US012735809B2

(12) United States Patent
Suga et al.

(10) Patent No.: US 12,735,809 B2
(45) Date of Patent: Sep. 15, 2026

(54) PEPTIDE LIBRARY PRODUCTION METHOD

(71) Applicant: The University of Tokyo, Tokyo (JP)

(72) Inventors: Hiroaki Suga, Tokyo (JP); Yuki Goto, Tokyo (JP); Ikuro Abe, Tokyo (JP); Masahiro Okada, Tokyo (JP); Sumika Inoue, Tokyo (JP)

(73) Assignee: The University of Tokyo, Tokyo (JP)

( * ) Notice: Subject to any disclaimer, the term of this patent is extended or adjusted under 35 U.S.C. 154(b) by 1404 days.

(21) Appl. No.: 17/283,599

(22) PCT Filed: Oct. 17, 2019

(86) PCT No.: PCT/JP2019/040975

§ 371 (c)(1),
(2) Date: Nov. 2, 2021

(87) PCT Pub. No.: WO2020/080490

PCT Pub. Date: Apr. 23, 2020

(65) Prior Publication Data

US 2022/0275534 A1 Sep. 1, 2022

(30) Foreign Application Priority Data

Oct. 17, 2018 (JP) ................................ 2018-196102

(51) Int. Cl.
*C40B 50/06* (2006.01)

(52) U.S. Cl.
CPC .................................. *C40B 50/06* (2013.01)

(58) Field of Classification Search
None
See application file for complete search history.

(56) References Cited

U.S. PATENT DOCUMENTS

2005/0123551 A1 6/2005 Sun
2016/0209421 A1 7/2016 Suga
2016/0272964 A1* 9/2016 Murakami ......... C12N 15/1062
2018/0022794 A1 1/2018 Olichon

FOREIGN PATENT DOCUMENTS

EP 0887416 12/1998
JP H11113579 4/1999
JP 2005521385 7/2005
JP 2015042159 3/2015
(Continued)

OTHER PUBLICATIONS

Okada et al., Stereospecific prenylation of tryptophan by a cyanobacterial post-translational modification enzyme, Oct. 12, 2016, pp. 9639-9644, vol. 14, No. 40, Publisher: Org Biomol Chem.
(Continued)

*Primary Examiner* — Christian C Boesen
(74) *Attorney, Agent, or Firm* — Suzannah K. Sundby, Esq.; Canady + Lortz LLP

(57) ABSTRACT

The purpose of the present invention is to provide a method of producing a peptide library including a step of bringing a peptide library including peptides having an amino acid sequence containing at least one Trp or derivative thereof into contact with a prenylation enzyme and prenylating at least a part of amino acid residues contained in at least some of the peptides.

14 Claims, 10 Drawing Sheets

Specification includes a Sequence Listing.

(56) References Cited

FOREIGN PATENT DOCUMENTS

| | | |
|---|---|---|
| JP | 2018506302 | 3/2018 |
| WO | 2014181888 | 11/2014 |

OTHER PUBLICATIONS

International Search Report received in PCT/JP2019/040975, mailed Dec. 24, 2019.
Written Opinion received in PCT/JP2019/040975, mailed Dec. 24, 2019.
Murakami et al., "A versatile tRNA aminoacylation catalyst based on RNA", 2003, pp. 655-662, vol. 10, No. 7, Publisher: Chem Biol.
Parajuli et al., "A Unique Tryptophan C-Prenyltransferase from the Kawaguchipeptin Biosynthetic Pathway", Mar. 7, 2016, pp. 3596-3599, vol. 55, No. 11, Publisher: Angew Chem Int Ed Engl.

* cited by examiner

Optimum immobilization amount is 46.7 pmol/1 μL beads.

Met3 or

Met9 or

Met3 and Met 9 may each have two cyclized structures.

PEPTIDE LIBRARY PRODUCTION METHOD

The content of the ASCII text file of the sequence listing named "20211102_034574_029US1_subseq_ST25" which is 260 kb in size was created on Nov. 2, 2021 and electronically submitted via EFS-Web herewith the application is incorporated herein by reference in its entirety.

TECHNICAL FIELD

The present invention relates to a method of producing a peptide library and a method of producing a peptide-mRNA complex library.

BACKGROUND ART

Research and development of various peptide drugs have recently been carried out. Peptide drugs have, as the largest advantage thereof, high affinity and high specificity to target molecules and ability of inhibiting protein-protein interaction which cannot be achieved by low molecular weight compounds. Due to chemical and biological diversity, peptide drugs tend to have higher specificity in interaction with target molecules than that of low molecular weight compounds and as a result, they can have greater physiological activity.

On the other hand, similar to most of other biopharmaceuticals, peptide drugs cannot penetrate a cellular membrane and therefore cannot reach the inside of cells and in addition, compared with large proteins such as antibodies, they are degraded in a short time due to their inferiority in protease resistance. They therefore have a problem with producing a sufficient effect. In recent years, improvement for such problems of peptide drugs has been investigated by subjecting peptides to various modifications.

The present inventors have developed a RAndom Peptide Integrated Discovery (RAPID) system as a protein translation system. This RAPID system is an experiment system that enables construction of a highly-diverse special cyclic peptide library and identification of active peptides from the library by using, in combination, an artificial translation synthesis system specialized in the synthesis of special cyclic peptides and a screening system making use of the characteristics of the translation system or molecular evolution engineering technique.

Since in the RAPID system, an arbitrary amino acid can be linked with an arbitrary tRNA by using an artificial aminoacylated RNA catalyst "flexizyme" (for example, Non-Patent Document 1), a desired amino acid can be bonded to tRNA having a desired anticodon. By making a desired amino acid correspond to an arbitrary codon different from that in a natural genetic code and performing codon reassignment for reprograming a genetic code table, it is possible to create a peptide library having an arbitrary amino acid containing a non-proteinogenic amino acid introduced at an arbitrary position of the peptide or a peptide library having a macrocyclic structure.

The highly-diverse special cyclic peptide library to be constructed includes peptides having enhanced protease resistance, cell permeability, or affinity or specificity to target molecules.

Further, by in vitro selection, peptides which will be active species that bind to an arbitrary target protein can be identified from the resulting library rapidly with high reliability.

CITATION LIST

Non-Patent Document

Non-Patent Document 1: H. Murakami, H. Saito, and H. Suga, (2003), Chemistry & Biology, Vol. 10, 655-662.

SUMMARY

Technical Problem

Peptides that bind to an arbitrary target protein can be identified rapidly using a peptide library created with a RAPID system, but the fact is that peptides thus identified have still failed to have sufficient cell membrane permeability.

Also for the purpose of creating peptides having activity to a target in cells, there is therefore an eager demand for a method of producing a peptide library including peptides excellent in cell membrane permeability.

An object of the present invention is to provide a novel method of producing a peptide library. In particular, an object is to provide a method of producing a peptide library capable of producing a peptide library including peptides which are expected to have cell membrane permeability and have a highly hydrophobic local structure.

Solution to Problem

The present inventors have proceeded with investigation to overcome the above-described problem. As a result, it has been found that the above-described problem can be overcome by modifying, in a peptide library, a predetermined amino acid contained in peptides constituting the peptide library with a prenylation enzyme, leading to the completion of the present invention.

The present invention is as follows.

[1] A method of producing a peptide library including prenylated peptide(s), including a step of bringing a peptide library including peptide(s) having an amino acid sequence containing at least one Trp or derivative thereof into contact with a prenylation enzyme and prenylating at least one Trp residue or derivative residue thereof.

[2] The method of producing a peptide library as described above in [1], wherein the prenylation enzyme is at least one or more selected from the group consisting of Enzyme 1 to Enzyme 21 and homologs thereof.

[3] The method of producing a peptide library as described above in [1], wherein the prenylation enzyme has any amino acid sequence of the following (1) to (3):

(1) an amino acid sequences represented by any of SEQ ID NOS: 1 to 56, (2) an amino acid sequence with one or more amino acid deletions, substitutions, or additions in an amino acid sequences represented by any of SEQ ID NOS: 1 to 56 having, and (3) an amino acid sequence having 80% or more homology with an amino acid sequences represented by any of SEQ ID NOS: 1 to 56.

[4] The method of producing a peptide library as described above in any of [1] to [3], wherein the peptide library includes a cyclic peptide.

[5] The method of producing a peptide library as described above in [4], wherein the cyclic peptide has a cyclic structure formed by bonding of two amino acid residues through a disulfide bond, peptide bond, alkyl bond, alkenyl bond, ester bond, thioester bond, ether bond, thioether bond, phosphonate ether bond, azo bond, C—S—C bond, C—N—C bond, C═N—C bond, amide bond, lactam bridge, carbamoyl bond, urea bond, thiourea bond, amine bond, thioamide bond, or triazole bond.

[6] The method of producing a peptide library as described above in any of [1] to [5], including, prior to the prenylation step, a step of translating an mRNA library in a cell-free translation system and preparing a peptide library including peptide(s) having an amino acid sequence containing at least one Trp or derivative thereof.

[7] A method of producing a peptide-genotype complex library, including: a step of preparing a peptide-genotype library including a complex between a genotype and a peptide, and a step of bringing the peptide-genotype library into contact with a prenylation enzyme to prenylate at least one Trp or derivative thereof.

[8] The method of producing a peptide-genotype complex library as described above in [7], wherein:

the peptide-genotype library preparation step includes a step of preparing a peptide-mRNA library by mRNA display method; and the peptide-mRNA library preparation step includes:

a step of bonding a puromycin to a 3'-end of each mRNA of an mRNA library to produce a puromycin-bound mRNA library, and a step of translating the puromycin-bound mRNA library in a cell-free translation system and preparing a peptide-mRNA library including peptide(s) having an amino acid sequence containing at least one Trp or derivative thereof.

[9] A screening method for identifying a peptide binding to a target material, including a step of bringing the peptide library prepared by the production method described above in any of [1] to [6] and/or the peptide-genotype complex library prepared by the production method described above in [7] or [8] into a target material, and a step of selecting a peptide binding to the target material.

[10] A method of producing a prenylated peptide, including a step of bringing a peptide having an amino acid sequence containing at least one Trp or derivative thereof into a prenylation enzyme and prenylating at least one Trp residue or derivative residue thereof.

[11] A method of producing a prenylated peptide as described above in [10], including a step of, prior to the prenylation step, synthesizing a peptide having an amino acid sequence containing at least one Trp or derivative thereof by chemical synthesis.

Advantage of the Present Invention

According to the present invention, a novel method of producing a peptide library can be provided.

Figure 1:
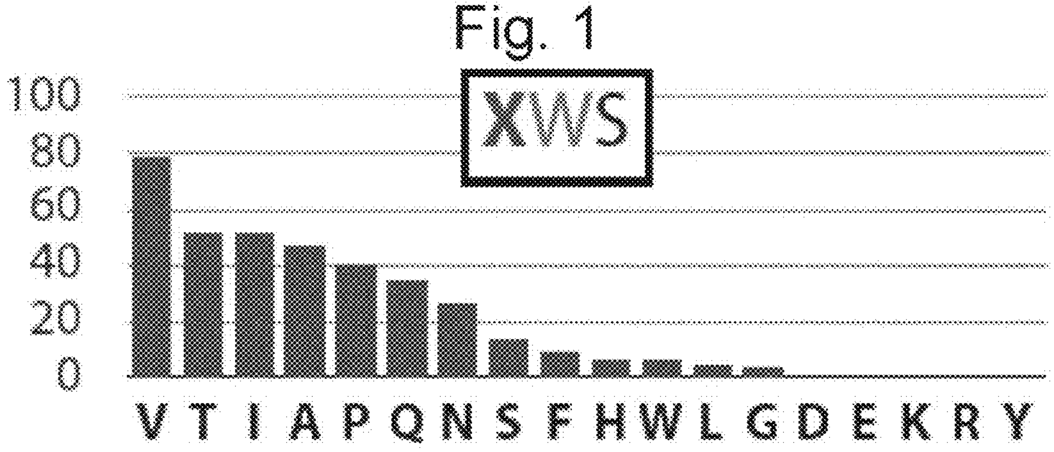
FIG. 1 is a histogram showing, in the mass spectrum of a reaction product obtained by changing the amino acid residue present upstream of W in peptide YG326, followed by prenylation, the results of quantitatively determining the respective peak intensities of an unmodified peptide and a modified peptide and calculating an apparent modification efficiency on the mass spectrum.

DESCRIPTION OF EMBODIMENTS (Method of Producing Peptide Library)

The method of producing a peptide library according to the present invention includes a step of bringing a peptide library including peptide(s) having an amino acid sequence containing at least one Trp or derivative thereof into contact with a prenylation enzyme and prenylating at least one Trp residue or derivative residue thereof.

The peptide library in the present invention includes at least two peptides. At least one of the peptides included in the peptide library of the present invention has an amino acid sequence containing at least one Trp or derivative thereof.

In the present invention, a peptide library including a highly hydrophobic peptide can be produced by prenylating some of Trps or derivatives thereof with a prenylation enzyme. Since the prenylation enzyme has high substrate tolerance, hydrophobicity of the peptide included in the peptide library can efficiently increase. For the reasons described above, the production method of the present invention makes it possible to efficiently introduce a hydrophobic group into a peptide and thereby produce a peptide library including peptide(s) expected to have cell membrane permeability.

(Step of Preparing Peptide Library)

As the peptide library used in the production method of the present invention, a peptide library may be obtained by production or may be obtained by purchase. When the peptide library is obtained by production, preferred examples of the production method include a method of producing a peptide library by solid-phase or liquid-phase chemical synthesis and a method of translating an mRNA library in a cell-free translation system and thereby preparing a peptide library including peptide(s) having an amino acid sequence containing at least one Trp or derivative thereof.

One of preferred aspects of the production method of the present invention includes a step of translating an mRNA library in a cell-free translation system and thereby preparing a peptide library including peptide(s) having an amino acid sequence containing at least one Trp or derivative thereof and a step of bringing the peptide library into contact with a prenylation enzyme and prenylating at least one Trp residue or derivative residue thereof.

The mRNA library contains an mRNA having a plurality of N1N2N3s as a codon.

The term "N1N2N3" as used herein means a codon specifying an arbitrary amino acid and for example, N1, N2, and N3 are each independently selected from adenine (A), guanine (G), cytosine (C), and uracil (U). One mRNA contains a plurality of N1N2N3s and the N1, N2 and N3 are each independently selected. For example, when mRNA has —N1N2N3-N1N2N3-, two N1s, N2s, and N3s may be the same or different from each other.

In the present invention, an arbitrary amino acid is reassigned to N1N2N3. In the reassignment, a codon-amino acid relation different from that in a natural genetic code table can be reassigned or alternatively, the same relation can be reassigned.

The term "natural genetic code table" means a table showing amino acids represented by genetic codes composed of an mRNA triplet in a living body. In the natural genetic code, N1N2N3 represents the following amino acids.

TABLE 1

| | U | C | A | G | |
|---|---|---|---|---|---|
| U | Phe | Ser | Tyr | Cys | U |
| | Phe | Ser | Tyr | Cys | C |
| | Leu | Ser | STOP | STOP | A |
| | Leu | Ser | STOP | Trp | G |
| C | Leu | Pro | His | Arg | U |
| | Leu | Pro | His | Arg | C |
| | Leu | Pro | Gln | Arg | A |
| | Leu | Pro | Gln | Arg | G |
| A | Ile | Thr | Asn | Ser | U |
| | Ile | Thr | Asn | Ser | C |
| | Ile | Thr | Lys | Arg | A |
| | Met | Thr | Lys | Arg | G |
| G | Val | Ala | Asp | Gly | U |
| | Val | Ala | Asp | Gly | C |
| | Val | Ala | Glu | Gly | A |
| | Val | Ala | Glu | Gly | G |

The mRNA library may include an mRNA containing, as the plurality of N1N2N3s, for example, any of a plurality of N1N2Ks, a plurality of N1N2Ss, a plurality of N1N2Ms, a plurality of N1N2Ws, a plurality of N1N2As, a plurality of N1N2Us, a plurality of N1N2Cs, and a plurality of N1N2Gs. In the present specification, N1 and N2 each have the same meaning as described above, Ks each independently represent either uracil (U) or guanine (G), Ss each independently represent either cytosine (C) or guanine (G), Ms each independently represent either adenine (A) or cytosine (C), and Ws each independently represent either adenine (A) or uracil (U).

For convenience, the present invention will next be described using, as an example, an mRNA library including mRNA having a plurality of N1N2Ks, that is, an mRNA library including mRNA having, as a codon, N1N2Ks as N1N2N3. Even if the other mRNA library is used, it may be possible insofar as a translated peptide library contains a peptide to be prenylated. In the natural genetic code table, N1N2K represents 20 kinds of amino acids with G or U in the right column of the table.

In the present specification, for example, Leu may be assigned to UUG as shown in the natural genetic code table or an amino acid other than Leu may be assigned by codon reassignment. Any amino acid can be assigned to a "N1N2K" codon. The term "an amino acid is assigned to a codon" means that a genetic code table is rewritten so that a certain codon encodes the amino acid. The term "an amino acid is assigned to a codon" and the term "a codon is reassigned" have the same meaning in the present specification.

Assignment of an amino acid to each codon different from that of the natural genetic code table is achieved by codon reassignment making use of, for example, an artificial aminoacylated RNA catalyst flexizyme. Using the flexizyme enables bonding of a desired amino acid to a tRNA having an arbitrary anticodon so that an arbitrary amino acid can be assigned to an arbitrary codon. The flexizyme will be described later. In the present invention, "bonding of an amino acid to tRNA" is also expressed by "charging an amino acid with tRNA", "aminoacylating tRNA", or "acylating tRNA with an amino acid".

In the present invention, a non-proteinogenic amino acid may be assigned to "N1N2K". For example, using, as a non-proteinogenic amino acid, an amino acid having a cyclic structure or an N-alkylamino acid makes it possible to obtain a peptide library having enhanced resistance to proteolysis, cell membrane permeability, and conformational rigidity. Such a peptide library is useful for the screening of peptides targeting an intracellular disease-related molecule or a molecule having a protease activity. When mRNA contains two or more "N1N2Ks", all of them may be assigned to a non-proteinogenic amino acid or some of them may be assigned to a non-proteinogenic amino acid.

The term "amino acid" as used herein is used in its broadest meaning and it embraces not only natural amino acids but also artificial amino acid mutants and derivatives. The amino acids may be represented by a commonly used single-letter or three-letter code. Examples of the amino acid or derivatives thereof used herein include natural proteinogenic L-amino acids, unnatural amino acids, and chemically synthesized compounds having properties known in the art as characteristics of an amino acid. Examples of the unnatural amino acids include, but not limited to, α,α-disubstituted amino acids (such as α-methylalanine), N-alkyl-α-amino acids, D-amino acids, β-amino acids, and α-hydroxy acids, each having a main chain structure different from that of natural amino acids; amino acids (such as norleucine and homohistidine) having a side-chain structure different from that of natural amino acids; amino acids (such as "homo" amino acids, homophenylalanine, and homohistidine) having extra methylene in the side chain thereof; and amino acids (such as cysteic acid) obtained by substituting the functional group of a carboxylic acid in the side chain of the amino acids by a sulfonic acid group.

The term "amino acid" as used herein embraces proteinogenic amino acids and non-proteinogenic amino acids. The term "proteinogenic amino acid" as used herein means an amino acid (Arg, His, Lys, Asp, Glu, Ser, Thr, Asn, Gln, Cys, Gly, Pro, Ala, Ile, Leu, Met, Phe, Trp, Tyr or Val) constituting a protein.

The term "non-proteinogenic amino acid" as used herein means a natural or unnatural amino acid other than the proteinogenic amino acid.

The derivative of Trp is represented, for example, by the following formula (I), formula (II), or formula (III). It is to be noted that the chemical structural formula shown herein embraces tautomers, geometrical isomers, optical isomers, and the like. In particular, asymmetric carbon in the formula (I), formula (II), or formula (III) may have either an R configuration or an S configuration, or a mixture of them.

[Chemical formula 1]

(I)

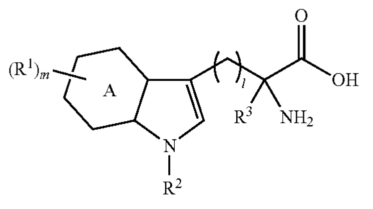

The ring A in the formula (I) is an aromatic 6-membered ring which may contain a hetero atom; R1 is an arbitrary substituent on the ring A; $R^2$ and $R^3$ each independently represent a hydrogen atom or an arbitrary substituent; m stands for any integer of from 0 to 4, and l stands for an integer of 1 or 2.

Examples of the ring A include benzene ring, pyridine ring, pyridazine ring, pyrimidine ring, and pyrazine ring.

Although the substituents $R^1$, $R^2$, and $R^3$ are not particularly limited, examples include a hydroxy group; halogen groups such as fluorine group, chloro group, bromo group, and iodo group; alkyl groups having from 1 to 10 carbon atoms such as methyl group, ethyl group, and propyl group; aryl groups such as phenyl group and naphthyl group; aralkyl groups such as benzyl group; and aralkyloxy groups such as benzyloxy group.

[Chemical formula 2]

(II)

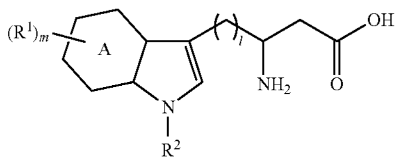

In the formula (II), the ring A, $R^1$, $R^2$, m, and l have the same meanings as the ring A, $R^1$, $R^2$, m, and l in the formula (I). The ring A in the formula (II) is preferably a benzene ring.

[Chemical formula 3]

(III)

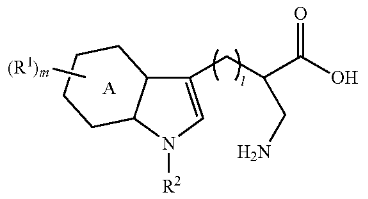

In the formula (III), the ring A, $R^1$, $R^2$, m, and l have the same meanings as the ring A, $R^1$, $R^2$, m, and l in the formula (I). The ring A in the formula (III) is preferably a benzene ring.

Examples of the Trp derivative represented by the formula (I) include the following derivatives.

[Chemical formula 4]

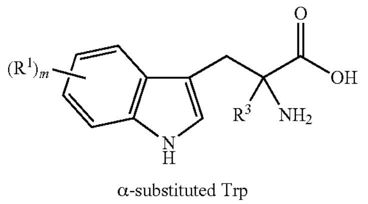

α-substituted Trp

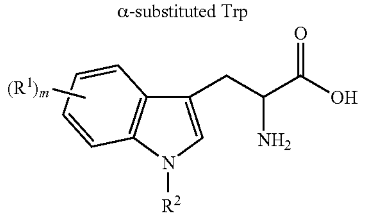

$N_{indole}$-substituted Trp

-continued

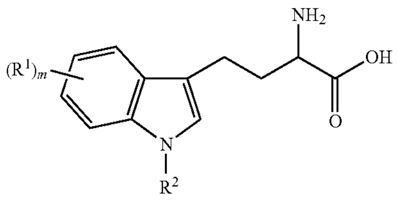

homoTrp

In the above derivatives, $R^1$, $R^2$, $R^3$ and m have the same meanings as $R^1$, $R^2$, $R^3$, and m in the formula (I).

Specific examples of the derivatives of Trp include D-tryptophan, 5-methyltryptophan, 5-hydroxytryptophan, 7-azatryptophan, and 5-benzyloxytryptophan.

It is presumed that since the Trp residue is prenylated to form a structure having an alkylated main-chain nitrogen as shown in the following formula (T1), a hydrogen bond donor decreases and the peptide containing the Trp residue tends to have improved hydrophobicity and membrane permeability (Refer to Beilstein J Org Chem. 2017 Feb. 22; 13:338-346.).

[Chemical formula 5]

(T1)

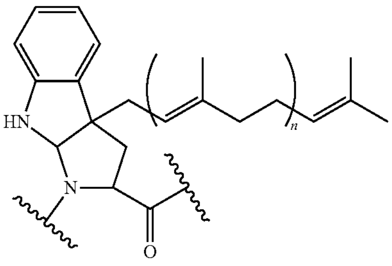

Here, the prenyl group is a structural unit composed of $C_5$ isoprene unit(s) and it is the following structure portion when the formula (T1) is used as an example.

[Chemical formula 6]

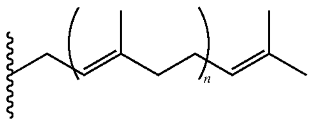

(In the above structure, n stands for any integer of from 0 to 11).

Although the steric configuration in the formula (T1) is not particularly limited, examples include steric configurations represented by the following formula (T1-1) and (T1-2). The steric configuration in the formula (T1) preferably has the steric configuration represented by the following formula (T1-1).

[Chemical formula 7]

(T1-1)

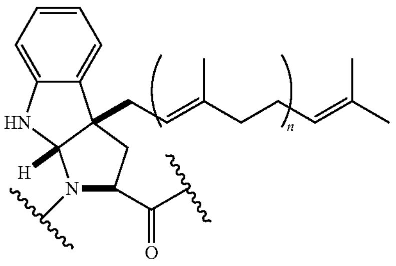

(T1-2)

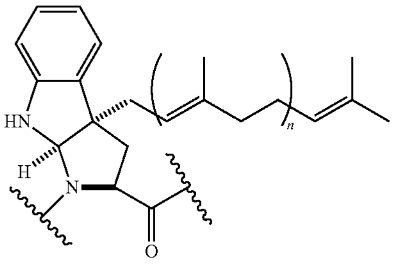

When the derivative residue of Trp is prenylated, the resulting product can be represented by the following formulas (I-1), (II-1), and (III-1).

[Chemical formula 8]

(I-1)

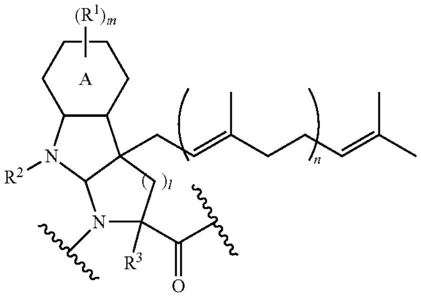

(II-1)

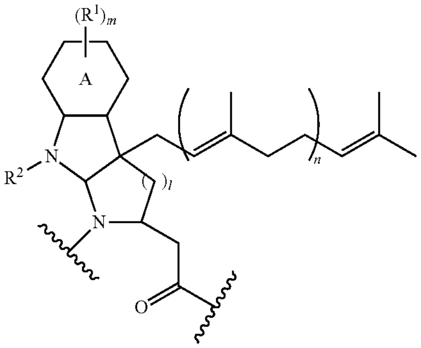

-continued (III-1)

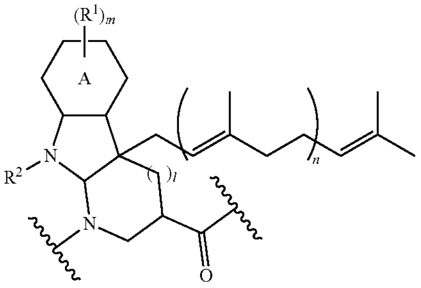

(In the formulas (I-1), (II-1), and (III-1), the ring A, $R^1$, $R^2$, $R^3$, m, and l have the same meanings as the ring A, $R^1$, $R^2$, $R^3$, m, and l in the formula (I), respectively).

By the method of producing a peptide library according to the present invention, a peptide library including several kinds of peptides including an amino acid encoded by "N1N2N3" can be produced. The number of amino acids encoded by "N1N2N3" included in each peptide is not particularly limited, it can be set at, for example, 4, 5, 6, 7, 8, 9, 10, 15, 20, or 30. The position of an amino acid encoded by "N1N2N3" in each peptide is not particularly limited. Amino acids encoded by "N1N2N3" in each peptide may be adjacent to each other or may be separated from each other.

In the method of producing a peptide library according to the present invention, an mRNA library including mRNA(s) which encode each peptide of the peptide library, respectively, and each of which contains at least one N1N2N3 is prepared.

The sequence of mRNAs which encode the peptides of the peptide library, respectively, can be determined depending on the amino acid sequence of the peptides constituting the peptide library and such an mRNA library can be prepared by synthesizing a DNA library encoding it and transcribing the resulting library.

For example, as shown below in Table 2, an mRNA library including mRNAs having, as N1N2N3, NNG, NNK, NNS, NNM, NNW, NNA, NNU or NNC can be designed while making use of the natural genetic code table.

TABLE 2

| |
|---|
| AUG (NNG)n UGU (SEQ ID NO: 491) |
| AUG (NNK)n UGU (SEQ ID NO: 492) |
| AUG (NNS)n UGU (SEQ ID NO: 493) |
| AUG (NNM)n UGU (SEQ ID NO: 494) |
| AUG (NNW)n UGU (SEQ ID NO: 495) |
| AUG (NNA)n UGU (SEQ ID NO: 496) |
| AUG (NNU)n UGU (SEQ ID NO: 497) |
| AUG (NNC)n UGU (SEQ ID NO: 498) |

In Table 2, the Ns are each independently selected from adenine (A), guanine (G), cytosine (C), and uracil (U).

In the above table, Ks each independently represent either uracil (U) or guanine (G);

Ss each independently represent either cytosine (C) or guanine (G);

Ms each independently represent either adenine (A) or cytosine (C); and

Ws each independently represent either adenine (A) or uracil (U).

In the above table, n is an arbitrary integer of 1 or more, preferably any integer of from 1 to 100, more preferably any integer of from 3 to 50, still more preferably any integer of from 3 to 20, still more preferably any integer of from 6 to 15.

When the natural genetic code table is used, a triplet encoding Trp is only one kind, that is, UGG, among 64 kinds of N1N2N3s. In theory, this suggests that the probability of one N1N2N3 triplet encoding Trp is 1 in 64. On the other hand, for example, the probability of one NNK triplet encoding Trp is 1 in 32. An mRNA library including, for example, mRNA(s) having 12 triplet repeats and having NNK as N1N2N3 can be designed while making use of the natural genetic code table. Such an mRNA library theoretically has diversity as high as $1.15\times10^{18}$ and includes 22% mRNAs not only containing no stop codon but also containing at least one UGG.

For example, the probability of one NNG triplet encoding Trp is 1 in 16. Such an mRNA library including NNG triplets and having n of 12 theoretically has diversity as high as $2.8\times10^{14}$ and includes 26% mRNAs not only containing no stop codon but also containing at least one UGG.

The present inventors have found that in the prenylation of a Trp residue with a prenylation enzyme, an amino acid residue upstream or downstream of the Trp residue has an influence on a modification efficiency. By using an mRNA library including mRNA(s) containing a codon encoding an amino acid residue which is adjacent to a Trp or derivative thereof to be prenylated and promotes the prenylation of the Trp or derivative thereof, the prenylation efficiency of the Trp or derivative thereof can be improved.

For example, as shown below in Table 3-1, using an mRNA containing UGG and a codon (XXX, YYY) adjacent to UGG and encoding an amino acid residue that promotes prenylation enables efficient introduction of a prenyl group in a peptide library.

TABLE 3-1

| |
|---|
| AUG (N1N2N3)n XXX UGG (N1N2N3)m UGU (SEQ ID NO: 499) |
| AUG (N1N2N3)n UGG YYY (N1N2N3)m UGU (SEQ ID NO: 500) |
| AUG (N1N2N3)n XXX UGG YYY (N1N2N3)m UGU (SEQ ID NO: 501) |

In Table 3-1, XXX is a degenerate codon sequence that specifies a group of upstream amino acids which become more susceptible to a prenylation enzyme used.

YYY is a degenerate codon sequence that specifies a group of downstream amino acids which become more susceptible to a prenylation enzyme used.

In the above table, n and m each independently represent an any integer of 0 or more and the sum of n and m is preferably any integer of from 1 to 100, more preferably any integer of from 3 to 50, still more preferably any integer of from 3 to 20, still more preferably any integer of from 4 to 13.

N1N2N3 has the same meaning as defined above and is, for example, a codon selected from the group consisting of NNK, NNS, NNW, NNM, NNA, NNC, NNG, and NNU. Two or more N1N2N3s are each a codon independently selected.

A modification efficiency with a prenylation enzyme changes depending on the kind of a prenylation enzyme used and it can be enhanced by adjusting an upstream and/or downstream amino acid residue adjacent to Trp (XXX, YYY as a corresponding codon). The amino acid sequence(s) for efficiency enhancement composed of Trp and the upstream and/or downstream amino acid residue(s) adjacent to Trp, XXX and YYY can be determined as needed by comprehensively preparing peptides in a cell-free translation system and carrying out an efficiency confirmation test by performing in vitro prenylation with a predetermined prenylation enzyme.

When KgpF is used as a prenylation enzyme, prenylated Trp can be introduced into a peptide efficiently by being contained the mRNAs shown in Table 3-2, among mRNAs in Table 3-1, in a library.

TABLE 3-2

| |
|---|
| AUG (NNK)n XXX UGG (NNK)m UGU (SEQ ID NO: 502) |

In Table 3-2, XXX, NNK, n, and m have the same meanings as described above.

Using an mRNA library including such a mRNA as the mRNA shown in Table 3-2, having an n and m of arbitrary integer and containing UGG while making use of the natural genetic code table makes it possible to fix the appearance position of UGG in the resulting peptide library and control the position of the Trp residue to be prenylated in the peptide. Further, when, for example, KgpF is used as a prenylation enzyme, the prenylation efficiency of the Trp residue can be made higher by designating the triplet XXX upstream of UGG to RYU or CMG and/or designating the triplet downstream of UGG to NNK. Such an mRNA library theoretically has diversity as high as $6.8\times10^{16}$ and includes 73% mRNAs not only containing no stop codon but also containing at least one UGG.

In Table 3-2, when XXX represents RYU or CMG, Rs each independently represent G or A, Ys each independently represent U or C, Ms each independently represent A or C, and Ks each independently represent G or U.

In the method of producing a peptide library according to the present invention, the mRNAs of the mRNA library are each translated in a cell-free translation system having, for example, 20 kinds of tRNAs having an anticodon for any of 20 N1N2N3 codons and charged with an amino acid corresponding to the codon.

For codon reassignment, a translation system obtained by arbitrarily removing a component constituting a translation system depending on a purpose and then reconstituting with only necessary components can be used. For example, when a translation system from which a specific amino acid has been removed is reconstituted, a codon corresponding to the amino acid becomes an empty codon, that is, a codon not encoding any amino acid. An arbitrary amino acid is then linked to a tRNA having an anticodon complementary to the empty codon by making use of flexizyme or the like. After addition of the resulting tRNA, translation is performed. The arbitrary amino acid is then encoded by the codon and a peptide having the arbitrary amino acid introduced therein instead of the removed amino acid is translated.

The tRNA to be used in the present invention may be a wild-type *Escherichia-coli* derived tRNA or an artificial tRNA prepared by in vitro transcription.

In the present invention, 20 kinds of tRNAs corresponding to 20 kinds of N1N2N3 to be used in the translation system may have the same sequence except for an anticodon loop portion. Using such a constitution enables the tRNAs to have uniform reactivity without enhancing or reducing the reactivity of a specific tRNA, leading to expression of a predetermined peptide with good reproducibility.

The term "cell-free translation system" as used herein means a translation system not containing cells. As the cell-free translation system, for example, an *Escherichia coli* extract, a wheat germ extract, a rabbit reticulocyte extract, or an insect cell extract can be used. Also usable is a reconstituted cell-free translation system constructed by the reconstitution of ribosome protein, aminoacyl-tRNA synthetase (aaRS), ribosomal RNA, amino acid, rRNA, GTP, ATP, translation initiation factor (IF), elongation factor (EF), release factor (RF), and ribosome regeneration factor (RRF), and another factor necessary for translation, each of which has been purified.

The system may contain an RNA polymerase for simultaneously performing transcription from DNA. As a commercially available cell-free translation system, usable are *Escherichia-coli* derived systems such as RTS-100 (registered trademark) of Roche Diagnostics, reconstituted translation systems such as PURESYSTEM (registered trademark) of PGI, PUREfrex of GeneFrontier, PURExpress In Vitro Protein Synthesis Kit of New England Biolabs, and systems using a wheat germ extract such as those of ZOEGENE and CellFree Sciences.

As a system using a ribosome of *Escherichia coli*, for example, techniques described in the following documents are known: H. F. Kung et al., 1977. The Journal of Biological Chemistry Vol. 252, No. 19, 6889-6894; M. C. Gonza et al., 1985, Proceeding of National Academy of Sciences of the United States of America Vol. 82, 1648-1652; M. Y. Pavlov and M. Ehrenberg, 1996, Archives of Biochemistry and Biophysics Vol. 328, No. 1, 9-16; Y. Shimizu et al., 2001, Nature Biotechnology Vol. 19, No. 8, 751-755; H. Ohashi et al., 2007, Biochemical and Biophysical Research Communications Vol. 352, No. 1, 270-276.

By using the cell-free translation system, a highly-pure expression product can be obtained without purification.

The cell-free translation system of the present invention may be used for not only for translation but also for transcription after addition of factor(s) necessary for transcription.

In the present invention, it is preferred not to add a natural aminoacyl-tRNA synthetase corresponding to an N1N2K codon to the cell-free translation system. In this case, the tRNA corresponding to the N1N2K codon can be charged with a corresponding amino acid, for example, by an artificial aminoacyl-tRNA synthetase such as flexizyme.

The peptide library in the present invention may include a cyclic peptide obtained by cyclization of a peptide. The term "cyclic peptide" as used herein means a peptide having a cyclic structure composed of 4 or more amino acids. The term "cyclic structure" means, in a linear peptide, a closed ring structure formed in the molecule by bonding, directly or via a linker or the like, of two amino acids separated from each other by two or more amino acid residues. The term "separated from each other by two or more amino acid residues" means that the two amino acids have at least two amino acid residues therebetween.

The cyclic structure is formed by bonding of two amino acids through a disulfide bond, peptide bond, alkyl bond, alkenyl bond, ester bond, thioester bond, ether bond, thioether bond, phosphonate ether bond, azo bond, C—S—C bond, C—N—C bond, C=N—C bond, amide bond, lactam bridge, carbamoyl bond, urea bond, thiourea bond, amine bond, thioamide bond, triazole bond, or the like. The kind of the bond is however not limited to them.

Cyclization of a peptide is sometimes useful for stabilizing the structure of the peptide and enhancing its affinity for a target.

The number of amino acids constituting a cyclic structure, in other words, amino acids forming a ring in the cyclic peptides is not particularly limited insofar they are four amino acids or more. They may be, for example, 4 amino acids or more, 5 amino acids or more, 8 amino acids or more, 15 amino acids or less, 20 amino acids or less, 25 amino acids or less, 30 amino acids or less, or the like.

The cyclization is not limited to that formed by bonding of the N-terminal and C-terminal amino acids of a peptide, but it may be formed by bonding of a terminal amino acid and a non-terminal amino acid or bonding of non-terminal amino acids. When one of the amino acids bonded for ring formation is a terminal amino acid and the other one is a non-terminal amino acid, the resulting cyclic peptide has a cyclic structure having a linear peptide attached thereto like a tail. Such a structure is sometimes called "lasso type" herein.

The term "amino acids adjacent to each other" as used herein means amino acids adjacent to each other even after a ring is formed. Amino acids adjacent to each other are, in a peptide, amino acids which are not separated from each other by one or more amino acid residues and in which amino acid residues have bonded to each other directly.

For cyclization, for example, a chloroacetylated amino acid may be used as the N terminal and a Cys may be placed downstream (on the C-terminal side) of the N terminal. In this case, through thioether bonding between the N-terminal amino acid and the Cys placed downstream (on the C terminal side) of the N terminal, spontaneous cyclization of the peptide occurs after expression. A thioether bond formed between a chloroacetylated amino acid and a Cys is not susceptible to degradation even under reducing conditions in a living body so that a physiologically active effect can be continued while prolonging the half-life in blood of the peptide.

Examples of the chloroacetylated amino acid include N-chloroacetyl-L-alanine, N-chloroacetyl-L-phenylalanine, N-chloroacetyl-L-tyrosine, N-chloroacetyl-L-tryptophan, N-3-chloromethylbenzoyl-L-phenylalanine, N-3-chloromethylbenzoyl-L-tyrosine, N-3-chloromethylbenzoyl-L-tryptophane, N-3-(2-chloroacetamido)benzoyl-L-phenylalanine, N-3-(2-chloroacetamido)benzoyl-L-tyrosine, and N-3-(2-chloroacetamido)benzoyl-L-tryptophane, and D-amino acid derivatives corresponding thereto.

Using, for example, Nγ-(2-chloroacetyl)-α,γ-diaminobutyric acid or Nγ-(2-chloroacetyl)-α,γ-diaminopropanoic acid as the chloroacetylated amino acid enables introduction of itself into any site of the peptide chain so that a thioether bond is formed between the amino acid at any position and a cysteine in the same peptide to form a cyclic structure.

The cyclization method may be carried out according to the method described, for example, in Kawakami, T. et al., Nature Chemical Biology 5, 888-890 (2009); Yamagishi, Y. et al., Chem Bio Chem 10, 1469-1472 (2009); Sako, Y. et al., Journal of American Chemical Society 130, 7932-7934 (2008); Goto, Y. et al., ACS Chemical Biology 3, 120-129 (2008); and Kawakami T. et al, Chemistry & Biology 15, 32-42 (2008).

The chloroacetylated amino acid and Cys may be bound to the peptide of the present invention directly or may be bonded via a linker or the like.

When the C-terminal amino acid of the cyclic peptide is not used for cyclization, this C terminal is not limited to a carboxyl group or a carboxylate group but may also be in the form of an amide or ester. The cyclic peptide of the present invention embraces salts of the cyclic peptide. Examples of the salts of the cyclic peptide include salts with a physiological acceptable base or acid such as addition salts of an inorganic acid (such as hydrochloric acid, hydrobromic acid, hydroiodic acid, sulfuric acid, or phosphoric acid), addition salts of an organic acid (such as p-toluenesulfonic acid, methanesulfonic acid, oxalic acid, p-bromophenylsulfonic acid, carboxylic acid, succinic acid, citric acid, benzoic acid, or acetic acid), inorganic bases (such as ammonium hydroxide, alkali or alkaline earth metal hydroxides, carbonates, or bicarbonates), and addition salts of an amino acid.

The cyclic peptide of the present invention may be those modified through phosphorylation, methylation, acetylation, adenylylation, ADP ribosylation, glylcosylation or the like insofar as it solves the problem of the present invention. It may be those fused with another peptide or protein.

(Prenylation Step)

The method of producing a peptide library according to the present invention includes a step of bringing a peptide library into contact with a prenylation enzyme and prenylating at least a part of Trps or derivatives thereof included in at least some of peptides. The term "prenylation enzyme" as used herein means an enzyme capable of bonding a prenyl group composed of a $C_5$ isoprene unit to at least a part of Trps or derivatives thereof contained in the peptide. The term "prenyl group" as used herein embraces a group having a plurality of isoprene units consecutively bonded to each other. Prenyl groups having 1, 2, 3, 4, 5, 6, 8, and 10 isoprene units may be called "dimethylallyl group", "geranyl group", "farnesyl group", geranylgeranyl group", "geranylfarnesyl group" "hexaprenyl group", "octaprenyl group", and "decaprenyl group", respectively.

In the prenylation step in the method of producing a peptide library according to the present invention, a peptide library is preferably brought into contact with a prenylation enzyme in the presence of a donor for a prenyl group. The donor for providing a prenyl group is not particularly limited and examples include dimethylallyl diphosphate (DMAPP), isoprenyl diphosphate (IPP), geranyl diphosphate (GPP), farnesyl diphosphate (FPP), geranylgeranyl diphosphate (GGPP), and phytyl diphosphate (PDP). These prenyl group donors may be used either singly or in combination of two or more.

The prenylation step in the method of producing a peptide library in the present invention may be performed in the presence or absence of a cofactor. The term "cofactor" as used herein means a material capable of enhancing the catalytic activity of an enzyme. Although the cofactor is not particularly limited, examples include magnesium ion, copper ion, iron ion, manganese ion, molybdenum ion, nickel ion, selenium ion, zinc ion and the like. They may be used either singly or in combination of two or more. Of these, magnesium ion is preferred.

Whether the cofactor is used or not in the method of producing a peptide library according to the present invention may be selected as needed, depending on the prenylation enzyme used. When a peptide library to be subject to prenylation is prepared in a cell-free translation system, prenylation can be performed without adding a cofactor because cofactor(s) is sometimes contained in this cell-free translation system.

Specific examples of the prenylation enzyme usable in the present invention include KgpF, OltF, TruF1, TruF2, PatF, LynF, AcyF, OscF and PagF, and homologs thereof capable of prenylating a Trp residue or Trp derivative, each listed below in Tables 4-1 to 4-2. These prenylation enzymes can modify a very wide range of substrates regardless of the kind of amino acid residues adjacent to a Trp or derivative thereof to be prenylated, as verified in Examples described later. The term "amino acid derivative" as used herein is used in its broadest sense. It embraces any amino acids other than natural amino acids and also includes the above-described artificial amino acid mutants and derivatives. The prenylation enzyme in the present invention can prenylate even an amino acid residue contained in a cyclic peptide so that also from this standpoint, it can modify a very wide range of substrates.

The prenylation enzyme can also be used while being supported on a solid-phase support such as magnetic beads. The prenylation enzyme in the present invention therefore embraces an aspect of an enzyme supported on a solid-phase support. The prenylation enzyme in the present invention may have an addition sequence of His tag, glutathione-S-transferase (GST), maltose-bound protein (MBP), or the like.

The prenylation enzyme and homologs thereof capable of prenylating a Trp or derivative thereof are not particularly limited insofar as they can prenylate a Trp or derivative thereof. As the prenylation enzyme, preferred is, as a result of selecting a known prenylation enzyme (enzyme obtained as a result of BLAST search analysis), forming a sequence alignment by using, for example, a Clusta lW, MEGA7 software, and performing phylogenetic analysis, an enzyme having an amino acid sequence found to have homology with the amino acid sequence of this known prenylation enzyme. The enzyme having an amino acid sequence found to have homology as a result of analysis includes a protein annotated as hypothetical protein.

As the prenylation enzyme, for example, Enzyme 1 to Enzyme 21 listed in Table 4-1 and Table 4-2 can be used. These enzymes may be used in combination of two or more.

Homologues of the prenylation enzymes from Enzyme 1 to Enzyme 21 are not particularly limited insofar as they are enzymes serving to prenylate a Trp or derivative thereof and they may be enzymes having an amino acid sequence having 20% or more homology with the alignment of Enzyme 1 to Enzyme 21.

The prenylation enzyme in the present specification is not particularly limited insofar as it has at least a domain engaged in a prenylation reaction. The homologs of Enzyme 1 to Enzyme 21 may be an aspect of an enzyme having a domain engaged in the prenylation reaction and a domain engaged in the other function (such an enzyme may also be called "bi-functional enzyme") or may be an aspect of two or more enzymes each having a domain engaged in prenylation.

Of the enzymes listed in Table 4-1 and Table 4-2, enzymes of Group 1 and Group 2 are preferred, with enzymes of Group 1 being more preferred.

TABLE 4-1A

| Group | Enzyme | accession No. | name or annotation | SEQ ID NO: | amino acid sequence |
|---|---|---|---|---|---|
| 1 | 1 | WP_061432709.1 | KgpF or LynF/TruF/PatF family peptide O-prenyltransferase [Microcystis aeruginosa] | 1 | MINYANAQLHKSKNLMYMKAHENIFEIEALYPLELFERFMQSQTDCSIDCACKIDGDELYPARFSLALYNNQYAEKQIRETIDFFHQVEGRTEVKLNYQQLQHFLGADFDFSKVIRNLVGVDARRELADSRVKLYIWMNDYPEKMATAMAWCDDKKELSTLIVNQEFLVGFDFYFDGRTAIELYISLSSEEFQQTQVWERLAKVVCAPALRLVNDCQAIQIGVSRANDSKIMYYHTLNPNSFIDNLGNEMASRVHAYYRHQPVRSLVVCIPEQELTARSIQRLNMYYCMN |
| | 2 | WP_052338757.1 | OltF or LynF/TruF/PatF family peptide O-prenyltransferase [Planktothrix] | 2 | MTYPSLLTASQKNLQFIGEHKNAFDLEYLYPLDLFEDLVAQVEPCRIECSCKIENNKLDPARFNLAINDSFARKAQAFLGFFHQVETRVGVIIDYKPLHFFMKGFDYSKVTQIMAGIDARAELTEARVKTWWAIDNYPEKLETAIALSQSDSKPLRMLLEINNSLVIGFHLYLRGKSEVRLYPSVSREDFKKVSVQAQLAKILSTPALKLLEDSVAISLVLKENGDKILHYHVLPERVNSFVNNLHQDMITRAHAPYRNKSQSLGCTVSLSEKELLAGYLKTINLYYMNT |
| 2 | 3 | WP_069351383.1 | LynF/TruF/PatF family peptide O-prenyltransferase [Scytonema millei] | 3 | MITDKHTLVDTNKNLHYIGEHKRAFQVESVYPLDIFERFVQEATDWGLECSCKIEKDKLYPIRFNLFRNHPSFKQFDAALDFFQQVEARDDVKLDYKLMHLFLGNYFDFNKIAQILVGVDLRTELSASRLKLWFVIQNYPEKLETAFALCDLKEELRALIVCCSLVVVGFDFYLDGRTNIELYPRILKKELQEVDVWKQLAKVVSPPTLQLLDSCWAFMLGFSKANPETILYCPARDPDSFIANLSNDLADRVHAYYQKQPVRGTIVAFRERELLAGAIENLNLYYQMSLGVTKKSEKFDGCVAKTGEAGADIQK |
| | 4 | CEJ46811.1 | Anacyclamide synthesis protein AcyF [Chrysosporum ovalisporum] | 4 | MTISENLFIGSQKNLHYINQHKHIFDVDHLYTLNIFDDFAQKVTHWGLECSCKIQKDQLYPARFNLFRNQPNWQDYQTAINFFQQVAAKTDVKLTYHLIENFVGNDFDFSKVHQILVGIDLRREFSASRLKFWFIISDYPQKLAKAISLCQSAEELQPFLVDNSVVIGFDFDFNGGSEIEVYPSISKEKFQQLAKVLSPQALQLLDSCWSLIIGFSQGNAEKILYYRTSDPNNFIANLRNDLANRVHAYYREQPVQGTIVGLRENEIIAGRIENLNLYYQMSSPITTNKN |

TABLE 4-1A-continued

| Group | Enzyme | accession No. | name or annotation | SEQ ID NO: | amino acid sequence |
|---|---|---|---|---|---|
| | 5 | WP_028090374.1 | LynF/TruF/PatF family peptide O-prenyltransferase [Dolichospermum circinale] | 5 | MTISENLFIGSQKNLHYINQHKHIFDVDHLYTLNIFDDFAQKVTHWGLECSCKIQKDQLYPARFNLFRNQPNWQDYQTAINFFQQVAAKTDVKLTYHLIENFVGNDFDFSKVHQILVGIDLRREFSASRLKFWFIISDYPQKLAKAISLCQPAEELQPFLVDNSVVIGFDFDFYGGSQIEVYPSISKEKFQQLAKVLSPQALQLLDSCWSLIIGFSQANPEKILYYRTSDPNNFIANLRNDLANRVHAYYREQPVQGTIVGLRENEIIAGRIENLNLYYQMSSPITTNKN |
| | 6 | WP_099072935.1 | LynF/TruF/PatF family peptide O-prenyltransferase [Nostoc linckia] | 6 | MVTYKPIQVDSEPYLEYIGKHKRAFDIYEDLYPVKLFEDFVQVEGRQGGMFRCGCNVTKDELSPARFALLFPTQDDLQSLHNPQQQLEAAFDFFRKVEGRAEVKVNYHLLEKFFGKNPDFGGIYFIAVGVDAQTEISESRLKLFIHLHDAPDKIESAIALSGDSPTLRAFLVNNDLLVGFDFYLDGRSEIEVYPTIYQEELKRADIQSRILPLLPPRALPLLKQCEVLQIGISPANKSNILYFDFVRDPNTFIDNLGNEMAKKVHAYYRHQPVQHVLVGVSEKDLYASSIEKVKLYYFKK |

TABLE 4-1B

| | | | | | |
|---|---|---|---|---|---|
| 2 | 7 | WP_099072934.1 | LynF/TruF/PatF family peptide O-prenyltransferase [Nostoc linckia] | 7 | MVTYNPIKTNSERYLEYIGKHKLAFDIYEDLYPLKIFEDFVEVEAKKRGLFYILSNVDKDEIYPARFCLRFPSLEEAQLLYNPQQQLQTALNFFRQVESRPEVKLNYHHIQQFFGSISDFQGIILMAVAIDARTVITESRLKLYVWLKNAPEKVETAIALCGDSPTLRAFLVNDKLQVGFDLFFNGESEIEVYPIISQDELQQVHIRDRIIPLLPPRALPLLQQCAVFQVGFSEANESNILYFDYVHDPNSFVDNLGNEMTKKIHAYYRHQPIKSLTVGIPEHNFYGRAIEHVKLYYDMN |
| | 8 | WP_061432522.1 | LynF/TruF/PatF family peptide O-prenyltransferase [Microcystis aeruginosa] | 8 | MVLKSNKKLYYISANKHAFEIDNLYPLNLFEGFVERIEKIEKTENCVLESSCKIDHDKLYPVRFNIGFPNNSIKQLHAVMDFFRRVESRVDVKLNLSLFQQFIGNDFKLDKMTDLMLGIDLRRDLSDSRLKIGLTIEDYPEKQKAAVILNNNIDEVTSNLLISNRLHIGFDFYLNGRSEMELYPHIMQQDFQKLDVQQRLSKVLSPPALQVVPACTRICVGISKANRDKIIYYYLENMGDFLNYFTVNDTARKVHAYYLKQPVVEMCVALPESELLAGTTIKNLNLYYLL |
| | 9 | WP_035367793.1 | LynF/TruF/PatF family peptide O-prenyltransferase [Dolichospermum circinale] | 9 | MTTLLESGKKIYYIGIHKQIFEIKNFYPLDIFDSFVNQIETTSENCSLESSCKIELDKLYPARFGIGFTLKNLKQLNVVYEFFQKVESRIDVQINYSLIQQFFGENFDFNKMTEFMVGIDARQELSETKLKIALTIKNYPEKIKTAIALNGGLDKNIYNLLVSNSLHIGFDLSLDGRSEIELYPYIRNQEFQIFDIQQRLATVLSPQALQFLPICSRICVGLSKANADKVVYFYLKNLNDFLNYFTVNDTARRVHAYYQQQPMREMCVAVQEKQLLGGTIEKMNLYYLI |
| | 10 | WP_052345004.1 | LynF/TruF/PatF family peptide O-prenyltransferase [Planktothrix rubescens] | 10 | MTYPSLLTASQKNLQFIGEHKNAFDLEYLYPLDLFEDLVAQVEPCRIECSCKIEDDKLDPARFNLAINDSFARKAQAFLGFFHQVETRVGVIIDYKPLHFFMKGFDYSKVTQIMAGIDARAELTEARVKTWWAIDNYPEKLETAIALSQSDSKPLRMLLEINNSLVIGFHLYLRGKSEVRLYPSVGREDFQKISVQAQLAKIISTPALKLLEDSGAISLVLKENGDKILHYHVLPERVNSFVDNLHQDMITRAHAPYRNKSQSLGCTVSLSEKELIAGSLKTINLYYMNQ |
| | 11 | WP_027254539.1 | LynF/TruF/PatF family peptide O-prenyltransferase [Planktothrix agardhii] | 11 | MTHPSLLTVSQKNLQFIGEHKNAFDLEYLYPLDLFEDLVAQVEPCRIECSCKIENNKLDPARFNLAINDSFARKAQAFLGFFHQVETRVGVIIDYKPLHFFMKGFDYSKVTQIMAGIDARAELTEARVKTWWAIDNYPEKLETAIALSQSDSKPLRMLLEINNSLVIGFHLYLRGKSEVRLYPSVSREDFKKVSVQAQLAKILSTPALKLLEDSVAISLVLKKNGDKILHYHVLPERVNSFVDNLHQDMITRAHAPYRNKSQSLGCTVSLSEKELIAGSLKTINLYYMNQ |

TABLE 4-2A

| Group | Enzyme | accession No. | name or annotation | SEQ ID NO: | amino acid sequence |
|---|---|---|---|---|---|
| 2 | 12 | WP_002767616.1 | LynF/TruF/PatF family peptide O-prenyltransferase [Microcystis aeruginosa] | 12 | MATSLESSKKNYYISTHKQAFDVENFYPLEIWEKFVEKIEKTSEKCFLESSCKIDQGQFYAARFGIGFDLQNLQQLNAVYNFCQEVESRVGVRVDYSLIKQFLGDDFDFSKMTEFLIGVDARRELAESKLKIALTINDYPEKLKTAIYLNGGLDETIEKLIVSNSLHLGFDLSLNGISEIELYPYIGKQDFQRIDIQQRLATVLSPQALRPLAACRRICVGLSKGNTEKILYYYLEDIKDFLNYFTPNDTARRVHAYYQKQPISEMCVAAPESQFIAEKIEKMNLYYLF |
| | 13 | WP_094346196.1 | LynF/TruF/PatF family peptide O-prenyltransferase [Nostoc sp. 'Peltigera membranacea cyanobiont' 232] | 13 | MPLTDFSISNKQVLKFISYHKTSFDIGYIYPLDLFERFATINKLTMVECSCKVKQNIVYPMRFDISLFGSNYAQKLNHVMLFFQEINSRVGVNLNLEWLTTFFDRGFKFSAILGFNVAIDLRTELKDSRIKLLIGLNNQEYPEKVETALKSCGLESQQGIRTLLIHSSYLVIGFDLYLDGRYDSQLDITLKPDVLQNTEVHQYLLNLISASALRPVPLCNEFAVSFSQMSKDKAIYYDLKNLDDFSTGFSNCLRLSEVSKTIHSIYRSHSIATAMGVVVSDNEFRGDIIQNFNLKYRIYGRT |
| 3 | 14 | AFK79989.1 | PirF or putative prenyl transferase [Microcystis aeruginosa PCC 7005] | 14 | MIVAEIQKNSLKEQRIKFIRNHQQAFDVEPIYPLRLFEDFVMSVEGDCSIEASCKIELDKLIASRFMLFFKDQEWEKYLTQSLAFFRQVENRVGVQLDYSLLQKFLGHNFDFSKLEVLSAGLDLRTNLADSSLKIHIRIKDYPEKINQALSLTIDGDDLTAVRDFLSVVGFDFYFDGRSAIEIYPEVKEEDFFKPKTQEKVWQHLPKFVLEPLQVTNLFGFGFSKTNHNPVVYYRLKGRQDLTNYFKINDTAQRVHSFYQHQDILPNMWVGTTQKELEKTRIENIRLYYYKSFKME |
| | 15 | WP_015081390.1 | AcyF or LynF/TruF/PatF family peptide O-prenyltransferase [Anabaena sp. 90] | 15 | MIANVTQKDRFQEQKLQFIRNHQQAFDVEPIYPLPLFEDFVMNVEGDCSIEASCKIELDKLIASRFMFFFKDKAQQWQKYLHQSLTFFNRVENLVGVQVDYSLLRQFLGSDFDFRKVTVLSAGIDLRSNIAESSLKMHIRIKDYPEKLDQALSLASNAEDLISVRPFLSLVGFDFYFNGRSEIELYPEIQAEDFAKSETQNLVWRHFPKFVLDPLEVTGSFLVGFSKANPNPVLYYNLKNKQDLANYFKLNDAAQRVHSFYQNQDILPHMWVGTVQKELEKTRIENVRLYYYKFFN |
| | 16 | WP_007355588.1 | OscF or LynF/TruF/PatF family peptide O-prenyltransferase [Kamptonema] | 16 | MIILSASDSTRPIFTLPKPLTQEQKLHCINAHRQAFDVQPLYPLDIFQDFITKTDGIDTIEASCKIEADKLQAARFVALSSQEIERKLTEFLTFFRQVESRVDVQLNYDLLHKFLGKSFDFSKVTRITTGVDLRPNISDSSLKIHIRLNDHPENLKKIEAALTLDGNDSTAQRWIALQTVHLIGFDFYLNGRSEIELYCELTEKQFQQPDIQSFLQQTFPPFVLEPLKVSSVFFTGLSKDNTEPVLYYCLKDKKDLLSYFPINDTAQRVHAFYQNQPVYSSMWVGVAQGELQKTRIDNIRLYYSKKNYSK |

TABLE 4-2B

| | | | | | |
|---|---|---|---|---|---|
| 3 | 17 | WP_039204681.1 | LynF/TruF/PatF family peptide O-prenyltransferase [Aphanizomenon flos-aquae] | 17 | MIANVTQKDRFQEQKLQFIRNHQQAFDVEPIYPLPLFEDFVMNVEGDCSIEASCKIELDKLIASRFMFFFKDKAQQWQKYLHQSLTFFNRVENLVGVQIDYSLLQQFLGSDFDFRKVTVLSAGIDLRSNLAESSLKMHIRIKDYPEKLDQALSLASNAEDLISVRPFLSLVGFDFYFNGRSEIELYPEIQAEDFAKSETQNLVWRHFPKFVLDPLEVTGSFLVGLSKANPNPVLYYNLKNKQDLANYFKLNDAAQRVHSFYQNQDILPK |
| | 18 | WP_083798475.1 | LynF or LynF/TruF/PatF family peptide O-prenyltransferase [Lyngbya sp. PCC 8106] | 18 | MTIMAIANRVPYNYLREQRIQFMHAHQDAFDVSTVFPLPLFEKLVTELEGSNVIELSCKIEADKLLAGRFLIFSDQENNWHQSLAQALQFLDSIESRVGVEINRESLDKFLAAHINSGKIMGISTGLDLRPELENSSVKIHIMLGENSEELVRTAIAIDGSHYPVELAQVLLKDTMMIGFDFFLNGHSEVELYISCSRKKDSLPNNRGESTRYYIRQKFSPKVSSLLDASDFFVGGFSKANVEPVLYYAFENIKDIPKYFVFNDLGNRVYDFCRSQDSITMTWIGINERDLDRERLNNFRLYYRRSFG |

TABLE 4-2B-continued

| | | | | |
|---|---|---|---|---|
| 19 | ACA04492.1 | TruF1 or TruF1 [uncultured Prochloron sp. 06037A] | 19 | MIMTTTWPDSYAKERRIQRLRHHFESFDVERAFPLP<br>LFEQAVLSLDSCPLLEPSFKVQEGILFAGRVTTSTG<br>TEDWQHLISTALNFFDAVESRVEVTIDRGLLEKFLT<br>LHQNSDKIEASLMGIDLRPNVKESSLKVHLRLDPQQ<br>DADELVMTAIDLDGGDYSPELTQVLLKDTFLIGFDF<br>FLDGGSAVEMYTICPGKKPLAMLGKKGAYLKPYVLS<br>NFSHKVTSLLQEVAALTVGFSKENPRPVLYFEFETL<br>REVKYNLLFNSLGDKIYDFCLHNQIENFVSIGVTEP<br>DLEKRRLENFRFYYRKAV |
| 20 | AAY21155.1 | PatF or PatF [Prochloron didemni] | 20 | MDLIDRLQNNQRKDRRLQFVRTHQEAFDVKPTFPLP<br>LFEEAILEIEGSCSVESSCQVEGDRLQGGRYEVCNN<br>QGTTWPESLTHAFKLLDKIDSQLGVRINRDSFDRFA<br>AAHVNSRKIINNTIGVHLGSKLEDSSVMLYINIKPE<br>EDTEELARTALVLDGGRYSDELTRVLLRDTMVIGFE<br>LFFDGRSRVDLGPCAPGKSGTLKMKGKHLEQYTQKN<br>LSRKVNSIFREGYLFGAFFSKTRVEPILFFYHSIIK<br>DLPKYFTFNSLGDKIYNFCQSQGCITDVAIAVTETE<br>LEKSRLENFCFYYDQWDECKPSSDYDTERHLH |
| 21 | ACA04493.1 | TruF2 or TruF2 [uncultured Prochloron sp. 06037A] | 21 | MVLSQLSKQTNLRENRLRCIRTHLEAFDIEPVLQIS<br>LFEEVIMEVEGSCNVKCSCKVERDRLFACQFTLAYS<br>QQKWPKTLKYNAILFDKIKSQVGICIDSSKFEQFSR<br>LHVNSDKILDSTVGIDLRPKSQDSCIRISVHLEPKE<br>SPEELVRTALALDNATYTSELTQVFLQDCTAIIFEC<br>FFDGRSRIELGAVAPGKKHGFSGNHGRALTAYAQKY<br>FSPKAVSLSEVSDLFGMTISKYKAEPVLHFGFNNIK<br>DISNYFLFNTLGNRIYSFCQNQDCILLAIIGVNEKE<br>LYSNRLENFLFDYAKNDESRMMRV |

Described specifically, the above prenylation enzyme is preferably composed of any of the following amino acid sequences.

(1) An amino acid sequences represented by any of SEQ ID NOS. 1 to 56 listed in the following Table 4-3 to Table 4-8.

(2) An amino acid sequence with one or more amino acid deletions, substitutions or additions in an amino acid sequences represented by any of SEQ ID NOS. 1 to 56.

(3) An amino acid sequence having preferably 80% or more, more preferably 90% or more, still more preferably 95% or more, still more preferably 96% or more, still more preferably 97% or more, particularly preferably 98% or more homology with an amino acid sequences represented by any of SEQ ID NOS. 1 to 56.

TABLE 4-3A

| Group | SEQ ID NO: | amino acid sequence | Enzyme | accession No. | name or annotation |
|---|---|---|---|---|---|
| 1 | 1 | MINYANAQLHKSKNLMYMKAHENIFEIEALYPLELFER<br>FMQSQTDCSIDCACKIDGDELYPARFSLALYNNQYAEK<br>QIRETIDFFHQVEGRTEVKLNYQQLQHFLGADFDFSKV<br>IRNLVGVDARRELADSRVKLYIWMNDYPEKMATAMAWC<br>DDKKELSTLIVNQEFLVGFDFYFDGRTAIELYISLSSE<br>EFQQTQVWERLAKVVCAPALRLVNDCQAIQIGVSRAND<br>SKIMYYHTLNPNSFIDNLGNEMASRVHAYYRHQPVRSL<br>VVCIPEQELTARSIQRLNMYYCMN | 1 | WP_061432709.1 | KgpF or LynF/TruF/ PatF family peptide O-prenyltransferase [Microcystis aeruginosa] |
| | 2 | MTYPSLLTASQKNLQFIGEHKNAFDLEYLYPLDLFEDL<br>VAQVEPCRIECSCKIENNKLDPARFNLAINDSFARKAQ<br>AFLGFFHQVETRVGVIIDYKPLHFFMKGFDYSKVTQIM<br>AGIDARAELTEARVKTWWAIDNYPEKLETAIALSQSDS<br>KPLRMLLEINNSLVIGFHLYLRGKSEVRLYPSVSREDF<br>KKVSVQAQLAKILSTPALKLLEDSVAISLVLKENGDKI<br>LHYHVLPERVNSFVNNLHQDMITRAHAPYRNKSQSLGC<br>TVSLSEKELLAGYLKTINLYYMNT | 2 | WP_052338757.1 | OltF or LynF/TruF/ PatF family peptide O-prenyltransferase [Planktothrix] |
| 2 | 3 | MITDKHTLVDTNKNLHYIGEHKRAFQVESVYPLDIFER<br>FVQEATDWGLECSCKIEKDKLYPIRFNLFRNHPSFKQF<br>DAALDFFQQVEARDDVKLDYKLMHLFLGNYFDFNKIAQ<br>ILVGVDLRTELSASRLKLWFVIQNYPEKLETAFALCDL<br>KEELRALIVCCSLVVVGFDFYLDGRTNIELYPRILKKE<br>LQEVDVWKQLAKVVSPPTLQLLDSCWAFMLGFSKANPE | 3 | WP_069351383.1 | LynF/TruF/PatF family peptide O-prenyltransferase [Scytonema millei] |

TABLE 4-3A-continued

| Group | SEQ ID NO: | amino acid sequence | Enzyme | accession No. | name or annotation |
|---|---|---|---|---|---|
| | | TILYCPARDPDSFIANLSNDLADRVHAYYQKQPVRGTI VAFRERELLAGAIENLNLYYQMSLGVTKKSEKFDGCVA KTGEAGADIQK | | | |
| | 4 | MTISENLFIGSQKNLHYINQHKHIFDVDHLYTLNIFDD FAQKVTHWGLECSCKIQKDQLYPARFNLFRNQPNWQDY QTAINFFQQVAAKTDVKLTYHLIENFVGNDFDFSKVHQ ILVGIDLRREFSASRLKFWFIISDYPQKLAKAISLCQS AEELQPFLVDNSVVIGFDFDFNGGSEIEVYPSISKEKF QQLAKVLSPQALQLLDSCWSLIIGFSQGNAEKILYYRT SDPNNFIANLRNDLANRVHAYYREQPVQGTIVGLRENE IIAGRIENLNLYYQMSSPITTNKN | 4 | CEJ46811.1 | Anacyclamide synthesis protein AcyF [Chrysosporum ovalisporum] |
| | 5 | MTISENLFIGSQKNLHYINQHKHIFDVDHLYTLNIFDD FAQKVTHWGLECSCKIQKDQLYPARFNLFRNQPNWQDY QTAINFFQQVAAKTDVKLTYHLIENFVGNDFDFSKVHQ ILVGIDLRREFSASRLKFWFIISDYPQKLAKAISLCQP AEELQPFLVDNSVVIGFDFDFYGGSQIEVYPSISKEKF QQLAKVLSPQALQLLDSCWSLIIGFSQANPEKILYYRT SDPNNFIANLRNDLANRVHAYYREQPVQGTIVGLRENE IIAGRIENLNLYYQMSSPITTNKN | 5 | WP_028090374.1 | LynF/TruF/PatF family peptide O-prenyltransferase [Dolichospermum circinale] |
| | 6 | MVTYKPIQVDSEPYLEYIGKHKRAFDIYEDLYPVKLFE DFVQVEGRQGGMFRCGCNVTKDELSPARFALLFPTQDD LQSLHNPQQQLEAAFDFFRKVEGRAEVKVNYHLLEKFF GKNPDFGGIYFIAVGVDAQTEISESRLKLFIHLHDAPD KIESAIALSGDSPTLRAFLVNNDLLVGFDFYLDGRSEI EVYPTIYQEELKRADIQSRILPLLPPRALPLLKQCEVL QIGISPANKSNILYFDFVRDPNTFIDNLGNEMAKKVHA YYRHQPVQHVLVGVSEKDLYASSIEKVKLYYFKK | 6 | WP_099072935.1 | LynF/TruF/PatF family peptide O-prenyltransferase [Nostoc linckia] |

TABLE 4-3B

| | | | | | |
|---|---|---|---|---|---|
| 2 | 7 | MVTYNPIKTNSERYLEYIGKHKLAFDIYEDLYPLKIFE DFVEVEAKKRGLFYILSNVDKDEIYPARFCLRFPSLEE AQLLYNPQQQLQTALNFFRQVESRPEVKLNYHHIQQFF GSISDFQGIILMAVAIDARTVITESRLKLYVWLKNAPE KVETAIALCGDSPTLRAFLVNDKLQVGFDLFFNGESEI EVYPIISQDELQQVHIRDRIIPLLPPRALPLLQQCAVF QVGFSEANESNILYFDYVHDPNSFVDNLGNEMTKKIHA YYRHQPIKSLTVGIPEHNFYGRAIEHVKLYYDMN | 7 | WP_099072934.1 | LynF/TruF/PatF family peptide O-prenyltransferase [Nostoc linckia] |
| | 8 | MVLKSNKKLYYISANKHAFEIDNLYPLNLFEGFVERIE KIEKTENCVLESSCKIDHDKLYPVRFNIGFPNNSIKQL HAVMDFFRRVESRVDVKLNLSLFQQFIGNDFKLDKMTD LMLGIDLRRDLSDSRLKIGLTIEDYPEKQKAAVILNNN IDEVTSNLLISNRLHIGFDFYLNGRSEMELYPHIMQQD FQKLDVQQRLSKVLSPPALQVVPACTRICVGISKANRD KIIYYYLENMGDFLNYFTVNDTARKVHAYYLKQPVVEM CVALPESELLAGTTIKNLNLYYLL | 8 | WP_061432522.1 | LynF/TruF/PatF family peptide O-prenyltransferase [Microcystis aeruginosa] |
| | 9 | MTTLLESGKKIYYIGIHKQIFEIKNFYPLDIFDSFVNQ IETTSENCSLESSCKIELDKLYPARFGIGFTLKNLKQL NVVYEFFQKVESRIDVQINYSLIQQFFGENFDFNKMTE FMVGIDARQELSETKLKIALTIKNYPEKIKTAIALNGG LDKNIYNLLVSNSLHIGFDLSLDGRSEIELYPYIRNQE FQIFDIQQRLATVLSPQALQFLPICSRICVGLSKANAD KVVYFYLKNLNDFLNYFTVNDTARRVHAYYQQQPMREM CVAVQEKQLLGGTIEKMNLYYLI | 9 | WP_035367793.1 | LynF/TruF/PatF family peptide O-prenyltransferase [Dolichospermum circinale] |
| | 10 | MTYPSLLTASQKNLQFIGEHKNAFDLEYLYPLDLFEDL VAQVEPCRIECSCKIEDDKLDPARFNLAINDSFARKAQ AFLGFFHQVETRVGVIIDYKPLHFFMKGFDYSKVTQIM AGIDARAELTEARVKTWWAIDNYPEKLETAIALSQSDS KPLRMLLEINNSLVIGFHLYLRGKSEVRLYPSVGREDF QKISVQAQLAKIISTPALKLLEDSGAISLVLKENGDKI LHYHVLPERVNSFVDNLHQDMITRAHAPYRNKSQSLGC TVSLSEKELIAGSLKTINLYYMNQ | 10 | WP_052345004.1 | LynF/TruF/PatF family peptide O-prenyltransferase [Planktothrix rubescens] |
| | 11 | MTHPSLLTVSQKNLQFIGEHKNAFDLEYLYPLDLFEDL VAQVEPCRIECSCKIENNKLDPARFNLAINDSFARKAQ AFLGFFHQVETRVGVIIDYKPLHFFMKGFDYSKVTQIM AGIDARAELTEARVKTWWAIDNYPEKLETAIALSQSDS | 11 | WP_027254539.1 | LynF/TruF/PatF family peptide O-prenyltransferase [Planktothrix |

TABLE 4-3B-continued

| | |
|---|---|
| KPLRMLLEINNSLVIGFHLYLRGKSEVRLYPSVSREDF KKVSVQAQLAKILSTPALKLLEDSVAISLVLKKNGDKI LHYHVLPERVNSFVDNLHQDMITRAHAPYRNKSQSLGC TVSLSEKELIAGSLKTINLYYMNQ | agardhii] |

TABLE 4-4A

| Group | SEQ ID NO: | amino acid sequence | Enzyme | accession No. | name or annotation |
|---|---|---|---|---|---|
| 2 | 12 | MATSLESSKKNYYISTHKQAFDVENFYP LEIWEKFVEKIEKTSEKCFLESSCKIDQ GQFYAARFGIGFDLQNLQQLNAVYNFCQ EVESRVGVRVDYSLIKQFLGDDFDFSKM TEFLIGVDARRELAESKLKIALTINDYP EKLKTAIYLNGGLDETIEKLIVSNSLHL GFDLSLNGISEIELYPYIGKQDFQRIDI QQRLATVLSPQALRPLAACRRICVGLSK GNTEKILYYYLEDIKDFLNYFTPNDTAR RVHAYYQKQPISEMCVAAPESQFIAEKI EKMNLYYLF | 12 | WP_002767616.1 | LynF/TruF/PatF family peptide O-prenyltransferase [Microcystis aeruginosa] |
| | 13 | MPLTDFSISNKQVLKFISYNKTSFDIGY IYPLDLFERFATINKLTMVECSCKVKQN IVYPMRFDISLFGSNYAQKLNHVMLFFQ EINSRVGVNLNLEWLTTFFDRGFKFSAI LGFNVAIDLRTELKDSRIKLLIGLNNQE YPEKVETALKSCGLESQQGIRTLLIHSS YLVIGFDLYLDGRYDSQLDITLKPDVLQ NTEVHQYLLNLISASALRPVPLCNEFAV SFSQMSKDKAIYYDLKNLDDFSTGFSNC LRLSEVSKTIHSIYRSHSIATAMGVVVS DNEFRGDIIQNFNLKYRIYGRT | 13 | WP_094346196.1 | LynF/TruF/PatF family peptide O-prenyltransferase [Nostoc sp. 'Peltigera membranacea cyanobiont' 232] |
| 3 | 14 | MIVAEIQKNSLKEQRIKFIRNHQQAFDV EPIYPLRLFEDFVMSVEGDCSIEASCKI ELDKLIASRFMLFFKDQEWEKYLTQSLA FFRQVENRVGVOLDYSLLQKFLGHNFDF SKLEVLSAGLDLRTNLADSSLKIHIRIK DYPEKINQALSLTIDGDDLTAVRDFLSV VGFDFYFDGRSAIEIYPEVKEEDFFKPK TQEKVWQHLPKFVLEPLQVTNLFGFGFS KTNHNPVVYYRLKGRQDLTNYFKINDTA QRVHSFYQHQDILPNMWVGTTQKELEKT RIENIRLYYYKSFKME | 14 | AFK79989.1 | PirF or putative prenyl transferase [Microcystis aeruginosa PCC 7005] |
| | 15 | MIANVTQKDRFQEQKLQFIRNHQQAFDV EPIYPLPLFEDFVMNVEGDCSIEASCKI ELDKLIASRFMFFFKDKAQQWQKYLHQS LTFFNRVENLVGVQVDYSLLRQFLGSDF DFRKVTVLSAGIDLRSNIAESSLKMHIR IKDYPEKLDQALSLASNAEDLISVRPFL SLVGFDFYFNGRSEIELYPEIQAEDFAK SETQNLVWRHFPKFVLDPLEVTGSFLVG FSKANPNPVLYYNLKNKQDLANYFKLND AAQRVHSFYQNQDILPHMWVGTVQKELE KTRIENVRLYYYKFFN | 15 | WP_015081390.1 | AcyF or LynF/TruF/PatF family peptide O-prenyltransferase [Anabaena sp. 90] |
| | 16 | MIILSASDSTRPIFTLPKPLTQEQKLHC INAHRQAFDVQPLYPLDIFQDFITKTDG IDTIEASCKIEADKLQAARFVALSSQEI ERKLTEFLTFFRQVESRVDVQLNYDLLH KFLGKSFDFSKVTRITTGVDLRPNISDS SLKIHIRLNDHPENLKKIEAALTLDGND STAQRWIALQTVHLIGFDFYLNGRSEIE LYCELTEKQFQQPDIQSFLQQTFPPFVL EPLKVSSVFFTGLSKDNTEPVLYYCLKD KKDLLSYFPINDTAQRVHAFYQNQPVYS SMWVGVAQGELQKTRIDNIRLYYSKKNY SK | 16 | WP_007355588.1 | OscF or LynF/TruF/PatF family peptide O-prenyltransferase [Kamptonema] |

TABLE 4-4B

| | | | | | |
|---|---|---|---|---|---|
| 3 | 17 | MIANVTQKDRFQEQKLQFIRNHQQAFDVEPIYPLPLFEDFVMNVEGDCSIEASCKIELDKLIASRFMFFFKDKAQQWQKYLHQSLTFFNRVENLVGVQIDYSLLQQFLGSDFDFRKVTVLSAGIDLRSNLAESSLKMHIRIKDYPEKLDQALSLASNAEDLISVRPFLSLVGFDFYFNGRSEIELYPEIQAEDFAKSETQNLVWRHFPKFVLDPLEVTGSFLVGLSKANPNPVLYYNLKNKQDLANYFKLNDAAQRVHSFYQNQDILPK | 17 | WP_039204681.1 | LynF/TruF/PatF family peptide O-prenyltransferase [Aphanizomenon flos-aquae] |
| | 18 | MTIMAIANRVPYNYLREQRIQFMHAHQDAFDVSTVFPLPLFEKLVTELEGSNVIELSCKIEADKLLAGRFLIFSDQENNWHQSLAQALQFLDSIESRVGVEINRESLDKFLAAHINSGKIMGISTGLDLRPELENSSVKIHIMLGENSEELVRTAIAIDGSHYPVELAQVLLKDTMMIGFDFFLNGHSEVELYISCSRKKDSLPNNRGESTRYYIRQKFSPKVSSLLDASDFFVGGFSKANVEPVLYYAFENIKDIPKYFVFNDLGNRVYDFCRSQDSITMTWIGINERDLDRERLNNFRLYYRRSFG | 18 | WP_083798475.1 | LynF or LynF/TruF/PatF family peptide O-prenyltransferase [Lyngbya sp. PCC 8106] |
| | 19 | MIMTTTWPDSYAKERRIQRLRHHFESFDVERAFPLPLFEQAVLSLDSCPLLEPSFKVQEGILFAGRVTTSTGTEDWQHLISTALNFFDAVESRVEVTIDRGLLEKFLTLHQNSDKIEASLMGIDLRPNVKESSLKVHLRLDPQQDADELVMTAIDLDGGDYSPELTQVLLKDTFLIGFDFFLDGGSAVEMYTICPGKKPLAMLGKKGAYLKPYVLSNFSHKVTSLLQEVAALTVGFSKENPRPVLYFEFETLREVKYNLLFNSLGDKIYDFCLHNQIENFVSIGVTEPDLEKRRLENFRFYYRKAV | 19 | ACA04492.1 | TruF1 or TruF1 [uncultured Prochloron sp. 06037A] |
| | 20 | MDLIDRLQNNQRKDRRLQFVRTHQEAFDVKPTFPLPLFEEAILEIEGSCSVESSCQVEGDRLQGGRYEVCNNQGTTWPESLTHAFKLLDKIDSQLGVRINRDSFDRFAAAHVNSRKIINNTIGVHLGSKLEDSSVMLYINIKPEEDTEELARTALVLDGGRYSDELTRVLLRDTMVIGFELFFDGRSRVDLGPCAPGKSGTLKMKGKHLEQYTQKNLSRKVNSIFREGYLFGAFFSKTRVEPILFFYHSIIKDLPKYFTFNSLGDKIYNFCQSQGCITDVAIAVTETELEKSRLENFCFYYDQWDECKPSSDYDTERHLH | 20 | AAY21155.1 | PatF or PatF [Prochloron didemni] |
| | 21 | MVLSQLSKQTNLRENRLRCIRTHLEAFDIEPVLQISLFEEVIMEVEGSCNVKCSCKVERDRLFACQFTLAYSQQKWPKTLKYNAILFDKIKSQVGICIDSSKFEQFSRLHVNSDKILDSTVGIDLRPKSQDSCIRISVHLEPKESPEELVRTALALDNATYTSELTQVFLQDCTAIIFECFFDGRSRIELGAVAPGKKHGFSGNHGRALTAYAQKYFSPKAVSLSEVSDLFGMTISKYKAEPVLHFGFNNIKDISNYFLFNTLGNRIYSFCQNQDCILLAIIGVNEKELYSNRLENFLFDYAKNDESRMMRV | 21 | ACA04493.1 | TruF2 or TruF2 [uncultured Prochloron sp. 06037A] |

TABLE 4-5A

| Group | SEQ ID NO: | amino acid sequence | Enzyme | accession No. | name or annotation |
|---|---|---|---|---|---|
| 4 | 22 | MNCTSILQQNHLREKRLQFIRAHQTAFEVEPVFPLQLFEDFVVSVEGDCTIEASCKVESDHLIASRFLLFFQEMTQSWPQKLDQAFRFFHQTENQVDVHLDYGLLQHFLGNDFDFSKMSVLSTGIDLRQNLADSSLKMHITIEDYPEKIATAFSLAKLPRDNFHQILLSSVSLIGFDFYLDGRSEIELYASLKEEEFNSPHVQSFLASIFCASALKPLGASSSFYMGLSIANENPVLYYLLKNKQELQNYFRLNDMGNRVHSFYNQQEILPHAWVGVAEQELQQGRIENIRLYYYQRFAAGMTG | 22 | WP_008049959.1 | LynF/TruF/PatF family peptide O-prenyltransferase [Arthrospira sp. PCC 8005] |
| | 23 | MIADVIQKDRIKEQKLQFIRNHQQAFDVEPIYPLPLFEDFVMGVEGDCSIEASCKIELDKLIASRFLLLFFKDKAQQWQKYLHQSLTFFSQVENRVGVQIDYSLLQQFLGSNFDFSKVRTFTTGIDLRNNLADSSLKIHFRIEDYPEKLETSLALSGDSISSLIKELPSYPLTKLIPQIGFDFYFNGSNEIELYIEVGEDDFQHPEIKEFLWQRFSKIALEPLKASSLFHLGLSKANNDPVLYYHLKNKKDLVNYFNLNDMGQRVHSFYQHQDVGVPMWVGTAQKELEKTRIENIRLYYYKSFKMESN | 23 | WP_042155601.1 | LynF/TruF/PatF family peptide O-prenyltransferase [Planktothrix agardhii] |

TABLE 4-5A-continued

| Group | SEQ ID NO: | amino acid sequence | Enzyme | accession No. | name or annotation |
|---|---|---|---|---|---|
| | 24 | MIADVIQKDRLKEQKLQFIRNHQQAFDVEPIYPLPL FEDFVMGVEGDCSIEVSCKIESDKLIASRFLLFFKD KTQQWQKYLHQSLTFFSQVENRVGVQIDYSLLQQFL GSNFDFSKVRTFTTGIDLRNNLADSSLKIHFRIEDY PEKLETSLALSGDSISSLIKELPSYPLTKLIPQIGF DFYFNGSNEIELYIEVGEDDFQHPEIKEFLWQRFSK IALEPLKASSLFHLGLSKANNDPVLYYHLKNKKDLV NYFNLNDMGQRVHSFYQHQDVGVPMWVGTAQKELEK TRIENIRLYYYKSFKMESN | 24 | BBD55900.1 | hypothetical protein NIES204_32190 [Planktothrix agardhii NIES-204] |
| | 25 | MIVADIQKSFLKEQRLQFIRNHQQAFDVELIYPLRL FEDFVMGVEGDCSIEASCKIELDKLIASRFMLFFKD KAQEWQKYLAQSLAFFRQVENRVGVKLDYSLLQQFL GLNFNFSKITVFSTGIDLRTNLADSSLKMHIRLKDY PEKINQALLLTSDSDDLIAVRDFLSIVGFDFYFDGR SAIKIYPEVAETDFFKPETQDKVWRHLPKFVLEPLK ATSLFCFGFSKTNNNPVLYYRLKNRQDLTNYFKLND TAQRVHSFYQHQDILSSVWVGTAQQELEKTRIENVR LYYYKYFGME | 25 | REJ40736.1 | LynF/TruF/PatF family peptide O-prenyltransferase [Microcystis flos-aquae DF17] |
| | 26 | MIVADIQKSSLKEQRLQFIRNHQQAFDVELIYPLRL FEDFVMGVEGDCSIEASCKIELDKLIASRFMLFFKD KAQEWQKYLAQSLAFFQQVENRVGVKLDYSLLQQFL GLNFNFSKITVFSTGIDLRTNLADSSLKMHIRLKDY PEKINQALLLTSDSDDLIAVRDFLSVVGFDFYFDGR SAIKIYPEVAETDFFKPETQDKVWRHLPKFVLEPLK ATSLFGFGFSKTNNNPVLYYRLKNRQDLTNYFKLND TAQRVHSFYQHQDILPNMWVGTSQQELEKTRIENVR LYYYKYFGME | 26 | WP_002797466.1 | LynF/TruF/PatF family peptide O-prenyltransferase [Microcystis aeruginosa] |

TABLE 4-5B

| | | | | | |
|---|---|---|---|---|---|
| 4 | 27 | MIVAEIQKNSLKEQRIKFIRNHQQAFDVEPIYPLRL FEDFVMSVEGDCSIEASCKIELDKLIASRFMLFFKD QEWEKYLTQSLAFFRQVENRVGVQLDYSLLQKFLGH NFDFSKLEVLSAGLDLRTNLADSSLKIHIRIKDYPE KINQALSLTIDGDDLIAVRDFLSVVGFDFYFDGRSA IEIYPEVKEEDFFKPKTQEKVWQHLPKFVLEPLQVT NLFGFGFSKTNHNPVVYYRLKGRQDLTNYFKINDTA QRVHSFYQHQDILPNMWVGTTQKELEKTRIENIRLY YYKSFKME | 27 | WP_024969547.1 | LynF/TruF/PatF family peptide O-prenyltransferase [Microcystis aeruginosa] |
| | 28 | MIVADIQQNSLKEQRTQFIRNHQQAFDVEPVYPLRL FEDFVMGVEGDCTIEASCKIELDKLIASRFLLFFKD KAQEWQKYLAQSLAFFQQVENRVGVQLDYSLLQRFL GDNFDFSKLEVLSAGIDLRTNLADSSVKMHIRIGDY PEKLATAFVLSDGVADSNYLSGFVHLIGFDFYFNGK SAIEIYAEVTEDDFFKPEIINQVWQHFPKSALKPLQ ASSLFFTGLSKANHNPVLYYHLKNKQDLANYFKLND TAQRVHSFYQHQDILPNMWVGTAQQELEKTRIENVR LYYYKYFGME | 28 | REJ40476.1 | LynF/TruF/PatF family peptide O-prenyltransferase [Microcystis flos-aquae TF09] |
| | 29 | MIVADIQQNSLKEQRTQFIRNHQQAFDVEPVYPLRL FEDFVMGVEGDCTIEASCKIELDKLIASRFLLFFKD KAQEWQKYLAQSLAFFQQVENRVGVQLDYSLLQRFL GDNFDFSKLEVLSAGIDLRTNLADSSVKMHIRIGDY PEKLATAFVLSDGVADSNYLSGFVHLIGFDFYFNGK SAIEIYAEVTEDDFFKPEIINQVWQHFPKSALKPLQ ASSLFFTGLSKANHNPVLYYHLKNKQDLANYFKLND TAQRVHSFYQHQDILPNMWVGTAQQELEKTRIENVR LYYYKYFGMD | 29 | WP_002792928.1 | LynF/TruF/PatF family peptide O-prenyltransferase [Microcystis aeruginosa] |
| | 30 | MIVADIQKSSLKEQRLQFIRNHQQAFDVEPIYPLRL FEDFVMGVEGDCSIEASCKIELDKLIASRFMLFFKD KAQQWQKYLDQSLAFFQQVENRVGVQLDYSLLQRFL GDNFDFSKLEVLSAGIDLRTNLADSSVKMHIRIGDY PEKLATAFVLSDGAADSNHLSGFVNLIGFDFYFNGK SEIEIYAEVTEDDFFKPETINQVWQHFPKSALKPLQ ASSLFFTGLSKANHNPVLYYSLKNCQDLINYFKLSD TAQRVHSFYQHQDILPSMWVGTAQQELEKTRIENVR LYYYKYFGME | 30 | WP_004161245.1 | LynF/TruF/PatF family peptide O-prenyltransferase [Microcystis aeruginosa] |

TABLE 4-5B-continued

| | | | | | |
|---|---|---|---|---|---|
| | 31 | MIVADIQKSSLKEQRLQFIRNHQQAFDVEPIYPLRLFEDFVMGVEGDCTIQASCKIELDQLIASRFMLFFKDKAQEWQNYLAQSLAFFRQVENRVGVKLDYSLLQQFLGLNFNFSKITVFSTGIDLRTNLADSSLKMHIRLKDYPEKINQALLLTSDSDDLIAVRDFLSIVGFDFYFDGRSAIKIYPEVAETDFFKPETQDKVWRHLPKFVLEPLKATSLFGFGFSKTNNNPVLYYRLKNRQDLTNYFKLNDTAQRVHSFYQHQDILSSVWLGTAQQELEKTRIENVRLYYYKLFGKL | 31 | WP_012263813.1 | LynF/TruF/PatF family peptide O-prenyltransferase [Microcystis aeruginosa] |

TABLE 4-6A

| Group | SEQ ID NO: | amino acid sequence | Enzyme | accession No. | name or annotation |
|---|---|---|---|---|---|
| 4 | 32 | MIADVIQKDRVKEQKLQFIRNHQQAFDVEPIYPLPLFEDFVMGVEGDCSIEASCKIESDKLVASRFMFFFQDKAQQWQKYLNQSLTFFSQVENRVGVQIDYSLLQQFLGSNFDFSKVTVLSAGIDLRDNLAESSLKMHIRIKDYPEKLNKALFLTSDSEDLISVRRYLSVVGFDFYFNGRSEIELYPEVQEEDFAKPEIQDLVWRHFPKFVLEPLKVTSLFGFGFSKANNNPVLYYHLKNRQDLTNYFKLNDTAQRVHSFYQHQDRLPNMWIGTAQKELEKTRIENIRLYYYKSFKMESS | 32 | WP_026786030.1 | LynF/TruF/PatF family peptide O-prenyltransferase [Planktothrix rubescens] |
| | 33 | MIADVIQKDRVKEQKLQFIRNHQQAFDVEPIYPLPLFEDFVMGVEGDCSIEASCKIESDKLVASRFMFFFQDKAQQWQKYLNQSLTFFSQVENRVGVQIDYSLLQQFLGSNFDFSKVTVLSAGIDLRDNLAESSLKMHIRIKDYPEKLNKALFLTSDSEDLISVRRYLSVVGFDFYFNGRSEIELYPEVQEEDFAKPEIQDLVWRHFPKFVLEPLKVTSLFGFGFSKANNNPVLYYHLKNRQDLTNYFKLNDTAQRVHSFYQHQDRLPNMWIGTAQKELEKTRIENIRLYYYKSFKMESN | 33 | WP_027249705.1 | LynF/TruF/PatF family peptide O-prenyltransferase [Planktothrix agardhii] |
| | 34 | MIVADIQKSSLKEQRLQFIRNHQQAFDVEPIYPLRLFEDFVMGVEGDCTIEASCKIELDKLIASRFLLFFKDKAQEWQKYLAQSLAFFQQVENRVGVQLDYSLLQGFLGDNFDFSKLEVLTAGIDLRTNLADSSLKMHIRIGDYPEKLATAFVLSDGVADSNYLSGFVHLIGFDFYFNGKSAIEIYAEIREDDFFKPETINQVWQHFPKSALKPLQASDLFFTGLSKANNNPVLYYSLKNRQNLINYFKLNDTAQRVHSFCQHQDILPNMWVGTAQQELEKTRIENVRLYYYKYFGME | 34 | WP_002762729.1 | LynF/TruF/PatF family peptide O-prenyltransferase [Microcystis aeruginosa] |
| | 35 | MIADVIQKDRIKGQKLQFIRNHQQAFDVEPIYPLPLFEDFVMGVEGDCSLEVSCKIESDKLIASRFLLFFKDKTQQWQKYLNQSLTFFSQVENRVGVQIDYSLLQQFLGYNFDFSKVTVLSAGIDLRNNLAESSLKMHIRIKDYPEKVETAFSLSDGAADGNYLKDFVNLIGFDFYFNGKSEIEIYAEVQEEDFFKPETINLVWRHFPPSVLTSLQASDSFFVGLSKPNNNPVLYYHLKNRQDLVNYFKLNDTAQRVHSFYQHQDILPEMWVGTAQKELEKTRIENIRLYYYKSFKMESN | 35 | WP_027254541.1 | LynF/TruF/PatF family peptide O-prenyltransferase [Planktothrix agardhii] |
| | 36 | MNCTSVLQQNHLREKRLQFIRAHQTAFDVEPVFPLQVFEDFVFGVEGDCTIEASCKVESDHLIASRFLLFFQEMTQSWPQKLDQAFRFFHQTENQVGVRLDYGLLQHFLGDDFDFSKISVLSTGIDLRQNLADSSLKMHITIEDYPEKIATAFSLAKLPRDKFHQILLSSVSLIGFDFYLDGRSEIELYASLKEEEFNSPHVQSFLTSNFCASALKPLAASSAFYMGLSIANENPVLYYLLKNKQELQNYFRLNDTGNRVHSLL | 36 | WP_006617852.1 | LynF/TruF/PatF family peptide O-prenyltransferase [Arthrospira platensis] |

TABLE 4-6B

| | | | | | |
|---|---|---|---|---|---|
| 4 | 37 | MIVAEIQKNSLKEQRLQFIRNHQQAFDVEPIYPLRLFEDFVVGVEGDCSIEASCKIELDKLIASRFMLFFKDKAQEWQKYLAQSLAFFKQVENRVGVKLDYSLLQQFLGTHFDFSKLQEVLSAGLDLRSNLADSSLKIHIRIKDYPEKLETAFALSDGAADSNYLSGFVNLIGFD | 37 | WP_002792921.1 | LynF/TruF/PatF family peptide O-prenyltransferase [Microcystis aeruginosa] |

TABLE 4-6B-continued

| | | | | |
|---|---|---|---|---|
| | FYFNGKSEIEIYAELQEEDFFKPETINLVWRHFPH SVLKPLQASNLFFTGLSKANHDPVLYYHLKDRQDL ANYFNLNDTAQRVHSFYQHQDILPTMWVGTSQQQL EKTRIENVRLYYYKFFGKLESISC | | | |
| 38 | MPREQRLQFIKAHQAAFEVEPLYPLALFEALVETF DEDCALEASCKIEFDQLIASRFLIFFSQNFEQNLA RVLNFMTQVNQRVDVQINTDLLYHFLGQKFDFRKM IRLATGVDLRSNLADSSLKIHIRLEDYPEKIESAL ALHGNPDDASYWADLNAIANIGLDFYLDGRSEIEF YPELSEERFQQPEMQVLLQQMFPPFVLAPLKASEI FGFGLSKANPSAVLYYQLKNKQDLPSYFAINDKAH QVHGYYLHQDTRPYMCVGVAQSELAKTRIDQIRLY YHQFFKVQNP | 38 | WP_012626000.1 | LynF/TruF/PatF family peptide O-prenyltransferase [Cyanothece sp. PCC 7425] |
| 39 | MIANVTQKDRFKEQKLQFIRNHQQAFDVEPIYPLP LFEDFVMNVEGDCSIEASCKIELDKLIASRFMFFF KDKAQQWQKYLHQSLTFFNRVENLVGVQIDYSLLQ QFLGSDFDFRKVTVLSAGIDLRSNLAESSLKMHIR IKDYPKKLDQALSLASNAEDLISVRRFLSVVGFDF YFNGRSEIELYPEVQEEDFAKSETQNLVWRHFPKF VLDPLEVTRLFGFGLSKANHNPVLYYNLKNKQDLA NYFKLNDAAQRVHSFYQNQDILPNMWVGTVQKELE KTRIENVRLYYYKSFN | 39 | OBQ18952.1 | anacyclamide synthesis protein AcyF [Anabaena sp. AL93] |
| 40 | MIVGAVPKERIKEQKLQFIRNHQQAFDVEPIYPLP LFEDFVMSVEGDCTIEASCKVELDKLIASRFLFFF KDKAQDWPSYLSQGLSFFKQVETQVGVQLDYSLLQ SFLGTDFDFSRVRTFTTGIDLRRESLAESSVKIHF RVKDYIEKVQTAIILSGGEFGFLEDFPKKFLAQYI PQIGFDFYFDGRCEIELYFEVIECNFGDPNVRQYL WSKMPSIALAPLKDTAVFHLGLSKANTNPVFYYQL KKYKGNLLNYFRLNDAAMRVDSFYRNQDTEYGGWV GVALEELEKTRIENIRLYYHKYFKIE | 40 | PZV25905.1 | anacyclamide synthesis protein AcyF [Snowella sp.] |
| 41 | MIVADIQKSSLKEQRLQFIRNHQQAFDVEPIYPLR LFEDFVMGVEGDCTIEASCKIELDKLIASRFLFCF KDPEQHWPSYLSQGLSFFKQVENRVGVQFDYSLLQ AFLGTDFDFSHVTTFTTGIDLRRESLTESSVKIHF RIEDYIAKVQTAIILSGYEVGFLEDFPKQFLARYI PQIGFDFYFDGRCEIELYFEVKENNFDDPNVKKYL WSKMPPVALAPLKDTDVFHLGLSKANTNPVFYYQL KKYKGDLLNHFRLNDTAMRVDSFYRNQETDYGGWV GVALEELEKTRIENIRLYYHKYFGME | 41 | WP_002802539.1 | LynF/TruF/PatF family peptide O-prenyltransferase [Microcystis aeruginosa] |

TABLE 4-7A

| Group | SEQ ID NO: | amino acid sequence | Enzyme | accession No. | name or annotation |
|---|---|---|---|---|---|
| 4 | 42 | MIADVIQKDRLKEQKLQFIRNHQQAFDVEPIYPLP LFEDFVMSVDGDCTIEASCKVELDKLIASRFLFFF KDKAQDWPSYLSQGLSFFKQVETQVGVQLDYSLLQ AFLGTDFDFSRVRTFTTGIDLRRESLAESSVKIHF RIEDYIEKVQTAIILSGGEFGFLEDFPKKFLARYI PQIGFDFYFNGRCEIELYFEVIECNFDDPNVKQYL WSKMPPIALAPLKDTAVFHLGLSKANTNPVFYYQL KKYKGNLLNYFRLNDDAMRVDSFYRNQDTDYGGWV GVALEELEKTRIENIRLYYHKYFKMESN | 42 | WP_079678526.1 | LynF/TruF/PatF family peptide O-prenyltransferase [Planktothrix sp. PCC 11201] |
| | 43 | MAKLSSAVFSFFRQVENRVGVQLDYSLLQQFLGDN FDFSKLEVLSTGIDLRTNLADSSVKMHIRIKDYPE KLETAFLLSDGAAGSNYLSGFVNLIGFDFYFNGKS EIEIYAEVGEDDFFKPETINQVWRHFPDSVLKPLQ ASSLFFTGLSKANNNPVLYYYLKNRQDLINYFRLN DTAQRVHSFYEHQDILPYMWVGTAQQELEKTRIEN VRLYYYKLFGKLE | 43 | CCH91680.1 | conserved hypothetical protein [Microcystis aeruginosa PCC 9432] |
| | 44 | MVILTPTSRTNRSQEQRLQFIRAHQNAFDVDSNFL LSTFEKTVLEIDENCGIEPSCKIEGDHLFAGRYAV AGEDGGNWRKILAQSLGFLNTIESRVDFKINRELI QKFLALHIGSNKIIANTTGIDLRPSLEESSVKIHF KIKVDEDAEELARTAIALDGGYYSSELTQVLLKDT | 44 | WP_044449669.1 | LynF/TruF/PatF family peptide O-prenyltransferase [Mastigocladus laminosus] |

TABLE 4-7A-continued

| Group | SEQ ID NO: | amino acid sequence | Enzyme | accession No. | name or annotation |
|---|---|---|---|---|---|
| | | TLIGFDFFLNGHSEVELYPSCPGGKYELSSNWGRT LSTYVQQNFSKKVVSLFNVCDIFMAGFSKVNIEPV LYFVFFDIKDIAKYFLFNSLGDRIYNFCQSQDDDY SSYYCVGVNERDLRVNRLEKFRFYYTKVI | | | |
| | 45 | MTFTPAFQNSILQERRLRFMRSHQEAFDVEPEFPL PLLENLAQALGSRCVVELSCKVESNQLFAARINIC YRDAWPQSLGQSLKFLDEVESRVGIQINRDLLQQF LAVHINSNKILWNTTGIDLRPNVEDSSVKIHIGID PNQDTEELVMTAIGLDGSQYSPELIQVLLKDSYMI GFDFFLNGRSEVELYTSCPGGKQQLVGNQGIYLKS YAKRNFSEKVFYLLEACDLFMAGFSKANTEAVIYF GFNNIEDMPKYFLFTSLGQRIYDFCRSQGAGPLPC VGVTQKDLESHHVENLRFYYRREFS | 45 | WP_045871562.1 | LynF/TruF/PatF family peptide O-prenyltransferase [Nostocales] |
| | 46 | MTSSLLEVLSAGIDLRTDLADSSVKMHIRIGDYPE KLATAFILSDGAADSNYLSGFVNLIGFDFYFNGKS EIEIYVEVREDDFFKPETINQVWQHFPKSALKPLQ SSSLFFTGLSKANHNPVLYYNLKNPQDLINCFKLN YTAQKVHSFYQHQDILPNMWVGTAQQELEKTRIEN IRLYYYKSFTME | 46 | WP_002758021.1 | LynF/TruF/PatF family peptide O-prenyltransferase [Microcystis aeruginosa] |

TABLE 4-7B

| | | | | | |
|---|---|---|---|---|---|
| 4 | 47 | MAIANRVPYNYLREQRIQFMHAHQDAFDVSTVFPLP LFEKLVTELEGSNVIELSCKIEADKLLAGRFLIFSD QENNWFIQSLAQALQFLDSIESRVGVEINRESLDKF LAAHINSGKIMGISTGLDLRPELENSSVKIHIMLGE NSEELVRTAIAIDGSHYPVELAQVLLKDTMMIGFDF FLNGHSEVELYISCSRKKDSLPNNRGESTRYYIRQK FSPKVSSLLDASDFFVGGFSKANVEPVLYYAFENIK DIPKYFVFNDLGNRVYDFCRSQDSITMTWIGINERD LDRERLNNFRLYYRRSFG | 47 | EAW34319.1 | hypothetical protein L8106_29075 [Lyngbya sp. PCC 8106] |
| | 48 | MTSSKLEVLSAGIDLRTDLADSSVKMHIRIGYYPEK LATAFILSDGAADSNYLSGFVNLIGFDFYFNGKSEI EIYAEVREDDFFKPETINQVWQHFPKSALKPLQASS LFFTGLSKANHNPVLYYNLKNPQVLINCFKLNYTAQ KVHSFYQHQDILPNMCVGTAQQELEKTRIENIRLYY YKSFTME | 48 | WP_004161274.1 | LynF/TruF/PatF family peptide O-prenyltransferase [Microcystis aeruginosa] |
| | 49 | MTSSLLEVLSAGIDLRTNLADSSVKMHIRIGDYTEK LATAFILSDGAADSNYLSGFVNLIGFDFYFNGKSEI EIYAEVREDDFFKPETINQVWQHFPKSALKPLQASS LFFTGLSKANHNPVLYYNLKNRQDLTNYFKINDTAQ RVHSFYQHQDILPKMWVGTAQQELEKTRIENVRLYY YKYFGME | 49 | WP_002769120.1 | LynF/TruF/PatF family peptide O-prenyltransferase [Microcystis aeruginosa] |
| | 50 | MILTTTWQDNYAKEQCIQYLRHHFESFEVEPAFPLP LFEQAILKLNSCSVLEPSFKVQGSTLFAGRVTASTK AASTKKDWPLLIRSALNLFDAVESRVEATINRSLLE KFLMLHQDSGKIEGSLMGIDLRPNVKESSLKVHLHL DKEQAVDELVMTAINLDGGYYAPDLTQVLLKDTALI GFDFFLDGRSAVEMYTCCAGSKQLSFLGKRGAYIKP YIYKNFSQKVTSLLKDVALVMVGFSKENSKPVLYFE FEKLRDIKSHLLFNSLGDKIYDFCLHHQLENFVSIG VTEQDLEKSRLENFRFYYRKSV | 50 | RAM49414.1 | microcyclamide biosynthesis protein [Hapalosiphonaceae cyanobacterium JJU2] |
| | 51 | MTITSGFSHNYLREQRLRFIRTHLDAFDVEPCFPLP LFEEAVLEIEGYCGIEPTCHVEGDRLFASDFQVATY EETWPRSLVDASKFLDKVESRVGVQINRNLLDQFSS LYINSSQIETNTIGIDLRPTLQDSLIKVYMHLHPGE GNEDLVMTALALDGANYSAEVTEVLLKDGSLIGFNL FLDGRSNIEIWAISPGGKYQQRGNFGSYLAAYIRKH FSQKVISLFDVSDGIAASFSKQKTSPLLYFHFFDIK EIPKYFAFNSLGDKIYDFYQSLDCVTYATVYAREQD MESNRLNNYGFLYNRSDTCQVDLDKLRFTQQVGISP | 51 | WP_054466071.1 | LynF/TruF/PatF family peptide O-prenyltransferase [Planktothricoides sp. SR001] |
| | 52 | MTITPVFSHHYLREQRLRFIRTHLEAFDVEPRFPLP LFEEAVLEIEGYCGIEPTCHVQGDRIFAGDIQVATY EKTWPKSLMGASKFLDKVGSQVGVQINRNLLDRFSS LYIHSSKIETNTIGIDLRPTIQDSLIKIYMHLHPGG SHEDLVMTALALDGANYSAEVTEVLLKDGALIGFNL | 52 | WP_002754527.1 | LynF/TruF/PatF family peptide O-prenyltransferase [Microcystis aeruginosa] |

TABLE 4-7B-continued

| |
|---|
| FLDGRSNIEIWAISPGGKYQHKGNFGRDLAAYIRKN<br>FSQKVNFLFDVADGIAASFSKQKIDPIFYFHFFDIK<br>DIPKYFAFNSLGDRIYDFYQSQDCVTYASISVREQD<br>LESSRLDNYGFLYNKSDVCQLNLDKFHFAQQLGISP |

TABLE 4-8

| Group | SEQ ID NO: | amino acid sequence | Enzyme | accession No. | name or annotation |
|---|---|---|---|---|---|
| 4 | 53 | MPITSVFSHNYLREQRLRFIRTHRDAFDVPYSFLLPLYEEAVFK IEGSCGVEPSCNVEGDRLFAGDFQVANYGHTWPRSLIDAASFLD KIERRIDVKINRNLLERFSALYIGSSKIENNTIGIDLRPTLQDS VIKIYMHIHPGQSNEDLVMTALALDGAIYSAELTQVLLRDVVVI GFNLFLDGRSNIEIWAGSAGQKHNHQGNLGRDLTAYIRKYYSHK VNYMFNVSDFSAVSFSKQKIDPLFHFHFFDIKDILKYFAFNSLG DKIYDFCQSQDCITYTGVSARAQELESNRLNNYSFFYNQSDTCQ TDLDILRLPMMF | 53 | WP_015177266.1 | LynF/TruF/PatF family peptide O-prenyltransferase [*Oscillatoria nigro-viridis*] |
| | 54 | MLQNIQNNRFKDRPIEFIRSHQEAFDVEPIFPIPLFEEVILELE GVFSVKPSCKVEGSRLLAGRYETGILPMRKTWPQLLTHTFKFLN KIESRVGVCINRESFEQFAAVHIGSDKIMDSTIGVHLGSKLEDS SVMMYIHFDTEQDCEELAKTAIALDGGHYSDELTQVLIRDMVVI GFELFFDGRSHVELCPVAPAQPGALGIRGKYLTPYIQKYFSQKV NSIFRGSHLLKICFSKAYATPVLGFYFKNLKDIPKYFRFNSLGD RIYDFCQSQSCIMVPAVFATEAELEKSRLEKFDFYYIRWEEC | 54 | CUR21328.1 | PatF [*Planktothrix paucivesiculata* PCC 9631] |
| | 55 | MIVNVIQKDRLKEQKLQFIRNHQQAFDVEPIYPLPLFEDFVTSI EGDCSLEASCKIESDKLIASRFLLFFEDKTQEWQKYLHQSLTFF GLVENRVGVKINYSLLQQFLGSSFDFSKVTVLSAGIDLRNNLAE SSLKMHIRIKDYPEKLDKAFALSDGAADGNYLKDFVNLIGFDFY FNGKSEIEIYAEVQEDDFFKPEINNLVWQHFPKTALQPLKASSL FFTGLSKANNNPVLYYHLKNRQDLTNYFKLNDTAQRVHSFYQHQ DILPYMWVGTAQKELEKTRIENIRLYYYKSFKMESN | 55 | 5TTY_A | PagF Chain A, Pagf Prenyltransferase |
| | 56 | DLIDRLQNNQRKDRRLQFVRTHQEAFDVKPTFPLPLFEEAILEI EGSCSVESSCQVEGDRLQGGRYEVCNNQGTTWPESLTHAFKLLD KIDSQLGVRINRDSFDRFAAAHVNSRKIINNTIGVHLGSKLEDS SVXLYIHIKPEEDTEELARTALVLDGGRYSDELTRVLLRDTXVI GFELFFDGRSRVDLGPCAPGKSGTLKXKGKHLEQYTQKNLSRKV NSIFREGYLFGAFFSKTRVEPILFFYHSIIKDLPKYFTFNSLGD KIYNFCQSQGCITDVAIAVTETELEKSRLENFCFYYDQWDECKP SSDYDTERHLHRS | 56 | 4BG2_A | PatF Chain A, X-ray Crystal Structure Of Patf From *Prochloron Didemni* |

The term "with one or more amino acid deletions, substitutions or additions" as used herein means that the number of amino acids deleted, substituted or the like is not particularly limited insofar as a prenylation enzyme thus obtained retains a function of prenylating an amino acid residue. In this sentence, the term "more" means an integer of 2 or more, preferably several, for example, from 2 to 15, more preferably from 2 to 10, still more preferably from 2 to 5, still more preferably 2, 3, or 4. The position of deletion, substitution or addition in each prenylation enzyme may be any of N terminal, C terminal and therebetween in each prenylation enzyme insofar as the resulting prenylation enzyme retains a function of prenylating an amino acid residue.

The term "having Y % or more homology with an amino acid sequence represented by SEQ ID NO: X" as used herein means that when respective amino acid sequences of two polypeptides are aligned to have the maximum agreement, a proportion of the number of amino acid residues common to them to the total number of amino acids shown by SEQ ID NO: X is Y % or more.

The prenylation enzyme is capable of prenylating a peptide containing a motif of, for example but not particularly limited to, X2X1X3 or X4X2X1X3X5 (X1 represents W which is an amino acid residue or derivative thereof to be prenylated, X2, X3, X4, and X5 each independently represent an arbitrary amino acid residue. The arbitrary amino acid residue also includes ClAc-D-Tyr). Although the amino acid residue adjacent to X1 including X2, X3, X4 and X5 is not particularly limited if the prenylation enzyme of the present invention is used, it is preferably an amino acid residue promoting prenylation of the amino acid residue X1 to be prenylated from the standpoint of improving the reaction efficiency of prenylation.

X1 is W or a derivative thereof.

The following X2 to X5 and the following motifs are shown as examples when KgpF is used as a prenylation enzyme. When a prenylation enzyme other than KgpF is used, preferable X2 to X5 and the motif can be set by, as described above, comprehensively preparing peptides in a free-cell translation system and performing an efficiency confirmation test by in vitro prenylation with a predetermined prenylation enzyme.

X2 is preferably V, T, I, A, P, Q, N, S, F, H, W, L, or G, or a derivative of any of them, more preferably V, T, I, A, P, Q, or N or a derivative of any of them, still more preferably V, T, I, A, or N, or a derivative of any of them.

X3 is preferably G, W, S, A, L, F, T, R, N, Y, I, V, H, Q, K, D, or E, or a derivative of any of them, more preferably G, W, S, A, L, F, T, R, N, or Y, or a derivative of any of them, still more preferably G, W, or S, or a derivative of any of them.

X4 is preferably G, N, Y, I, R, E, F, S, W, H, D, T, P, A, V, L, Q, or K, or a derivative of any of them. X5 is preferably G, N, Y, I, R, E, F, S, W, H, D, T, P, A, V, L, Q, K, or C or a derivative of any of them.

For example, when KgpF is used as a prenylation enzyme, the prenylation enzyme can prenylate a peptide having the motif shown specifically below. In the following motifs, y means ClAc-D-Tyr.

VWG
VWW
VWS
VWI
VWC
VWT
VWR
VWQ
VWN
VWF
VWK
VWD
VWH
TWG
TWW
TWS
TWT
TWP
TWL
TWK
TWD
TWN
TWH
IWG
IWW
IWS
IWR
IWI
IWP
IWT
IWN
IWQ
IWE
IWH
AWG
AWW
AWS
AWH
AWV
AWD
AWL
AWT
AWR
AWQ
AWI
PWG
PWW
PWS
PWP
PWW
PWR
PWA
PWL
PWN
PWY
PWI
PWK
QWS
QWA
NWG
NWW
NWA
NWL
NWF
NWT
NWR
NWN
NWY
NWI
NWV
NWH
NWQ
NWK
NWD
NEW
NWP
NWS
SWS
FWF
FWS
HWS
HWG
HWD
WWQ
WWS
LWV
LWS
LWC
GWS
GWT
DWF
DWS
RWR
RWC
YWS
EWS
EWP
KWS

For example, when KgpF is used as a prenylation enzyme, the prenylation enzyme can also prenylate a peptide containing the motif shown below more specifically. In the following motif, y means ClAc-D-Tyr.

GVWGG (SEQ ID NO: 57)

GVWWG (SEQ ID NO: 58)

GVWSG (SEQ ID NO: 59)

EVWNL (SEQ ID NO: 60)

RVWGP (SEQ ID NO: 61)

RVWGC (SEQ ID NO: 62)

RVWGY (SEQ ID NO: 63)

-continued (SEQ ID NO: 64)
HVWGD (SEQ ID NO: 65)
DVWGY (SEQ ID NO: 66)
DVWIF (SEQ ID NO: 67)
YVWGR (SEQ ID NO: 68)
YVWGH (SEQ ID NO: 69)
HVWGT (SEQ ID NO: 70)
TVWGY (SEQ ID NO: 71)
YVWGP (SEQ ID NO: 72)
PVWGC (SEQ ID NO: 73)
HVWSL (SEQ ID NO: 74)
AVWDH (SEQ ID NO: 75)
SVWTC (SEQ ID NO: 76)
AVWRS (SEQ ID NO: 77)
yVWNV (SEQ ID NO: 78)
AVWQT (SEQ ID NO: 79)
RVWKL (SEQ ID NO: 80)
TVWQQ (SEQ ID NO: 81)
SVWSI (SEQ ID NO: 82)
DVWQT (SEQ ID NO: 83)
HVWHQ (SEQ ID NO: 84)
EVWNL (SEQ ID NO: 85)
GTWGG (SEQ ID NO: 86)
GTWWG (SEQ ID NO: 87)
GTWSG (SEQ ID NO: 88)
HTWST (SEQ ID NO: 89)
STWTS (SEQ ID NO: 90)
NTWWQ -continued (SEQ ID NO: 91)
ITWPL (SEQ ID NO: 92)
GTWLY (SEQ ID NO: 93)
NTWKV (SEQ ID NO: 94)
FTWDN (SEQ ID NO: 95)
TTWDE (SEQ ID NO: 96)
ETWNA (SEQ ID NO: 97)
TTWNA (SEQ ID NO: 98)
VTWNS (SEQ ID NO: 99)
VTWNA (SEQ ID NO: 100)
NTWNS (SEQ ID NO: 101)
ETWHN (SEQ ID NO: 102)
STWGS (SEQ ID NO: 103)
LTWGA (SEQ ID NO: 104)
STWGH (SEQ ID NO: 105)
VTWKG (SEQ ID NO: 106)
ATWNA (SEQ ID NO: 107)
GIWGG (SEQ ID NO: 108)
GIWWG (SEQ ID NO: 109)
GIWSG (SEQ ID NO: 110)
RIWRY (SEQ ID NO: 111)
IIWII (SEQ ID NO: 112)
GIWGS (SEQ ID NO: 113)
QIWTH (SEQ ID NO: 114)
RIWRK (SEQ ID NO: 115)
KIWNS (SEQ ID NO: 116)
TIWII (SEQ ID NO: 117)
RIWQV -continued (SEQ ID NO: 118)
GIWEK (SEQ ID NO: 119)
SIWSQ (SEQ ID NO: 120)
HIWTD (SEQ ID NO: 121)
IIWHR (SEQ ID NO: 122)
QIWPN (SEQ ID NO: 123)
GAWGG (SEQ ID NO: 124)
GAWWG (SEQ ID NO: 125)
GAWSG (SEQ ID NO: 126)
SAWHG (SEQ ID NO: 127)
PAWVR (SEQ ID NO: 128)
YAWDQ (SEQ ID NO: 129)
YAWLR (SEQ ID NO: 130)
QAWTK (SEQ ID NO: 131)
NAWTG (SEQ ID NO: 132)
YAWRS (SEQ ID NO: 133)
LAWQI (SEQ ID NO: 134)
KAWIC (SEQ ID NO: 135)
KAWHR (SEQ ID NO: 136)
GPWGG (SEQ ID NO: 137)
GPWWG (SEQ ID NO: 138)
GPWSG (SEQ ID NO: 139)
RPWVP (SEQ ID NO: 140)
QPWPE (SEQ ID NO: 141)
TPWVC (SEQ ID NO: 142)
WPWRT (SEQ ID NO: 143)
VPWAE (SEQ ID NO: 144)
KPWLK -continued (SEQ ID NO: 145)
KPWNY (SEQ ID NO: 146)
RPWYC (SEQ ID NO: 147)
SPWID (SEQ ID NO: 148)
DPWKS (SEQ ID NO: 149)
NNWSP (SEQ ID NO: 150)
NNWST (SEQ ID NO: 151)
GNWSY (SEQ ID NO: 152)
YNWSQ (SEQ ID NO: 153)
INWSL (SEQ ID NO: 154)
RNWSY (SEQ ID NO: 155)
RNWSR (SEQ ID NO: 156)
FNWSF (SEQ ID NO: 157)
GNWSG (SEQ ID NO: 158)
NNWST (SEQ ID NO: 159)
GNWGG (SEQ ID NO: 160)
GNWWG (SEQ ID NO: 161)
GNWAG (SEQ ID NO: 162)
GNWLG (SEQ ID NO: 163)
GNWFG (SEQ ID NO: 164)
GNWTG (SEQ ID NO: 165)
GNWRG (SEQ ID NO: 166)
GNWNG (SEQ ID NO: 167)
GNWYG (SEQ ID NO: 168)
GNWIG (SEQ ID NO: 169)
GNWVG (SEQ ID NO: 170)
GNWHG (SEQ ID NO: 171)
GNWQG -continued (SEQ ID NO: 172)
GNWKG (SEQ ID NO: 173)
GNWDG (SEQ ID NO: 174)
GNWEG (SEQ ID NO: 175)
NNWPT (SEQ ID NO: 176)
PNWRF (SEQ ID NO: 177)
FFWFF (SEQ ID NO: 178)
GFWSG (SEQ ID NO: 179)
GLWSG (SEQ ID NO: 180)
YLWSK (SEQ ID NO: 181)
yLWVL (SEQ ID NO: 182)
NDWST (SEQ ID NO: 183)
YDWFC (SEQ ID NO: 184)
NEWST (SEQ ID NO: 185)
HEWPW (SEQ ID NO: 186)
NKWST (SEQ ID NO: 187)
NYWST (SEQ ID NO: 188)
GSWSG (SEQ ID NO: 189)
ySWSP (SEQ ID NO: 190)
ISWNE (SEQ ID NO: 191)
GWWSG (SEQ ID NO: 192)
TWWQR (SEQ ID NO: 193)
GGWSG (SEQ ID NO: 194)
TGWTR (SEQ ID NO: 195)
GHWSG (SEQ ID NO: 196)
FHWGL (SEQ ID NO: 197)
IHWDC (SEQ ID NO: 198)
GQWSG -continued (SEQ ID NO: 199)
YQWAC (SEQ ID NO: 200)
YRWRV For example, when OltF is used as a prenylation enzyme, the prenylation enzyme can also prenylate a peptide containing the motif shown below specifically. In the following motif, y means ClAc-D-Tyr.

NWS
IWR
PWV
VWI
SWN
NWR
yWY
AWD
VWN
RWG
FWF
GWG
YWY
NWN
VWV
FWL
LWV
DWF

Further, for example when OltF is used as a prenylation enzyme, the prenylation enzyme can also prenylate a peptide containing the motif shown below specifically.

(SEQ ID NO: 201)
NNWSP (SEQ ID NO: 202)
NNWST (SEQ ID NO: 203)
RIWRY (SEQ ID NO: 204)
RPWVP (SEQ ID NO: 205)
DVWIF (SEQ ID NO: 206)
ISWNE (SEQ ID NO: 207)
PNWRF (SEQ ID NO: 208)
YAWDQ (SEQ ID NO: 209)
EVWNL (SEQ ID NO: 210)
GRWGY (SEQ ID NO: 211)
FFWFF (SEQ ID NO: 212)
GGWGG (SEQ ID NO: 213)
YYWYY (SEQ ID NO: 214)
NNWNN

-continued

VVWVV (SEQ ID NO: 215)

YFWLP (SEQ ID NO: 216)

GLWVP (SEQ ID NO: 217)

SDWFW (SEQ ID NO: 218)

WFWLP (SEQ ID NO: 219)

More specifically, at least peptides having the following amino acid sequence, as well as peptides shown later in Examples, can be prenylated.

Cyclic [WLNGDNNWSTP] (SEQ ID NO: 386)

Cyclic [TSQIWGSPVP] (SEQ ID NO: 382)

Cyclic [SAQWQNFGVP] (SEQ ID NO: 383)

WLNGDNNWSTP (SEQ ID NO: 384)

WLNGDNNWSTPAYDG (SEQ ID NO: 385)

This can be understood from the finding that for example KgpF prenylates two Trp residues contained in a main-chain cyclized peptide (Cyclic [WLNGDNNWSTP]) formed from a precursor peptide (KgpE) of Kawaguchipeptin A and composed of 11 residues to form a natural product Kawaguchipeptin A (refer to Tetrahedron, 1996, 52, 9025. ACIE, 2016, 55, 3596. Org. Biomol. Chem., 2016, 14, 9639.). The prenylation enzyme can also prenylate Fmoc-Trp-OH though at low efficiency. In the above description, Cyclic[ ] and c[ ] means that it is an amino acid sequence of a cyclic peptide and a left-end amino acid residue and a right-end amino acid residue in the bracket bond to each other.

Although the concentration of the prenylation enzyme is not particularly limited because it differs depending on the expression and purification conditions of the enzyme, it is, for example, from 0.1 to 1000 μM. The concentration of the prenylation enzyme can be made smaller by adjusting the expression and purification conditions of the enzyme.

(Peptide Library Having Phenotype Displayed on Genotype)

A display method is a system capable of linking a phenotype to a genotype encoding the sequence thereof through non-covalent bonding or covalent bonding to display the phenotype on the genotype and performing enrichment and amplification (selection) of active species by using a replication system reconstructed in a test tube.

Examples of it include phage display with *Escherichia coli* as a replication medium and yeast display.

In vitro display without using a prokaryotic or eukaryotic organism as a medium can also be used and the in vitro display permits more diverse library search than phage display. Examples of the in vitro display include ribosome display, cDNA display, and mRNA display.

(Method of Producing Peptide-Genotype Library)

One aspect of the present invention is a method of producing a peptide-genotype complex library including a step of preparing a peptide-genotype library including genotype-peptide complexe(s) and a step of bringing the peptide-genotype library into contact with a prenylation enzyme and prenylating at least one Trp or derivative thereof.

(Method of Producing Peptide-Genotype Library)

As the display method of the present invention, any method can be used, and mRNA display can be used preferably.

Described specifically, the method of producing a peptide-genotype complex library is preferably a method of producing a peptide-mRNA complex library. The step of preparing a peptide-genotype library includes a step of preparing a peptide-mRNA library by the mRNA display method; and the step of preparing a peptide-mRNA library includes a step of binding puromycin to the 3' end of each RNA of the mRNA library to produce a puromycin-bound mRNA library and a step of translating the puromycin-bound mRNA library in a cell-free translation system and preparing a peptide-mRNA library including peptides having an amino acid sequence containing at least one Trp or derivative thereof.

The step of producing a puromycin-bound mRNA library is performed, more specifically, by binding puromycin to the downstream region of ORF (Open reading frame) of each mRNA when a mRNA library is prepared in the method of producing a peptide library described above. Puromycin may be bound to mRNA via a linker composed of a peptide or nucleic acid. An mRNA-peptide complex is formed by binding puromycin to the downstream region of ORF of mRNA and incorporating puromycin in a ribosome which has translated ORF of mRNA. Such a peptide-mRNA complex allows association between genotype and phenotype so that it can be applied to in vitro display.

(Peptide Library)

The present invention embraces a peptide library produced by the above-described production method. More specifically, the peptide library of the present invention includes an aspect of a peptide library and an aspect of a peptide-mRNA complex library including the above-described cyclic peptides.

(Screening Method)

One aspect of the present invention is a screening method for identifying a peptide that binds to a target material, including a step of bringing a peptide library and/or peptide-genotype complex library, preferably a peptide-mRNA complex library, each produced by the above-described method, into contact with a target material and a step of selecting a peptide that binds to the target material. The contact step in the screening method of the present invention may be performed by bringing a peptide library and/or peptide-genotype complex library, preferably a peptide-mRNA complex library, each produced by the above-described method into contact with a target material, followed by incubation.

The target material is not particularly limited in the present specification and examples include low molecular weight compounds, high molecular weight compounds, nucleic acids, peptides, proteins, sugars, lipids and the like. In particular, the library of the present invention can also be applied to the case where a target material has protease activity or is an intracellular molecule.

The target material immobilized onto, for example, a solid-phase support may be brought into contact with the peptide library and/or peptide-mRNA complex library according to the present invention. The term "solid-phase support" as used herein is not particularly limited insofar as it can immobilize the target material onto itself. Examples include microtiter plates, substrates, and beads made of glass, a metal, a resin or the like, nitrocellulose membranes, nylon membranes, and PVDF membranes. The target material can become immobilized onto such a solid-phase support in a known manner.

The target material and the library are brought into contact with each other in a buffer selected as needed and they are interacted while controlling pH, temperature, time and the like.

The screening method of the present invention includes a step of selecting a peptide that has bound to the target material. The peptide that has bound to the target material can be selected, for example, by labeling peptides detectably by a known method and after the contact step, washing the surface of the solid-phase support with a buffer, and then detecting the compound that has bound to the target material.

Examples of a detectable label include enzymes such as peroxidase, alkaline phosphatase and the like, radioactive substances such as 25I, 131I, 35S, 3H and the like, fluorescent substances such as fluorescein isothiocyanate, rhodamine, dansyl chloride, phycoerythrin, tetramethyl rhodamine isothiocyanate, near infrared fluorescent materials and the like, light-emitting substances such as luciferase, luciferin, aequorin and the like, and nanoparticles such as gold colloid, quantum dot and the like. When an enzyme is used as the label, detection can also be achieved by bringing the substrate of the enzyme into contact with the enzyme to cause color development. It is also possible to detect by binding biotin to the peptide and then binding avidin or streptavidin labeled with an enzyme or the like.

The screening method can not only detect or analyze the presence/absence or degree of binding but also analyze the enhanced or inhibited activity of the target material and thereby identify a peptide having such enhancing or inhibiting activity. Such a method also allows identification of a peptide having physiological activity and useful as a drug.

In the screening method of the present invention, a display method can be applied to the step of selecting a peptide that binds to a target material and usable examples of such a display method include phage display using *Escherichia coli* as a replication medium, yeast display, and ribosome display, cDNA display and mRNA display, which are each an in vitro display not using a prokaryotic or eukaryotic organism as a medium. Particularly when the peptide-mRNA complex library is used in the screening method of the present invention, the mRNA display method can be applied to the step of selecting a peptide that binds to the target material. The term "mRNA display method" as used herein means a method of, in the translation of mRNA, binding the mRNA to a synthesized peptide to allow association between a phenotype (peptide) and a nucleic acid sequence (mRNA).

In the display method, a peptide-genotype complex library is brought into contact with a target molecule and after incubation, a peptide-genotype complex group bound to the target molecule is selected. This step can be carried out, similar to that used for the above-described selection of a peptide bound to a target material, for example by fixing a target material onto the surface of a solid phase and selecting a peptide-genotype complex trapped on the surface of the solid phase.

When as the display method, the mRNA display method is used, a group of cDNAs can be obtained by subjecting a group of peptide-mRNA complexes to a reverse transcription reaction. This cDNAs encode cyclic peptides binding to a target molecule.

By amplifying the cDNA group and transcribing the resulting group, an mRNA library can be obtained again. In the mRNA library thus obtained again, the concentration of a molecule that binds to the target molecule becomes higher than that of the first mRNA library. The molecule that binds to the target molecule can therefore be enriched gradually by repeating the above step in a plurality of times.

The amino acid sequence of the enriched cyclic peptide can be determined by analyzing the sequence of the cDNA so that a cyclic peptide having high affinity for the target molecule can be produced based on the sequence information.

The RaPID system (Yamagishi, Y. et al., Chemistry & biology, 2011, 18 (12), 1562-70) is one example of a screening system having a FIT system, used in Examples described later, and mRNA display in combination. The RaPID system having a genetic code reprogramming technology using the FIT system and the mRNA display method in combination has enabled screening with a peptide library including nonproteins.

(Screening Kit)

The present invention also provides a peptide screening kit. One aspect of the screening kit of the present invention includes a peptide library and/or peptide-mRNA complex library produced by the production method of the present invention.

The screening kit of the present invention includes, in addition to the above-described peptide library and/or the peptide-mRNA complex library, a reagent and apparatus necessary for detecting binding of the peptide or peptide-mRNA complex and a target material. Examples of such a reagent and apparatus include, but not limited to, solid-phase supports, buffers, labeling reagents, enzymes, enzyme reaction terminator solutions, and microplate readers.

(Method of Producing Peptide)

The present invention also provides a method of producing a prenylated peptide, including a step of bringing a peptide having an amino acid sequence containing at least one Trp or derivative thereof into contact with a prenylation enzyme and prenylating the at least one Trp residue or derivative residue thereof.

Although a method of obtaining the peptide having an amino acid sequence containing at least one Trp or derivative thereof is not particularly limited, examples include chemical synthesis, preferably a method of synthesizing using a solid-phase synthesis method. One of the preferred aspects of the method of producing a peptide according to the present invention includes a step of synthesizing, by chemical synthesis, a peptide having an amino acid sequence containing at least one Trp or derivative thereof and a step of bringing the peptide having an amino acid sequence containing at least one Trp or derivative thereof into contact with a prenylation enzyme and prenylating the at least one Trp residue or derivative residue thereof.

The method of producing a peptide according to the present invention can be carried out based on the above-described method of producing a peptide library according to the present invention. Described specifically, in the prenylation step, it is preferred to bring a peptide having an amino acid sequence containing at least one Trp or derivative thereof into contact with a prenylation enzyme in the presence of a donor for prenyl group in the presence or absence of a cofactor.

Although the donor for donating a prenyl group is not particularly limited, examples include dimethylallyl diphosphate (DMAPP), isoprenyl diphosphate (IPP), geranyl diphosphate (GPP), farnesyl diphosphate (FPP), geranylgeranyl diphosphate (GGPP), and phytyl diphosphate (PDP). These donors for donating a prenyl group may be used either singly or in combination of two or more.

Although the cofactor is not particularly limited, examples include magnesium ion, copper ion, iron ion, manganese ion, molybdenum ion, nickel ion, selenium ion, zinc ion and the like. They may be used either singly or in combination of two or more. Of these, magnesium ion is preferred. Whether the cofactor is used or not in the method of producing a peptide according to the present invention may be selected as needed, depending on the prenylation enzyme to be used.

(Translation System)

In the present invention, the cell-free translation system may contain an elongator tRNA and may further contain an initiator tRNA. As described above, the present inventors have developed the translation system in which N1N2N3 encodes an arbitrary amino acid by codon reassignment making use of flexizyme. In a natural translation system, tRNAs having an anticodon corresponding to each amino acid are present and the tRNAs have intrinsic sequences respectively also in a region other than the anticodon loop.

When an arbitrary amino acid is reassigned to any of N1N2N3s by making use of flexizyme, all the tRNAs may be artificial. In this case, elongator tRNAs corresponding to respective N1N2N3s to be added to the translation system may have base sequences 80% or more, 85% or more, 88% or more, or 90% or more in full length identical to one another. This means that a group of elongator tRNAs almost equal in their sequences except for the sequences of anticodons may be used. The elongator tRNA group may have base sequences identical to one another except for anticodon loops. The elongator tRNAs corresponding to respective N1N2N3s to be added to the translation system may have sequences 85% or more, 88% or more, 90% or more, 93% or more, 95% or more, 98% or more, or 99% or more identical to one another except for anticodon loops.

The term "anticodon loop" as used herein means a loop portion of a single strand of a tRNA containing an anticodon. The sequence of the anticodon loop can be determined as needed by those skilled in the art so as to complement the codon-anticodon interaction.

The translation system thus obtained includes, as tRNAs, only one kind of initiator tRNAs and one kind of elongator tRNAs (that is, tRNAs having almost the same base sequence except for anticodons) so that the reactivity of the tRNAs becomes uniform and predetermined peptides can therefore be obtained with good reproducibility.

According to the translation system of the present invention, a library including $1\times10^{12}$ to $1\times10^{13}$ or more respectively different peptides can be produced based on the diversity of N1N2N3 in the mRNA.

The translation system of the present invention may be used for transcription after addition of a factor necessary for transcription.

The translation system of the present invention is suited for use in the method of producing a peptide library according to the present invention described above.

All the disclosures of the patent documents and reference documents cited herein are incorporated herein in their entirety by reference.

EXAMPLES

The present invention will hereinafter be described specifically based on Examples, but the present invention is not limited to or by them. Those skilled in the art can change the present invention into various aspects without departing from the gist of the present invention and such a change is also embraced within the scope of the present invention.

1. FIT System v7S/v8.0.3

The FIT system has the following composition:

50 mM HEPES-KOH (pH 7.6); 12 mM magnesium acetate; 100 mM potassium acetate; 2 mM sperm idine; 20 mM creatinine phosphate; 2 mM DTT; 2 mM ATP; 2 mM GTP; 1 mM CTP; 1 mM UTP; 0.1 mM 10-formyl-5,6,7,8-tetrahydrofolic acid; 0.5 mM 15 proteinogenic amino acids other than Met, Lys, Gln, Trp, and Glu; 1.5 mg/ml *E. coli* total tRNA; 0.73 μM AlaRS; 0.03 μM ArgRS; 0.38 μM AsnRS; 0.13 μM AspRS; 0.02 μM CysRS; 0.06 μM GlnRS; 0.23 μM GluRS; 0.02 μM GlyRS; 0.02 μM HisRS; 0.4 μM IleRS; 0.04 LeuRS; 0.11 μM LysRS; 0.03 μM MetRS; 0.68 μM PheRS; 0.16 μM ProRS; 0.04 μM SerRS; 0.09 μM ThrRS; 0.03 μM TrpRS; 0.02 μM TyrRS; 0.02 μM ValRS; 0.6 μM MTF; 2.7 μM IF1; 0.4 μM IF2; 1.5 μM IF3; 0.26 μM EF-G; 10 μM EF-Tu; 10 μM EF-Ts; 0.25 μM RF2; 0.17 μM RF3; 0.5 μM RRF; 0.1 μM T7 RNA polymerase; 4 pg/ml creatine kinase; 3 pg/ml myokinase; 0.1 μM pyrophosphatase; 0.1 μM nucleotidediphosphatase kinase, and 1.2 μM ribosome.

2. Preparation of ClAc-D/L-Trp/Tyr-$tRNA^{fMet}_{CUA}$

In 83.3 mM HEPES-KOH (pH 8.0), 3 μL of 83.3 μM $tRNA^{fmet}_{CUA}$ and 3 μL of 83.3 μM flexizyme were heated at 95° C. for 2 minutes and then cooled to room temperature in 5 minutes. To the resulting RNA solution was added 2 μL of 3 M $MgCl_2$ and the resulting mixture was incubated on ice for 5 minutes. Then, 2 μL of 25 mM ClAc-D-Trp-CME, ClAc-L-Trp-CME, ClAc-D-Tyr-CME, or ClAc-L-Tyr-CME (in DMSO) was added to the reaction mixture, followed by incubation on ice for 2 hours. The reaction was terminated by adding 40 μL of 0.3 M sodium acetate (pH 5.2) and tRNA was collected by ethanol precipitation. Precipitate was washed twice with 70% ethanol and 0.1 M sodium acetate (pH 5.2) and once with 70% ethanol. After air drying for 10 minutes, the precipitate was dissolved in 1.0 μL of 1.0 mM sodium acetate and the resulting solution was used for the following translation reaction.

3. Prenylation Enzyme

With regards to each of KgpF and OltF, heterogeneous co-expression of a gene synthesized after optimizing the codon of a gene derived from a producing strain was performed in *Escherichia coli*, followed by purification to obtain a prenylation enzyme.

4. MALDI-TOF Analysis

The analysis was performed using UltrafleXtreme (Bruker Daltonics) or Autoflex II (Bruker Daltonics) and peptide calibration standard II (Bruker Daltonics).

In addition, reagents and the like disclosed in WO2014/181888 and WO2015/030014, particularly those disclosed in Examples thereof were used as needed also in the present Examples.

Example 1: Modification Test of Thioether-Closed Artificial Cyclic Peptide Having Sequence Element of Kawaguchipeptin, a Natural Substrate Three kinds of thioether-closed artificial cyclic amino acid sequences YG280 to 282 derived from the sequence of Kawaguchipeptin, a natural substrate, (which may also be called "natural substrate sequence") were designed.

[Chemical formula 9]

(SEQ ID NO: 505)

Cyclic[WLNGDNNWSTP]

cf. kawaguchipeptin (SEQ ID NO: 220)

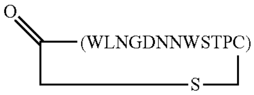

YG280

(SEQ ID NO: 221)

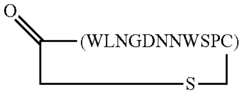

YG281

(SEQ ID NO: 222)

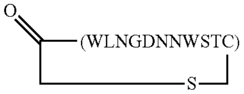

YG282

(In the formula, shown in the parentheses is an amino acid sequence).

For three kinds of thioether-closed artificial cyclic peptides (YG280 to 282), peptides whose N-terminal Trp as an initiator residue had a steric configuration of D-form and those of L-form were synthesized. In short, six kinds in total of peptides were obtained by translation and synthesis under (Conditions 1) of the artificial translation system developed by the present inventors. The peptides thus obtained were then reacted with 14.7 μM KgpF at 37° C. for 18 hours in the system shown in (Conditions 2). "DMAPP" used in (Conditions 2) is dimethylallyl pyrophosphoric acid.

(Conditions 1)

FIT system: v7s/v8.0.3

19aa-Met: 0.5 mM

ClAc-D or L-Trp-tRNA$^{fMet}{}_{CUA}$: 90 μM

Reaction: 37° C., 60 min.

Scale: 2.5 pL scale (Conditions 2)

Translated mixture amount: 2.5 μL (mixture obtained under (Conditions 1))

KgpF: 14.7 μM

DMAPP: 2 mM

Total amount: 15.7 μL

Reaction: 37° C., 18 hours

The above reaction products were analyzed by MALDI-TOF-MS. The results were as shown below.

For all the three kinds of peptides tested, products having a molecular weight increased by that corresponding to prenylation were observed when they were treated with KgpF. This has suggested that the above peptides become a substrate of KgpF.

Although the peptides had a Trp at two positions therein, prenylation occurred at only one position.

Among the three kinds of peptides tested, the peptide having the YG280 sequence with a steric configuration of the N terminal Trp of D-form showed the most excellent modification efficiency by prenylation, so that the tests were continued further while focusing on the YG280 sequence.

Example 2: Modification of Thioether-Closed Artificial Cyclic Peptide with KgpF—Optimization of Enzyme Concentration Based on the results of Example 1, the prenylation reaction conditions were optimized by using the peptide having a YG280 sequence and gradually increasing the concentration of KgpF.

The YG280 sequences having the steric configuration of the N terminal Trp serving as an initiation residue of D-form and those of L-form were synthesized, so that two kinds of peptides were prepared in total. These two kinds of artificial cyclic peptides were obtained by translation and synthesis in the artificial translation system (Conditions 3) developed by the present inventors. The peptides thus obtained were then reacted with 53, 160, and 580 μM KgpF in a system shown in (Conditions 4) at 37° C. for 18 hours.

(Conditions 3)

FIT system: v7s/v8.0.3

19aa-Met: 0.5 mM

ClAc-D or L-Trp-tRNA$^{fMet}{}_{CUA}$: 120 μM

Reaction: 37° C., 3 hours

Scale: 2.5 μL scale (Conditions 4)

Translated mixture amount: 2.5 μL (mixture obtained under (Conditions 3))

KgpF: 53, 160, 580 μM

DMAPP: 2 mM

Reaction: 37° C., 18 hours

In the system using 160 μM KgpF, slight precipitation was found, while in the system using 580 μM KgpF, much precipitation was found.

The above reaction products were analyzed by MALDI-TOF-MS. The results are as shown below.

With an increase in the concentration of KgpF, a peak showing the modification product became more intense correspondingly.

The peptides having an N-terminal Trp in D-form as the steric configuration were superior in prenylation modification efficiency to those having that in L-form.

When the peptides having an N-terminal Trp in D-form as the steric configuration were reacted with 580 μM KgpF, almost all the peptides underwent prenylation modification (there were only few peaks showing non-prenylated peptides).

The peptides had a Trp at two positions but prenylation occurred only at one position.

It has been found that using a highly-concentrated KgpF enables efficient prenylation of a thioether-closed artificial cyclic peptide.

Example 3: Modification of Thioether-Closed Artificial Cyclic Peptide with KgpF—Identification of Modification Site In Examples 1 and 2, prenylation occurred only at one position, though the peptide had a Trp at 2 positions. To determine the position where prenylation occurred, the peptides (YG298, 280) whose Trp residues in the YG280 sequence had each been mutated into Tyr and the peptide (YG290) having no Trp residue in a random region were designed and presence or absence of progression of modification with KgpF was assessed.

[Chemical formula 10]

(SEQ ID NO: 223)

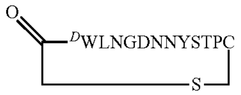

ClAc-D-Trp-initiated YG298

(SEQ ID NO: 224)

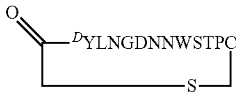

ClAc-D-Trp-initiated YG280

(SEQ ID NO: 225)

YG290-CM11

The above three kinds of artificial cyclic peptides were obtained by translation and synthesis in the artificial translation system (Conditions 5) developed by the present inventors. The peptides thus obtained were then reacted with KgpF in the system shown below in (Conditions 6) at 37° C. for 18 hours.

(Conditions 5)

FIT system: v7s/v8.0.3

19aa-Met: 0.5 mM

ClAc-D or L-Trp-$tRNA^{fMet}{}_{CUA}$: 90 μM

Reaction: 37° C., 60 min.

Scale: 2.5 μL scale (Conditions 6)

Translated mixture amount: 2.5 μL (mixture obtained under (Conditions 5))

KgpF: 160 or 580 μM

DMAPP: 2 mM

Reaction: 37° C., 18 hours

The above reaction products were analyzed by MALDI-TOF-MS. As a result, it has been confirmed that no modified product was found even after the peptide YG298 having the N-terminal Trp residue remained therein or the peptide YG290-CM11 having no Trp residue in the peptide chain thereof was reacted with 580 μM KgpF, while the peptide ClAc-D-Tyr-initiated YG280 having the Trp residue remained in the chain (8th residue) was modified at an efficiency equal to that of the peptide of the original sequence (YG280). This has suggested that the Trp residue in the peptide chain of the peptide YG280 underwent prenylation modification.

Example 4: Research of Substrate Tolerance of KgpF—Modification of Peptides with Various Ring Sizes The YG280 sequence derived from a natural substrate sequence was a thioether-closed cyclic peptide composed of 12 residues. It was therefore studied whether the thioether-closed cyclic peptides (YG310 and 311) having a shorter sequence and the thioether-closed cyclic peptides (YG312 to 314) having a longer sequence than that of YG280-1 used as a standard could be modified with KgpF or not.

[Chemical formula 11]

(SEQ ID NO: 226)

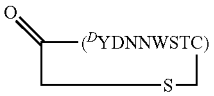

YG310

(SEQ ID NO: 227)

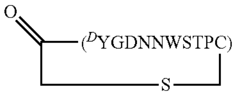

YG311

(SEQ ID NO: 228)

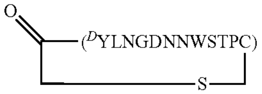

YG280-1

(SEQ ID NO: 229)

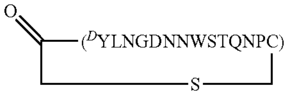

YG312

(SEQ ID NO: 230)

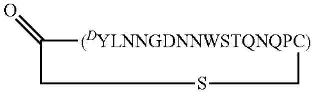

YG313

(SEQ ID NO: 231)

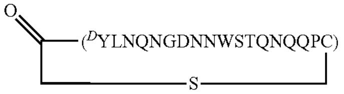

YG314

The above six kinds of artificial cyclic peptides were obtained by translation and synthesis in the artificial translation system (Conditions 7) developed by the present inventors. The peptides thus obtained were then reacted with 160 μM KgpF in the system shown in (Conditions 8) at 37° C. for 18 hours.

(Conditions 7)

FIT system: v7s/v9.1

19aa-Met: 0.5 mM

ClAc-D-Tyr-$tRNA^{fMet}{}_{CUA}$: 90 μM

Reaction: 37° C., 60 min.

Scale: 2.5 μL scale (Conditions 8)

Translated mixture amount: 2.5 μL (mixture obtained under (Conditions 7))

KgpF: 160 μM

DMAPP: 2 mM

Reaction: 37° C., 18 hours

The above reaction products were analyzed by MALDI-TOF-MS. As a result, it has been found that although there was an increase or decrease in the modification efficiency, depending on the ring size, all the sequences tested were modified with KgpF. This has proven that KgpF can modify thioether-closed artificial cyclic peptides having various ring sizes.

Example 5: Research of Substrate Tolerance of KgpF—Verification of Flanking Sequence of Trp (1)

In the natural substrate sequence and YG280, amino acid residues present upstream and downstream of Trp to be modified were Asn and Ser, respectively. The three kinds of amino acid sequences (YG300, 304, and 305) were designed by changing the flanking sequence of Trp and whether they could be modified with KgpF or not was studied.

[Chemical formula 12]

(SEQ ID NO: 232)

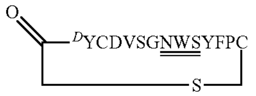

YG300 (RFG > NWS)

(SEQ ID NO: 233)

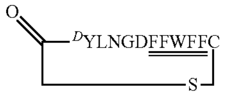

YG304

(SEQ ID NO: 234)

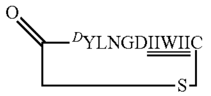

YG305

The above three kinds of artificial cyclic peptides were obtained by translation and synthesis in the artificial translation system (Conditions 9) developed by the present inventors. The peptides thus obtained were then reacted with 160 μM KgpF in the system shown in (Conditions 10) at 37° C. for 18 hours.

(Conditions 9)
- FIT system: v7s/v9.1
- 19aa-Met: 0.5 mM
- ClAc-D-Tyr-$tRNA^{fMet}{}_{CUA}$: 90 μM
- Reaction: 37° C., 60 min.
- Scale: 2.5 μL scale (Conditions 10)
- Translated mixture amount: 2.5 μL (mixture obtained under (Conditions 9))
- KgpF: 160 μM
- DMAPP: 2 mM
- Reaction: 37° C., 18 hours The reaction products were analyzed by MALDI-TOF-MS. As a result, it was found that the three kinds of the artificial peptides tested were each modified by prenylation.

In addition, the following cyclic peptides (YG288-S2iL8, YG289-S2iD7, YG292-PaktiL5, and YG297-aMD4) were also obtained similarly by translation and synthesis and reacted with DMAPP in the presence of KgpF. It was observed by MALDI-TOF-MS that they were modified with a prenyl group.

[Chemical formula 13]

(SEQ ID NO: 235)

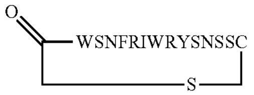

YG288-S2iL8

(SEQ ID NO: 236)

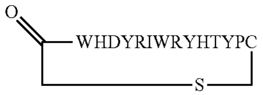

YG289-S2iD7

(SEQ ID NO: 237)

YG292-PaktiL5

(SEQ ID NO: 238)

YG297-aMD4

Example 6: Research of Substrate Tolerance of KgpF—Verification of Flanking Sequence of Trp (2)

To closely investigate the influence of the flanking sequence of Trp on the modification efficiency with KgpF, 13 kinds of sequences having, instead of the flanking sequence of W, the NWS or NNWST sequence found in Kawaguchipeptin, a natural substrate, were designed (Table 5) and whether they could be modified with KgpF or not was studied.

TABLE 5

| | N | template | DMAPP adduct 0 | 1 | 2 | MALDI mode | SEQ ID NO |
|---|---|---|---|---|---|---|---|
| YG300-CM11(RFG > NWS) | ClAc-D- | YCDVSGNWSYPC | 2 | 4 | 0 | LN | 239 |
| YG317-aMD5-NWS | ClAc-D- | YWYYNWSQTYKAFPC | 1 | 4 | 0 | LP | 240 |
| YG318-aMD5-NNWST | ClAc-D- | YWYNNWSTTYKAFPC | 1 | 4 | 0 | LP | 241 |
| YG319-PaktiL2-NWS | ClAc-D- | YWILINWSLVRRKC | 1 | 4 | 0 | LP | 242 |
| YG321-301-NWS | ClAc-D- | YRRNWSYKDDDDKC | 1 | 4 | 0 | LP | 243 |
| YG322-301-NNWST | ClAc-D- | YRNNWSTKDDDDKC | 1 | 4 | 0 | LP | 244 |

TABLE 5-continued

| | N | template | DMAPP adduct 0 | 1 | 2 | MALDI mode | SEQ ID NO |
|---|---|---|---|---|---|---|---|
| YG323-302-NWS | ClAc-D- | YLNGDRNWSRPC | 1 | 4 | 0 | LP | 245 |
| YG280 | ClAc-D- | YLNGDNNWSTPC | 2 | 4 | 0 | LP | 220 |
| YG304-YG280(FFWFF) | ClAc-D- | YLNGDFFWFFPC | 4 | 3 | 0 | LN | 246 |
| YG325-304-NWS | ClAc-D- | YLNGDFNWSFPC | 3 | 3 | 0 | LP | 247 |
| YG326-306-NWS | ClAc-D- | YLNGDGNWSCGC | 4 | 3 | 0 | LP | 248 |

0: N/A, 1: Nothing, 2: Very weak intensity, 3: Medium intensity, 4: Strong intensity The above artificial cyclic peptides were obtained by translation and synthesis in the artificial translation system (Conditions 11) developed by the present inventors. The peptides thus obtained were then reacted with 160 μM KgpF in the system shown in (Conditions 12) at 37° C. for 18 hours.

(Conditions 11)

FIT system: v7s/v9.1

19aa-Met: 0.5 mM

ClAc-D-Tyr-tRNA$^{fMet}{}_{CUA}$: 90 μM

Reaction: 37° C., 60 min.

Scale: 2.5 μL scale (Conditions 12)

Translated mixture amount: 2.5 μL (mixture obtained under (Conditions 1))

KgpF: 160 μM

DMAPP: 2 mM

Reaction: 37° C., 18 hours

The above reaction products were analyzed by MALDI-TOF-MS. As a result, it has been found that a modification efficiency with KgpF showed a marked improvement by replacing the flanking sequence of W with the NWS or NNWST sequence found in the natural substrate.

Example 7: Research of Substrate Tolerance of KgpF—Verification of Flanking Sequence of Trp (3)

What kind of a flanking sequence of W would make the resulting peptide excellent and preferable in prenylation with KgpF was studied further comprehensively.

Here, the following mutants were prepared comprehensively by replacing the flanking sequence of W of peptide YG326 with another amino acid residue and whether they could be prenylated with KgpF or not was studied.

[Chemical formula 14]

(SEQ ID NO: 248)

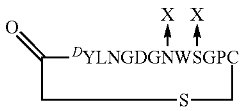

YG326

[Chemical formula 15]

-continued (SEQ ID NO: 249)

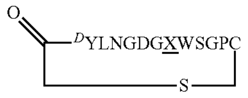

Mutant I of YG326

[Chemical formula 16]

(SEQ ID NO: 250)

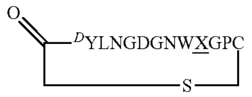

Mutant II of YG326

Figure 2:
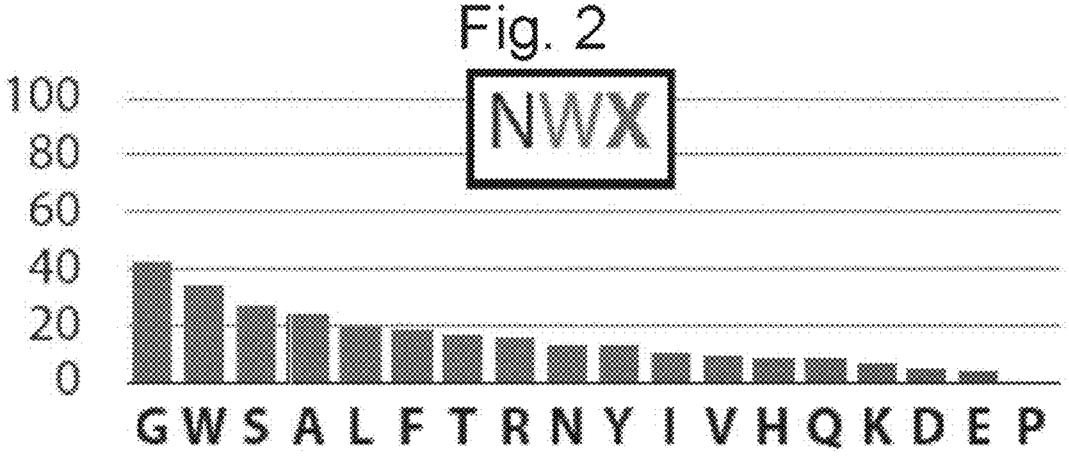
FIG. 2 is a histogram showing, in the mass spectrum of a reaction product obtained by changing the amino acid residue present downstream of W in peptide YG326, followed by prenylation, the results of quantitatively determining the respective peak intensities of an unmodified peptide and a modified peptide and calculating an apparent modification efficiency on the mass spectrum.

The peptides in which N (X in Mutant I of YG326) upstream of W contained in the sequence of peptide YG326 and S (X in Mutant II of YG326) downstream of the W were replaced with various amino acid residues shown along the abscissa of the graphs shown in FIG. 1 and FIG. 2 were synthesized as in Example 6 and a prenylation reaction was performed as in Example 6. The reaction products were analyzed by MALDI-TOF-MS. The results are as shown below.

The graphs shown in FIG. 1 and FIG. 2 are histograms including an apparent modification efficiency on the mass spectrum which was calculated by quantitatively determining the respective peak intensities of an unmodified peptide and a modified peptide in mass spectrum of each reaction product. In the graph of FIG. 1, with regards to the amino acids upstream of W, amino acid residues are aligned in the descending order of modification efficiency given by them. In the graph of FIG. 2, with regards to the amino acids downstream of W, amino acid residues are aligned in the descending order of modification efficiency given by them.

The level of the modification efficiency of N which is a natural upstream sequence is indicated by a dotted line.

The following respective compounds having D, E, K and Y as the amino acid upstream of W and the following compound having P as the amino acid downstream of W were also synthesized as in Example 6 and a prenylation reaction was performed as in Example 6.

[Chemical formula 17]

(SEQ ID NO: 251)

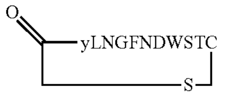

YG280-DWS (SEQ ID NO: 252)

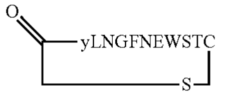

YG280-EWS (SEQ ID NO: 253)

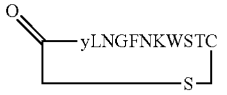

YG280-KWS (SEQ ID NO: 254)

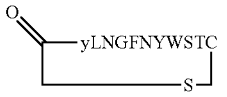

YG280-YWS (SEQ ID NO: 255)

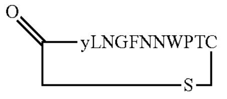

YG280-NWP

Observation by MALDI-TOF-MS showed that the above compounds YG280-DWS, YG280-EWS, YG280-KWS, YG280-YWS, and YG280-NWP were modified with a prenyl group.

It has been found in general that amino acid residues having a variety of properties such as acidity, basicity, affinity, hydrophobicity and the like were tolerated both at the upstream position and the downstream position.

Example 8: Research of Substrate Tolerance of KgpF—Verification of Flanking Sequence of Trp (4)

Based on the results obtained in Example 7, it becomes possible to design some flanking sequences giving a higher modification efficiency than the natural NWS flanking sequence. Here, the 10 kinds of flanking sequences were newly designed (the abscissa of FIG. 3), which were obtained by multiplying, as an upstream sequence, the 5 kinds of amino acids superior to natural N in modification efficiency and, as a downstream sequence, the 2 kinds of amino acids superior to natural S in modification efficiency. The peptides were each synthesized as in Example 6 and a prenylation reaction was performed as in Example 6.

Figure 3:
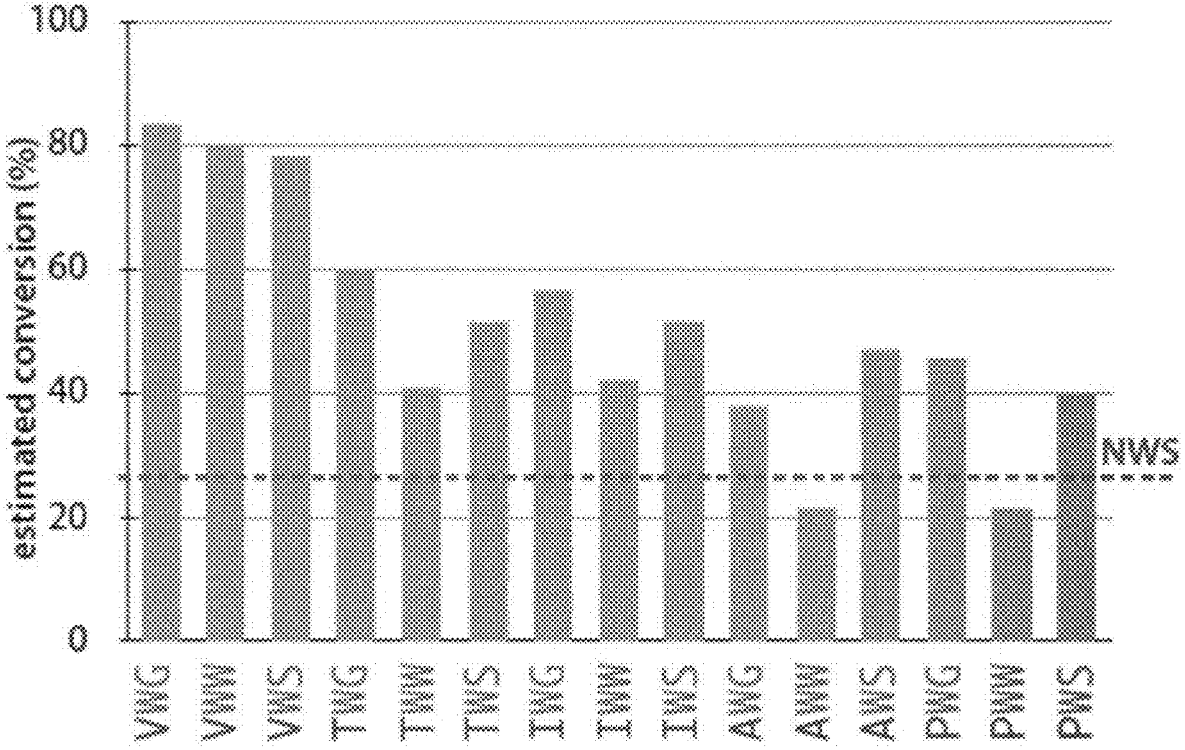
FIG. 3 is a histogram showing the results of subjecting respective peptides containing the 10 kinds of motifs each composed of 3 amino acid residues to a prenylation reaction and calculating an apparent modification efficiency on a mass spectrum.

The above reaction products thus obtained were analyzed by MALDI-TOF-MS. As a result, it has been found that almost all the peptides thus analyzed showed a modification efficiency higher than that of the peptide having a natural NWS sequence (FIG. 3).

Example 9: Research of Substrate Tolerance of KgpF—Verification of Flanking Sequence of Trp (5)

Based on the results of the modification efficiency of the flanking sequence obtained in Example 7, a peptide whose amino acid residue upstream of W was fixed to the most preferable Val and amino acid sequence on the downstream side was changed was designed. Designed were mutants obtained by replacing the X portion of VWX with the 6 kinds of amino acids (G, W, S, F, N, and K). The resulting peptides were synthesized as in Example 6 and a prenylation reaction was performed as in Example 6.

Figure 4:
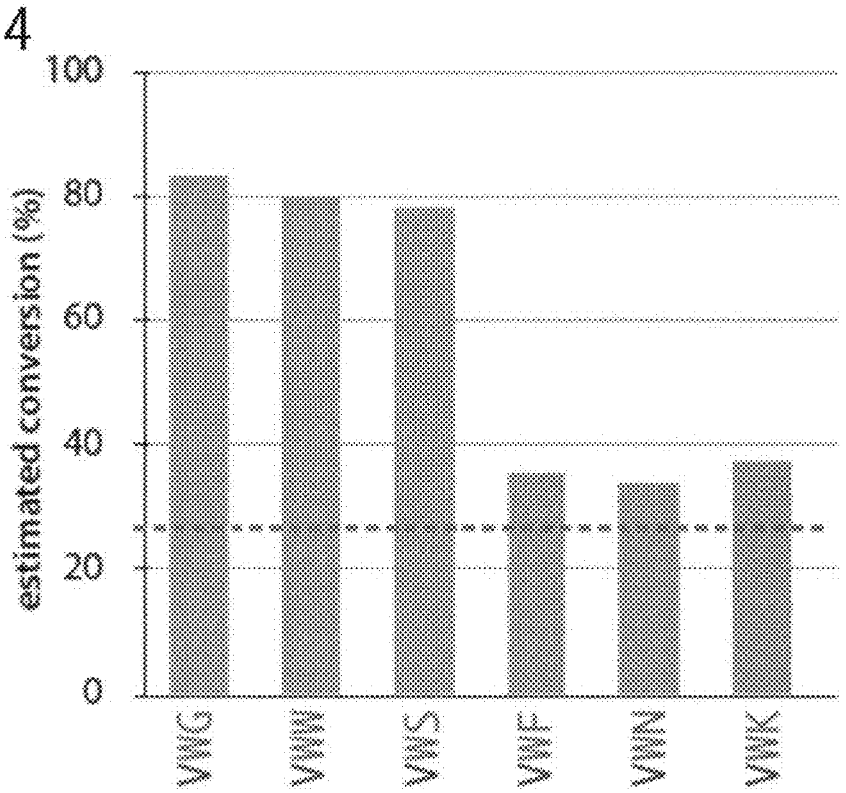
FIG. 4 is a histogram showing the results of subjecting mutants obtained by converting the X portion of VWX to the 6 kinds of amino acids (G, W, S, F, N and K) to a prenylation reaction and calculating an apparent modification efficiency on the mass spectrum.

The above reaction products thus obtained were analyzed by MALDI-TOF-MS. As a result, it has been found that they showed a modification efficiency equal or greater than the natural NWS (FIG. 4). All the Examples described above have suggested that when the amino acid upstream of Trp is a modifiable amino acid (V, T, I, A or P), the Trp is prenylated by KgpF without depending on the downstream amino acid residue. It has been verified as a result of comprehensive substrate tolerance research that KgpF is a Trp prenylation enzyme having very high substrate tolerance.

Example 10: KgpF Modification Reaction in Amino Acid Sequence Containing a Plurality of Trps The artificial cyclic peptides Clone-M1 to M9 shown below were obtained by translation and synthesis in the artificial translation system (Conditions 13) developed by the present inventors. The peptides thus obtained were then reacted with 160 μM KgpF in the system shown in (Conditions 14) at 0° C. for 20 hours.

[Chemical formula 18]

(SEQ ID NO: 256)

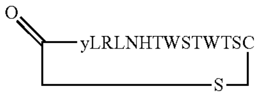

Clone-M1

(SEQ ID NO: 257)

Clone-M2

(SEQ ID NO: 258)

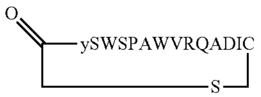

Clone-M3

(SEQ ID NO: 259)

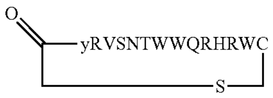

Clone-M4

(SEQ ID NO: 260)

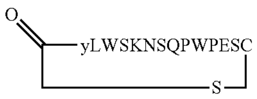

Clone-M5

(SEQ ID NO: 261)

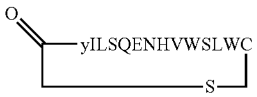

Clone-M6

-continued (SEQ ID NO: 262)

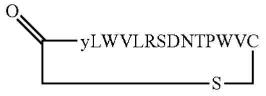

Clone-M7

(SEQ ID NO: 263)

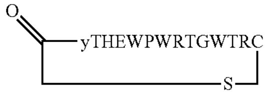

Clone-M8

(SEQ ID NO: 264)

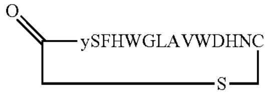

Clone-M9

(In the above formulas, "y" represents D-Tyr).

(Conditions 13)

FIT system: v8s/v11.0

19aa-Met: 0.5 mM

ClAc-D-Tyr-tRNA$^{fMet}{}_{CUA}$: 90 μM

Reaction: 37° C., 60 min.

Scale: 2.5 μL scale

After the above reaction was performed, the reaction product was incubated at 25° C. for 12 minutes.

Then, a cyclization reaction was performed under the following conditions.

Translated mixture amount: 2.5 μL (mixture obtained by the above reaction)

EDTA: 18 mM

Reaction: 42° C., 60 min.

Scale: 2.75 μL scale

Shown in Table 6 are 5: strong intensity, 4: medium intensity, 3: weak intensity, 2: very weak intensity, 1: no peak, and N/A: not observed.

TABLE 6

| | Number of additions 0 | Number of additions 1 | Number of additions 2 | Number of additions 3 |
|---|---|---|---|---|
| Clone-M1 | 1 | 1 | 5 | N/A |
| Clone-M2 | 1 | 5 | 1 | N/A |
| Clone-M3 | 1 | 1 | 4 | N/A |
| Clone-M4 | 1 | 4 | 1 | 1 |
| Clone-M5 | 3 | 5 | 1 | N/A |
| Clone-M6 | 1 | 5 | 5 | N/A |
| Clone-M7 | 1 | 4 | 5 | N/A |
| Clone-M8 | 1 | 1 | 5 | 1 |
| Clone-M9 | 1 | 1 | 5 | N/A |

Example 11: Improvement in Modification Reaction Efficiency by Changing KgpF

Reaction of the artificial cyclic peptide shown in Table 7 was made under conditions similar to (Conditions 11) and (Conditions 12) except that v8s/v11.1 was used as FIT system, KgpF v 3.1 was used as a prenylation modification enzyme, and the concentration of the KgpF v 3.1 was set at 10 μM. Here, KgpF v 3.1 is an enzyme having a higher purification degree and more improved specific activity than KgpF used under (Conditions 12).

Shown in Table 7 are: 5: strong intensity, 4: medium intensity, 3: weak intensity, 2: very weak intensity, 1: no peak, and N/A: not observed.

TABLE 7

| Sequence | template | KgpF v 3.1 (μM) | The number of prenyl groups added 0 | 1 | 2 | 3 | SEQ ID |
|---|---|---|---|---|---|---|---|
| YG281 | YLNGDNNWSTPC | 10 | 1 | 5 | N/A | N/A | 265 |
| YG282 | YLNGDNNWSPC | 10 | 1 | 5 | N/A | N/A | 266 |
| YG288-S2iL8 | YSNFRIWRYSNSSC | 10 | 1 | 5 | N/A | N/A | 267 |
| YG289-S2iD7 | YHDYRIWRYHTYPC | 10 | 1 | 5 | N/A | N/A | 268 |
| YG291-PaktiL2 | YWILITWPLVRRKC | 10 | 4 | 4 | N/A | N/A | 269 |
| YG292-PaktiL5 | YIRRPWVPIIYLGC | 10 | 1 | 5 | N/A | N/A | 270 |
| YG293-MaL4 | YTFRDVWIFYGSLLSRC | 10 | 1 | 5 | N/A | N/A | 271 |
| YG295-aML5 | YISWNEFNSPNWRFITC | 10 | 1 | 5 | 1 | N/A | 272 |
| YG296-aMD5 | YWYYAWDQTYKAFPC | 10 | 5 | 3 | 1 | N/A | 273 |
| YG297-aMD4 | YRQFNRRTHEVWNLDC | 10 | 1 | 5 | N/A | N/A | 274 |

(Conditions 14)

Translated mixture amount: 2.75 μL (mixture obtained under (Conditions 13))

KOH: 6.0 mM $Mg(OAc)_2$: 9.0 mM

Tris-HCl (pH 8.3) 15 mM

KgpF: 160 μM

DMAPP: 2 mM

Reaction: 0° C., 20 hours

Example 12: Modification of Artificial Cyclic Peptides Containing VW Sequence and Having Various Ring Sizes The artificial cyclic peptides shown in Table 8 and Table 9 were obtained by translation and synthesis in the artificial translation system (Conditions 15) developed by the present inventors. The peptides thus obtained were then reacted with 60 μM KgpF in the system shown in (Conditions 16) at 37° C. for 18 hours.

(Conditions 15)
FIT system: v8s/v11.1
19aa-Met: 0.5 mM
ClAc-D-Tyr-$tRNA^{fMet}{}_{CUA}$: 90 μM
Reaction: 37° C., 60 min.
Scale: 2.5 μL scale
(Conditions 16)
Translated mixture amount: 2.5 μL (mixture obtained under (Conditions 15))
KgpF: 60 μM
DMAPP: 2 mM
Reaction: 37° C., 18 hours Shown in Table 8 and Table 9 are: 5: strong intensity, 4: medium intensity, 3: weak intensity, 2: very weak intensity, 1: no peak, and N/A: not observed.

TABLE 8

| Sequence | Initiator | template | KgpF (μM) | The number of prenyl groups added 0 | 1 | 2 | 3 | SEQ ID |
|---|---|---|---|---|---|---|---|---|
| YG386 | ClAc-(D)Tyr | VWCYPRG | 60 | 1 | 5 | N/A | N/A | 275 |
| YG387 | ClAc-(D)Tyr | VWGCYPR | 60 | 1 | 5 | N/A | N/A | 276 |
| YG388 | ClAc-(D)Tyr | RVWGCYP | 60 | 1 | 5 | N/A | N/A | 277 |
| YG389 | ClAc-(D)Tyr | RVWGPCY | 60 | 1 | 5 | N/A | N/A | 278 |
| YG390 | ClAc-(D)Tyr | RVWGYPC | 60 | 1 | 5 | N/A | N/A | 279 |

TABLE 9

| Sequence | Initiator | template | KgpF (μM) | The number of prenyl groups added 0 | 1 | 2 | 3 | SEQ ID |
|---|---|---|---|---|---|---|---|---|
| YG391 | ClAc-(D)Tyr | YRVWGYPC | 60 | 1 | 5 | N/A | N/A | 280 |
| YG392 | ClAc-(D)Tyr | YRVWGYHPC | 60 | 1 | 5 | N/A | N/A | 281 |
| YG393 | ClAc-(D)Tyr | DYRVWGYHPC | 60 | 1 | 5 | N/A | N/A | 282 |
| YG394 | ClAc-(D)Tyr | DYRVWGYHTPC | 60 | 1 | 5 | N/A | N/A | 283 |
| YG395 | ClAc-(D)Tyr | HDYRVWGYHTPC | 60 | 1 | 5 | N/A | N/A | 284 |
| YG396 | ClAc-(D)Tyr | HDYRVWGYHTYPC | 60 | 1 | 5 | N/A | N/A | 285 |
| YG397 | ClAc-(D)Tyr | HNDYRVWGYHTYPC | 60 | 1 | 5 | N/A | N/A | 286 |
| YG398 | ClAc-(D)Tyr | HNDYRVWGYHTYQPC | 60 | 1 | 5 | N/A | N/A | 287 |
| YG399 | ClAc-(D)Tyr | HNQDYRVWGYHTYQPC | 60 | 1 | 5 | N/A | N/A | 288 |
| YG400 | ClAc-(D)Tyr | HNQDYRVWGYHTYQNPC | 60 | 1 | 5 | N/A | N/A | 289 |
| YG401 | ClAc-(D)Tyr | HNQNDYRVWGYHTYQNPC | 60 | 1 | 5 | N/A | N/A | 290 |

Example 13: Modification of Artificial Cyclic Peptides Containing VW or WG Sequence and Having W at Various Positions The artificial cyclic peptides shown in Table 10 were obtained by translation and synthesis in the artificial translation system (Conditions 17) developed by the present inventors. The peptides thus obtained were then reacted with 60 μM KgpF in the system shown in (Conditions 18) at 37° C. for 18 hours.

(Conditions 17)
FIT system: v8s/v11.1
19aa-Met: 0.5 mM
ClAc-D-Tyr-$tRNA^{fMet}{}_{CUA}$: 90 μM
Reaction: 37° C., 60 min.
Scale: 2.5 μL scale
(Conditions 18)
Translated mixture amount: 2.5 μL (mixture obtained under (Conditions 17))
KgpF: 60 μM
DMAPP: 2 mM
Reaction: 37° C., 18 hours Shown in Table 10 are: 5: strong intensity, 4: medium intensity, 3: weak intensity, 2: very weak intensity, 1: no peak, and N/A: not observed.

TABLE 10

| Sequence | Initiator | template | KgpF (μM) | The number of prenyl groups added 0 | 1 | 2 | 3 | SEQ ID |
|---|---|---|---|---|---|---|---|---|
| YG402 | ClAc-(D)Tyr | WGHDYRVYHTYPC | 60 | 5 | 1 | N/A | N/A | 291 |
| YG403 | ClAc-(D)Tyr | VWGHDYRYHTYPC | 60 | 1 | 5 | N/A | N/A | 292 |
| YG404 | ClAc-(D)Tyr | HVWGDYRYHTYPC | 60 | 2 | 5 | N/A | N/A | 293 |
| YG405 | ClAc-(D)Tyr | HDVWGYRYHTYPC | 60 | 1 | 5 | N/A | N/A | 294 |
| YG406 | ClAc-(D)Tyr | HDYVWGRYHTYPC | 60 | 1 | 5 | N/A | N/A | 295 |
| YG407 | ClAc-(D)Tyr | HDYRYVWGHTYPC | 60 | 1 | 5 | N/A | N/A | 296 |
| YG408 | ClAc-(D)Tyr | HDYRYHVWGTYPC | 60 | 1 | 5 | N/A | N/A | 297 |
| YG409 | ClAc-(D)Tyr | HDYRYHTVWGYPC | 60 | 1 | 5 | N/A | N/A | 298 |
| YG410 | ClAc-(D)Tyr | HDYRYHTYVWGPC | 60 | 1 | 5 | N/A | N/A | 299 |
| YG411 | ClAc-(D)Tyr | HDYRYHTYPVWGC | 60 | 1 | 5 | N/A | N/A | 300 |
| YG412 | ClAc-(D)Tyr | HDYRGYHTYPVWC | 60 | 1 | 5 | N/A | N/A | 301 |

Example 14: Modification of Artificial Cyclic Peptides Having Various Peptide Sequences The artificial cyclic peptides shown below were obtained by translation and synthesis in the artificial translation system (Conditions 19) developed by the present inventors. The peptides thus obtained were then reacted with 160 μM KgpF in the system shown in (Conditions 20) at 0° C. for 20 hours.

The reaction products were analyzed by MALDI-TOF-MS. As a result, it has been confirmed that the artificial cyclic peptides shown below were modified by prenylation. As described above, the fact that prenylation proceeded in peptides having various sequences means that a peptide library including peptides having higher cell membrane permeability can be obtained efficiently.

(Conditions 19)

FIT system: v8s/11.0

19aa-Met: 0.5 mM

ClAc-D-Tyr-$tRNA^{fMet}_{CUA}$: 90 μM

Reaction: 37° C., 60 min.

Scale: 2.5 μL scale

After the above reaction was performed, the reaction product was incubated at 25° C. for 12 minutes.

Then, a cyclization reaction was performed under the following conditions.

Translated mixture amount: 2.5 μL (mixture obtained by the above reaction)

EDTA: 18 mM

Reaction: 42° C., 60 min.

Scale: 2.75 μL scale (Conditions 20)

Translated mixture amount: 2.75 μL (mixture obtained under (Conditions 19))

KOH: 6.0 mM $Mg(OAc)_2$: 9.0 mM

Tris-HCl (pH 8.3): 15 mM

KgpF: 160 μM

DMAPP: 2 mM

Reaction: 0° C., 20 hours

[Chemical formula 19]

(SEQ ID NO: 302)

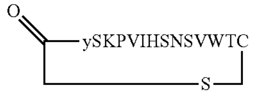

Clone-V1

(SEQ ID NO: 303)

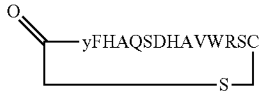

Clone-V2

(SEQ ID NO: 304)

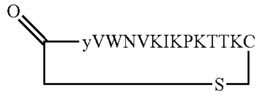

Clone-V3

(SEQ ID NO: 305)

Clone-V4

(SEQ ID NO: 306)

Clone-V5

(In the above formulas, “y” represents D-Tyr).

[Chemical formula 20]

(SEQ ID NO: 307)

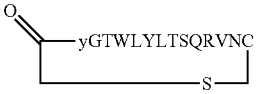

Clone-T1

(SEQ ID NO: 308)

Clone-T2

(SEQ ID NO: 309)

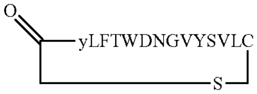

Clone-T3

(SEQ ID NO: 310)

Clone-T4

(In the above formulas, “y” represents D-Tyr).

[Chemical formula 21]

(SEQ ID NO: 311)

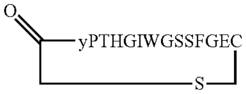

Clone-I1

(SEQ ID NO: 312)

Clone-I2

(SEQ ID NO: 313)

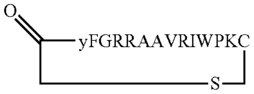

Clone-I3

(SEQ ID NO: 314)

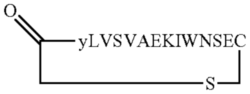

Clone-I4

(SEQ ID NO: 315)

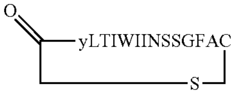

Clone-I5

-continued (SEQ ID NO: 316)

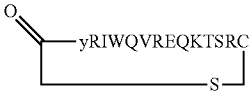

Clone-I6

(SEQ ID NO: 317)

Clone-I7

(In the above formulas, “y” represents D-Tyr).

[Chemical formula 22]

(SEQ ID NO: 318)

Clone-A1

(SEQ ID NO: 319)

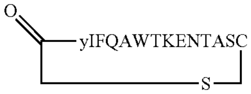

Clone-A2

(SEQ ID NO: 320)

Clone-A3

(SEQ ID NO: 321)

Clone-A4

(SEQ ID NO: 322)

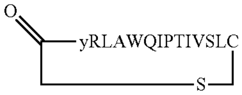

Clone-A5

(In the above formulas, “y” represents D-Tyr).

[Chemical formula 23]

(SEQ ID NO: 323)

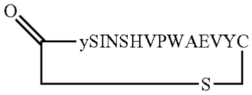

Clone-P1

(SEQ ID NO: 324)

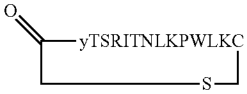

Clone-P2

-continued (SEQ ID NO: 325)

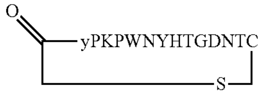

Clone-P3

(SEQ ID NO: 326)

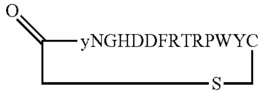

Clone-P4

(SEQ ID NO: 327)

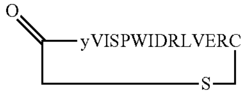

Clone-P5

(SEQ ID NO: 328)

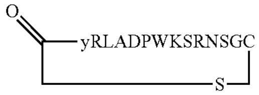

Clone-P6

(SEQ ID NO: 329)

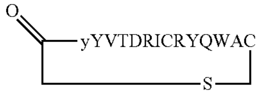

Clone-Q1

(In the above formulas, "y" represents D-Tyr).

Example 15: Modification Test of Thioether-Closed Artificial Cyclic Peptide with OltF In order to prove that not only KgpF but also another enzyme having homology with it could modify a thioether-closed artificial cyclic peptide, it was studied whether or not a thioether-closed artificial cyclic peptide could be modified with an OltF enzyme.

The 6 kinds of thioether-closed artificial cyclic amino acid sequences (YG413 to 417 and 419) derived from the sequence of OscE1 and OscE2 presumed to be natural substrates of OltF were designed.

[Chemical formula 24]

(SEQ ID NO: 487)

$_c$[NERGYGLWVP]

cf. Oscillatorin (SEQ ID NO: 488)

$\equiv$ $_c$[YGLWVPNERG]

(SEQ ID NO: 330)

(OscE1)
YG413

(SEQ ID NO: 332)

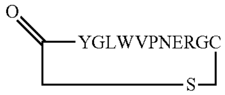

YG415

-continued (SEQ ID NO: 331)

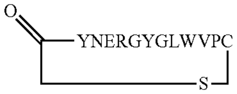

YG414

(SEQ ID NO: 489)

$_c$[QNNRERGSDWFWMPP]

cf. (OscE2)

(SEQ ID NO: 490)

$\equiv$ $_c$[ERGSDWFWMPPQNNR]

(SEQ ID NO: 333)

YG416

(SEQ ID NO: 335)

YG419

(SEQ ID NO: 334)

YG417

The above artificial cyclic peptides were obtained by translation and synthesis in the artificial translation system (Conditions 21) developed by the present inventors. The peptides thus obtained were then reacted with 24 or 72 μM OltF in the system shown in (Conditions 22) at 37° C. for 18 hours.

(Conditions 21)

FIT system: v7s/v9.1

19aa-Met: 0.5 mM

ClAc-D or L-Tyr-tRNA$^{fMet}_{CUA}$: 90 μM

Reaction: 37° C., 60 min.

Scale: 2.5 μL scale (Conditions 22)

Translated mixture amount: 2.5 μL (mixture obtained under (Conditions 21))

OltF: 24, 72 μM

DMAPP: 2 mM

Reaction: 37° C., 18 hours

The above reaction products thus obtained were analyzed by MALDI-TOF-MS. As a result, a product modified by prenylation was observed in any of the peptides. It has been found from the above fact that OltF, similar to KgpF, has an ability of modifying not only a natural main-chain cyclized peptide but also a thioether-closed artificial cyclic peptide. This has suggested that a group of enzymes having high homology with OltF or KgpF can modify a thioether-closed artificial cyclic peptide similarly to them and therefore can be used as the prenylation enzyme of the present invention.

Example 16: Modification Test of Thioether-Closed Artificial Cyclic Peptide with OltF The artificial cyclic peptides shown in Table 11 and Table 12 were obtained by translation and synthesis in the artificial translation system (Conditions 23) developed by the present inventors. The peptides thus obtained were then reacted with 9.13 μM OltF in the system shown in (Conditions 24) at 37° C. for 18 hours. It is to be noted that OltF v 2.1 is an enzyme prepared from OltF used in (Conditions 22) while changing a purification manner.

(Conditions 23)

FIT system: v8s/v11.1

19aa-Met: 0.5 mM

ClAc-D or L-Tyr-$tRNA^{fMet}{}_{CUA}$: 90 μM

Reaction: 37° C., 60 min.

Scale: 2.5 μL scale (Conditions 24)

Translated mixture amount: 2.5 μL (mixture obtained under (Conditions 23))

OltF v 2.1: 9.13 μM

DMAPP: 2 mM

Reaction: 37° C., 18 hours

Shown in Table 11 and Table 12 are: 5: strong intensity, 4: medium intensity, 3: weak intensity, 2: very weak intensity, 1: no peak, and N/A: not observed.

TABLE 11

| Sequence | Initiator | template | OltF v 2.1 | The number of prenyl groups added 0 | 1 | 2 | 3 | SEQ ID |
|---|---|---|---|---|---|---|---|---|
| YG281 | ClAc-(D)Tyr | YLNGDNNWSPC | 9.13 μM | 5 | 3 | N/A | N/A | 336 |
| YG282 | ClAc-(D)Tyr | YLNGDNNWSTC | 9.13 μM | 1 | 4 | N/A | N/A | 337 |
| YG288 | ClAc-(D)Tyr | YSNFRIWRYSNSSC | 9.13 μM | 1 | 5 | N/A | N/A | 338 |
| YG289 | ClAc-(D)Tyr | YHDYRIWRYHTYPC | 9.13 μM | 1 | 5 | N/A | N/A | 339 |
| YG292 | ClAc-(D)Tyr | YIRRPWVPIIYLGC | 9.13 μM | 2 | 5 | N/A | N/A | 340 |
| YG293 | ClAc-(D)Tyr | YTFRDVWIFYGSLLSRC | 9.13 μM | 3 | 4 | N/A | N/A | 341 |
| YG295 | ClAc-(D)Tyr | YISWNEFNSPNWRFITC | 9.13 μM | 4 | 3 | 1 | N/A | 342 |
| YG296 | ClAc-(D)Tyr | YWYYAWDQTYKAFPC | 9.13 μM | 3 | 2 | 1 | N/A | 343 |
| YG297 | ClAc-(D)Tyr | YRQFNRRTHEVWNLDC | 9.13 μM | 5 | 4 | N/A | N/A | 344 |
| YG299 | ClAc-(D)Tyr | YCDVSGRWGYFPC | 9.13 μM | 3 | 5 | N/A | N/A | 345 |

Sequence The number of prenyl groups added

TABLE 12

| Sequence | Initiator | template | OLtF v 2.1 | The number of prenyl groups added 0 | 1 | 2 | 3 | SEQ ID |
|---|---|---|---|---|---|---|---|---|
| DNT061 | ClAc-(D)Tyr | YNNRERGSDFFWFFPC | 9.13 μM | 2 | 5 | N/A | N/A | 346 |
| DNT062 | ClAc-(D)Tyr | YNNRERGSDGGWGGPC | 9.13 μM | 3 | 5 | N/A | N/A | 347 |
| DNT063 | ClAc-(D)Tyr | YNNRERGSDYYWYYPC | 9.13 μM | 2 | 5 | N/A | N/A | 348 |
| DNT065 | ClAc-(D)Tyr | YNNRERGSDNNWNNPC | 9.13 μM | 3 | 5 | N/A | N/A | 349 |
| DNT066 | ClAc-(D)Tyr | YNNRERGSDVVWVVPC | 9.13 μM | 4 | 5 | N/A | N/A | 350 |
| DNT070 | ClAc-(D)Tyr | YISWNEFNSYFWLPITC | 9.13 μM | 1 | 5 | 1 | N/A | 351 |
| DNT034 | ClAc-(D)Tyr | YNNRERGSDYFWLPPC | 9.13 μM | 1 | 5 | N/A | N/A | 352 |
| DNT057 | ClAc-(D)Tyr | YRQFNRRTHYFWLPDC | 9.13 μM | 1 | 5 | N/A | N/A | 353 |

Example 17: Preparation of mRNA Library (Design of mRNA Library)

As shown in Table 13, an mRNA library was designed.

TABLE 13

| | |
|---|---|
| ... AUG XXX UGG NNK NNK NNK NNK NNK NNK NNK NNK NNK NNK NNK UGU ... | Group1 |
| ... AUG NNK XXX UGG NNK NNK NNK NNK NNK NNK NNK NNK NNK NNK UGU ... | |
| ... AUG NNK NNK XXX UOG NNK NNK NNK NNK NNK NNK NNK NNK NNK UGU ... | |

TABLE 13-continued

```
... AUG NNK NNK NNK XXX UGG NNK NNK NNK NNK NNK NNK NNK UGU ...
... AUG NNK NNK NNK NNK XXX UGG NNK NNK NNK NNK NNK NNK UGU ...
... AUG NNK NNK NNK NNK NNK XXX UGG NNK NNK NNK NNK NNK UGQ ...    Group2
... AUG NNK NNK NNK NNK NNK NNK XXX UGG NNK NNK NNK NNK UGU ...
... AUG NNK NNK NNK NNK NNK NNK NNK XXX UGG NNK NNK NNK UGU ...

... AUG NNK NNK NNK NNK INK NNK NNK NNK XXX UGG NNK NNK UGU ...
                                                                   Group1
... AUG NNK NNK NNK NNK NNK NNK NNK NNK NNK XXX UGO NNK UGU ...
```

In Table 13, from top to bottom the sequence identifiers are SEQ ID NOs: 503 to 512.

In the mRNAs in Table 13, amino acids were reassigned based on the genetic code table shown below in Table 14. Here, Trp is reassigned to UGG of the mRNA in Table 13. XXX was RYU and CMG (RYU and CMG were present at 2:1 (RYU: CMG)) or RYU. It is to be noted that in RYU, Rs each independently represent G or A and Ys each independently represent U or C; in CMG, Ms each independently represent A or C; and in NNK, Ks each independently represent G or U, and N is an arbitrary base.

TABLE 14

| | U | C | A | G | |
|---|---|---|---|---|---|
| U | Phe | Ser | Tyr | Cys | U |
| | Phe | Ser | Tyr | Cys | C |
| | Leu | Ser | STOP | STOP | A |
| | Leu | Ser | STOP | Trp | G |
| C | Leu | Pro | His | Arg | U |
| | Leu | Pro | His | Arg | C |
| | Leu | Pro | Gln | Arg | A |
| | Leu | Pro | Gln | Arg | G |
| A | Ile | Thr | Asn | Ser | U |
| | Ile | Thr | Asn | Ser | C |
| | Ile | Thr | Lys | Arg | A |
| | Met | Thr | Lys | Arg | G |
| G | Val | Ala | Asp | Gly | U |
| | Val | Ala | Asp | Gly | C |
| | Val | Ala | Glu | Gly | A |
| | Val | Ala | Glu | Gly | G |

(Preparation of mRNA Library)

<Composition of 1 mL Scale System>

$MgCl_2$: 2.5 mM dNTPs: 0.25 mM

KCl: 50 mM

Tris-HCl (pH 9.0): 10 mM

Triton X-100: 1 μL

Primers: 250 nM (a primer containing T7YGM.F46 v1tr.F46 and the sequence of the above library) Taq polymerase <Extension of 1 mL Scale System>

Extension was achieved as shown in Table 15 by keeping at 95° C. for 1 minute, keeping at 61° C. for 1 minute and then keeping at 72° C. for 1 minute. Keeping at 61° C. for 1 minute and then keeping at 72° C. for 1 minute were performed with 5 cycles.

It is to be noted that the sequence of the primer T7YGM.F46 v1tr.F46 is as follows:

```
T7YGM.F46 v1tr.F46:
                                          (SEQ ID NO: 378)
TAATACGACTCACTATAGGGTTAACTTTAAGAAGGAGATATAAATA
```

TABLE 15

| |
|---|
| Extension |
| 95° C. 1 min |
| 61° C. 1 min ← |
| 72° C. 1 min ┘ |
| 5 cycles |

<Composition of 10 mL Scale System>

Product obtained by the extension: 1 mL $MgCl_2$: 2.5 mM dNTPs: 0.25 mM

KCl: 50 mM

Tris-HCl (pH 9.0): 10 mM

Triton X-100: 10 μL

Primers: 250 nM (T7YGM.F46 v1tr.F46 and rCNSGGVSan13.R39)

Taq Polymerase

<PCR of 10 mL Scale System>

PCR (polymerase chain reaction) was performed, as shown in Table 16, by keeping at 95° C. for 40 seconds, keeping at 65° C. for 40 seconds, and then keeping at 72° C. for 40 seconds. Keeping at 95° C. for 40 seconds, keeping at 65° C. for 40 seconds and then keeping at 72° C. for 40 seconds were performed with 4 cycles.

It is to be noted that the following are the respective sequences of the primers T7YGM.F46 v1tr.F46 and rCNSGGVSan13.R39.

```
T7YGM.F46 v1tr.F46:
                                          (SEQ ID NO: 378)
TAATACGACTCACTATAGGGTTAACTTTAAGAAGGAGATATAAATA

rCNSGGVSan13.R39:
                                          (SEQ ID NO: 379)
TTTCCGCCCCCCGTCCTAGCTTACCCCACCACTGTTACA
```

TABLE 16

| |
|---|
| PCR |
| 95° C. 40 sec ← |
| 65° C. 40 sec |
| 72° C. 40 sec ┘ |
| 4 cycles |

Figure 5:
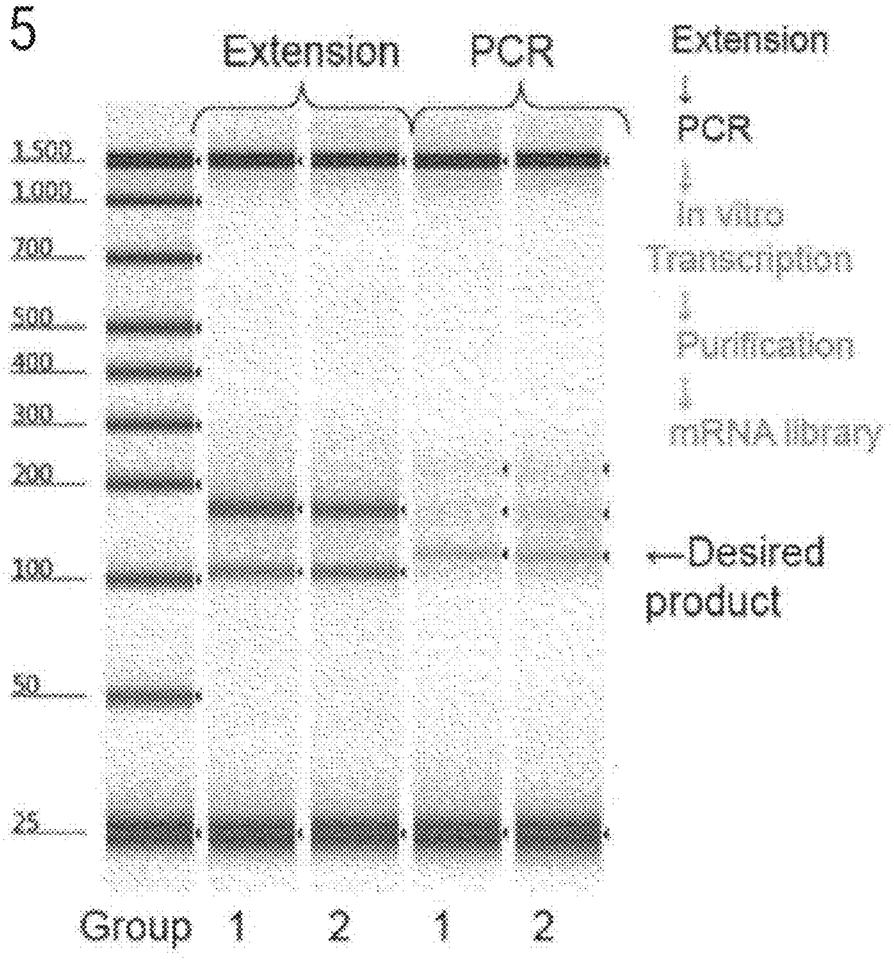
FIG. 5 is a diagram showing that a desired DNA library is obtained as a product by PCR.

As shown in FIG. 5, it was confirmed that a desired product was obtained by PCR.

(Purification of mRNA Library)

Figure 6:
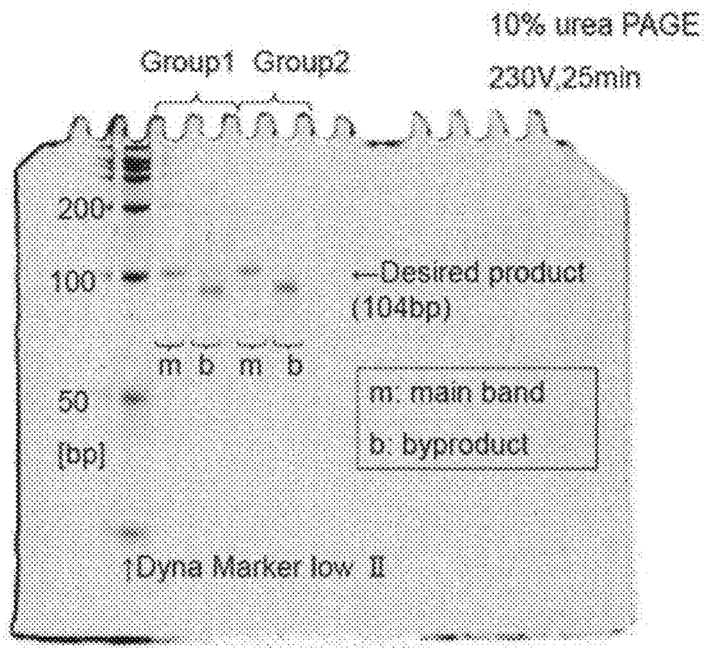
FIG. 6 is a diagram of a gel of electrophoresis showing the success in preparation of an mRNA library from a PCR product.

Preparation of an mRNA library was successfully achieved by performing in vitro transcription (4 mL scale) of the resulting PCR product with T7 RNA polymerase and purifying the products by electrophoresis under conditions of 12% denaturing-PAGE, 230V, and 70 minutes. As shown in FIG. 6 showing the gel of electrophoresis, it has been confirmed that a desired product was obtained, separated from a byproduct. Translation of the mRNA library thus obtained in a FIT system and contact with a prenylation enzyme as described above make it possible to introduce a prenyl group into the peptide of the peptide library obtained from the mRNAs.

Example 18: Modification Reaction of Artificial Cyclic Peptide with KgpF in Solid Phase To prove that prenylating modification could be performed not only in a liquid phase but also in a solid phase, it was studied whether or not an artificial cyclic peptide could be modified with a KgpF enzyme immobilized onto the surface of magnetic beads via a tag.

(Immobilization of KgpF onto Magnetic Beads)

Figure 7:
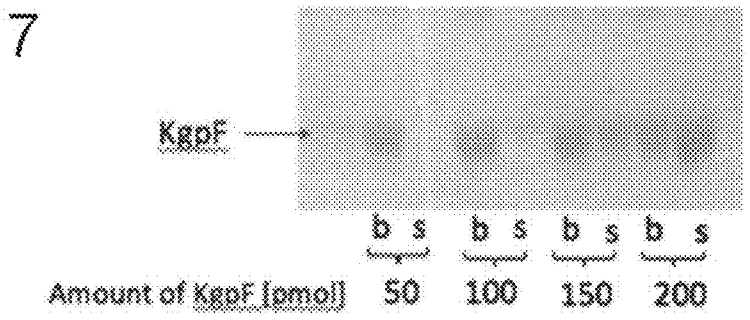
FIG. 7 is a diagram showing SDS-PAGE from which it has been confirmed that KgpF having a His tag can be immobilized onto NTA beads.

Dynabeads His-Tag Isolation and Pulldown (Invitrogen) was brought into contact with KgpF having a His-tag added N terminal and the KgpF was immobilized onto the magnetic beads. As shown in FIG. 7, with an increase in the amount of KgpF brought into contact with the beads, an immobilized amount of KgpF to the beads increased. When it exceeded a predetermined amount, immobilization reached saturation.

(Modification of Artificial Cyclic Peptide with KgpF Immobilized onto Magnetic Beads)

The artificial cyclic peptides shown in Table were synthesized under (Conditions 25) and were brought into contact with KgpF in solid phase under (Conditions 26). In addition, the same peptides were reacted in liquid phase under conditions shown in (Conditions 13) and (Conditions 14) except that the prenylation reaction time was changed to 14 hours.

(Conditions 25)

FIT system: v8s/v11.1

19aa-Met: 0.5 mM

ClAc-D-Tyr-$tRNA^{fMet}{}_{CUA}$: 90 μM

Reaction: 37° C., 60 min.

Scale: 2.5 μL scale

After the above reaction was performed, the reaction product was incubated at 25° C. for 12 minutes.

Then, a cyclization reaction was performed under the following conditions.

Translated mixture amount: 2.5 μL (mixture obtained by the above reaction)

EDTA: 18 mM

Reaction: 42° C., 60 min.

Scale: 2.75 μL scale (Conditions 26)

Translated mixture amount: 2.75 μL (mixture obtained under (Conditions 25))

KOH: 6.0 mM $Mg(OAc)_2$: 9.0 mM

Tris-HCl (pH 8.3) 15 mM

KgpF immobilized onto magnetic beads: 72 μM

DMAPP: 2 mM

Reaction: 4° C., 14 hours, rotation mixing

The solution obtained by the reaction was analyzed by MALDI-TOF-MS. As shown in the table, although the KgpF concentration is lower in solid phase, the modification efficiency is 100%, similarly to that in liquid phase (no peak of start material was found). This has revealed that modification can be achieved in solid phase similarly to that in liquid phase.

Shown in Table 17 are: 5: strong intensity, 4: medium intensity, 3: weak intensity, 2: very weak intensity, 1: no peak, and N/A: not observed.

TABLE 17

| | | | | | The number of prenyl groups added | | | | SEQ |
|---|---|---|---|---|---|---|---|---|---|
| Sequence | Initiator | template | KgpF | | 0 | 1 | 2 | 3 | ID |
| Clone-V3 | ClAc-(D)Tyr | VWNVKIKPKTTKC | Liquid phase | 160 μM | 1 | 5 | N/A | N/A | 304 |
| Clone-V3 | ClAc-(D)Tyr | VWNVKIKPKTTKC | Solid phase | 72 μM | 1 | 5 | N/A | N/A | 304 |
| Clone-T2 | ClAc-(D)Tyr | LVRERENTWKVTC | Liquid phase | 160 μM | 1 | 4 | N/A | N/A | 308 |
| Clone-T2 | ClAc-(D)Tyr | LVRERENTWKVTC | Solid phase | 72 μM | 1 | 5 | N/A | N/A | 308 |

Example 19: Preparation of Compound Library and Screening

A library was prepared based on the design of the mRNA library shown in Example 17 in a manner similar to that of Example 17 except that the XXX portion was replaced with RYU.

Figure 8:
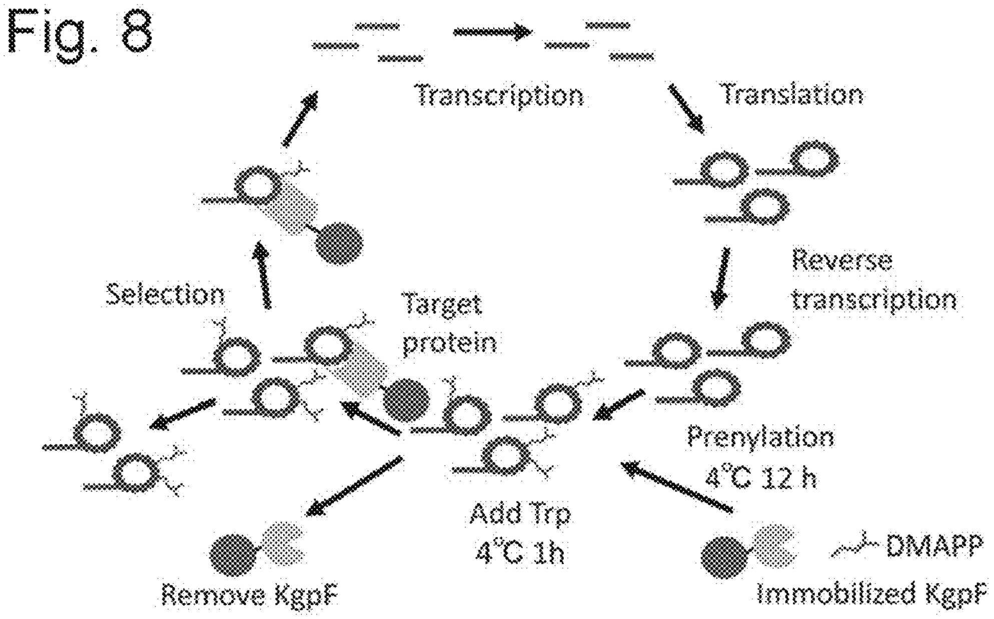
FIG. 8 shows a selection scheme of a prenylated cyclic peptide.

A peptide-mRNA complex library was constructed from the above mRNA library according to the scheme shown in FIG. 8 and then, treated with a KgpF enzyme immobilized onto magnetic beads to construct a compound library including prenylated peptides.

Figure 9:
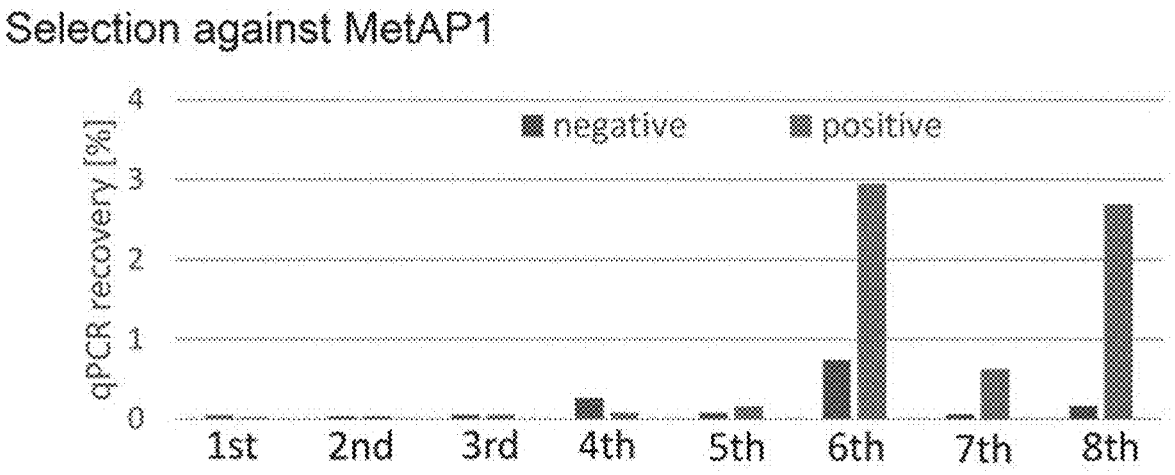
FIG. 9 is a graph of recovery rates of cDNAs in selection against MetAP1 used as a target.
Figure 10:
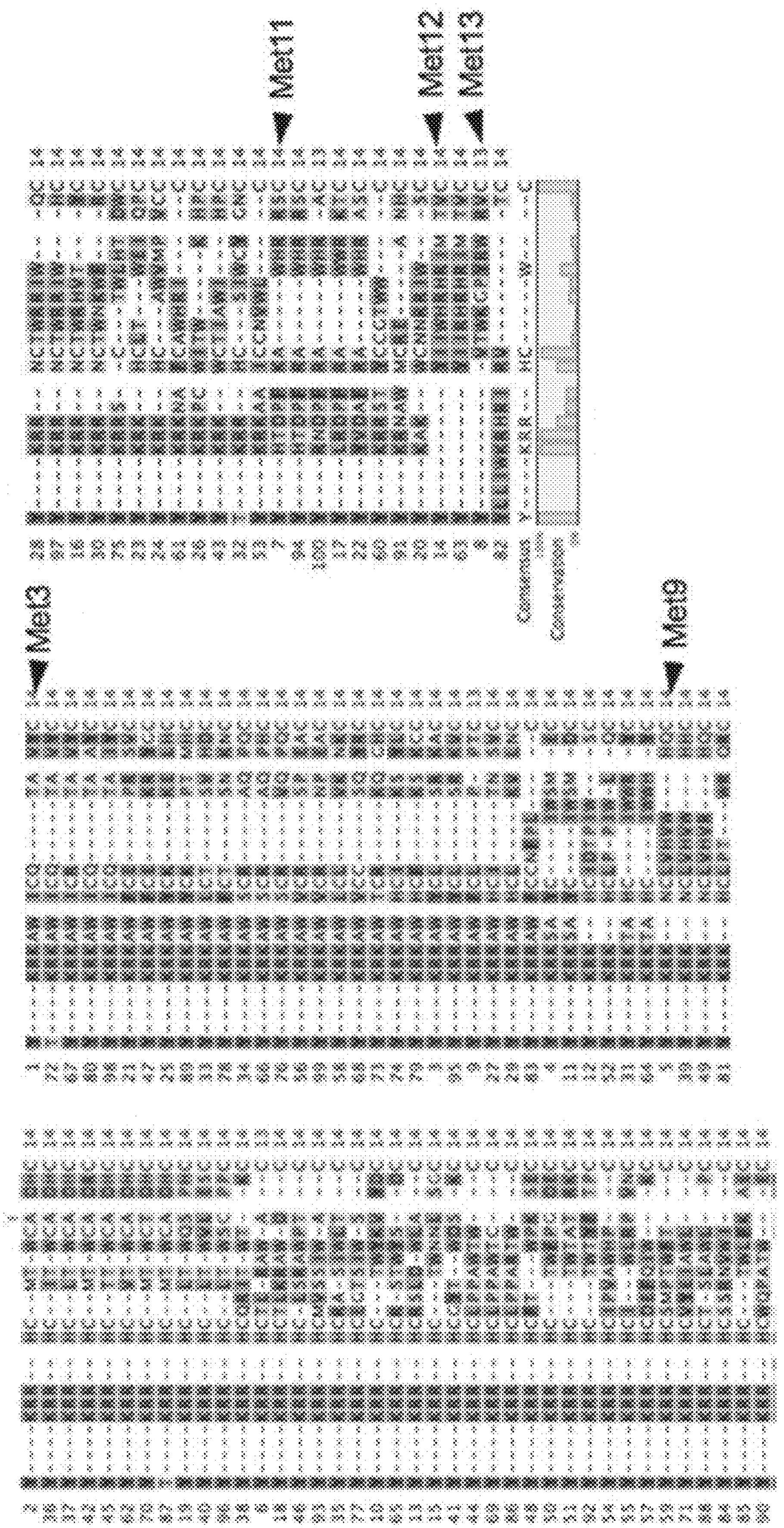
FIG. 10 is a diagram showing sequences obtained by selection against MetAP1 used as a target. From top to bottom, the sequence identifiers in: the left column are SEQ ID NOs: 387 to 425; the middle column are SEQ ID NOs: 426 to 462; and the right column are SEQ ID NOs: 463 to 486.

Then, the compound library was provided for a step of screening cyclic peptides having interaction with an enzyme MetAP1 (Human) as in the scheme shown in FIG. 8. As a result, a library in which cyclic peptides binding to the MetAP1 had been enriched was obtained as shown in FIG. 9. Peptide sequences included in the resulting enriched library are shown in FIG. 10. It has been confirmed that with regards to some of the peptides shown in FIG. 10, peptides having these sequences are modified by prenylation as shown in Table 18 by bringing them into contact with KgpF under conditions shown in (Conditions 13) and (Conditions 14).

The above results have revealed that a compound library can be provided by the production method of the present invention using a prenylation enzyme.

Shown in Table 18 and Table 19 are: 5: strong intensity, 4: medium intensity, 3: weak intensity, 2: very weak intensity, 1: no peak, and N/A: not observed.

TABLE 18

| Sequence | Initiator | template | Sequence added to C terminal | The number of prenyl groups added 0 | 1 | 2 | 3 | SEQ NO |
|---|---|---|---|---|---|---|---|---|
| Met3 | ClAc-(D)Tyr | KRKAWICQTAVYC | NSGGVS | 2 | 5 | N/A | N/A | 354 |
| Met9 | ClAc-(D)Tyr | KRKNCLVHVWHQC | NSGGVS | 1 | 5 | N/A | N/A | 355 |
| Met11 | ClAc-(D)Tyr | HTDPFKAWHRRSC | NSGGVS | 1 | 5 | N/A | N/A | 356 |
| Met12 | ClAc-(D)Tyr | YIIWHRHRIMTVC | NSGGVS | 3 | 4 | N/A | N/A | 357 |
| Met13 | ClAc-(D)Tyr | VTWKGPYRWRVC | NSGGVS | 1 | 5 | 1 | N/A | 358 |

Example 19-1: Assessment of Peptides Obtained as a Result of Screening Against MetAP1

(Pulldown Assay on Binding Ability to MetAP1)

With regards to the prenylated cyclic peptides identified as a result of screening with MetAP1 as a target, their binding ability to the target was assessed by qualitative pulldown assay. After synthesis of Met3, Met9, Met11, Met12, Met13 and Met14 while displaying each of the sequences on mRNA, the Trp residue in the sequence was prenylated. The prenylated peptide-mRNA complex thus obtained was pulled down with magnetic beads and then, a recovered mRNA amount was determined by RT-qPCR. The results are shown in FIG. 11.

Figure 11:
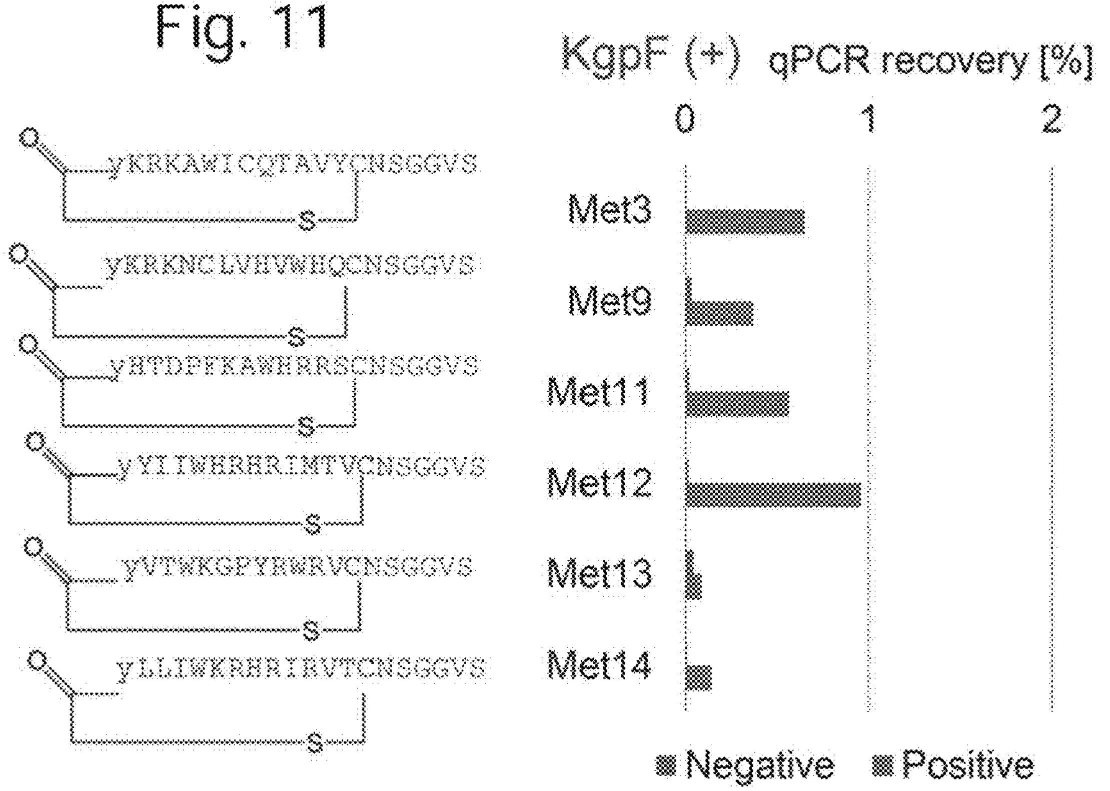
FIG. 11 is a diagram showing the results of pulldown assay of prenylated cyclic peptides identified as a result of screening with MetAP1 as a target. From top to bottom, the sequence identifiers are SEQ ID NOs: 354 to 359, 354, and 355. At the bottom, middle of FIG. 11, the top sequence is SEQ ID NO: 354 and the bottom sequence is SEQ ID NO: 355.
Figure 11:
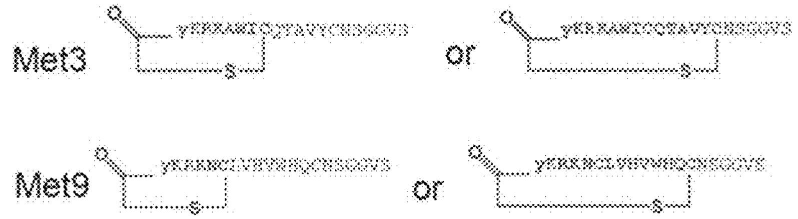

In the bar graph of FIG. 11, Negative bar indicates a pulldown amount when MetAP1-non-immobilized beads are used and Positive bar indicates a pulldown amount when MetAP1—immobilized beads are used. It has been confirmed that the pulldown amount is significantly higher in Positive than in Negative and the prenylated peptide sequence binds to MetAP1.

(Synthesis of Prenylated Cyclic Peptide by Using Fmoc Solid-Phase Synthesis and Prenylation with KgpF)

After chemical synthesis of respective cyclic peptides having sequences Met2 (SEQ ID NO: 361), Met3-1 (SEQ ID NO: 360), Met3a-L (SEQ ID NO: 362), Met11 (SEQ ID NO: 363) and Met13 (SEQ ID NO: 364) by Fmoc solid-phase synthesis, they were treated with KgpF in a test tube to prepare prenylated cyclic peptides. The prenylation was performed under the following Conditions 27.

(Conditions 27)

Scale: 1 mL

Cyclic peptide: 300 μM (in Met3-1, Met11, and Met13) or 1500 μM (in Met2 and Met3a-L)

$MgCl_2$: 5.0 mM

KgpF: 16 μM (in Met11 and Met13) or 75 μM (in Met2, Met3-1, and Met3a-L)

DMAPP: 1 mM

HEPES-KOH (pH 7.5) 50 mM

Reaction: 37° C., 20 hours

Figure 12:
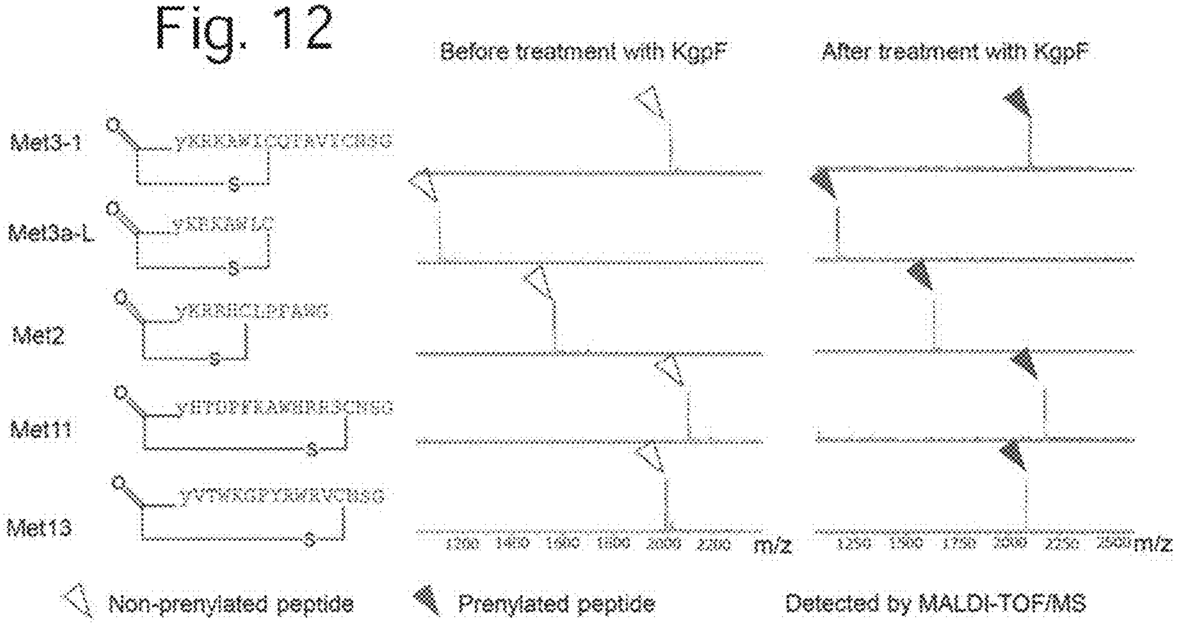
FIG. 12 is a diagram showing a MALDI-TOF-MS spectrum before and after treatment with KgpF, of cyclic peptides chemically synthesized by Fmoc solid-phase synthesis. From top to bottom, the sequence identifiers are SEQ ID NOs: 360 to 364.

As shown in FIG. 12, it has been confirmed from MALDI-TOF-MS spectrum performed before and after the treatment with KgpF that intended prenylated cyclic peptides are obtained.

(MetAP1 Inhibition Test of Prenylated Cyclic Peptide)

Figure 13:
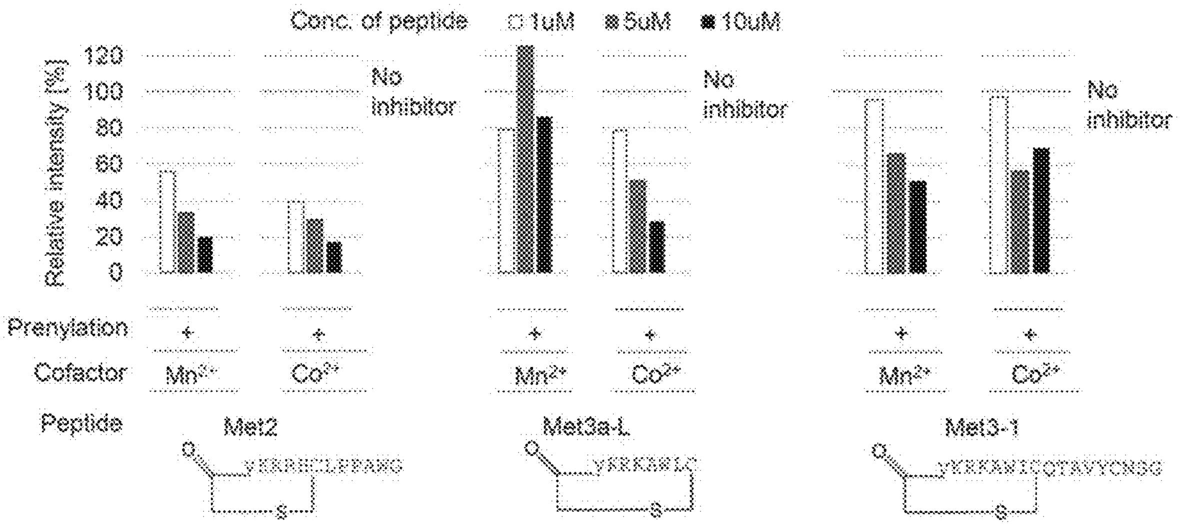
FIG. 13 is a diagram showing the results of MetAP1 enzymatic activity inhibition test by Met2, Met3a-L and Met3-1. From left to right, the sequence identifiers are SEQ ID NOs: 361, 362, and 360.

A MetAP1 inhibition test was performed in vitro using the prenylated Met2, Met3a-L, and Met3-1 at concentrations of 1 μM, 5 μM or 10 μM in the presence of a MetAP1 cofactor $Mn^{2+}$ or $Co^{2+}$. In the test, enzymatic activity was measured by detecting probe fluorescence, that is, fluorescence emitted depending on the enzymatic activity of MetAP1. The measurement results of fluorescence intensity are shown in FIG. 13. As shown in FIG. 13, it has been confirmed that the prenylated Met2, Met3, and Met3a-L peptides could each inhibit the enzymatic activity of MetAP1 which was a target.

(Conditions)

Scale: 20 μL

Cyclic peptide: 1, 5, 10 μM $MnCl_2$ or $CoCl_2$: 100 μM

MetAP1 enzymatic activity probe: 1 μM

MetAP1: 1 μM

Tris (pH7.6): 25 mM

NaCl: 75 mM

Reaction: 37° C., 120 min.

After the reaction, the fluorescence intensity of the probe was measured using a plate reader.

Example 20: Characteristics of Enzymatic Reaction of Prenylation Enzyme

Prenylation reaction was performed using the cyclic peptide shown below under conditions shown in (Conditions 27) in the presence or absence of Mg2+ at a concentration of EDTA adjusted to 0 mM, 1 mM or 10 mM. The cyclic peptides shown below were obtained by the synthesis using solid-phase synthesis.

[Chemical formula 25]

(SEQ ID NO: 365)

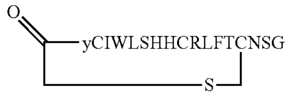

Kgp1-1

(SEQ ID NO: 360)

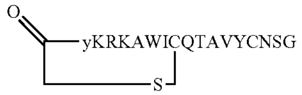

Met3-1

(SEQ ID NO: 381)

Met14

(Conditions 27)

Scale: 5.7 μL

Cyclic peptide: 120 μL $MgCl_2$: 5.0 mM (Mg(+); when used)

KgpF or OltF: 16 μM (KgpF) or 8.5 μM (OltF)

DMAPP: 2 mM

HEPES-KOH (pH7.5): 50 mM

Reaction: 37° C., 16 hours

Figure 14:
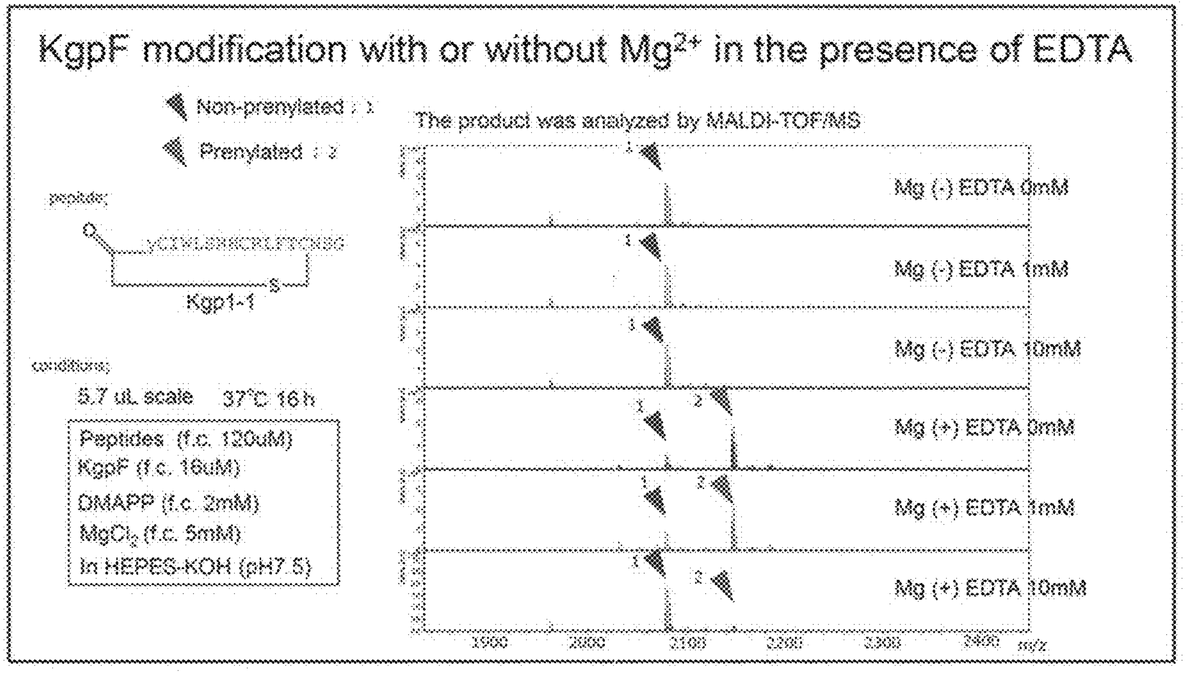
FIG. 14 is a diagram showing the results of the progress of a prenylation reaction of the cyclic peptide Kgp1-1 (SEQ ID NO: 365) by KgpF with or without Mg2+ in the presence of EDTA.
Figure 15:
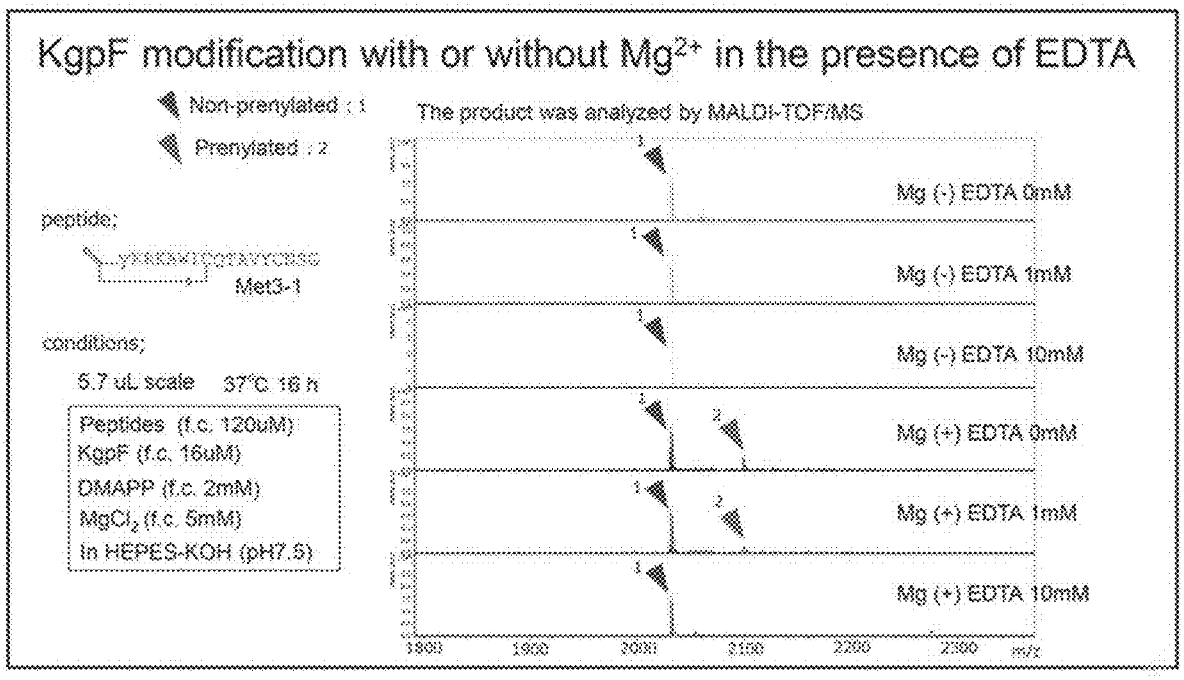
FIG. 15 is a diagram showing the results of the progress of a prenylation reaction of the cyclic peptide Met3-1 (SEQ ID NO: 360) by KgpF with or without Mg2+ in the presence of EDTA.
Figure 16:
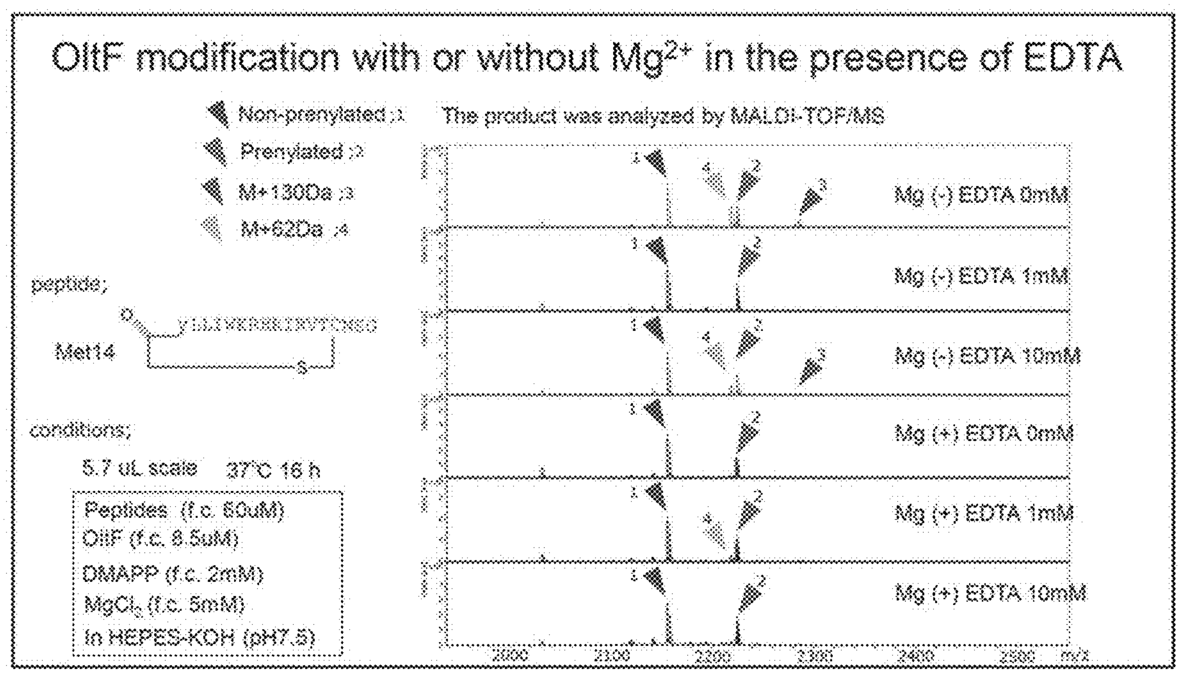
FIG. 16 is a diagram showing the results of the progress of a prenylation reaction of the cyclic peptide Met14 (SEQ ID NO: 381) by OltF with or without Mg2+ in the presence of EDTA.

The reaction products were analyzed by MALDI-TOF-MS. As a result, it has been found that the reaction proceeded dependently on $Mg^{2+}$ when KgpF was used as a prenylation enzyme (refer to FIG. 14 and FIG. 15) and the reaction proceeded independently on $Mg^{2+}$ when OltF was used (refer to FIG. 16).

Example 21: Prenylation of Cyclic Peptide Containing Non-Proteinogenic Amino Acid A prenylation test with KgpF was performed using a cyclic peptide containing an amino acid in D-form as a non-proteinogenic amino acid. The cyclic peptide containing an amino acid in D-form (X in the following formula) is represented by the following formula.

[Chemical formula 26]

(SEQ ID NO: 380)

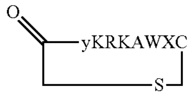

X represents D-amino acids

The above artificial cyclic peptides containing an amino acid in D-form were obtained by translation and synthesis under the following (Conditions 28) in the artificial translation system developed by the present inventors. The translated mixtures thus obtained were then reacted (prenylated) under the following (Conditions 29).

(Conditions 28)

5aa-mix (K,R,A,W,C): 0.5 mM

ClAc-D-Tyr-$tRNA^{fMet}_{CUA}$: 90 μM

D-aa-$tRNA^{Pro1E2}_{CGG}$: 90 μM

Reaction: 37° C. and 60 minutes in artificial translation-system solution

Scale: 2.5 μL scale (Conditions 29)

Translated mixture amount: 2.5 pL (mixture obtained under (Conditions 28))

KgpF: 16 μM

DMAPP: 2 mM

Reaction: 37° C., 20 hours

Figure 17:
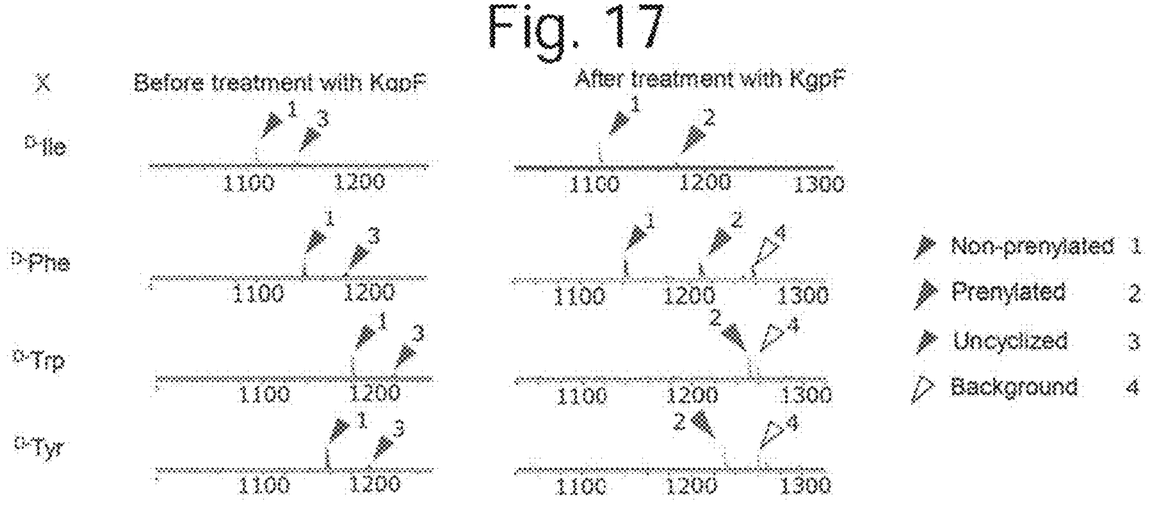
FIG. 17 is a diagram showing MALDI-TOF-MS spectrum of a translated mixture containing an artificial cyclic peptide containing an amino acid in D-form before and after treatment with KgpF. From top to bottom, the sequence identifiers are SEQ ID NOs: 366 to 369.

The reaction products were analyzed by MALDI-TOF-MS. As a result, it has been confirmed that the respective artificial cyclic peptides containing, as X, Ile in D-form, Phe in D-form, Trp in D-form and Tyr in D-form were modified by prenylation (refer to FIG. 17).

Example 22: Prenylation of Non-Proteinogenic Trp in Cyclic Peptide Containing the Trp By using a cyclic peptide containing a non-proteinogenic amino acid Trp, a prenylation test of the Trp with OltF or KgpF was performed. The cyclic peptide used is as follows. In the formula, X is Trp in D-form.

[Chemical formula 27]

(SEQ ID NO: 370)

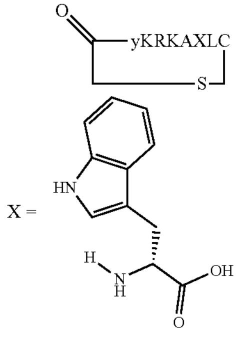

D-Trp

The above artificial cyclic peptide containing Trp in D-form was obtained by translation and synthesis under the following (Conditions 30) in the artificial translation system developed by the present inventors. The translated mixture thus obtained was then reacted (prenylated) under the following (Conditions 31) at 37° C. for 20 hours.

(Conditions 30)

19aa-Mix (19 kinds of proteinogenic amino acids other than M)]: 0.5 mM

ClAc-D-Tyr-$tRNA^{fMet}_{CUA}$: 90 μM

D-Trp-$tRNA^{Pro1E2}_{CGG}$: 90 μM

Reaction: 37° C. and 60 minutes in an artificial translation-system solution.

Scale: 2.5 μL scale (Conditions 31)

Translated mixture amount: 2.5 μL (mixture obtained under (Conditions 30))

KgpF or OltF: 170 μM

DMAPP: 2 mM

Reaction: 37° C., 20 hours

Figure 18:
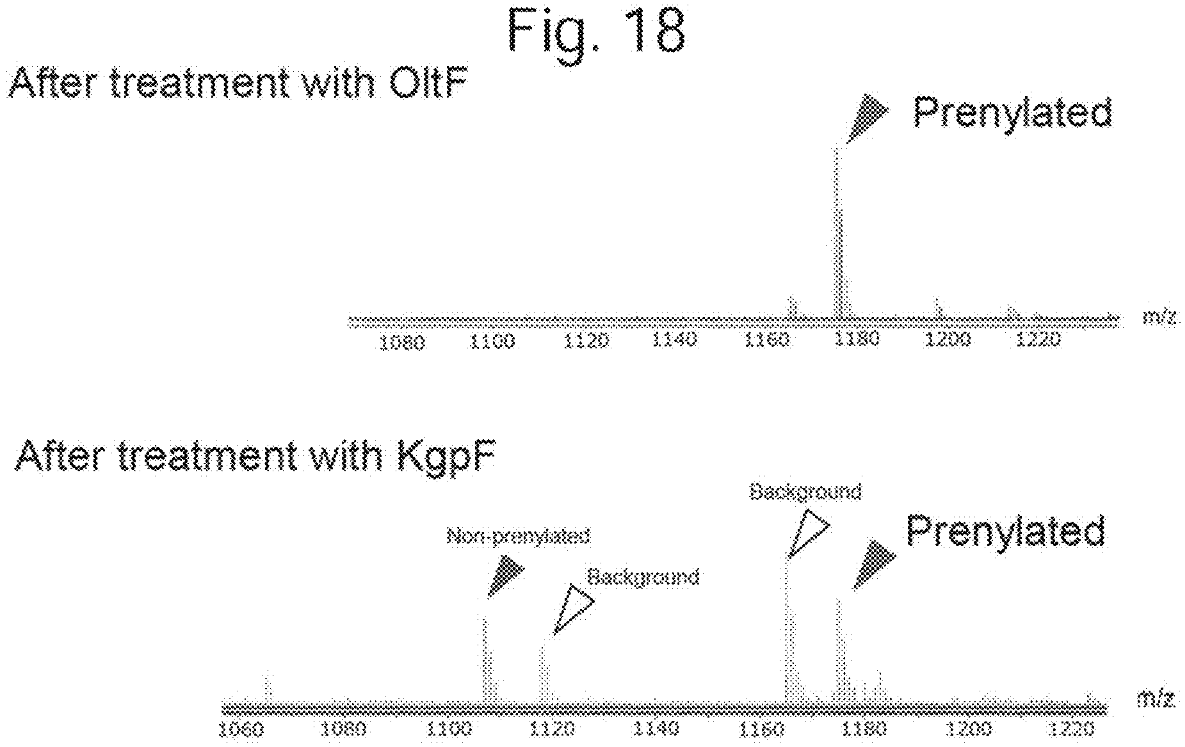
FIG. 18 is a diagram showing the MALDI-TOF-MS spectrum of a cyclic peptide containing a non-proteinogenic Trp derivative after prenylation of the Trp derivative with OltF or KgpF.

The reaction product was analyzed by MALDI-TOF-MS. As a result, it has been confirmed that the artificial cyclic peptide containing, as X, Trp in D-form was modified by prenylation (refer to FIG. 18).

Example 23: Prenylation of Trp Present at N Terminal

The cyclic peptide shown below was obtained by translation and synthesis under the following (Conditions 32) in the artificial translation system developed by the present inventors. The translated mixture thus obtained was then reacted (prenylated) under the following (Conditions 33).

[Chemical formula 28]

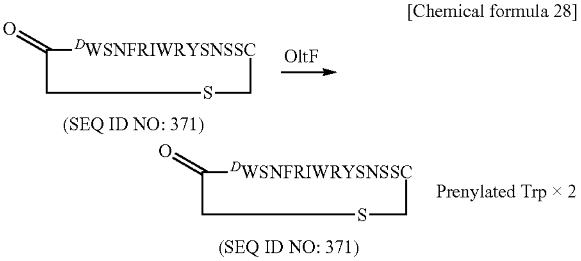

(Conditions 32)

19aa-mix (19 kinds of proteinogenic amino acids other than M)]: 0.5 mM

ClAc-D-Tyr-tRNA$^{fMet}{}_{CUA}$: 50 μM

Reaction: 37° C. and 30 minutes in an artificial translation-system solution.

Scale: 2.5 μL scale (Conditions 33)

Translated mixture amount: 2.5 μL (mixture obtained under (Conditions 32))

OltF: 100 μM

DMAPP: 2.1 mM

Reaction: 37° C., 18 hours

Scale: 5.7 μL scale

Figure 19:
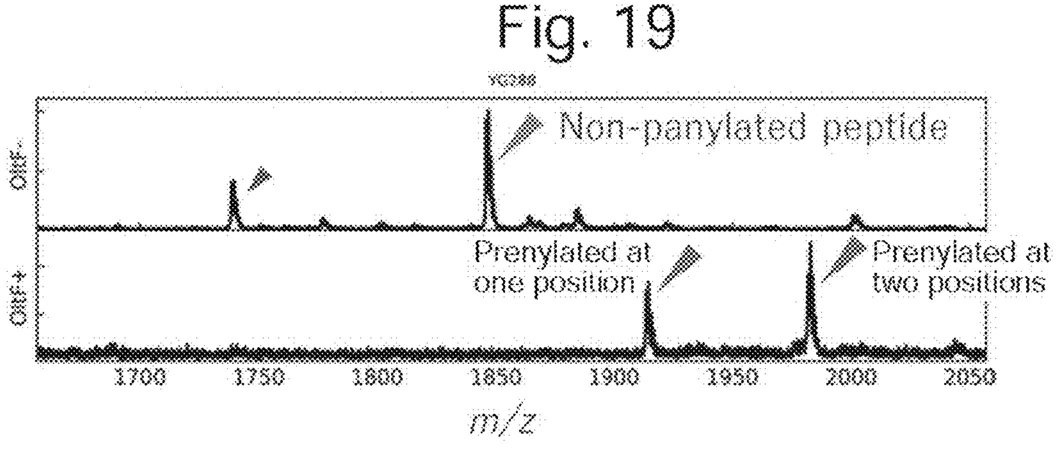
FIG. 19 is a diagram showing the MALDI-TOF-MS spectrum of a cyclic peptide containing a Trp at two positions, that is, at N-terminal position and in the sequence, before and after treatment with OltF.

The reaction product was analyzed by MALDI-TOF-MS. As a result, it has been found that a Trp at two positions, that is, at the N-terminal position and in the sequence could be prenylated by using OltF as a prenylation enzyme (refer to FIG. 19).

Figure 20:
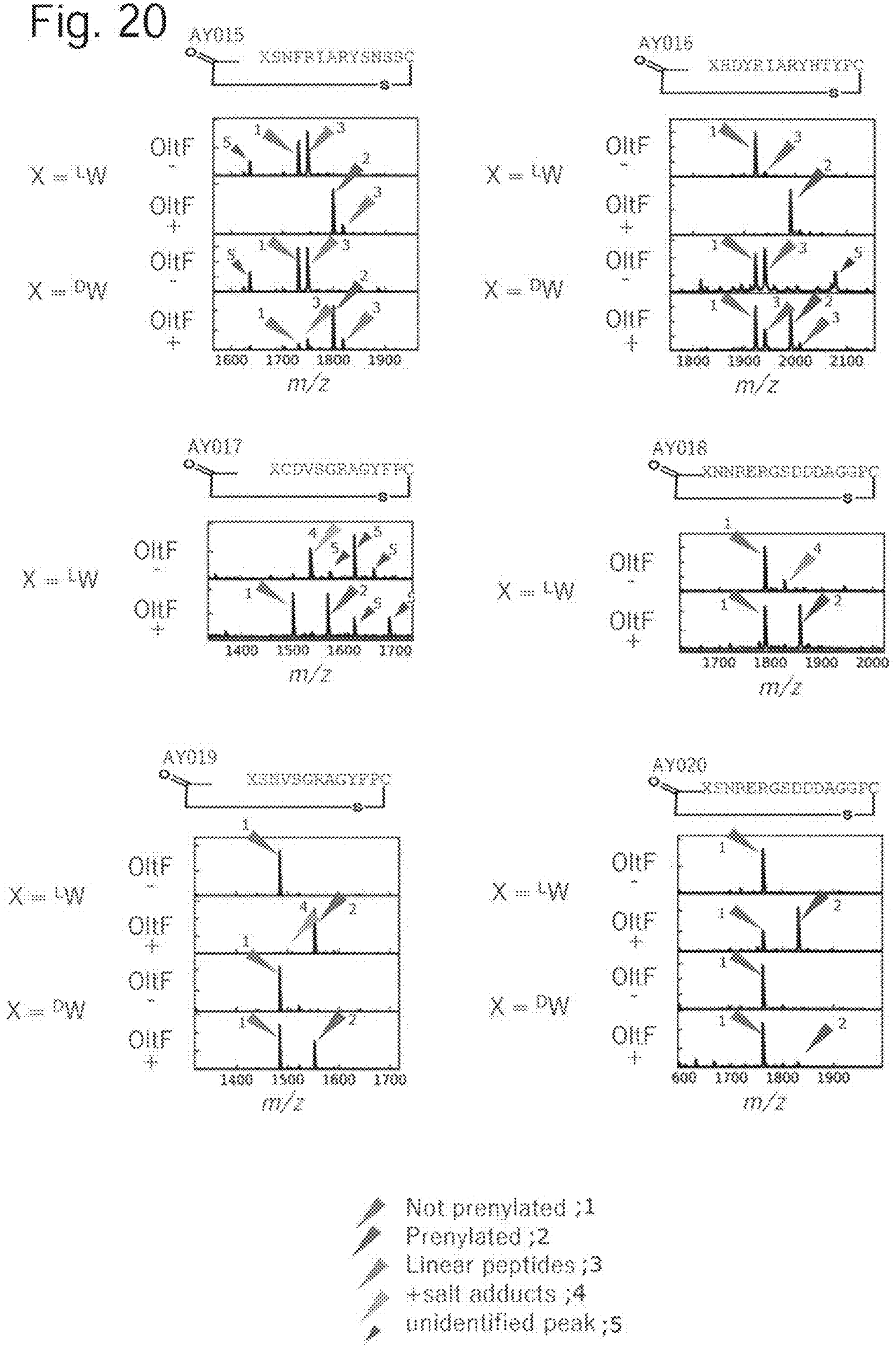
FIG. 20 is a diagram showing the MALDI-TOF-MS spectrum of a cyclic peptide containing a Trp at N terminal position, before and after treatment with OltF. From left to right, the sequence identifiers in: the top row are SEQ ID NOs: 372 and 373; the middle row are SEQ ID NOs: 374 and 375; and the bottom row are SEQ ID NOs: 376 and 377.

In a manner similar to that described above, prenylation of AY015 (SEQ ID NO: 372), AY016 (SEQ ID NO: 373), AY017 (SEQ ID NO: 374), AY018 (SEQ ID NO: 375), AY019 (SEQ ID NO: 376) and AY020 (SEQ ID NO: 377) (refer to FIG. 20) was performed with OltF. It has been confirmed that a Trp at the N terminal position was prenylated.

What is claimed is:

1. A method of producing a peptide library comprising a prenylated peptide, comprising a step of bringing a peptide library comprising a peptide having an amino acid sequence containing at least one Trp or derivative thereof into contact with a prenylation enzyme and prenylating at least one Trp residue or derivative residue thereof.

2. The method of producing a peptide library according to claim 1, wherein the prenylation enzyme is at least one or more selected from the group consisting of Enzyme 1 to Enzyme 21 and homologs thereof.

3. The method of producing a peptide library according to claim 1, wherein the prenylation enzyme consists of any amino acid sequence of the following (1) to (3):

(1) an amino acid sequence represented by any of SEQ ID NOS: 1 to 56, (2) an amino acid sequence with one or more amino acid deletions, substitutions or additions in an amino acid sequence represented by any of SEQ ID NOS: 1 to 56, and (3) an amino acid sequence having 80% or more homology with an amino acid sequence represented by any of SEQ ID NOS: 1 to 56.

4. The method of producing a peptide library according to claim 1, wherein the peptide library comprises a cyclic peptide.

5. The method of producing a peptide library according to claim 4, wherein the cyclic peptide has a cyclic structure formed by bonding of two amino acid residues through a disulfide bond, peptide bond, alkyl bond, alkenyl bond, ester bond, thioester bond, ether bond, thioether bond, phosphonate ether bond, azo bond, C—S—C bond, C—N—C bond, C═N—C bond, amide bond, lactam bridge, carbamoyl bond, urea bond, thiourea bond, amine bond, thioamide bond, or triazole bond.

6. The method of producing a peptide library according to claim 1, comprising, prior to the prenylation step, a step of translating an mRNA library in a cell-free translation system and preparing a peptide library comprising a peptide having an amino acid sequence containing at least one Trp or derivative thereof.

7. A screening method for identifying a peptide binding to a target material, comprising:

a step of bringing the peptide library prepared by the production method as claimed in claim 1 into a target material, and a step of selecting a peptide binding to the target material.

8. The method of producing a peptide library according to claim 1, wherein:

the peptide is a peptide linked to genotype, and the method further comprises a step of preparing a peptide library comprising a peptide having an amino acid sequence containing at least one Trp or derivative thereof and linked to genotype.

9. The method of producing a peptide library according to claim 8, wherein:

the step of preparing the peptide library comprises a step of preparing a peptide-mRNA library by mRNA display method; and the step of preparing the peptide-mRNA library comprises:

a step of binding a puromycin to a 3'-end of each mRNA of an mRNA library to produce a puromycin-bound mRNA library, and a step of translating the puromycin-bound mRNA library in a cell-free translation system and preparing a peptide-mRNA library comprising a peptide having an amino acid sequence containing at least one Trp or derivative thereof.

10. A screening method for identifying a peptide binding to a target material, comprising:

a step of bringing the peptide library prepared by the production method as claimed in claim 8 into a target material, and a step of selecting a peptide binding to the target material.

11. A screening method for identifying a peptide binding to a target material, comprising:

a step of bringing the peptide library prepared by the production method as claimed in claim 9 into a target material, and a step of selecting a peptide binding to the target material.

12. The method of producing a peptide library according to claim 2, wherein the peptide library comprises a cyclic peptide.

13. The method of producing a peptide library according to claim 3, wherein the peptide library comprises a cyclic peptide.

14. The method of producing a peptide library according to claim 2, comprising, prior to the prenylation step, a step of translating an mRNA library in a cell-free translation system and preparing a peptide library comprising a peptide having an amino acid sequence containing at least one Trp or derivative thereof.

* * * * *

SEQUENCE LISTING

```
<160> NUMBER OF SEQ ID NOS: 512

<210> SEQ ID NO 1
<211> LENGTH: 290
<212> TYPE: PRT
<213> ORGANISM: Microcystis aeruginosa

<400> SEQUENCE: 1

Met Ile Asn Tyr Ala Asn Ala Gln Leu His Lys Ser Lys Asn Leu Met
1               5                   10                  15

Tyr Met Lys Ala His Glu Asn Ile Phe Glu Ile Glu Ala Leu Tyr Pro
            20                  25                  30

Leu Glu Leu Phe Glu Arg Phe Met Gln Ser Gln Thr Asp Cys Ser Ile
        35                  40                  45

Asp Cys Ala Cys Lys Ile Asp Gly Asp Glu Leu Tyr Pro Ala Arg Phe
    50                  55                  60

Ser Leu Ala Leu Tyr Asn Asn Gln Tyr Ala Glu Lys Gln Ile Arg Glu
65                  70                  75                  80

Thr Ile Asp Phe Phe His Gln Val Glu Gly Arg Thr Glu Val Lys Leu
                85                  90                  95

Asn Tyr Gln Gln Leu Gln His Phe Leu Gly Ala Asp Phe Asp Phe Ser
            100                 105                 110

Lys Val Ile Arg Asn Leu Val Gly Val Asp Ala Arg Arg Glu Leu Ala
        115                 120                 125

Asp Ser Arg Val Lys Leu Tyr Ile Trp Met Asn Asp Tyr Pro Glu Lys
    130                 135                 140

Met Ala Thr Ala Met Ala Trp Cys Asp Asp Lys Lys Glu Leu Ser Thr
145                 150                 155                 160

Leu Ile Val Asn Gln Glu Phe Leu Val Gly Phe Asp Phe Tyr Phe Asp
                165                 170                 175

Gly Arg Thr Ala Ile Glu Leu Tyr Ile Ser Leu Ser Ser Glu Glu Phe
            180                 185                 190

Gln Gln Thr Gln Val Trp Glu Arg Leu Ala Lys Val Val Cys Ala Pro
        195                 200                 205

Ala Leu Arg Leu Val Asn Asp Cys Gln Ala Ile Gln Ile Gly Val Ser
    210                 215                 220

Arg Ala Asn Asp Ser Lys Ile Met Tyr Tyr His Thr Leu Asn Pro Asn
225                 230                 235                 240

Ser Phe Ile Asp Asn Leu Gly Asn Glu Met Ala Ser Arg Val His Ala
                245                 250                 255

Tyr Tyr Arg His Gln Pro Val Arg Ser Leu Val Val Cys Ile Pro Glu
            260                 265                 270

Gln Glu Leu Thr Ala Arg Ser Ile Gln Arg Leu Asn Met Tyr Tyr Cys
        275                 280                 285
```

```
Met Asn
    290


<210> SEQ ID NO 2
<211> LENGTH: 290
<212> TYPE: PRT
<213> ORGANISM: Planktothrix

<400> SEQUENCE: 2

Met Thr Tyr Pro Ser Leu Leu Thr Ala Ser Gln Lys Asn Leu Gln Phe
1               5                   10                  15

Ile Gly Glu His Lys Asn Ala Phe Asp Leu Glu Tyr Leu Tyr Pro Leu
            20                  25                  30

Asp Leu Phe Glu Asp Leu Val Ala Gln Val Glu Pro Cys Arg Ile Glu
        35                  40                  45

Cys Ser Cys Lys Ile Glu Asn Asn Lys Leu Asp Pro Ala Arg Phe Asn
    50                  55                  60

Leu Ala Ile Asn Asp Ser Phe Ala Arg Lys Ala Gln Ala Phe Leu Gly
65                  70                  75                  80

Phe Phe His Gln Val Glu Thr Arg Val Gly Val Ile Ile Asp Tyr Lys
                85                  90                  95

Pro Leu His Phe Phe Met Lys Gly Phe Asp Tyr Ser Lys Val Thr Gln
            100                 105                 110

Ile Met Ala Gly Ile Asp Ala Arg Ala Glu Leu Thr Glu Ala Arg Val
        115                 120                 125

Lys Thr Trp Trp Ala Ile Asp Asn Tyr Pro Glu Lys Leu Glu Thr Ala
    130                 135                 140

Ile Ala Leu Ser Gln Ser Asp Ser Lys Pro Leu Arg Met Leu Leu Glu
145                 150                 155                 160

Ile Asn Asn Ser Leu Val Ile Gly Phe His Leu Tyr Leu Arg Gly Lys
                165                 170                 175

Ser Glu Val Arg Leu Tyr Pro Ser Val Ser Arg Glu Asp Phe Lys Lys
            180                 185                 190

Val Ser Val Gln Ala Gln Leu Ala Lys Ile Leu Ser Thr Pro Ala Leu
        195                 200                 205

Lys Leu Leu Glu Asp Ser Val Ala Ile Ser Leu Val Leu Lys Glu Asn
    210                 215                 220

Gly Asp Lys Ile Leu His Tyr His Val Leu Pro Glu Arg Val Asn Ser
225                 230                 235                 240

Phe Val Asn Asn Leu His Gln Asp Met Ile Thr Arg Ala His Ala Pro
                245                 250                 255

Tyr Arg Asn Lys Ser Gln Ser Leu Gly Cys Thr Val Ser Leu Ser Glu
            260                 265                 270

Lys Glu Leu Leu Ala Gly Tyr Leu Lys Thr Ile Asn Leu Tyr Tyr Met
        275                 280                 285

Asn Thr
    290


<210> SEQ ID NO 3
<211> LENGTH: 315
<212> TYPE: PRT
<213> ORGANISM: Scytonema millei

<400> SEQUENCE: 3

Met Ile Thr Asp Lys His Thr Leu Val Asp Thr Asn Lys Asn Leu His
1               5                   10                  15
```

```
Tyr Ile Gly Glu His Lys Arg Ala Phe Gln Val Glu Ser Val Tyr Pro
            20                  25                  30

Leu Asp Ile Phe Glu Arg Phe Val Gln Glu Ala Thr Asp Trp Gly Leu
        35                  40                  45

Glu Cys Ser Cys Lys Ile Glu Lys Asp Lys Leu Tyr Pro Ile Arg Phe
    50                  55                  60

Asn Leu Phe Arg Asn His Pro Ser Phe Lys Gln Phe Asp Ala Ala Leu
65                  70                  75                  80

Asp Phe Phe Gln Gln Val Glu Ala Arg Asp Asp Val Lys Leu Asp Tyr
                85                  90                  95

Lys Leu Met His Leu Phe Leu Gly Asn Tyr Phe Asp Phe Asn Lys Ile
            100                 105                 110

Ala Gln Ile Leu Val Gly Val Asp Leu Arg Thr Glu Leu Ser Ala Ser
        115                 120                 125

Arg Leu Lys Leu Trp Phe Val Ile Gln Asn Tyr Pro Glu Lys Leu Glu
    130                 135                 140

Thr Ala Phe Ala Leu Cys Asp Leu Lys Glu Glu Leu Arg Ala Leu Ile
145                 150                 155                 160

Val Cys Cys Ser Leu Val Val Val Gly Phe Asp Phe Tyr Leu Asp Gly
                165                 170                 175

Arg Thr Asn Ile Glu Leu Tyr Pro Arg Ile Leu Lys Lys Glu Leu Gln
            180                 185                 190

Glu Val Asp Val Trp Lys Gln Leu Ala Lys Val Val Ser Pro Pro Thr
        195                 200                 205

Leu Gln Leu Leu Asp Ser Cys Trp Ala Phe Met Leu Gly Phe Ser Lys
    210                 215                 220

Ala Asn Pro Glu Thr Ile Leu Tyr Cys Pro Ala Arg Asp Pro Asp Ser
225                 230                 235                 240

Phe Ile Ala Asn Leu Ser Asn Asp Leu Ala Asp Arg Val His Ala Tyr
                245                 250                 255

Tyr Gln Lys Gln Pro Val Arg Gly Thr Ile Val Ala Phe Arg Glu Arg
            260                 265                 270

Glu Leu Leu Ala Gly Ala Ile Glu Asn Leu Asn Leu Tyr Tyr Gln Met
        275                 280                 285

Ser Leu Gly Val Thr Lys Lys Ser Glu Lys Phe Asp Gly Cys Val Ala
    290                 295                 300

Lys Thr Gly Glu Ala Gly Ala Asp Ile Gln Lys
305                 310                 315


<210> SEQ ID NO 4
<211> LENGTH: 290
<212> TYPE: PRT
<213> ORGANISM: Chrysosporum ovalisporum

<400> SEQUENCE: 4

Met Thr Ile Ser Glu Asn Leu Phe Ile Gly Ser Gln Lys Asn Leu His
1               5                   10                  15

Tyr Ile Asn Gln His Lys His Ile Phe Asp Val Asp His Leu Tyr Thr
            20                  25                  30

Leu Asn Ile Phe Asp Asp Phe Ala Gln Lys Val Thr His Trp Gly Leu
        35                  40                  45

Glu Cys Ser Cys Lys Ile Gln Lys Asp Gln Leu Tyr Pro Ala Arg Phe
    50                  55                  60

Asn Leu Phe Arg Asn Gln Pro Asn Trp Gln Asp Tyr Gln Thr Ala Ile
```

```
65                  70                  75                  80

Asn Phe Phe Gln Gln Val Ala Ala Lys Thr Asp Val Lys Leu Thr Tyr
                85                  90                  95

His Leu Ile Glu Asn Phe Val Gly Asn Asp Phe Asp Phe Ser Lys Val
            100                 105                 110

His Gln Ile Leu Val Gly Ile Asp Leu Arg Arg Glu Phe Ser Ala Ser
        115                 120                 125

Arg Leu Lys Phe Trp Phe Ile Ile Ser Asp Tyr Pro Gln Lys Leu Ala
    130                 135                 140

Lys Ala Ile Ser Leu Cys Gln Ser Ala Glu Glu Leu Gln Pro Phe Leu
145                 150                 155                 160

Val Asp Asn Ser Val Val Ile Gly Phe Asp Phe Asp Phe Asn Gly Gly
                165                 170                 175

Ser Glu Ile Glu Val Tyr Pro Ser Ile Ser Lys Glu Lys Phe Gln Gln
            180                 185                 190

Leu Ala Lys Val Leu Ser Pro Gln Ala Leu Gln Leu Leu Asp Ser Cys
        195                 200                 205

Trp Ser Leu Ile Ile Gly Phe Ser Gln Gly Asn Ala Glu Lys Ile Leu
    210                 215                 220

Tyr Tyr Arg Thr Ser Asp Pro Asn Asn Phe Ile Ala Asn Leu Arg Asn
225                 230                 235                 240

Asp Leu Ala Asn Arg Val His Ala Tyr Tyr Arg Glu Gln Pro Val Gln
                245                 250                 255

Gly Thr Ile Val Gly Leu Arg Glu Asn Glu Ile Ile Ala Gly Arg Ile
            260                 265                 270

Glu Asn Leu Asn Leu Tyr Tyr Gln Met Ser Ser Pro Ile Thr Thr Asn
        275                 280                 285

Lys Asn
    290


<210> SEQ ID NO 5
<211> LENGTH: 290
<212> TYPE: PRT
<213> ORGANISM: Dolichospermum circinale

<400> SEQUENCE: 5

Met Thr Ile Ser Glu Asn Leu Phe Ile Gly Ser Gln Lys Asn Leu His
1               5                   10                  15

Tyr Ile Asn Gln His Lys His Ile Phe Asp Val Asp His Leu Tyr Thr
            20                  25                  30

Leu Asn Ile Phe Asp Asp Phe Ala Gln Lys Val Thr His Trp Gly Leu
        35                  40                  45

Glu Cys Ser Cys Lys Ile Gln Lys Asp Gln Leu Tyr Pro Ala Arg Phe
    50                  55                  60

Asn Leu Phe Arg Asn Gln Pro Asn Trp Gln Asp Tyr Gln Thr Ala Ile
65                  70                  75                  80

Asn Phe Phe Gln Gln Val Ala Ala Lys Thr Asp Val Lys Leu Thr Tyr
                85                  90                  95

His Leu Ile Glu Asn Phe Val Gly Asn Asp Phe Asp Phe Ser Lys Val
            100                 105                 110

His Gln Ile Leu Val Gly Ile Asp Leu Arg Arg Glu Phe Ser Ala Ser
        115                 120                 125

Arg Leu Lys Phe Trp Phe Ile Ile Ser Asp Tyr Pro Gln Lys Leu Ala
    130                 135                 140
```

-continued

```
Lys Ala Ile Ser Leu Cys Gln Pro Ala Glu Glu Leu Gln Pro Phe Leu
145                 150                 155                 160

Val Asp Asn Ser Val Val Ile Gly Phe Asp Phe Asp Phe Tyr Gly Gly
                165                 170                 175

Ser Gln Ile Glu Val Tyr Pro Ser Ile Ser Lys Glu Lys Phe Gln Gln
            180                 185                 190

Leu Ala Lys Val Leu Ser Pro Gln Ala Leu Gln Leu Leu Asp Ser Cys
        195                 200                 205

Trp Ser Leu Ile Ile Gly Phe Ser Gln Ala Asn Pro Glu Lys Ile Leu
    210                 215                 220

Tyr Tyr Arg Thr Ser Asp Pro Asn Asn Phe Ile Ala Asn Leu Arg Asn
225                 230                 235                 240

Asp Leu Ala Asn Arg Val His Ala Tyr Tyr Arg Glu Gln Pro Val Gln
                245                 250                 255

Gly Thr Ile Val Gly Leu Arg Glu Asn Glu Ile Ile Ala Gly Arg Ile
            260                 265                 270

Glu Asn Leu Asn Leu Tyr Tyr Gln Met Ser Ser Pro Ile Thr Thr Asn
        275                 280                 285

Lys Asn
    290
```

<210> SEQ ID NO 6
<211> LENGTH: 300
<212> TYPE: PRT
<213> ORGANISM: Nostoc linckia

<400> SEQUENCE: 6

```
Met Val Thr Tyr Lys Pro Ile Gln Val Asp Ser Glu Pro Tyr Leu Glu
1               5                   10                  15

Tyr Ile Gly Lys His Lys Arg Ala Phe Asp Ile Tyr Glu Asp Leu Tyr
            20                  25                  30

Pro Val Lys Leu Phe Glu Asp Phe Val Gln Val Glu Gly Arg Gln Gly
        35                  40                  45

Gly Met Phe Arg Cys Gly Cys Asn Val Thr Lys Asp Glu Leu Ser Pro
    50                  55                  60

Ala Arg Phe Ala Leu Leu Phe Pro Thr Gln Asp Asp Leu Gln Ser Leu
65                  70                  75                  80

His Asn Pro Gln Gln Gln Leu Glu Ala Ala Phe Asp Phe Phe Arg Lys
                85                  90                  95

Val Glu Gly Arg Ala Glu Val Lys Val Asn Tyr His Leu Leu Glu Lys
            100                 105                 110

Phe Phe Gly Lys Asn Pro Asp Phe Gly Gly Ile Tyr Phe Ile Ala Val
        115                 120                 125

Gly Val Asp Ala Gln Thr Glu Ile Ser Glu Ser Arg Leu Lys Leu Phe
    130                 135                 140

Ile His Leu His Asp Ala Pro Asp Lys Ile Glu Ser Ala Ile Ala Leu
145                 150                 155                 160

Ser Gly Asp Ser Pro Thr Leu Arg Ala Phe Leu Val Asn Asn Asp Leu
                165                 170                 175

Leu Val Gly Phe Asp Phe Tyr Leu Asp Gly Arg Ser Glu Ile Glu Val
            180                 185                 190

Tyr Pro Thr Ile Tyr Gln Glu Glu Leu Lys Arg Ala Asp Ile Gln Ser
        195                 200                 205

Arg Ile Leu Pro Leu Leu Pro Pro Arg Ala Leu Pro Leu Leu Lys Gln
    210                 215                 220
```

```
Cys Glu Val Leu Gln Ile Gly Ile Ser Pro Ala Asn Lys Ser Asn Ile
225                 230                 235                 240

Leu Tyr Phe Asp Phe Val Arg Asp Pro Asn Thr Phe Ile Asp Asn Leu
                245                 250                 255

Gly Asn Glu Met Ala Lys Lys Val His Ala Tyr Tyr Arg His Gln Pro
            260                 265                 270

Val Gln His Val Leu Val Gly Val Ser Glu Lys Asp Leu Tyr Ala Ser
        275                 280                 285

Ser Ile Glu Lys Val Lys Leu Tyr Tyr Phe Lys Lys
    290                 295                 300


<210> SEQ ID NO 7
<211> LENGTH: 300
<212> TYPE: PRT
<213> ORGANISM: Nostoc linckia

<400> SEQUENCE: 7

Met Val Thr Tyr Asn Pro Ile Lys Thr Asn Ser Glu Arg Tyr Leu Glu
1               5                   10                  15

Tyr Ile Gly Lys His Lys Leu Ala Phe Asp Ile Tyr Glu Asp Leu Tyr
            20                  25                  30

Pro Leu Lys Ile Phe Glu Asp Phe Val Glu Val Glu Ala Lys Lys Arg
        35                  40                  45

Gly Leu Phe Tyr Ile Leu Ser Asn Val Asp Lys Asp Glu Ile Tyr Pro
    50                  55                  60

Ala Arg Phe Cys Leu Arg Phe Pro Ser Leu Glu Glu Ala Gln Leu Leu
65                  70                  75                  80

Tyr Asn Pro Gln Gln Gln Leu Gln Thr Ala Leu Asn Phe Phe Arg Gln
                85                  90                  95

Val Glu Ser Arg Pro Glu Val Lys Leu Asn Tyr His His Ile Gln Gln
            100                 105                 110

Phe Phe Gly Ser Ile Ser Asp Phe Gln Gly Ile Ile Leu Met Ala Val
        115                 120                 125

Ala Ile Asp Ala Arg Thr Val Ile Thr Glu Ser Arg Leu Lys Leu Tyr
    130                 135                 140

Val Trp Leu Lys Asn Ala Pro Glu Lys Val Glu Thr Ala Ile Ala Leu
145                 150                 155                 160

Cys Gly Asp Ser Pro Thr Leu Arg Ala Phe Leu Val Asn Asp Lys Leu
                165                 170                 175

Gln Val Gly Phe Asp Leu Phe Phe Asn Gly Glu Ser Glu Ile Glu Val
            180                 185                 190

Tyr Pro Ile Ile Ser Gln Asp Glu Leu Gln Gln Val His Ile Arg Asp
        195                 200                 205

Arg Ile Ile Pro Leu Leu Pro Pro Arg Ala Leu Pro Leu Leu Gln Gln
    210                 215                 220

Cys Ala Val Phe Gln Val Gly Phe Ser Glu Ala Asn Glu Ser Asn Ile
225                 230                 235                 240

Leu Tyr Phe Asp Tyr Val His Asp Pro Asn Ser Phe Val Asp Asn Leu
                245                 250                 255

Gly Asn Glu Met Thr Lys Lys Ile His Ala Tyr Tyr Arg His Gln Pro
            260                 265                 270

Ile Lys Ser Leu Thr Val Gly Ile Pro Glu His Asn Phe Tyr Gly Arg
        275                 280                 285

Ala Ile Glu His Val Lys Leu Tyr Tyr Asp Met Asn
```

```
    290                 295                 300


<210> SEQ ID NO 8
<211> LENGTH: 290
<212> TYPE: PRT
<213> ORGANISM: Microcystis aeruginosa

<400> SEQUENCE: 8

Met Val Leu Lys Ser Asn Lys Lys Leu Tyr Tyr Ile Ser Ala His Lys
1               5                   10                  15

His Ala Phe Glu Ile Asp Asn Leu Tyr Pro Leu Asn Leu Phe Glu Gly
            20                  25                  30

Phe Val Glu Arg Ile Glu Lys Ile Glu Lys Thr Glu Asn Cys Val Leu
        35                  40                  45

Glu Ser Ser Cys Lys Ile Asp His Asp Lys Leu Tyr Pro Val Arg Phe
    50                  55                  60

Asn Ile Gly Phe Pro Asn Asn Ser Ile Lys Gln Leu His Ala Val Met
65                  70                  75                  80

Asp Phe Phe Arg Arg Val Glu Ser Arg Val Asp Val Lys Leu Asn Leu
                85                  90                  95

Ser Leu Phe Gln Gln Phe Ile Gly Asn Asp Phe Lys Leu Asp Lys Met
            100                 105                 110

Thr Asp Leu Met Leu Gly Ile Asp Leu Arg Arg Asp Leu Ser Asp Ser
        115                 120                 125

Arg Leu Lys Ile Gly Leu Thr Ile Glu Asp Tyr Pro Glu Lys Gln Lys
    130                 135                 140

Ala Ala Val Ile Leu Asn Asn Asn Ile Asp Glu Val Thr Ser Asn Leu
145                 150                 155                 160

Leu Ile Ser Asn Arg Leu His Ile Gly Phe Asp Phe Tyr Leu Asn Gly
                165                 170                 175

Arg Ser Glu Met Glu Leu Tyr Pro His Ile Met Gln Gln Asp Phe Gln
            180                 185                 190

Lys Leu Asp Val Gln Gln Arg Leu Ser Lys Val Leu Ser Pro Pro Ala
        195                 200                 205

Leu Gln Val Val Pro Ala Cys Thr Arg Ile Cys Val Gly Ile Ser Lys
    210                 215                 220

Ala Asn Arg Asp Lys Ile Ile Tyr Tyr Tyr Leu Glu Asn Met Gly Asp
225                 230                 235                 240

Phe Leu Asn Tyr Phe Thr Val Asn Asp Thr Ala Arg Lys Val His Ala
                245                 250                 255

Tyr Tyr Leu Lys Gln Pro Val Val Glu Met Cys Val Ala Leu Pro Glu
            260                 265                 270

Ser Glu Leu Leu Ala Gly Thr Thr Ile Lys Asn Leu Asn Leu Tyr Tyr
        275                 280                 285

Leu Leu
    290


<210> SEQ ID NO 9
<211> LENGTH: 289
<212> TYPE: PRT
<213> ORGANISM: Dolichospermum circinale

<400> SEQUENCE: 9

Met Thr Thr Leu Leu Glu Ser Gly Lys Lys Ile Tyr Tyr Ile Gly Ile
1               5                   10                  15

His Lys Gln Ile Phe Glu Ile Lys Asn Phe Tyr Pro Leu Asp Ile Phe
```

-continued

```
            20                  25                  30

Asp Ser Phe Val Asn Gln Ile Glu Thr Thr Ser Glu Asn Cys Ser Leu
        35                  40                  45

Glu Ser Ser Cys Lys Ile Glu Leu Asp Lys Leu Tyr Pro Ala Arg Phe
    50                  55                  60

Gly Ile Gly Phe Thr Leu Lys Asn Leu Lys Gln Leu Asn Val Val Tyr
65                  70                  75                  80

Glu Phe Phe Gln Lys Val Glu Ser Arg Ile Asp Val Gln Ile Asn Tyr
                85                  90                  95

Ser Leu Ile Gln Gln Phe Phe Gly Glu Asn Phe Asp Phe Asn Lys Met
            100                 105                 110

Thr Glu Phe Met Val Gly Ile Asp Ala Arg Gln Glu Leu Ser Glu Thr
        115                 120                 125

Lys Leu Lys Ile Ala Leu Thr Ile Lys Asn Tyr Pro Glu Lys Ile Lys
    130                 135                 140

Thr Ala Ile Ala Leu Asn Gly Gly Leu Asp Lys Asn Ile Tyr Asn Leu
145                 150                 155                 160

Leu Val Ser Asn Ser Leu His Ile Gly Phe Asp Leu Ser Leu Asp Gly
                165                 170                 175

Arg Ser Glu Ile Glu Leu Tyr Pro Tyr Ile Arg Asn Gln Glu Phe Gln
            180                 185                 190

Ile Phe Asp Ile Gln Gln Arg Leu Ala Thr Val Leu Ser Pro Gln Ala
        195                 200                 205

Leu Gln Phe Leu Pro Ile Cys Ser Arg Ile Cys Val Gly Leu Ser Lys
    210                 215                 220

Ala Asn Ala Asp Lys Val Val Tyr Phe Tyr Leu Lys Asn Leu Asn Asp
225                 230                 235                 240

Phe Leu Asn Tyr Phe Thr Val Asn Asp Thr Ala Arg Arg Val His Ala
                245                 250                 255

Tyr Tyr Gln Gln Gln Pro Met Arg Glu Met Cys Val Ala Val Gln Glu
            260                 265                 270

Lys Gln Leu Leu Gly Gly Thr Ile Glu Lys Met Asn Leu Tyr Tyr Leu
        275                 280                 285

Ile


<210> SEQ ID NO 10
<211> LENGTH: 290
<212> TYPE: PRT
<213> ORGANISM: Planktothrix rubescens

<400> SEQUENCE: 10

Met Thr Tyr Pro Ser Leu Leu Thr Ala Ser Gln Lys Asn Leu Gln Phe
1               5                   10                  15

Ile Gly Glu His Lys Asn Ala Phe Asp Leu Glu Tyr Leu Tyr Pro Leu
            20                  25                  30

Asp Leu Phe Glu Asp Leu Val Ala Gln Val Glu Pro Cys Arg Ile Glu
        35                  40                  45

Cys Ser Cys Lys Ile Glu Asp Asp Lys Leu Asp Pro Ala Arg Phe Asn
    50                  55                  60

Leu Ala Ile Asn Asp Ser Phe Ala Arg Lys Ala Gln Ala Phe Leu Gly
65                  70                  75                  80

Phe Phe His Gln Val Glu Thr Arg Val Gly Val Ile Ile Asp Tyr Lys
                85                  90                  95

Pro Leu His Phe Phe Met Lys Gly Phe Asp Tyr Ser Lys Val Thr Gln
```

```
            100                 105                 110

Ile Met Ala Gly Ile Asp Ala Arg Ala Glu Leu Thr Glu Ala Arg Val
        115                 120                 125

Lys Thr Trp Trp Ala Ile Asp Asn Tyr Pro Glu Lys Leu Glu Thr Ala
    130                 135                 140

Ile Ala Leu Ser Gln Ser Asp Ser Lys Pro Leu Arg Met Leu Leu Glu
145                 150                 155                 160

Ile Asn Asn Ser Leu Val Ile Gly Phe His Leu Tyr Leu Arg Gly Lys
                165                 170                 175

Ser Glu Val Arg Leu Tyr Pro Ser Val Gly Arg Glu Asp Phe Gln Lys
            180                 185                 190

Ile Ser Val Gln Ala Gln Leu Ala Lys Ile Ile Ser Thr Pro Ala Leu
        195                 200                 205

Lys Leu Leu Glu Asp Ser Gly Ala Ile Ser Leu Val Leu Lys Glu Asn
    210                 215                 220

Gly Asp Lys Ile Leu His Tyr His Val Leu Pro Glu Arg Val Asn Ser
225                 230                 235                 240

Phe Val Asp Asn Leu His Gln Asp Met Ile Thr Arg Ala His Ala Pro
                245                 250                 255

Tyr Arg Asn Lys Ser Gln Ser Leu Gly Cys Thr Val Ser Leu Ser Glu
            260                 265                 270

Lys Glu Leu Ile Ala Gly Ser Leu Lys Thr Ile Asn Leu Tyr Tyr Met
        275                 280                 285

Asn Gln
    290


<210> SEQ ID NO 11
<211> LENGTH: 290
<212> TYPE: PRT
<213> ORGANISM: Planktothrix agardhii

<400> SEQUENCE: 11

Met Thr His Pro Ser Leu Leu Thr Val Ser Gln Lys Asn Leu Gln Phe
1               5                   10                  15

Ile Gly Glu His Lys Asn Ala Phe Asp Leu Glu Tyr Leu Tyr Pro Leu
            20                  25                  30

Asp Leu Phe Glu Asp Leu Val Ala Gln Val Glu Pro Cys Arg Ile Glu
        35                  40                  45

Cys Ser Cys Lys Ile Glu Asn Asn Lys Leu Asp Pro Ala Arg Phe Asn
    50                  55                  60

Leu Ala Ile Asn Asp Ser Phe Ala Arg Lys Ala Gln Ala Phe Leu Gly
65                  70                  75                  80

Phe Phe His Gln Val Glu Thr Arg Val Gly Val Ile Ile Asp Tyr Lys
                85                  90                  95

Pro Leu His Phe Phe Met Lys Gly Phe Asp Tyr Ser Lys Val Thr Gln
            100                 105                 110

Ile Met Ala Gly Ile Asp Ala Arg Ala Glu Leu Thr Glu Ala Arg Val
        115                 120                 125

Lys Thr Trp Trp Ala Ile Asp Asn Tyr Pro Glu Lys Leu Glu Thr Ala
    130                 135                 140

Ile Ala Leu Ser Gln Ser Asp Ser Lys Pro Leu Arg Met Leu Leu Glu
145                 150                 155                 160

Ile Asn Asn Ser Leu Val Ile Gly Phe His Leu Tyr Leu Arg Gly Lys
                165                 170                 175
```

-continued

```
Ser Glu Val Arg Leu Tyr Pro Ser Val Ser Arg Glu Asp Phe Lys Lys
            180                 185                 190

Val Ser Val Gln Ala Gln Leu Ala Lys Ile Leu Ser Thr Pro Ala Leu
        195                 200                 205

Lys Leu Leu Glu Asp Ser Val Ala Ile Ser Leu Val Leu Lys Lys Asn
    210                 215                 220

Gly Asp Lys Ile Leu His Tyr His Val Leu Pro Glu Arg Val Asn Ser
225                 230                 235                 240

Phe Val Asp Asn Leu His Gln Asp Met Ile Thr Arg Ala His Ala Pro
                245                 250                 255

Tyr Arg Asn Lys Ser Gln Ser Leu Gly Cys Thr Val Ser Leu Ser Glu
            260                 265                 270

Lys Glu Leu Ile Ala Gly Ser Leu Lys Thr Ile Asn Leu Tyr Tyr Met
        275                 280                 285

Asn Gln
    290


<210> SEQ ID NO 12
<211> LENGTH: 289
<212> TYPE: PRT
<213> ORGANISM: Microcystis aeruginosa

<400> SEQUENCE: 12

Met Ala Thr Ser Leu Glu Ser Ser Lys Lys Asn Tyr Tyr Ile Ser Thr
1               5                   10                  15

His Lys Gln Ala Phe Asp Val Glu Asn Phe Tyr Pro Leu Glu Ile Trp
            20                  25                  30

Glu Lys Phe Val Glu Lys Ile Glu Lys Thr Ser Glu Lys Cys Phe Leu
        35                  40                  45

Glu Ser Ser Cys Lys Ile Asp Gln Gly Gln Phe Tyr Ala Ala Arg Phe
    50                  55                  60

Gly Ile Gly Phe Asp Leu Gln Asn Leu Gln Gln Leu Asn Ala Val Tyr
65                  70                  75                  80

Asn Phe Cys Gln Glu Val Glu Ser Arg Val Gly Val Arg Val Asp Tyr
                85                  90                  95

Ser Leu Ile Lys Gln Phe Leu Gly Asp Asp Phe Asp Phe Ser Lys Met
            100                 105                 110

Thr Glu Phe Leu Ile Gly Val Asp Ala Arg Arg Glu Leu Ala Glu Ser
        115                 120                 125

Lys Leu Lys Ile Ala Leu Thr Ile Asn Asp Tyr Pro Glu Lys Leu Lys
    130                 135                 140

Thr Ala Ile Tyr Leu Asn Gly Gly Leu Asp Glu Thr Ile Glu Lys Leu
145                 150                 155                 160

Ile Val Ser Asn Ser Leu His Leu Gly Phe Asp Leu Ser Leu Asn Gly
                165                 170                 175

Ile Ser Glu Ile Glu Leu Tyr Pro Tyr Ile Gly Lys Gln Asp Phe Gln
            180                 185                 190

Arg Ile Asp Ile Gln Gln Arg Leu Ala Thr Val Leu Ser Pro Gln Ala
        195                 200                 205

Leu Arg Pro Leu Ala Ala Cys Arg Arg Ile Cys Val Gly Leu Ser Lys
    210                 215                 220

Gly Asn Thr Glu Lys Ile Leu Tyr Tyr Tyr Leu Glu Asp Ile Lys Asp
225                 230                 235                 240

Phe Leu Asn Tyr Phe Thr Pro Asn Asp Thr Ala Arg Arg Val His Ala
                245                 250                 255
```

```
Tyr Tyr Gln Lys Gln Pro Ile Ser Glu Met Cys Val Ala Ala Pro Glu
            260                 265                 270

Ser Gln Phe Ile Ala Glu Lys Ile Glu Lys Met Asn Leu Tyr Tyr Leu
        275                 280                 285

Phe


<210> SEQ ID NO 13
<211> LENGTH: 302
<212> TYPE: PRT
<213> ORGANISM: Nostoc sp. 'Peltigera membranacea cyanobiont' 232

<400> SEQUENCE: 13

Met Pro Leu Thr Asp Phe Ser Ile Ser Asn Lys Gln Val Leu Lys Phe
1               5                   10                  15

Ile Ser Tyr His Lys Thr Ser Phe Asp Ile Gly Tyr Ile Tyr Pro Leu
            20                  25                  30

Asp Leu Phe Glu Arg Phe Ala Thr Ile Asn Lys Leu Thr Met Val Glu
        35                  40                  45

Cys Ser Cys Lys Val Lys Gln Asn Ile Val Tyr Pro Met Arg Phe Asp
    50                  55                  60

Ile Ser Leu Phe Gly Ser Asn Tyr Ala Gln Lys Leu Asn His Val Met
65                  70                  75                  80

Leu Phe Phe Gln Glu Ile Asn Ser Arg Val Gly Val Asn Leu Asn Leu
                85                  90                  95

Glu Trp Leu Thr Thr Phe Phe Asp Arg Gly Phe Lys Phe Ser Ala Ile
            100                 105                 110

Leu Gly Phe Asn Val Ala Ile Asp Leu Arg Thr Glu Leu Lys Asp Ser
        115                 120                 125

Arg Ile Lys Leu Leu Ile Gly Leu Asn Asn Gln Glu Tyr Pro Glu Lys
    130                 135                 140

Val Glu Thr Ala Leu Lys Ser Cys Gly Leu Glu Ser Gln Gln Gly Ile
145                 150                 155                 160

Arg Thr Leu Leu Ile His Ser Ser Tyr Leu Val Ile Gly Phe Asp Leu
                165                 170                 175

Tyr Leu Asp Gly Arg Tyr Asp Ser Gln Leu Asp Ile Thr Leu Lys Pro
            180                 185                 190

Asp Val Leu Gln Asn Thr Glu Val His Gln Tyr Leu Leu Asn Leu Ile
        195                 200                 205

Ser Ala Ser Ala Leu Arg Pro Val Pro Leu Cys Asn Glu Phe Ala Val
    210                 215                 220

Ser Phe Ser Gln Met Ser Lys Asp Lys Ala Ile Tyr Tyr Asp Leu Lys
225                 230                 235                 240

Asn Leu Asp Asp Phe Ser Thr Gly Phe Ser Asn Cys Leu Arg Leu Ser
                245                 250                 255

Glu Val Ser Lys Thr Ile His Ser Ile Tyr Arg Ser His Ser Ile Ala
            260                 265                 270

Thr Ala Met Gly Val Val Val Ser Asp Asn Glu Phe Arg Gly Asp Ile
        275                 280                 285

Ile Gln Asn Phe Asn Leu Lys Tyr Arg Ile Tyr Gly Arg Thr
    290                 295                 300


<210> SEQ ID NO 14
<211> LENGTH: 296
<212> TYPE: PRT
<213> ORGANISM: Microcystis aeruginosa PCC 7005
```

<400> SEQUENCE: 14

Met Ile Val Ala Glu Ile Gln Lys Asn Ser Leu Lys Glu Gln Arg Ile
1               5                   10                  15

Lys Phe Ile Arg Asn His Gln Gln Ala Phe Asp Val Glu Pro Ile Tyr
            20                  25                  30

Pro Leu Arg Leu Phe Glu Asp Phe Val Met Ser Val Glu Gly Asp Cys
        35                  40                  45

Ser Ile Glu Ala Ser Cys Lys Ile Glu Leu Asp Lys Leu Ile Ala Ser
    50                  55                  60

Arg Phe Met Leu Phe Phe Lys Asp Gln Glu Trp Glu Lys Tyr Leu Thr
65                  70                  75                  80

Gln Ser Leu Ala Phe Phe Arg Gln Val Glu Asn Arg Val Gly Val Gln
                85                  90                  95

Leu Asp Tyr Ser Leu Leu Gln Lys Phe Leu Gly His Asn Phe Asp Phe
            100                 105                 110

Ser Lys Leu Glu Val Leu Ser Ala Gly Leu Asp Leu Arg Thr Asn Leu
        115                 120                 125

Ala Asp Ser Ser Leu Lys Ile His Ile Arg Ile Lys Asp Tyr Pro Glu
    130                 135                 140

Lys Ile Asn Gln Ala Leu Ser Leu Thr Ile Asp Gly Asp Asp Leu Thr
145                 150                 155                 160

Ala Val Arg Asp Phe Leu Ser Val Val Gly Phe Asp Phe Tyr Phe Asp
                165                 170                 175

Gly Arg Ser Ala Ile Glu Ile Tyr Pro Glu Val Lys Glu Glu Asp Phe
            180                 185                 190

Phe Lys Pro Lys Thr Gln Glu Lys Val Trp Gln His Leu Pro Lys Phe
        195                 200                 205

Val Leu Glu Pro Leu Gln Val Thr Asn Leu Phe Gly Phe Gly Phe Ser
    210                 215                 220

Lys Thr Asn His Asn Pro Val Val Tyr Tyr Arg Leu Lys Gly Arg Gln
225                 230                 235                 240

Asp Leu Thr Asn Tyr Phe Lys Ile Asn Asp Thr Ala Gln Arg Val His
                245                 250                 255

Ser Phe Tyr Gln His Gln Asp Ile Leu Pro Asn Met Trp Val Gly Thr
            260                 265                 270

Thr Gln Lys Glu Leu Glu Lys Thr Arg Ile Glu Asn Ile Arg Leu Tyr
        275                 280                 285

Tyr Tyr Lys Ser Phe Lys Met Glu
    290                 295

<210> SEQ ID NO 15
<211> LENGTH: 296
<212> TYPE: PRT
<213> ORGANISM: Anabaena sp. 90

<400> SEQUENCE: 15

Met Ile Ala Asn Val Thr Gln Lys Asp Arg Phe Gln Glu Gln Lys Leu
1               5                   10                  15

Gln Phe Ile Arg Asn His Gln Gln Ala Phe Asp Val Glu Pro Ile Tyr
            20                  25                  30

Pro Leu Pro Leu Phe Glu Asp Phe Val Met Asn Val Glu Gly Asp Cys
        35                  40                  45

Ser Ile Glu Ala Ser Cys Lys Ile Glu Leu Asp Lys Leu Ile Ala Ser
    50                  55                  60

```
Arg Phe Met Phe Phe Phe Lys Asp Lys Ala Gln Gln Trp Gln Lys Tyr
65                  70                  75                  80

Leu His Gln Ser Leu Thr Phe Phe Asn Arg Val Glu Asn Leu Val Gly
                85                  90                  95

Val Gln Val Asp Tyr Ser Leu Leu Arg Gln Phe Leu Gly Ser Asp Phe
            100                 105                 110

Asp Phe Arg Lys Val Thr Val Leu Ser Ala Gly Ile Asp Leu Arg Ser
        115                 120                 125

Asn Ile Ala Glu Ser Ser Leu Lys Met His Ile Arg Ile Lys Asp Tyr
    130                 135                 140

Pro Glu Lys Leu Asp Gln Ala Leu Ser Leu Ala Ser Asn Ala Glu Asp
145                 150                 155                 160

Leu Ile Ser Val Arg Pro Phe Leu Ser Leu Val Gly Phe Asp Phe Tyr
                165                 170                 175

Phe Asn Gly Arg Ser Glu Ile Glu Leu Tyr Pro Glu Ile Gln Ala Glu
            180                 185                 190

Asp Phe Ala Lys Ser Glu Thr Gln Asn Leu Val Trp Arg His Phe Pro
        195                 200                 205

Lys Phe Val Leu Asp Pro Leu Glu Val Thr Gly Ser Phe Leu Val Gly
    210                 215                 220

Phe Ser Lys Ala Asn Pro Asn Pro Val Leu Tyr Tyr Asn Leu Lys Asn
225                 230                 235                 240

Lys Gln Asp Leu Ala Asn Tyr Phe Lys Leu Asn Asp Ala Ala Gln Arg
                245                 250                 255

Val His Ser Phe Tyr Gln Asn Gln Asp Ile Leu Pro His Met Trp Val
            260                 265                 270

Gly Thr Val Gln Lys Glu Leu Glu Lys Thr Arg Ile Glu Asn Val Arg
        275                 280                 285

Leu Tyr Tyr Tyr Lys Phe Phe Asn
    290                 295


<210> SEQ ID NO 16
<211> LENGTH: 310
<212> TYPE: PRT
<213> ORGANISM: Kamptonema

<400> SEQUENCE: 16

Met Ile Ile Leu Ser Ala Ser Asp Ser Thr Arg Pro Ile Phe Thr Leu
1               5                   10                  15

Pro Lys Pro Leu Thr Gln Glu Gln Lys Leu His Cys Ile Asn Ala His
            20                  25                  30

Arg Gln Ala Phe Asp Val Gln Pro Leu Tyr Pro Leu Asp Ile Phe Gln
        35                  40                  45

Asp Phe Ile Thr Lys Thr Asp Gly Ile Asp Thr Ile Glu Ala Ser Cys
    50                  55                  60

Lys Ile Glu Ala Asp Lys Leu Gln Ala Ala Arg Phe Val Ala Leu Ser
65                  70                  75                  80

Ser Gln Glu Ile Glu Arg Lys Leu Thr Glu Phe Leu Thr Phe Phe Arg
                85                  90                  95

Gln Val Glu Ser Arg Val Asp Val Gln Leu Asn Tyr Asp Leu Leu His
            100                 105                 110

Lys Phe Leu Gly Lys Ser Phe Asp Phe Ser Lys Val Thr Arg Ile Thr
        115                 120                 125

Thr Gly Val Asp Leu Arg Pro Asn Ile Ser Asp Ser Ser Leu Lys Ile
```

```
    130                 135                 140

His Ile Arg Leu Asn Asp His Pro Glu Asn Leu Lys Lys Ile Glu Ala
145                 150                 155                 160

Ala Leu Thr Leu Asp Gly Asn Asp Ser Thr Ala Gln Arg Trp Ile Ala
                165                 170                 175

Leu Gln Thr Val His Leu Ile Gly Phe Asp Phe Tyr Leu Asn Gly Arg
            180                 185                 190

Ser Glu Ile Glu Leu Tyr Cys Glu Leu Thr Glu Lys Gln Phe Gln Gln
        195                 200                 205

Pro Asp Ile Gln Ser Phe Leu Gln Gln Thr Phe Pro Pro Phe Val Leu
    210                 215                 220

Glu Pro Leu Lys Val Ser Ser Val Phe Phe Thr Gly Leu Ser Lys Asp
225                 230                 235                 240

Asn Thr Glu Pro Val Leu Tyr Tyr Cys Leu Lys Asp Lys Lys Asp Leu
                245                 250                 255

Leu Ser Tyr Phe Pro Ile Asn Asp Thr Ala Gln Arg Val His Ala Phe
            260                 265                 270

Tyr Gln Asn Gln Pro Val Tyr Ser Ser Met Trp Val Gly Val Ala Gln
        275                 280                 285

Gly Glu Leu Gln Lys Thr Arg Ile Asp Asn Ile Arg Leu Tyr Tyr Ser
    290                 295                 300

Lys Lys Asn Tyr Ser Lys
305                 310


<210> SEQ ID NO 17
<211> LENGTH: 269
<212> TYPE: PRT
<213> ORGANISM: Aphanizomenon flos-aquae

<400> SEQUENCE: 17

Met Ile Ala Asn Val Thr Gln Lys Asp Arg Phe Gln Glu Gln Lys Leu
1               5                   10                  15

Gln Phe Ile Arg Asn His Gln Gln Ala Phe Asp Val Glu Pro Ile Tyr
            20                  25                  30

Pro Leu Pro Leu Phe Glu Asp Phe Val Met Asn Val Glu Gly Asp Cys
        35                  40                  45

Ser Ile Glu Ala Ser Cys Lys Ile Glu Leu Asp Lys Leu Ile Ala Ser
    50                  55                  60

Arg Phe Met Phe Phe Phe Lys Asp Lys Ala Gln Gln Trp Gln Lys Tyr
65                  70                  75                  80

Leu His Gln Ser Leu Thr Phe Phe Asn Arg Val Glu Asn Leu Val Gly
                85                  90                  95

Val Gln Ile Asp Tyr Ser Leu Leu Gln Gln Phe Leu Gly Ser Asp Phe
            100                 105                 110

Asp Phe Arg Lys Val Thr Val Leu Ser Ala Gly Ile Asp Leu Arg Ser
        115                 120                 125

Asn Leu Ala Glu Ser Ser Leu Lys Met His Ile Arg Ile Lys Asp Tyr
    130                 135                 140

Pro Glu Lys Leu Asp Gln Ala Leu Ser Leu Ala Ser Asn Ala Glu Asp
145                 150                 155                 160

Leu Ile Ser Val Arg Pro Phe Leu Ser Leu Val Gly Phe Asp Phe Tyr
                165                 170                 175

Phe Asn Gly Arg Ser Glu Ile Glu Leu Tyr Pro Glu Ile Gln Ala Glu
            180                 185                 190
```

-continued

```
Asp Phe Ala Lys Ser Glu Thr Gln Asn Leu Val Trp Arg His Phe Pro
        195                 200                 205

Lys Phe Val Leu Asp Pro Leu Glu Val Thr Gly Ser Phe Leu Val Gly
    210                 215                 220

Leu Ser Lys Ala Asn Pro Asn Pro Val Leu Tyr Tyr Asn Leu Lys Asn
225                 230                 235                 240

Lys Gln Asp Leu Ala Asn Tyr Phe Lys Leu Asn Asp Ala Ala Gln Arg
                245                 250                 255

Val His Ser Phe Tyr Gln Asn Gln Asp Ile Leu Pro Lys
            260                 265


<210> SEQ ID NO 18
<211> LENGTH: 308
<212> TYPE: PRT
<213> ORGANISM: Lyngbya sp. PCC 8106

<400> SEQUENCE: 18

Met Thr Ile Met Ala Ile Ala Asn Arg Val Pro Tyr Asn Tyr Leu Arg
1               5                   10                  15

Glu Gln Arg Ile Gln Phe Met His Ala His Gln Asp Ala Phe Asp Val
            20                  25                  30

Ser Thr Val Phe Pro Leu Pro Leu Phe Glu Lys Leu Val Thr Glu Leu
        35                  40                  45

Glu Gly Ser Asn Val Ile Glu Leu Ser Cys Lys Ile Glu Ala Asp Lys
    50                  55                  60

Leu Leu Ala Gly Arg Phe Leu Ile Phe Ser Asp Gln Glu Asn Asn Trp
65                  70                  75                  80

His Gln Ser Leu Ala Gln Ala Leu Gln Phe Leu Asp Ser Ile Glu Ser
                85                  90                  95

Arg Val Gly Val Glu Ile Asn Arg Glu Ser Leu Asp Lys Phe Leu Ala
            100                 105                 110

Ala His Ile Asn Ser Gly Lys Ile Met Gly Ile Ser Thr Gly Leu Asp
        115                 120                 125

Leu Arg Pro Glu Leu Glu Asn Ser Ser Val Lys Ile His Ile Met Leu
    130                 135                 140

Gly Glu Asn Ser Glu Glu Leu Val Arg Thr Ala Ile Ala Ile Asp Gly
145                 150                 155                 160

Ser His Tyr Pro Val Glu Leu Ala Gln Val Leu Leu Lys Asp Thr Met
                165                 170                 175

Met Ile Gly Phe Asp Phe Phe Leu Asn Gly His Ser Glu Val Glu Leu
            180                 185                 190

Tyr Ile Ser Cys Ser Arg Lys Lys Asp Ser Leu Pro Asn Asn Arg Gly
        195                 200                 205

Glu Ser Thr Arg Tyr Tyr Ile Arg Gln Lys Phe Ser Pro Lys Val Ser
    210                 215                 220

Ser Leu Leu Asp Ala Ser Asp Phe Phe Val Gly Gly Phe Ser Lys Ala
225                 230                 235                 240

Asn Val Glu Pro Val Leu Tyr Tyr Ala Phe Glu Asn Ile Lys Asp Ile
                245                 250                 255

Pro Lys Tyr Phe Val Phe Asn Asp Leu Gly Asn Arg Val Tyr Asp Phe
            260                 265                 270

Cys Arg Ser Gln Asp Ser Ile Thr Met Thr Trp Ile Gly Ile Asn Glu
        275                 280                 285

Arg Asp Leu Asp Arg Glu Arg Leu Asn Asn Phe Arg Leu Tyr Tyr Arg
    290                 295                 300
```

-continued

Arg Ser Phe Gly
305

<210> SEQ ID NO 19
<211> LENGTH: 306
<212> TYPE: PRT
<213> ORGANISM: uncultured Prochloron sp. 06037A

<400> SEQUENCE: 19

```
Met Ile Met Thr Thr Thr Trp Pro Asp Ser Tyr Ala Lys Glu Arg Arg
1               5                   10                  15

Ile Gln Arg Leu Arg His His Phe Glu Ser Phe Asp Val Glu Arg Ala
            20                  25                  30

Phe Pro Leu Pro Leu Phe Glu Gln Ala Val Leu Ser Leu Asp Ser Cys
        35                  40                  45

Pro Leu Leu Glu Pro Ser Phe Lys Val Gln Glu Gly Ile Leu Phe Ala
    50                  55                  60

Gly Arg Val Thr Thr Ser Thr Gly Thr Glu Asp Trp Gln His Leu Ile
65                  70                  75                  80

Ser Thr Ala Leu Asn Phe Phe Asp Ala Val Glu Ser Arg Val Glu Val
                85                  90                  95

Thr Ile Asp Arg Gly Leu Leu Glu Lys Phe Leu Thr Leu His Gln Asn
            100                 105                 110

Ser Asp Lys Ile Glu Ala Ser Leu Met Gly Ile Asp Leu Arg Pro Asn
        115                 120                 125

Val Lys Glu Ser Ser Leu Lys Val His Leu Arg Leu Asp Pro Gln Gln
    130                 135                 140

Asp Ala Asp Glu Leu Val Met Thr Ala Ile Asp Leu Asp Gly Gly Asp
145                 150                 155                 160

Tyr Ser Pro Glu Leu Thr Gln Val Leu Leu Lys Asp Thr Phe Leu Ile
                165                 170                 175

Gly Phe Asp Phe Phe Leu Asp Gly Gly Ser Ala Val Glu Met Tyr Thr
            180                 185                 190

Ile Cys Pro Gly Lys Lys Pro Leu Ala Met Leu Gly Lys Lys Gly Ala
        195                 200                 205

Tyr Leu Lys Pro Tyr Val Leu Ser Asn Phe Ser His Lys Val Thr Ser
    210                 215                 220

Leu Leu Gln Glu Val Ala Ala Leu Thr Val Gly Phe Ser Lys Glu Asn
225                 230                 235                 240

Pro Arg Pro Val Leu Tyr Phe Glu Phe Glu Thr Leu Arg Glu Val Lys
                245                 250                 255

Tyr Asn Leu Leu Phe Asn Ser Leu Gly Asp Lys Ile Tyr Asp Phe Cys
            260                 265                 270

Leu His Asn Gln Ile Glu Asn Phe Val Ser Ile Gly Val Thr Glu Pro
        275                 280                 285

Asp Leu Glu Lys Arg Arg Leu Glu Asn Phe Arg Phe Tyr Tyr Arg Lys
    290                 295                 300

Ala Val
305
```

<210> SEQ ID NO 20
<211> LENGTH: 320
<212> TYPE: PRT
<213> ORGANISM: Prochloron didemni

<400> SEQUENCE: 20

Met Asp Leu Ile Asp Arg Leu Gln Asn Asn Gln Arg Lys Asp Arg Arg
1               5                   10                  15

Leu Gln Phe Val Arg Thr His Gln Glu Ala Phe Asp Val Lys Pro Thr
            20                  25                  30

Phe Pro Leu Pro Leu Phe Glu Glu Ala Ile Leu Glu Ile Glu Gly Ser
        35                  40                  45

Cys Ser Val Glu Ser Ser Cys Gln Val Glu Gly Asp Arg Leu Gln Gly
    50                  55                  60

Gly Arg Tyr Glu Val Cys Asn Asn Gln Gly Thr Thr Trp Pro Glu Ser
65                  70                  75                  80

Leu Thr His Ala Phe Lys Leu Leu Asp Lys Ile Asp Ser Gln Leu Gly
                85                  90                  95

Val Arg Ile Asn Arg Asp Ser Phe Asp Arg Phe Ala Ala Ala His Val
            100                 105                 110

Asn Ser Arg Lys Ile Ile Asn Asn Thr Ile Gly Val His Leu Gly Ser
        115                 120                 125

Lys Leu Glu Asp Ser Ser Val Met Leu Tyr Ile His Ile Lys Pro Glu
    130                 135                 140

Glu Asp Thr Glu Glu Leu Ala Arg Thr Ala Leu Val Leu Asp Gly Gly
145                 150                 155                 160

Arg Tyr Ser Asp Glu Leu Thr Arg Val Leu Leu Arg Asp Thr Met Val
                165                 170                 175

Ile Gly Phe Glu Leu Phe Phe Asp Gly Arg Ser Arg Val Asp Leu Gly
            180                 185                 190

Pro Cys Ala Pro Gly Lys Ser Gly Thr Leu Lys Met Lys Gly Lys His
        195                 200                 205

Leu Glu Gln Tyr Thr Gln Lys Asn Leu Ser Arg Lys Val Asn Ser Ile
    210                 215                 220

Phe Arg Glu Gly Tyr Leu Phe Gly Ala Phe Phe Ser Lys Thr Arg Val
225                 230                 235                 240

Glu Pro Ile Leu Phe Phe Tyr His Ser Ile Ile Lys Asp Leu Pro Lys
                245                 250                 255

Tyr Phe Thr Phe Asn Ser Leu Gly Asp Lys Ile Tyr Asn Phe Cys Gln
            260                 265                 270

Ser Gln Gly Cys Ile Thr Asp Val Ala Ile Ala Val Thr Glu Thr Glu
        275                 280                 285

Leu Glu Lys Ser Arg Leu Glu Asn Phe Cys Phe Tyr Tyr Asp Gln Trp
    290                 295                 300

Asp Glu Cys Lys Pro Ser Ser Asp Tyr Asp Thr Glu Arg His Leu His
305                 310                 315                 320

<210> SEQ ID NO 21
<211> LENGTH: 312
<212> TYPE: PRT
<213> ORGANISM: uncultured Prochloron sp. 06037A

<400> SEQUENCE: 21

Met Val Leu Ser Gln Leu Ser Lys Gln Thr Asn Leu Arg Glu Asn Arg
1               5                   10                  15

Leu Arg Cys Ile Arg Thr His Leu Glu Ala Phe Asp Ile Glu Pro Val
            20                  25                  30

Leu Gln Ile Ser Leu Phe Glu Glu Val Ile Met Glu Val Glu Gly Ser
        35                  40                  45

Cys Asn Val Lys Cys Ser Cys Lys Val Glu Arg Asp Arg Leu Phe Ala

-continued

```
    50                  55                  60

Cys Gln Phe Thr Leu Ala Tyr Ser Gln Gln Lys Trp Pro Lys Thr Leu
65                  70                  75                  80

Lys Tyr Asn Ala Ile Leu Phe Asp Lys Ile Lys Ser Gln Val Gly Ile
                85                  90                  95

Cys Ile Asp Ser Ser Lys Phe Glu Gln Phe Ser Arg Leu His Val Asn
            100                 105                 110

Ser Asp Lys Ile Leu Asp Ser Thr Val Gly Ile Asp Leu Arg Pro Lys
        115                 120                 125

Ser Gln Asp Ser Cys Ile Arg Ile Ser Val His Leu Glu Pro Lys Glu
    130                 135                 140

Ser Pro Glu Glu Leu Val Arg Thr Ala Leu Ala Leu Asp Asn Ala Thr
145                 150                 155                 160

Tyr Thr Ser Glu Leu Thr Gln Val Phe Leu Gln Asp Cys Thr Ala Ile
                165                 170                 175

Ile Phe Glu Cys Phe Phe Asp Gly Arg Ser Arg Ile Glu Leu Gly Ala
            180                 185                 190

Val Ala Pro Gly Lys Lys His Gly Phe Ser Gly Asn His Gly Arg Ala
        195                 200                 205

Leu Thr Ala Tyr Ala Gln Lys Tyr Phe Ser Pro Lys Ala Val Ser Leu
    210                 215                 220

Ser Glu Val Ser Asp Leu Phe Gly Met Thr Ile Ser Lys Tyr Lys Ala
225                 230                 235                 240

Glu Pro Val Leu His Phe Gly Phe Asn Asn Ile Lys Asp Ile Ser Asn
                245                 250                 255

Tyr Phe Leu Phe Asn Thr Leu Gly Asn Arg Ile Tyr Ser Phe Cys Gln
            260                 265                 270

Asn Gln Asp Cys Ile Leu Leu Ala Ile Ile Gly Val Asn Glu Lys Glu
        275                 280                 285

Leu Tyr Ser Asn Arg Leu Glu Asn Phe Leu Phe Asp Tyr Ala Lys Asn
    290                 295                 300

Asp Glu Ser Arg Met Met Arg Val
305                 310


<210> SEQ ID NO 22
<211> LENGTH: 304
<212> TYPE: PRT
<213> ORGANISM: Arthrospira sp. PCC 8005

<400> SEQUENCE: 22

Met Asn Cys Thr Ser Ile Leu Gln Gln Asn His Leu Arg Glu Lys Arg
1               5                   10                  15

Leu Gln Phe Ile Arg Ala His Gln Thr Ala Phe Glu Val Glu Pro Val
            20                  25                  30

Phe Pro Leu Gln Leu Phe Glu Asp Phe Val Val Ser Val Glu Gly Asp
        35                  40                  45

Cys Thr Ile Glu Ala Ser Cys Lys Val Glu Ser Asp His Leu Ile Ala
    50                  55                  60

Ser Arg Phe Leu Leu Phe Phe Gln Glu Met Thr Gln Ser Trp Pro Gln
65                  70                  75                  80

Lys Leu Asp Gln Ala Phe Arg Phe Phe His Gln Thr Glu Asn Gln Val
                85                  90                  95

Asp Val His Leu Asp Tyr Gly Leu Leu Gln His Phe Leu Gly Asn Asp
            100                 105                 110
```

```
Phe Asp Phe Ser Lys Met Ser Val Leu Ser Thr Gly Ile Asp Leu Arg
        115                 120                 125

Gln Asn Leu Ala Asp Ser Ser Leu Lys Met His Ile Thr Ile Glu Asp
    130                 135                 140

Tyr Pro Glu Lys Ile Ala Thr Ala Phe Ser Leu Ala Lys Leu Pro Arg
145                 150                 155                 160

Asp Asn Phe His Gln Ile Leu Leu Ser Ser Val Ser Leu Ile Gly Phe
                165                 170                 175

Asp Phe Tyr Leu Asp Gly Arg Ser Glu Ile Glu Leu Tyr Ala Ser Leu
            180                 185                 190

Lys Glu Glu Glu Phe Asn Ser Pro His Val Gln Ser Phe Leu Ala Ser
        195                 200                 205

Ile Phe Cys Ala Ser Ala Leu Lys Pro Leu Gly Ala Ser Ser Ser Phe
    210                 215                 220

Tyr Met Gly Leu Ser Ile Ala Asn Glu Asn Pro Val Leu Tyr Tyr Leu
225                 230                 235                 240

Leu Lys Asn Lys Gln Glu Leu Gln Asn Tyr Phe Arg Leu Asn Asp Met
                245                 250                 255

Gly Asn Arg Val His Ser Phe Tyr Asn Gln Gln Glu Ile Leu Pro His
            260                 265                 270

Ala Trp Val Gly Val Ala Glu Gln Glu Leu Gln Gln Gly Arg Ile Glu
        275                 280                 285

Asn Ile Arg Leu Tyr Tyr Tyr Gln Arg Phe Ala Ala Gly Met Thr Gly
    290                 295                 300


<210> SEQ ID NO 23
<211> LENGTH: 308
<212> TYPE: PRT
<213> ORGANISM: Planktothrix agardhii

<400> SEQUENCE: 23

Met Ile Ala Asp Val Ile Gln Lys Asp Arg Ile Lys Glu Gln Lys Leu
1               5                   10                  15

Gln Phe Ile Arg Asn His Gln Gln Ala Phe Asp Val Glu Pro Ile Tyr
            20                  25                  30

Pro Leu Pro Leu Phe Glu Asp Phe Val Met Gly Val Glu Gly Asp Cys
        35                  40                  45

Ser Ile Glu Ala Ser Cys Lys Ile Glu Leu Asp Lys Leu Ile Ala Ser
    50                  55                  60

Arg Phe Leu Leu Leu Phe Phe Lys Asp Lys Ala Gln Gln Trp Gln Lys
65                  70                  75                  80

Tyr Leu His Gln Ser Leu Thr Phe Phe Ser Gln Val Glu Asn Arg Val
                85                  90                  95

Gly Val Gln Ile Asp Tyr Ser Leu Leu Gln Gln Phe Leu Gly Ser Asn
            100                 105                 110

Phe Asp Phe Ser Lys Val Arg Thr Phe Thr Thr Gly Ile Asp Leu Arg
        115                 120                 125

Asn Asn Leu Ala Asp Ser Ser Leu Lys Ile His Phe Arg Ile Glu Asp
    130                 135                 140

Tyr Pro Glu Lys Leu Glu Thr Ser Leu Ala Leu Ser Gly Asp Ser Ile
145                 150                 155                 160

Ser Ser Leu Ile Lys Glu Leu Pro Ser Tyr Pro Leu Thr Lys Leu Ile
                165                 170                 175

Pro Gln Ile Gly Phe Asp Phe Tyr Phe Asn Gly Ser Asn Glu Ile Glu
            180                 185                 190
```

```
Leu Tyr Ile Glu Val Gly Glu Asp Asp Phe Gln His Pro Glu Ile Lys
        195                 200                 205

Glu Phe Leu Trp Gln Arg Phe Ser Lys Ile Ala Leu Glu Pro Leu Lys
    210                 215                 220

Ala Ser Ser Leu Phe His Leu Gly Leu Ser Lys Ala Asn Asn Asp Pro
225                 230                 235                 240

Val Leu Tyr Tyr His Leu Lys Asn Lys Lys Asp Leu Val Asn Tyr Phe
                245                 250                 255

Asn Leu Asn Asp Met Gly Gln Arg Val His Ser Phe Tyr Gln His Gln
            260                 265                 270

Asp Val Gly Val Pro Met Trp Val Gly Thr Ala Gln Lys Glu Leu Glu
        275                 280                 285

Lys Thr Arg Ile Glu Asn Ile Arg Leu Tyr Tyr Tyr Lys Ser Phe Lys
    290                 295                 300

Met Glu Ser Asn
305


<210> SEQ ID NO 24
<211> LENGTH: 307
<212> TYPE: PRT
<213> ORGANISM: Planktothrix agardhii NIES-204

<400> SEQUENCE: 24

Met Ile Ala Asp Val Ile Gln Lys Asp Arg Leu Lys Glu Gln Lys Leu
1               5                   10                  15

Gln Phe Ile Arg Asn His Gln Gln Ala Phe Asp Val Glu Pro Ile Tyr
            20                  25                  30

Pro Leu Pro Leu Phe Glu Asp Phe Val Met Gly Val Glu Gly Asp Cys
        35                  40                  45

Ser Ile Glu Val Ser Cys Lys Ile Glu Ser Asp Lys Leu Ile Ala Ser
    50                  55                  60

Arg Phe Leu Leu Phe Phe Lys Asp Lys Thr Gln Gln Trp Gln Lys Tyr
65                  70                  75                  80

Leu His Gln Ser Leu Thr Phe Phe Ser Gln Val Glu Asn Arg Val Gly
                85                  90                  95

Val Gln Ile Asp Tyr Ser Leu Leu Gln Gln Phe Leu Gly Ser Asn Phe
            100                 105                 110

Asp Phe Ser Lys Val Arg Thr Phe Thr Thr Gly Ile Asp Leu Arg Asn
        115                 120                 125

Asn Leu Ala Asp Ser Ser Leu Lys Ile His Phe Arg Ile Glu Asp Tyr
    130                 135                 140

Pro Glu Lys Leu Glu Thr Ser Leu Ala Leu Ser Gly Asp Ser Ile Ser
145                 150                 155                 160

Ser Leu Ile Lys Glu Leu Pro Ser Tyr Pro Leu Thr Lys Leu Ile Pro
                165                 170                 175

Gln Ile Gly Phe Asp Phe Tyr Phe Asn Gly Ser Asn Glu Ile Glu Leu
            180                 185                 190

Tyr Ile Glu Val Gly Glu Asp Asp Phe Gln His Pro Glu Ile Lys Glu
        195                 200                 205

Phe Leu Trp Gln Arg Phe Ser Lys Ile Ala Leu Glu Pro Leu Lys Ala
    210                 215                 220

Ser Ser Leu Phe His Leu Gly Leu Ser Lys Ala Asn Asn Asp Pro Val
225                 230                 235                 240

Leu Tyr Tyr His Leu Lys Asn Lys Lys Asp Leu Val Asn Tyr Phe Asn
```

-continued

```
                245                 250                 255

Leu Asn Asp Met Gly Gln Arg Val His Ser Phe Tyr Gln His Gln Asp
            260                 265                 270

Val Gly Val Pro Met Trp Val Gly Thr Ala Gln Lys Glu Leu Glu Lys
        275                 280                 285

Thr Arg Ile Glu Asn Ile Arg Leu Tyr Tyr Tyr Lys Ser Phe Lys Met
    290                 295                 300

Glu Ser Asn
305


<210> SEQ ID NO 25
<211> LENGTH: 298
<212> TYPE: PRT
<213> ORGANISM: Microcystis flos-aquae DF17

<400> SEQUENCE: 25

Met Ile Val Ala Asp Ile Gln Lys Ser Phe Leu Lys Glu Gln Arg Leu
1               5                   10                  15

Gln Phe Ile Arg Asn His Gln Gln Ala Phe Asp Val Glu Leu Ile Tyr
            20                  25                  30

Pro Leu Arg Leu Phe Glu Asp Phe Val Met Gly Val Glu Gly Asp Cys
        35                  40                  45

Ser Ile Glu Ala Ser Cys Lys Ile Glu Leu Asp Lys Leu Ile Ala Ser
    50                  55                  60

Arg Phe Met Leu Phe Phe Lys Asp Lys Ala Gln Glu Trp Gln Lys Tyr
65                  70                  75                  80

Leu Ala Gln Ser Leu Ala Phe Phe Arg Gln Val Glu Asn Arg Val Gly
                85                  90                  95

Val Lys Leu Asp Tyr Ser Leu Leu Gln Gln Phe Leu Gly Leu Asn Phe
            100                 105                 110

Asn Phe Ser Lys Ile Thr Val Phe Ser Thr Gly Ile Asp Leu Arg Thr
        115                 120                 125

Asn Leu Ala Asp Ser Ser Leu Lys Met His Ile Arg Leu Lys Asp Tyr
    130                 135                 140

Pro Glu Lys Ile Asn Gln Ala Leu Leu Leu Thr Ser Asp Ser Asp Asp
145                 150                 155                 160

Leu Ile Ala Val Arg Asp Phe Leu Ser Ile Val Gly Phe Asp Phe Tyr
                165                 170                 175

Phe Asp Gly Arg Ser Ala Ile Lys Ile Tyr Pro Glu Val Ala Glu Thr
            180                 185                 190

Asp Phe Phe Lys Pro Glu Thr Gln Asp Lys Val Trp Arg His Leu Pro
        195                 200                 205

Lys Phe Val Leu Glu Pro Leu Lys Ala Thr Ser Leu Phe Cys Phe Gly
    210                 215                 220

Phe Ser Lys Thr Asn Asn Asn Pro Val Leu Tyr Tyr Arg Leu Lys Asn
225                 230                 235                 240

Arg Gln Asp Leu Thr Asn Tyr Phe Lys Leu Asn Asp Thr Ala Gln Arg
                245                 250                 255

Val His Ser Phe Tyr Gln His Gln Asp Ile Leu Ser Ser Val Trp Val
            260                 265                 270

Gly Thr Ala Gln Gln Glu Leu Glu Lys Thr Arg Ile Glu Asn Val Arg
        275                 280                 285

Leu Tyr Tyr Tyr Lys Tyr Phe Gly Met Glu
    290                 295
```

<210> SEQ ID NO 26
<211> LENGTH: 298
<212> TYPE: PRT
<213> ORGANISM: Microcystis aeruginosa

<400> SEQUENCE: 26

```
Met Ile Val Ala Asp Ile Gln Lys Ser Ser Leu Lys Glu Gln Arg Leu
1               5                   10                  15

Gln Phe Ile Arg Asn His Gln Gln Ala Phe Asp Val Glu Leu Ile Tyr
            20                  25                  30

Pro Leu Arg Leu Phe Glu Asp Phe Val Met Gly Val Glu Gly Asp Cys
        35                  40                  45

Ser Ile Glu Ala Ser Cys Lys Ile Glu Leu Asp Lys Leu Ile Ala Ser
    50                  55                  60

Arg Phe Met Leu Phe Phe Lys Asp Lys Ala Gln Glu Trp Gln Lys Tyr
65                  70                  75                  80

Leu Ala Gln Ser Leu Ala Phe Phe Gln Gln Val Glu Asn Arg Val Gly
                85                  90                  95

Val Lys Leu Asp Tyr Ser Leu Leu Gln Gln Phe Leu Gly Leu Asn Phe
            100                 105                 110

Asn Phe Ser Lys Ile Thr Val Phe Ser Thr Gly Ile Asp Leu Arg Thr
        115                 120                 125

Asn Leu Ala Asp Ser Ser Leu Lys Met His Ile Arg Leu Lys Asp Tyr
    130                 135                 140

Pro Glu Lys Ile Asn Gln Ala Leu Leu Leu Thr Ser Asp Ser Asp Asp
145                 150                 155                 160

Leu Ile Ala Val Arg Asp Phe Leu Ser Val Val Gly Phe Asp Phe Tyr
                165                 170                 175

Phe Asp Gly Arg Ser Ala Ile Lys Ile Tyr Pro Glu Val Ala Glu Thr
            180                 185                 190

Asp Phe Phe Lys Pro Glu Thr Gln Asp Lys Val Trp Arg His Leu Pro
        195                 200                 205

Lys Phe Val Leu Glu Pro Leu Lys Ala Thr Ser Leu Phe Gly Phe Gly
    210                 215                 220

Phe Ser Lys Thr Asn Asn Asn Pro Val Leu Tyr Tyr Arg Leu Lys Asn
225                 230                 235                 240

Arg Gln Asp Leu Thr Asn Tyr Phe Lys Leu Asn Asp Thr Ala Gln Arg
                245                 250                 255

Val His Ser Phe Tyr Gln His Gln Asp Ile Leu Pro Asn Met Trp Val
            260                 265                 270

Gly Thr Ser Gln Gln Glu Leu Glu Lys Thr Arg Ile Glu Asn Val Arg
        275                 280                 285

Leu Tyr Tyr Tyr Lys Tyr Phe Gly Met Glu
    290                 295
```

<210> SEQ ID NO 27
<211> LENGTH: 296
<212> TYPE: PRT
<213> ORGANISM: Microcystis aeruginosa

<400> SEQUENCE: 27

```
Met Ile Val Ala Glu Ile Gln Lys Asn Ser Leu Lys Glu Gln Arg Ile
1               5                   10                  15

Lys Phe Ile Arg Asn His Gln Gln Ala Phe Asp Val Glu Pro Ile Tyr
            20                  25                  30
```

```
Pro Leu Arg Leu Phe Glu Asp Phe Val Met Ser Val Glu Gly Asp Cys
        35                  40                  45

Ser Ile Glu Ala Ser Cys Lys Ile Glu Leu Asp Lys Leu Ile Ala Ser
    50                  55                  60

Arg Phe Met Leu Phe Phe Lys Asp Gln Glu Trp Glu Lys Tyr Leu Thr
65                  70                  75                  80

Gln Ser Leu Ala Phe Phe Arg Gln Val Glu Asn Arg Val Gly Val Gln
                85                  90                  95

Leu Asp Tyr Ser Leu Leu Gln Lys Phe Leu Gly His Asn Phe Asp Phe
            100                 105                 110

Ser Lys Leu Glu Val Leu Ser Ala Gly Leu Asp Leu Arg Thr Asn Leu
        115                 120                 125

Ala Asp Ser Ser Leu Lys Ile His Ile Arg Ile Lys Asp Tyr Pro Glu
    130                 135                 140

Lys Ile Asn Gln Ala Leu Ser Leu Thr Ile Asp Gly Asp Asp Leu Ile
145                 150                 155                 160

Ala Val Arg Asp Phe Leu Ser Val Val Gly Phe Asp Phe Tyr Phe Asp
                165                 170                 175

Gly Arg Ser Ala Ile Glu Ile Tyr Pro Glu Val Lys Glu Glu Asp Phe
            180                 185                 190

Phe Lys Pro Lys Thr Gln Glu Lys Val Trp Gln His Leu Pro Lys Phe
        195                 200                 205

Val Leu Glu Pro Leu Gln Val Thr Asn Leu Phe Gly Phe Gly Phe Ser
    210                 215                 220

Lys Thr Asn His Asn Pro Val Val Tyr Tyr Arg Leu Lys Gly Arg Gln
225                 230                 235                 240

Asp Leu Thr Asn Tyr Phe Lys Ile Asn Asp Thr Ala Gln Arg Val His
                245                 250                 255

Ser Phe Tyr Gln His Gln Asp Ile Leu Pro Asn Met Trp Val Gly Thr
            260                 265                 270

Thr Gln Lys Glu Leu Glu Lys Thr Arg Ile Glu Asn Ile Arg Leu Tyr
        275                 280                 285

Tyr Tyr Lys Ser Phe Lys Met Glu
    290                 295


<210> SEQ ID NO 28
<211> LENGTH: 298
<212> TYPE: PRT
<213> ORGANISM: Microcystis flos-aquae TF09

<400> SEQUENCE: 28

Met Ile Val Ala Asp Ile Gln Gln Asn Ser Leu Lys Glu Gln Arg Thr
1               5                   10                  15

Gln Phe Ile Arg Asn His Gln Gln Ala Phe Asp Val Glu Pro Val Tyr
            20                  25                  30

Pro Leu Arg Leu Phe Glu Asp Phe Val Met Gly Val Glu Gly Asp Cys
        35                  40                  45

Thr Ile Glu Ala Ser Cys Lys Ile Glu Leu Asp Lys Leu Ile Ala Ser
    50                  55                  60

Arg Phe Leu Leu Phe Phe Lys Asp Lys Ala Gln Glu Trp Gln Lys Tyr
65                  70                  75                  80

Leu Ala Gln Ser Leu Ala Phe Phe Gln Gln Val Glu Asn Arg Val Gly
                85                  90                  95

Val Gln Leu Asp Tyr Ser Leu Leu Gln Arg Phe Leu Gly Asp Asn Phe
            100                 105                 110
```

```
Asp Phe Ser Lys Leu Glu Val Leu Ser Ala Gly Ile Asp Leu Arg Thr
        115                 120                 125

Asn Leu Ala Asp Ser Ser Val Lys Met His Ile Arg Ile Gly Asp Tyr
    130                 135                 140

Pro Glu Lys Leu Ala Thr Ala Phe Val Leu Ser Asp Gly Val Ala Asp
145                 150                 155                 160

Ser Asn Tyr Leu Ser Gly Phe Val His Leu Ile Gly Phe Asp Phe Tyr
                165                 170                 175

Phe Asn Gly Lys Ser Ala Ile Glu Ile Tyr Ala Glu Val Thr Glu Asp
            180                 185                 190

Asp Phe Phe Lys Pro Glu Ile Ile Asn Gln Val Trp Gln His Phe Pro
        195                 200                 205

Lys Ser Ala Leu Lys Pro Leu Gln Ala Ser Ser Leu Phe Phe Thr Gly
    210                 215                 220

Leu Ser Lys Ala Asn His Asn Pro Val Leu Tyr Tyr His Leu Lys Asn
225                 230                 235                 240

Lys Gln Asp Leu Ala Asn Tyr Phe Lys Leu Asn Asp Thr Ala Gln Arg
                245                 250                 255

Val His Ser Phe Tyr Gln His Gln Asp Ile Leu Pro Asn Met Trp Val
            260                 265                 270

Gly Thr Ala Gln Gln Glu Leu Glu Lys Thr Arg Ile Glu Asn Val Arg
        275                 280                 285

Leu Tyr Tyr Tyr Lys Tyr Phe Gly Met Glu
    290                 295
```

<210> SEQ ID NO 29
<211> LENGTH: 298
<212> TYPE: PRT
<213> ORGANISM: Microcystis aeruginosa

<400> SEQUENCE: 29

```
Met Ile Val Ala Asp Ile Gln Gln Asn Ser Leu Lys Glu Gln Arg Thr
1               5                   10                  15

Gln Phe Ile Arg Asn His Gln Gln Ala Phe Asp Val Glu Pro Val Tyr
            20                  25                  30

Pro Leu Arg Leu Phe Glu Asp Phe Val Met Gly Val Glu Gly Asp Cys
        35                  40                  45

Thr Ile Glu Ala Ser Cys Lys Ile Glu Leu Asp Lys Leu Ile Ala Ser
    50                  55                  60

Arg Phe Leu Leu Phe Phe Lys Asp Lys Ala Gln Glu Trp Gln Lys Tyr
65                  70                  75                  80

Leu Ala Gln Ser Leu Ala Phe Phe Gln Gln Val Glu Asn Arg Val Gly
                85                  90                  95

Val Gln Leu Asp Tyr Ser Leu Leu Gln Arg Phe Leu Gly Asp Asn Phe
            100                 105                 110

Asp Phe Ser Lys Leu Glu Val Leu Ser Ala Gly Ile Asp Leu Arg Thr
        115                 120                 125

Asn Leu Ala Asp Ser Ser Val Lys Met His Ile Arg Ile Gly Asp Tyr
    130                 135                 140

Pro Glu Lys Leu Ala Thr Ala Phe Val Leu Ser Asp Gly Val Ala Asp
145                 150                 155                 160

Ser Asn Tyr Leu Ser Gly Phe Val His Leu Ile Gly Phe Asp Phe Tyr
                165                 170                 175

Phe Asn Gly Lys Ser Ala Ile Glu Ile Tyr Ala Glu Val Thr Glu Asp
```

-continued

```
            180                 185                 190

Asp Phe Phe Lys Pro Glu Ile Ile Asn Gln Val Trp Gln His Phe Pro
        195                 200                 205

Lys Ser Ala Leu Lys Pro Leu Gln Ala Ser Ser Leu Phe Phe Thr Gly
    210                 215                 220

Leu Ser Lys Ala Asn His Asn Pro Val Leu Tyr Tyr His Leu Lys Asn
225                 230                 235                 240

Lys Gln Asp Leu Ala Asn Tyr Phe Lys Leu Asn Asp Thr Ala Gln Arg
                245                 250                 255

Val His Ser Phe Tyr Gln His Gln Asp Ile Leu Pro Asn Met Trp Val
            260                 265                 270

Gly Thr Ala Gln Gln Glu Leu Glu Lys Thr Arg Ile Glu Asn Val Arg
        275                 280                 285

Leu Tyr Tyr Tyr Lys Tyr Phe Gly Met Asp
    290                 295


<210> SEQ ID NO 30
<211> LENGTH: 298
<212> TYPE: PRT
<213> ORGANISM: Microcystis aeruginosa

<400> SEQUENCE: 30

Met Ile Val Ala Asp Ile Gln Lys Ser Ser Leu Lys Glu Gln Arg Leu
1               5                   10                  15

Gln Phe Ile Arg Asn His Gln Gln Ala Phe Asp Val Glu Pro Ile Tyr
            20                  25                  30

Pro Leu Arg Leu Phe Glu Asp Phe Val Met Gly Val Glu Gly Asp Cys
        35                  40                  45

Ser Ile Glu Ala Ser Cys Lys Ile Glu Leu Asp Lys Leu Ile Ala Ser
    50                  55                  60

Arg Phe Met Leu Phe Phe Lys Asp Lys Ala Gln Gln Trp Gln Lys Tyr
65                  70                  75                  80

Leu Asp Gln Ser Leu Ala Phe Phe Gln Gln Val Glu Asn Arg Val Gly
                85                  90                  95

Val Gln Leu Asp Tyr Ser Leu Leu Gln Arg Phe Leu Gly Asp Asn Phe
            100                 105                 110

Asp Phe Ser Lys Leu Glu Val Leu Ser Ala Gly Ile Asp Leu Arg Thr
        115                 120                 125

Asn Leu Ala Asp Ser Ser Val Lys Met His Ile Arg Ile Gly Asp Tyr
    130                 135                 140

Pro Glu Lys Leu Ala Thr Ala Phe Val Leu Ser Asp Gly Ala Ala Asp
145                 150                 155                 160

Ser Asn His Leu Ser Gly Phe Val Asn Leu Ile Gly Phe Asp Phe Tyr
                165                 170                 175

Phe Asn Gly Lys Ser Glu Ile Glu Ile Tyr Ala Glu Val Thr Glu Asp
            180                 185                 190

Asp Phe Phe Lys Pro Glu Thr Ile Asn Gln Val Trp Gln His Phe Pro
        195                 200                 205

Lys Ser Ala Leu Lys Pro Leu Gln Ala Ser Ser Leu Phe Phe Thr Gly
    210                 215                 220

Leu Ser Lys Ala Asn His Asn Pro Val Leu Tyr Tyr Ser Leu Lys Asn
225                 230                 235                 240

Cys Gln Asp Leu Ile Asn Tyr Phe Lys Leu Ser Asp Thr Ala Gln Arg
                245                 250                 255
```

```
Val His Ser Phe Tyr Gln His Gln Asp Ile Leu Pro Ser Met Trp Val
            260                 265                 270

Gly Thr Ala Gln Gln Glu Leu Glu Lys Thr Arg Ile Glu Asn Val Arg
        275                 280                 285

Leu Tyr Tyr Tyr Lys Tyr Phe Gly Met Glu
    290                 295


<210> SEQ ID NO 31
<211> LENGTH: 298
<212> TYPE: PRT
<213> ORGANISM: Microcystis aeruginosa

<400> SEQUENCE: 31

Met Ile Val Ala Asp Ile Gln Lys Ser Ser Leu Lys Glu Gln Arg Leu
1               5                   10                  15

Gln Phe Ile Arg Asn His Gln Gln Ala Phe Asp Val Glu Pro Ile Tyr
            20                  25                  30

Pro Leu Arg Leu Phe Glu Asp Phe Val Met Gly Val Glu Gly Asp Cys
        35                  40                  45

Thr Ile Gln Ala Ser Cys Lys Ile Glu Leu Asp Gln Leu Ile Ala Ser
    50                  55                  60

Arg Phe Met Leu Phe Phe Lys Asp Lys Ala Gln Glu Trp Gln Asn Tyr
65                  70                  75                  80

Leu Ala Gln Ser Leu Ala Phe Phe Arg Gln Val Glu Asn Arg Val Gly
                85                  90                  95

Val Lys Leu Asp Tyr Ser Leu Leu Gln Gln Phe Leu Gly Leu Asn Phe
            100                 105                 110

Asn Phe Ser Lys Ile Thr Val Phe Ser Thr Gly Ile Asp Leu Arg Thr
        115                 120                 125

Asn Leu Ala Asp Ser Ser Leu Lys Met His Ile Arg Leu Lys Asp Tyr
    130                 135                 140

Pro Glu Lys Ile Asn Gln Ala Leu Leu Leu Thr Ser Asp Ser Asp Asp
145                 150                 155                 160

Leu Ile Ala Val Arg Asp Phe Leu Ser Ile Val Gly Phe Asp Phe Tyr
                165                 170                 175

Phe Asp Gly Arg Ser Ala Ile Lys Ile Tyr Pro Glu Val Ala Glu Thr
            180                 185                 190

Asp Phe Phe Lys Pro Glu Thr Gln Asp Lys Val Trp Arg His Leu Pro
        195                 200                 205

Lys Phe Val Leu Glu Pro Leu Lys Ala Thr Ser Leu Phe Gly Phe Gly
    210                 215                 220

Phe Ser Lys Thr Asn Asn Asn Pro Val Leu Tyr Tyr Arg Leu Lys Asn
225                 230                 235                 240

Arg Gln Asp Leu Thr Asn Tyr Phe Lys Leu Asn Asp Thr Ala Gln Arg
                245                 250                 255

Val His Ser Phe Tyr Gln His Gln Asp Ile Leu Ser Ser Val Trp Leu
            260                 265                 270

Gly Thr Ala Gln Gln Glu Leu Glu Lys Thr Arg Ile Glu Asn Val Arg
        275                 280                 285

Leu Tyr Tyr Tyr Lys Leu Phe Gly Lys Leu
    290                 295


<210> SEQ ID NO 32
<211> LENGTH: 300
<212> TYPE: PRT
<213> ORGANISM: Planktothrix rubescens
```

<400> SEQUENCE: 32

Met Ile Ala Asp Val Ile Gln Lys Asp Arg Val Lys Glu Gln Lys Leu
1 5 10 15

Gln Phe Ile Arg Asn His Gln Gln Ala Phe Asp Val Glu Pro Ile Tyr
20 25 30

Pro Leu Pro Leu Phe Glu Asp Phe Val Met Gly Val Glu Gly Asp Cys
35 40 45

Ser Ile Glu Ala Ser Cys Lys Ile Glu Ser Asp Lys Leu Val Ala Ser
50 55 60

Arg Phe Met Phe Phe Phe Gln Asp Lys Ala Gln Gln Trp Gln Lys Tyr
65 70 75 80

Leu Asn Gln Ser Leu Thr Phe Phe Ser Gln Val Glu Asn Arg Val Gly
85 90 95

Val Gln Ile Asp Tyr Ser Leu Leu Gln Gln Phe Leu Gly Ser Asn Phe
100 105 110

Asp Phe Ser Lys Val Thr Val Leu Ser Ala Gly Ile Asp Leu Arg Asp
115 120 125

Asn Leu Ala Glu Ser Ser Leu Lys Met His Ile Arg Ile Lys Asp Tyr
130 135 140

Pro Glu Lys Leu Asn Lys Ala Leu Phe Leu Thr Ser Asp Ser Glu Asp
145 150 155 160

Leu Ile Ser Val Arg Arg Tyr Leu Ser Val Val Gly Phe Asp Phe Tyr
165 170 175

Phe Asn Gly Arg Ser Glu Ile Glu Leu Tyr Pro Glu Val Gln Glu Glu
180 185 190

Asp Phe Ala Lys Pro Glu Ile Gln Asp Leu Val Trp Arg His Phe Pro
195 200 205

Lys Phe Val Leu Glu Pro Leu Lys Val Thr Ser Leu Phe Gly Phe Gly
210 215 220

Phe Ser Lys Ala Asn Asn Asn Pro Val Leu Tyr Tyr His Leu Lys Asn
225 230 235 240

Arg Gln Asp Leu Thr Asn Tyr Phe Lys Leu Asn Asp Thr Ala Gln Arg
245 250 255

Val His Ser Phe Tyr Gln His Gln Asp Arg Leu Pro Asn Met Trp Ile
260 265 270

Gly Thr Ala Gln Lys Glu Leu Glu Lys Thr Arg Ile Glu Asn Ile Arg
275 280 285

Leu Tyr Tyr Tyr Lys Ser Phe Lys Met Glu Ser Ser
290 295 300

<210> SEQ ID NO 33
<211> LENGTH: 300
<212> TYPE: PRT
<213> ORGANISM: Planktothrix agardhii

<400> SEQUENCE: 33

Met Ile Ala Asp Val Ile Gln Lys Asp Arg Val Lys Glu Gln Lys Leu
1 5 10 15

Gln Phe Ile Arg Asn His Gln Gln Ala Phe Asp Val Glu Pro Ile Tyr
20 25 30

Pro Leu Pro Leu Phe Glu Asp Phe Val Met Gly Val Glu Gly Asp Cys
35 40 45

Ser Ile Glu Ala Ser Cys Lys Ile Glu Ser Asp Lys Leu Val Ala Ser
50 55 60

Arg Phe Met Phe Phe Phe Gln Asp Lys Ala Gln Gln Trp Gln Lys Tyr
65 70 75 80

Leu Asn Gln Ser Leu Thr Phe Phe Ser Gln Val Glu Asn Arg Val Gly
85 90 95

Val Gln Ile Asp Tyr Ser Leu Leu Gln Gln Phe Leu Gly Ser Asn Phe
100 105 110

Asp Phe Ser Lys Val Thr Val Leu Ser Ala Gly Ile Asp Leu Arg Asp
115 120 125

Asn Leu Ala Glu Ser Ser Leu Lys Met His Ile Arg Ile Lys Asp Tyr
130 135 140

Pro Glu Lys Leu Asn Lys Ala Leu Phe Leu Thr Ser Asp Ser Glu Asp
145 150 155 160

Leu Ile Ser Val Arg Arg Tyr Leu Ser Val Val Gly Phe Asp Phe Tyr
165 170 175

Phe Asn Gly Arg Ser Glu Ile Glu Leu Tyr Pro Glu Val Gln Glu Glu
180 185 190

Asp Phe Ala Lys Pro Glu Ile Gln Asp Leu Val Trp Arg His Phe Pro
195 200 205

Lys Phe Val Leu Glu Pro Leu Lys Val Thr Ser Leu Phe Gly Phe Gly
210 215 220

Phe Ser Lys Ala Asn Asn Asn Pro Val Leu Tyr Tyr His Leu Lys Asn
225 230 235 240

Arg Gln Asp Leu Thr Asn Tyr Phe Lys Leu Asn Asp Thr Ala Gln Arg
245 250 255

Val His Ser Phe Tyr Gln His Gln Asp Arg Leu Pro Asn Met Trp Ile
260 265 270

Gly Thr Ala Gln Lys Glu Leu Glu Lys Thr Arg Ile Glu Asn Ile Arg
275 280 285

Leu Tyr Tyr Tyr Lys Ser Phe Lys Met Glu Ser Asn
290 295 300

<210> SEQ ID NO 34
<211> LENGTH: 298
<212> TYPE: PRT
<213> ORGANISM: Microcystis aeruginosa

<400> SEQUENCE: 34

Met Ile Val Ala Asp Ile Gln Lys Ser Ser Leu Lys Glu Gln Arg Leu
1 5 10 15

Gln Phe Ile Arg Asn His Gln Gln Ala Phe Asp Val Glu Pro Ile Tyr
20 25 30

Pro Leu Arg Leu Phe Glu Asp Phe Val Met Gly Val Glu Gly Asp Cys
35 40 45

Thr Ile Glu Ala Ser Cys Lys Ile Glu Leu Asp Lys Leu Ile Ala Ser
50 55 60

Arg Phe Leu Leu Phe Phe Lys Asp Lys Ala Gln Glu Trp Gln Lys Tyr
65 70 75 80

Leu Ala Gln Ser Leu Ala Phe Phe Gln Gln Val Glu Asn Arg Val Gly
85 90 95

Val Gln Leu Asp Tyr Ser Leu Leu Gln Gly Phe Leu Gly Asp Asn Phe
100 105 110

Asp Phe Ser Lys Leu Glu Val Leu Thr Ala Gly Ile Asp Leu Arg Thr
115 120 125

Asn Leu Ala Asp Ser Ser Leu Lys Met His Ile Arg Ile Gly Asp Tyr

-continued

```
    130                 135                 140

Pro Glu Lys Leu Ala Thr Ala Phe Val Leu Ser Asp Gly Val Ala Asp
145                 150                 155                 160

Ser Asn Tyr Leu Ser Gly Phe Val His Leu Ile Gly Phe Asp Phe Tyr
                165                 170                 175

Phe Asn Gly Lys Ser Ala Ile Glu Ile Tyr Ala Glu Ile Arg Glu Asp
            180                 185                 190

Asp Phe Phe Lys Pro Glu Thr Ile Asn Gln Val Trp Gln His Phe Pro
        195                 200                 205

Lys Ser Ala Leu Lys Pro Leu Gln Ala Ser Asp Leu Phe Phe Thr Gly
    210                 215                 220

Leu Ser Lys Ala Asn Asn Asn Pro Val Leu Tyr Tyr Ser Leu Lys Asn
225                 230                 235                 240

Arg Gln Asn Leu Ile Asn Tyr Phe Lys Leu Asn Asp Thr Ala Gln Arg
                245                 250                 255

Val His Ser Phe Cys Gln His Gln Asp Ile Leu Pro Asn Met Trp Val
            260                 265                 270

Gly Thr Ala Gln Gln Glu Leu Glu Lys Thr Arg Ile Glu Asn Val Arg
        275                 280                 285

Leu Tyr Tyr Tyr Lys Tyr Phe Gly Met Glu
    290                 295


<210> SEQ ID NO 35
<211> LENGTH: 300
<212> TYPE: PRT
<213> ORGANISM: Planktothrix agardhii

<400> SEQUENCE: 35

Met Ile Ala Asp Val Ile Gln Lys Asp Arg Ile Lys Gly Gln Lys Leu
1               5                   10                  15

Gln Phe Ile Arg Asn His Gln Gln Ala Phe Asp Val Glu Pro Ile Tyr
            20                  25                  30

Pro Leu Pro Leu Phe Glu Asp Phe Val Met Gly Val Glu Gly Asp Cys
        35                  40                  45

Ser Leu Glu Val Ser Cys Lys Ile Glu Ser Asp Lys Leu Ile Ala Ser
    50                  55                  60

Arg Phe Leu Leu Phe Phe Lys Asp Lys Thr Gln Gln Trp Gln Lys Tyr
65                  70                  75                  80

Leu Asn Gln Ser Leu Thr Phe Phe Ser Gln Val Glu Asn Arg Val Gly
                85                  90                  95

Val Gln Ile Asp Tyr Ser Leu Leu Gln Gln Phe Leu Gly Tyr Asn Phe
            100                 105                 110

Asp Phe Ser Lys Val Thr Val Leu Ser Ala Gly Ile Asp Leu Arg Asn
        115                 120                 125

Asn Leu Ala Glu Ser Ser Leu Lys Met His Ile Arg Ile Lys Asp Tyr
    130                 135                 140

Pro Glu Lys Val Glu Thr Ala Phe Ser Leu Ser Asp Gly Ala Ala Asp
145                 150                 155                 160

Gly Asn Tyr Leu Lys Asp Phe Val Asn Leu Ile Gly Phe Asp Phe Tyr
                165                 170                 175

Phe Asn Gly Lys Ser Glu Ile Glu Ile Tyr Ala Glu Val Gln Glu Glu
            180                 185                 190

Asp Phe Phe Lys Pro Glu Thr Ile Asn Leu Val Trp Arg His Phe Pro
        195                 200                 205
```

-continued

```
Pro Ser Val Leu Thr Ser Leu Gln Ala Ser Asp Ser Phe Phe Val Gly
    210                 215                 220

Leu Ser Lys Pro Asn Asn Asn Pro Val Leu Tyr Tyr His Leu Lys Asn
225                 230                 235                 240

Arg Gln Asp Leu Val Asn Tyr Phe Lys Leu Asn Asp Thr Ala Gln Arg
                245                 250                 255

Val His Ser Phe Tyr Gln His Gln Asp Ile Leu Pro Glu Met Trp Val
            260                 265                 270

Gly Thr Ala Gln Lys Glu Leu Glu Lys Thr Arg Ile Glu Asn Ile Arg
        275                 280                 285

Leu Tyr Tyr Tyr Lys Ser Phe Lys Met Glu Ser Asn
    290                 295                 300


<210> SEQ ID NO 36
<211> LENGTH: 264
<212> TYPE: PRT
<213> ORGANISM: Arthrospira platensis

<400> SEQUENCE: 36

Met Asn Cys Thr Ser Val Leu Gln Gln Asn His Leu Arg Glu Lys Arg
1               5                   10                  15

Leu Gln Phe Ile Arg Ala His Gln Thr Ala Phe Asp Val Glu Pro Val
            20                  25                  30

Phe Pro Leu Gln Val Phe Glu Asp Phe Val Phe Gly Val Glu Gly Asp
        35                  40                  45

Cys Thr Ile Glu Ala Ser Cys Lys Val Glu Ser Asp His Leu Ile Ala
    50                  55                  60

Ser Arg Phe Leu Leu Phe Phe Gln Glu Met Thr Gln Ser Trp Pro Gln
65                  70                  75                  80

Lys Leu Asp Gln Ala Phe Arg Phe Phe His Gln Thr Glu Asn Gln Val
                85                  90                  95

Gly Val Arg Leu Asp Tyr Gly Leu Leu Gln His Phe Leu Gly Asp Asp
            100                 105                 110

Phe Asp Phe Ser Lys Ile Ser Val Leu Ser Thr Gly Ile Asp Leu Arg
        115                 120                 125

Gln Asn Leu Ala Asp Ser Ser Leu Lys Met His Ile Thr Ile Glu Asp
    130                 135                 140

Tyr Pro Glu Lys Ile Ala Thr Ala Phe Ser Leu Ala Lys Leu Pro Arg
145                 150                 155                 160

Asp Lys Phe His Gln Ile Leu Leu Ser Ser Val Ser Leu Ile Gly Phe
                165                 170                 175

Asp Phe Tyr Leu Asp Gly Arg Ser Glu Ile Glu Leu Tyr Ala Ser Leu
            180                 185                 190

Lys Glu Glu Glu Phe Asn Ser Pro His Val Gln Ser Phe Leu Thr Ser
        195                 200                 205

Asn Phe Cys Ala Ser Ala Leu Lys Pro Leu Ala Ala Ser Ser Ala Phe
    210                 215                 220

Tyr Met Gly Leu Ser Ile Ala Asn Glu Asn Pro Val Leu Tyr Tyr Leu
225                 230                 235                 240

Leu Lys Asn Lys Gln Glu Leu Gln Asn Tyr Phe Arg Leu Asn Asp Thr
                245                 250                 255

Gly Asn Arg Val His Ser Leu Leu
            260


<210> SEQ ID NO 37
```

<211> LENGTH: 304
<212> TYPE: PRT
<213> ORGANISM: Microcystis aeruginosa

<400> SEQUENCE: 37

```
Met Ile Val Ala Glu Ile Gln Lys Asn Ser Leu Lys Glu Gln Arg Leu
1               5                   10                  15

Gln Phe Ile Arg Asn His Gln Gln Ala Phe Asp Val Glu Pro Ile Tyr
            20                  25                  30

Pro Leu Arg Leu Phe Glu Asp Phe Val Val Gly Val Glu Gly Asp Cys
        35                  40                  45

Ser Ile Glu Ala Ser Cys Lys Ile Glu Leu Asp Lys Leu Ile Ala Ser
    50                  55                  60

Arg Phe Met Leu Phe Phe Lys Asp Lys Ala Gln Glu Trp Gln Lys Tyr
65                  70                  75                  80

Leu Ala Gln Ser Leu Ala Phe Phe Lys Gln Val Glu Asn Arg Val Gly
                85                  90                  95

Val Lys Leu Asp Tyr Ser Leu Leu Gln Gln Phe Leu Gly Thr His Phe
            100                 105                 110

Asp Phe Ser Lys Leu Gln Glu Val Leu Ser Ala Gly Leu Asp Leu Arg
        115                 120                 125

Ser Asn Leu Ala Asp Ser Ser Leu Lys Ile His Ile Arg Ile Lys Asp
    130                 135                 140

Tyr Pro Glu Lys Leu Glu Thr Ala Phe Ala Leu Ser Asp Gly Ala Ala
145                 150                 155                 160

Asp Ser Asn Tyr Leu Ser Gly Phe Val Asn Leu Ile Gly Phe Asp Phe
                165                 170                 175

Tyr Phe Asn Gly Lys Ser Glu Ile Glu Ile Tyr Ala Glu Leu Gln Glu
            180                 185                 190

Glu Asp Phe Phe Lys Pro Glu Thr Ile Asn Leu Val Trp Arg His Phe
        195                 200                 205

Pro His Ser Val Leu Lys Pro Leu Gln Ala Ser Asn Leu Phe Phe Thr
    210                 215                 220

Gly Leu Ser Lys Ala Asn His Asp Pro Val Leu Tyr Tyr His Leu Lys
225                 230                 235                 240

Asp Arg Gln Asp Leu Ala Asn Tyr Phe Asn Leu Asn Asp Thr Ala Gln
                245                 250                 255

Arg Val His Ser Phe Tyr Gln His Gln Asp Ile Leu Pro Thr Met Trp
            260                 265                 270

Val Gly Thr Ser Gln Gln Gln Leu Glu Lys Thr Arg Ile Glu Asn Val
        275                 280                 285

Arg Leu Tyr Tyr Tyr Lys Phe Phe Gly Lys Leu Glu Ser Ile Ser Cys
    290                 295                 300
```

<210> SEQ ID NO 38
<211> LENGTH: 290
<212> TYPE: PRT
<213> ORGANISM: Cyanothece sp. PCC 7425

<400> SEQUENCE: 38

```
Met Pro Arg Glu Gln Arg Leu Gln Phe Ile Lys Ala His Gln Ala Ala
1               5                   10                  15

Phe Glu Val Glu Pro Leu Tyr Pro Leu Ala Leu Phe Glu Ala Leu Val
            20                  25                  30

Glu Thr Phe Asp Glu Asp Cys Ala Leu Glu Ala Ser Cys Lys Ile Glu
        35                  40                  45
```

```
Phe Asp Gln Leu Ile Ala Ser Arg Phe Leu Ile Phe Phe Ser Gln Asn
    50                  55                  60

Phe Glu Gln Asn Leu Ala Arg Val Leu Asn Phe Met Thr Gln Val Asn
65                  70                  75                  80

Gln Arg Val Asp Val Gln Ile Asn Thr Asp Leu Leu Tyr His Phe Leu
                85                  90                  95

Gly Gln Lys Phe Asp Phe Arg Lys Met Ile Arg Leu Ala Thr Gly Val
            100                 105                 110

Asp Leu Arg Ser Asn Leu Ala Asp Ser Ser Leu Lys Ile His Ile Arg
        115                 120                 125

Leu Glu Asp Tyr Pro Glu Lys Ile Glu Ser Ala Leu Ala Leu His Gly
    130                 135                 140

Asn Pro Asp Asp Ala Ser Tyr Trp Ala Asp Leu Asn Ala Ile Ala Asn
145                 150                 155                 160

Ile Gly Leu Asp Phe Tyr Leu Asp Gly Arg Ser Glu Ile Glu Phe Tyr
                165                 170                 175

Pro Glu Leu Ser Glu Glu Arg Phe Gln Gln Pro Glu Met Gln Val Leu
            180                 185                 190

Leu Gln Gln Met Phe Pro Pro Phe Val Leu Ala Pro Leu Lys Ala Ser
        195                 200                 205

Glu Ile Phe Gly Phe Gly Leu Ser Lys Ala Asn Pro Ser Ala Val Leu
    210                 215                 220

Tyr Tyr Gln Leu Lys Asn Lys Gln Asp Leu Pro Ser Tyr Phe Ala Ile
225                 230                 235                 240

Asn Asp Lys Ala His Gln Val His Gly Tyr Tyr Leu His Gln Asp Thr
                245                 250                 255

Arg Pro Tyr Met Cys Val Gly Val Ala Gln Ser Glu Leu Ala Lys Thr
            260                 265                 270

Arg Ile Asp Gln Ile Arg Leu Tyr Tyr His Gln Phe Phe Lys Val Gln
        275                 280                 285

Asn Pro
    290
```

<210> SEQ ID NO 39
<211> LENGTH: 296
<212> TYPE: PRT
<213> ORGANISM: Anabaena sp. AL93

<400> SEQUENCE: 39

```
Met Ile Ala Asn Val Thr Gln Lys Asp Arg Phe Lys Glu Gln Lys Leu
1               5                   10                  15

Gln Phe Ile Arg Asn His Gln Gln Ala Phe Asp Val Glu Pro Ile Tyr
            20                  25                  30

Pro Leu Pro Leu Phe Glu Asp Phe Val Met Asn Val Glu Gly Asp Cys
        35                  40                  45

Ser Ile Glu Ala Ser Cys Lys Ile Glu Leu Asp Lys Leu Ile Ala Ser
    50                  55                  60

Arg Phe Met Phe Phe Phe Lys Asp Lys Ala Gln Gln Trp Gln Lys Tyr
65                  70                  75                  80

Leu His Gln Ser Leu Thr Phe Phe Asn Arg Val Glu Asn Leu Val Gly
                85                  90                  95

Val Gln Ile Asp Tyr Ser Leu Leu Gln Gln Phe Leu Gly Ser Asp Phe
            100                 105                 110

Asp Phe Arg Lys Val Thr Val Leu Ser Ala Gly Ile Asp Leu Arg Ser
```

```
        115                 120                 125

Asn Leu Ala Glu Ser Ser Leu Lys Met His Ile Arg Ile Lys Asp Tyr
    130                 135                 140

Pro Lys Lys Leu Asp Gln Ala Leu Ser Leu Ala Ser Asn Ala Glu Asp
145                 150                 155                 160

Leu Ile Ser Val Arg Arg Phe Leu Ser Val Val Gly Phe Asp Phe Tyr
                165                 170                 175

Phe Asn Gly Arg Ser Glu Ile Glu Leu Tyr Pro Glu Val Gln Glu Glu
            180                 185                 190

Asp Phe Ala Lys Ser Glu Thr Gln Asn Leu Val Trp Arg His Phe Pro
        195                 200                 205

Lys Phe Val Leu Asp Pro Leu Glu Val Thr Arg Leu Phe Gly Phe Gly
    210                 215                 220

Leu Ser Lys Ala Asn His Asn Pro Val Leu Tyr Tyr Asn Leu Lys Asn
225                 230                 235                 240

Lys Gln Asp Leu Ala Asn Tyr Phe Lys Leu Asn Asp Ala Ala Gln Arg
                245                 250                 255

Val His Ser Phe Tyr Gln Asn Gln Asp Ile Leu Pro Asn Met Trp Val
            260                 265                 270

Gly Thr Val Gln Lys Glu Leu Glu Lys Thr Arg Ile Glu Asn Val Arg
        275                 280                 285

Leu Tyr Tyr Tyr Lys Ser Phe Asn
    290                 295


<210> SEQ ID NO 40
<211> LENGTH: 306
<212> TYPE: PRT
<213> ORGANISM: Snowella sp.

<400> SEQUENCE: 40

Met Ile Val Gly Ala Val Pro Lys Glu Arg Ile Lys Glu Gln Lys Leu
1               5                   10                  15

Gln Phe Ile Arg Asn His Gln Gln Ala Phe Asp Val Glu Pro Ile Tyr
            20                  25                  30

Pro Leu Pro Leu Phe Glu Asp Phe Val Met Ser Val Glu Gly Asp Cys
        35                  40                  45

Thr Ile Glu Ala Ser Cys Lys Val Glu Leu Asp Lys Leu Ile Ala Ser
    50                  55                  60

Arg Phe Leu Phe Phe Phe Lys Asp Lys Ala Gln Asp Trp Pro Ser Tyr
65                  70                  75                  80

Leu Ser Gln Gly Leu Ser Phe Phe Lys Gln Val Glu Thr Gln Val Gly
                85                  90                  95

Val Gln Leu Asp Tyr Ser Leu Leu Gln Ser Phe Leu Gly Thr Asp Phe
            100                 105                 110

Asp Phe Ser Arg Val Arg Thr Phe Thr Thr Gly Ile Asp Leu Arg Arg
        115                 120                 125

Glu Ser Leu Ala Glu Ser Ser Val Lys Ile His Phe Arg Val Lys Asp
    130                 135                 140

Tyr Ile Glu Lys Val Gln Thr Ala Ile Ile Leu Ser Gly Gly Glu Phe
145                 150                 155                 160

Gly Phe Leu Glu Asp Phe Pro Lys Lys Phe Leu Ala Gln Tyr Ile Pro
                165                 170                 175

Gln Ile Gly Phe Asp Phe Tyr Phe Asp Gly Arg Cys Glu Ile Glu Leu
            180                 185                 190
```

```
Tyr Phe Glu Val Ile Glu Cys Asn Phe Gly Asp Pro Asn Val Arg Gln
        195                 200                 205

Tyr Leu Trp Ser Lys Met Pro Ser Ile Ala Leu Ala Pro Leu Lys Asp
    210                 215                 220

Thr Ala Val Phe His Leu Gly Leu Ser Lys Ala Asn Thr Asn Pro Val
225                 230                 235                 240

Phe Tyr Tyr Gln Leu Lys Lys Tyr Lys Gly Asn Leu Leu Asn Tyr Phe
                245                 250                 255

Arg Leu Asn Asp Ala Ala Met Arg Val Asp Ser Phe Tyr Arg Asn Gln
            260                 265                 270

Asp Thr Glu Tyr Gly Gly Trp Val Gly Val Ala Leu Glu Glu Leu Glu
        275                 280                 285

Lys Thr Arg Ile Glu Asn Ile Arg Leu Tyr Tyr His Lys Tyr Phe Lys
    290                 295                 300

Ile Glu
305


<210> SEQ ID NO 41
<211> LENGTH: 306
<212> TYPE: PRT
<213> ORGANISM: Microcystis aeruginosa

<400> SEQUENCE: 41

Met Ile Val Ala Asp Ile Gln Lys Ser Ser Leu Lys Glu Gln Arg Leu
1               5                   10                  15

Gln Phe Ile Arg Asn His Gln Gln Ala Phe Asp Val Glu Pro Ile Tyr
            20                  25                  30

Pro Leu Arg Leu Phe Glu Asp Phe Val Met Gly Val Glu Gly Asp Cys
        35                  40                  45

Thr Ile Glu Ala Ser Cys Lys Ile Glu Leu Asp Lys Leu Ile Ala Ser
    50                  55                  60

Arg Phe Leu Phe Cys Phe Lys Asp Pro Glu Gln His Trp Pro Ser Tyr
65                  70                  75                  80

Leu Ser Gln Gly Leu Ser Phe Phe Lys Gln Val Glu Asn Arg Val Gly
                85                  90                  95

Val Gln Phe Asp Tyr Ser Leu Leu Gln Ala Phe Leu Gly Thr Asp Phe
            100                 105                 110

Asp Phe Ser His Val Thr Thr Phe Thr Thr Gly Ile Asp Leu Arg Arg
        115                 120                 125

Glu Ser Leu Thr Glu Ser Ser Val Lys Ile His Phe Arg Ile Glu Asp
    130                 135                 140

Tyr Ile Ala Lys Val Gln Thr Ala Ile Ile Leu Ser Gly Tyr Glu Val
145                 150                 155                 160

Gly Phe Leu Glu Asp Phe Pro Lys Gln Phe Leu Ala Arg Tyr Ile Pro
                165                 170                 175

Gln Ile Gly Phe Asp Phe Tyr Phe Asp Gly Arg Cys Glu Ile Glu Leu
            180                 185                 190

Tyr Phe Glu Val Lys Glu Asn Asn Phe Asp Asp Pro Asn Val Lys Lys
        195                 200                 205

Tyr Leu Trp Ser Lys Met Pro Pro Val Ala Leu Ala Pro Leu Lys Asp
    210                 215                 220

Thr Asp Val Phe His Leu Gly Leu Ser Lys Ala Asn Thr Asn Pro Val
225                 230                 235                 240

Phe Tyr Tyr Gln Leu Lys Lys Tyr Lys Gly Asp Leu Leu Asn His Phe
                245                 250                 255
```

Arg Leu Asn Asp Thr Ala Met Arg Val Asp Ser Phe Tyr Arg Asn Gln
260 265 270

Glu Thr Asp Tyr Gly Gly Trp Val Gly Val Ala Leu Glu Glu Leu Glu
275 280 285

Lys Thr Arg Ile Glu Asn Ile Arg Leu Tyr Tyr His Lys Tyr Phe Gly
290 295 300

Met Glu
305

<210> SEQ ID NO 42
<211> LENGTH: 308
<212> TYPE: PRT
<213> ORGANISM: Planktothrix sp. PCC 11201

<400> SEQUENCE: 42

Met Ile Ala Asp Val Ile Gln Lys Asp Arg Leu Lys Glu Gln Lys Leu
1 5 10 15

Gln Phe Ile Arg Asn His Gln Gln Ala Phe Asp Val Glu Pro Ile Tyr
20 25 30

Pro Leu Pro Leu Phe Glu Asp Phe Val Met Ser Val Asp Gly Asp Cys
35 40 45

Thr Ile Glu Ala Ser Cys Lys Val Glu Leu Asp Lys Leu Ile Ala Ser
50 55 60

Arg Phe Leu Phe Phe Phe Lys Asp Lys Ala Gln Asp Trp Pro Ser Tyr
65 70 75 80

Leu Ser Gln Gly Leu Ser Phe Phe Lys Gln Val Glu Thr Gln Val Gly
85 90 95

Val Gln Leu Asp Tyr Ser Leu Leu Gln Ala Phe Leu Gly Thr Asp Phe
100 105 110

Asp Phe Ser Arg Val Arg Thr Phe Thr Thr Gly Ile Asp Leu Arg Arg
115 120 125

Glu Ser Leu Ala Glu Ser Ser Val Lys Ile His Phe Arg Ile Glu Asp
130 135 140

Tyr Ile Glu Lys Val Gln Thr Ala Ile Ile Leu Ser Gly Gly Glu Phe
145 150 155 160

Gly Phe Leu Glu Asp Phe Pro Lys Lys Phe Leu Ala Arg Tyr Ile Pro
165 170 175

Gln Ile Gly Phe Asp Phe Tyr Phe Asn Gly Arg Cys Glu Ile Glu Leu
180 185 190

Tyr Phe Glu Val Ile Glu Cys Asn Phe Asp Asp Pro Asn Val Lys Gln
195 200 205

Tyr Leu Trp Ser Lys Met Pro Pro Ile Ala Leu Ala Pro Leu Lys Asp
210 215 220

Thr Ala Val Phe His Leu Gly Leu Ser Lys Ala Asn Thr Asn Pro Val
225 230 235 240

Phe Tyr Tyr Gln Leu Lys Lys Tyr Lys Gly Asn Leu Leu Asn Tyr Phe
245 250 255

Arg Leu Asn Asp Asp Ala Met Arg Val Asp Ser Phe Tyr Arg Asn Gln
260 265 270

Asp Thr Asp Tyr Gly Gly Trp Val Gly Val Ala Leu Glu Glu Leu Glu
275 280 285

Lys Thr Arg Ile Glu Asn Ile Arg Leu Tyr Tyr His Lys Tyr Phe Lys
290 295 300

Met Glu Ser Asn

305

<210> SEQ ID NO 43
<211> LENGTH: 223
<212> TYPE: PRT
<213> ORGANISM: Microcystis aeruginosa PCC 9432

<400> SEQUENCE: 43

Met Ala Lys Leu Ser Ser Ala Val Phe Ser Phe Phe Arg Gln Val Glu
1 5 10 15

Asn Arg Val Gly Val Gln Leu Asp Tyr Ser Leu Leu Gln Gln Phe Leu
20 25 30

Gly Asp Asn Phe Asp Phe Ser Lys Leu Glu Val Leu Ser Thr Gly Ile
35 40 45

Asp Leu Arg Thr Asn Leu Ala Asp Ser Ser Val Lys Met His Ile Arg
50 55 60

Ile Lys Asp Tyr Pro Glu Lys Leu Glu Thr Ala Phe Leu Leu Ser Asp
65 70 75 80

Gly Ala Ala Gly Ser Asn Tyr Leu Ser Gly Phe Val Asn Leu Ile Gly
85 90 95

Phe Asp Phe Tyr Phe Asn Gly Lys Ser Glu Ile Glu Ile Tyr Ala Glu
100 105 110

Val Gly Glu Asp Asp Phe Phe Lys Pro Glu Thr Ile Asn Gln Val Trp
115 120 125

Arg His Phe Pro Asp Ser Val Leu Lys Pro Leu Gln Ala Ser Ser Leu
130 135 140

Phe Phe Thr Gly Leu Ser Lys Ala Asn Asn Asn Pro Val Leu Tyr Tyr
145 150 155 160

Tyr Leu Lys Asn Arg Gln Asp Leu Ile Asn Tyr Phe Arg Leu Asn Asp
165 170 175

Thr Ala Gln Arg Val His Ser Phe Tyr Glu His Gln Asp Ile Leu Pro
180 185 190

Tyr Met Trp Val Gly Thr Ala Gln Gln Glu Leu Glu Lys Thr Arg Ile
195 200 205

Glu Asn Val Arg Leu Tyr Tyr Tyr Lys Leu Phe Gly Lys Leu Glu
210 215 220

<210> SEQ ID NO 44
<211> LENGTH: 309
<212> TYPE: PRT
<213> ORGANISM: Mastigocladus laminosus

<400> SEQUENCE: 44

Met Val Ile Leu Thr Pro Thr Ser Arg Thr Asn Arg Ser Gln Glu Gln
1 5 10 15

Arg Leu Gln Phe Ile Arg Ala His Gln Asn Ala Phe Asp Val Asp Ser
20 25 30

Asn Phe Leu Leu Ser Thr Phe Glu Lys Thr Val Leu Glu Ile Asp Glu
35 40 45

Asn Cys Gly Ile Glu Pro Ser Cys Lys Ile Glu Gly Asp His Leu Phe
50 55 60

Ala Gly Arg Tyr Ala Val Ala Gly Glu Asp Gly Gly Asn Trp Arg Lys
65 70 75 80

Ile Leu Ala Gln Ser Leu Gly Phe Leu Asn Thr Ile Glu Ser Arg Val
85 90 95

Asp Phe Lys Ile Asn Arg Glu Leu Ile Gln Lys Phe Leu Ala Leu His

```
            100                 105                 110

Ile Gly Ser Asn Lys Ile Ile Ala Asn Thr Thr Gly Ile Asp Leu Arg
        115                 120                 125

Pro Ser Leu Glu Glu Ser Ser Val Lys Ile His Phe Lys Ile Lys Val
    130                 135                 140

Asp Glu Asp Ala Glu Glu Leu Ala Arg Thr Ala Ile Ala Leu Asp Gly
145                 150                 155                 160

Gly Tyr Tyr Ser Ser Glu Leu Thr Gln Val Leu Leu Lys Asp Thr Thr
                165                 170                 175

Leu Ile Gly Phe Asp Phe Phe Leu Asn Gly His Ser Glu Val Glu Leu
            180                 185                 190

Tyr Pro Ser Cys Pro Gly Gly Lys Tyr Glu Leu Ser Ser Asn Trp Gly
        195                 200                 205

Arg Thr Leu Ser Thr Tyr Val Gln Gln Asn Phe Ser Lys Lys Val Val
    210                 215                 220

Ser Leu Phe Asn Val Cys Asp Ile Phe Met Ala Gly Phe Ser Lys Val
225                 230                 235                 240

Asn Ile Glu Pro Val Leu Tyr Phe Val Phe Phe Asp Ile Lys Asp Ile
                245                 250                 255

Ala Lys Tyr Phe Leu Phe Asn Ser Leu Gly Asp Arg Ile Tyr Asn Phe
            260                 265                 270

Cys Gln Ser Gln Asp Asp Asp Tyr Ser Ser Tyr Tyr Cys Val Gly Val
        275                 280                 285

Asn Glu Arg Asp Leu Arg Val Asn Arg Leu Glu Lys Phe Arg Phe Tyr
    290                 295                 300

Tyr Thr Lys Val Ile
305


<210> SEQ ID NO 45
<211> LENGTH: 305
<212> TYPE: PRT
<213> ORGANISM: Nostocales

<400> SEQUENCE: 45

Met Thr Phe Thr Pro Ala Phe Gln His Ser Ile Leu Gln Glu Arg Arg
1               5                   10                  15

Leu Arg Phe Met Arg Ser His Gln Glu Ala Phe Asp Val Glu Pro Glu
            20                  25                  30

Phe Pro Leu Pro Leu Leu Glu Asn Leu Ala Gln Ala Leu Gly Ser Arg
        35                  40                  45

Cys Val Val Glu Leu Ser Cys Lys Val Glu Ser Asn Gln Leu Phe Ala
    50                  55                  60

Ala Arg Ile Asn Ile Cys Tyr Arg Asp Ala Trp Pro Gln Ser Leu Gly
65                  70                  75                  80

Gln Ser Leu Lys Phe Leu Asp Glu Val Glu Ser Arg Val Gly Ile Gln
                85                  90                  95

Ile Asn Arg Asp Leu Leu Gln Gln Phe Leu Ala Val His Ile Asn Ser
            100                 105                 110

Asn Lys Ile Leu Trp Asn Thr Thr Gly Ile Asp Leu Arg Pro Asn Val
        115                 120                 125

Glu Asp Ser Ser Val Lys Ile His Ile Gly Ile Asp Pro Asn Gln Asp
    130                 135                 140

Thr Glu Glu Leu Val Met Thr Ala Ile Gly Leu Asp Gly Ser Gln Tyr
145                 150                 155                 160
```

```
Ser Pro Glu Leu Ile Gln Val Leu Leu Lys Asp Ser Tyr Met Ile Gly
                165                 170                 175

Phe Asp Phe Phe Leu Asn Gly Arg Ser Glu Val Glu Leu Tyr Thr Ser
            180                 185                 190

Cys Pro Gly Gly Lys Gln Gln Leu Val Gly Asn Gln Gly Ile Tyr Leu
        195                 200                 205

Lys Ser Tyr Ala Lys Arg Asn Phe Ser Glu Lys Val Phe Tyr Leu Leu
    210                 215                 220

Glu Ala Cys Asp Leu Phe Met Ala Gly Phe Ser Lys Ala Asn Thr Glu
225                 230                 235                 240

Ala Val Ile Tyr Phe Gly Phe Asn Asn Ile Glu Asp Met Pro Lys Tyr
                245                 250                 255

Phe Leu Phe Thr Ser Leu Gly Gln Arg Ile Tyr Asp Phe Cys Arg Ser
            260                 265                 270

Gln Gly Ala Gly Pro Leu Pro Cys Val Gly Val Thr Gln Lys Asp Leu
        275                 280                 285

Glu Ser His His Val Glu Asn Leu Arg Phe Tyr Tyr Arg Arg Glu Phe
    290                 295                 300

Ser
305


<210> SEQ ID NO 46
<211> LENGTH: 187
<212> TYPE: PRT
<213> ORGANISM: Microcystis aeruginosa

<400> SEQUENCE: 46

Met Thr Ser Ser Leu Leu Glu Val Leu Ser Ala Gly Ile Asp Leu Arg
1               5                   10                  15

Thr Asp Leu Ala Asp Ser Ser Val Lys Met His Ile Arg Ile Gly Asp
            20                  25                  30

Tyr Pro Glu Lys Leu Ala Thr Ala Phe Ile Leu Ser Asp Gly Ala Ala
        35                  40                  45

Asp Ser Asn Tyr Leu Ser Gly Phe Val Asn Leu Ile Gly Phe Asp Phe
    50                  55                  60

Tyr Phe Asn Gly Lys Ser Glu Ile Glu Ile Tyr Val Glu Val Arg Glu
65                  70                  75                  80

Asp Asp Phe Phe Lys Pro Glu Thr Ile Asn Gln Val Trp Gln His Phe
                85                  90                  95

Pro Lys Ser Ala Leu Lys Pro Leu Gln Ser Ser Ser Leu Phe Phe Thr
            100                 105                 110

Gly Leu Ser Lys Ala Asn His Asn Pro Val Leu Tyr Tyr Asn Leu Lys
        115                 120                 125

Asn Pro Gln Asp Leu Ile Asn Cys Phe Lys Leu Asn Tyr Thr Ala Gln
    130                 135                 140

Lys Val His Ser Phe Tyr Gln His Gln Asp Ile Leu Pro Asn Met Trp
145                 150                 155                 160

Val Gly Thr Ala Gln Gln Glu Leu Glu Lys Thr Arg Ile Glu Asn Ile
                165                 170                 175

Arg Leu Tyr Tyr Tyr Lys Ser Phe Thr Met Glu
            180                 185


<210> SEQ ID NO 47
<211> LENGTH: 305
<212> TYPE: PRT
<213> ORGANISM: Lyngbya sp. PCC 8106
```

<400> SEQUENCE: 47

Met Ala Ile Ala Asn Arg Val Pro Tyr Asn Tyr Leu Arg Glu Gln Arg
1 5 10 15

Ile Gln Phe Met His Ala His Gln Asp Ala Phe Asp Val Ser Thr Val
20 25 30

Phe Pro Leu Pro Leu Phe Glu Lys Leu Val Thr Glu Leu Glu Gly Ser
35 40 45

Asn Val Ile Glu Leu Ser Cys Lys Ile Glu Ala Asp Lys Leu Leu Ala
50 55 60

Gly Arg Phe Leu Ile Phe Ser Asp Gln Glu Asn Asn Trp His Gln Ser
65 70 75 80

Leu Ala Gln Ala Leu Gln Phe Leu Asp Ser Ile Glu Ser Arg Val Gly
85 90 95

Val Glu Ile Asn Arg Glu Ser Leu Asp Lys Phe Leu Ala Ala His Ile
100 105 110

Asn Ser Gly Lys Ile Met Gly Ile Ser Thr Gly Leu Asp Leu Arg Pro
115 120 125

Glu Leu Glu Asn Ser Ser Val Lys Ile His Ile Met Leu Gly Glu Asn
130 135 140

Ser Glu Glu Leu Val Arg Thr Ala Ile Ala Ile Asp Gly Ser His Tyr
145 150 155 160

Pro Val Glu Leu Ala Gln Val Leu Leu Lys Asp Thr Met Met Ile Gly
165 170 175

Phe Asp Phe Phe Leu Asn Gly His Ser Glu Val Glu Leu Tyr Ile Ser
180 185 190

Cys Ser Arg Lys Lys Asp Ser Leu Pro Asn Asn Arg Gly Glu Ser Thr
195 200 205

Arg Tyr Tyr Ile Arg Gln Lys Phe Ser Pro Lys Val Ser Ser Leu Leu
210 215 220

Asp Ala Ser Asp Phe Phe Val Gly Gly Phe Ser Lys Ala Asn Val Glu
225 230 235 240

Pro Val Leu Tyr Tyr Ala Phe Glu Asn Ile Lys Asp Ile Pro Lys Tyr
245 250 255

Phe Val Phe Asn Asp Leu Gly Asn Arg Val Tyr Asp Phe Cys Arg Ser
260 265 270

Gln Asp Ser Ile Thr Met Thr Trp Ile Gly Ile Asn Glu Arg Asp Leu
275 280 285

Asp Arg Glu Arg Leu Asn Asn Phe Arg Leu Tyr Tyr Arg Arg Ser Phe
290 295 300

Gly
305

<210> SEQ ID NO 48
<211> LENGTH: 187
<212> TYPE: PRT
<213> ORGANISM: Microcystis aeruginosa

<400> SEQUENCE: 48

Met Thr Ser Ser Lys Leu Glu Val Leu Ser Ala Gly Ile Asp Leu Arg
1 5 10 15

Thr Asp Leu Ala Asp Ser Ser Val Lys Met His Ile Arg Ile Gly Tyr
20 25 30

Tyr Pro Glu Lys Leu Ala Thr Ala Phe Ile Leu Ser Asp Gly Ala Ala
35 40 45

```
Asp Ser Asn Tyr Leu Ser Gly Phe Val Asn Leu Ile Gly Phe Asp Phe
    50                  55                  60

Tyr Phe Asn Gly Lys Ser Glu Ile Glu Ile Tyr Ala Glu Val Arg Glu
65                  70                  75                  80

Asp Asp Phe Phe Lys Pro Glu Thr Ile Asn Gln Val Trp Gln His Phe
                85                  90                  95

Pro Lys Ser Ala Leu Lys Pro Leu Gln Ala Ser Ser Leu Phe Phe Thr
            100                 105                 110

Gly Leu Ser Lys Ala Asn His Asn Pro Val Leu Tyr Tyr Asn Leu Lys
        115                 120                 125

Asn Pro Gln Val Leu Ile Asn Cys Phe Lys Leu Asn Tyr Thr Ala Gln
    130                 135                 140

Lys Val His Ser Phe Tyr Gln His Gln Asp Ile Leu Pro Asn Met Cys
145                 150                 155                 160

Val Gly Thr Ala Gln Gln Glu Leu Glu Lys Thr Arg Ile Glu Asn Ile
                165                 170                 175

Arg Leu Tyr Tyr Tyr Lys Ser Phe Thr Met Glu
            180                 185
```

<210> SEQ ID NO 49
<211> LENGTH: 187
<212> TYPE: PRT
<213> ORGANISM: Microcystis aeruginosa

<400> SEQUENCE: 49

```
Met Thr Ser Ser Leu Leu Glu Val Leu Ser Ala Gly Ile Asp Leu Arg
1               5                   10                  15

Thr Asn Leu Ala Asp Ser Ser Val Lys Met His Ile Arg Ile Gly Asp
            20                  25                  30

Tyr Thr Glu Lys Leu Ala Thr Ala Phe Ile Leu Ser Asp Gly Ala Ala
        35                  40                  45

Asp Ser Asn Tyr Leu Ser Gly Phe Val Asn Leu Ile Gly Phe Asp Phe
    50                  55                  60

Tyr Phe Asn Gly Lys Ser Glu Ile Glu Ile Tyr Ala Glu Val Arg Glu
65                  70                  75                  80

Asp Asp Phe Phe Lys Pro Glu Thr Ile Asn Gln Val Trp Gln His Phe
                85                  90                  95

Pro Lys Ser Ala Leu Lys Pro Leu Gln Ala Ser Ser Leu Phe Phe Thr
            100                 105                 110

Gly Leu Ser Lys Ala Asn His Asn Pro Val Leu Tyr Tyr Asn Leu Lys
        115                 120                 125

Asn Arg Gln Asp Leu Thr Asn Tyr Phe Lys Ile Asn Asp Thr Ala Gln
    130                 135                 140

Arg Val His Ser Phe Tyr Gln His Gln Asp Ile Leu Pro Lys Met Trp
145                 150                 155                 160

Val Gly Thr Ala Gln Gln Glu Leu Glu Lys Thr Arg Ile Glu Asn Val
                165                 170                 175

Arg Leu Tyr Tyr Tyr Lys Tyr Phe Gly Met Glu
            180                 185
```

<210> SEQ ID NO 50
<211> LENGTH: 310
<212> TYPE: PRT
<213> ORGANISM: Hapalosiphonaceae cyanobacterium JJU2

<400> SEQUENCE: 50

-continued

```
Met Ile Leu Thr Thr Thr Trp Gln Asp Asn Tyr Ala Lys Glu Gln Cys
1               5                   10                  15

Ile Gln Tyr Leu Arg His His Phe Glu Ser Phe Glu Val Glu Pro Ala
            20                  25                  30

Phe Pro Leu Pro Leu Phe Glu Gln Ala Ile Leu Lys Leu Asn Ser Cys
        35                  40                  45

Ser Val Leu Glu Pro Ser Phe Lys Val Gln Gly Ser Thr Leu Phe Ala
    50                  55                  60

Gly Arg Val Thr Ala Ser Thr Lys Ala Ala Ser Thr Lys Lys Asp Trp
65                  70                  75                  80

Pro Leu Leu Ile Arg Ser Ala Leu Asn Leu Phe Asp Ala Val Glu Ser
                85                  90                  95

Arg Val Glu Ala Thr Ile Asn Arg Ser Leu Leu Glu Lys Phe Leu Met
            100                 105                 110

Leu His Gln Asp Ser Gly Lys Ile Glu Gly Ser Leu Met Gly Ile Asp
        115                 120                 125

Leu Arg Pro Asn Val Lys Glu Ser Ser Leu Lys Val His Leu His Leu
    130                 135                 140

Asp Lys Glu Gln Ala Val Asp Glu Leu Val Met Thr Ala Ile Asn Leu
145                 150                 155                 160

Asp Gly Gly Tyr Tyr Ala Pro Asp Leu Thr Gln Val Leu Leu Lys Asp
                165                 170                 175

Thr Ala Leu Ile Gly Phe Asp Phe Phe Leu Asp Gly Arg Ser Ala Val
            180                 185                 190

Glu Met Tyr Thr Cys Cys Ala Gly Ser Lys Gln Leu Ser Phe Leu Gly
        195                 200                 205

Lys Arg Gly Ala Tyr Ile Lys Pro Tyr Ile Tyr Lys Asn Phe Ser Gln
    210                 215                 220

Lys Val Thr Ser Leu Leu Lys Asp Val Ala Leu Val Met Val Gly Phe
225                 230                 235                 240

Ser Lys Glu Asn Ser Lys Pro Val Leu Tyr Phe Glu Phe Glu Lys Leu
                245                 250                 255

Arg Asp Ile Lys Ser His Leu Leu Phe Asn Ser Leu Gly Asp Lys Ile
            260                 265                 270

Tyr Asp Phe Cys Leu His His Gln Leu Glu Asn Phe Val Ser Ile Gly
        275                 280                 285

Val Thr Glu Gln Asp Leu Glu Lys Ser Arg Leu Glu Asn Phe Arg Phe
    290                 295                 300

Tyr Tyr Arg Lys Ser Val
305                 310
```

<210> SEQ ID NO 51
<211> LENGTH: 324
<212> TYPE: PRT
<213> ORGANISM: Planktothricoides sp. SR001

<400> SEQUENCE: 51

```
Met Thr Ile Thr Ser Gly Phe Ser His Asn Tyr Leu Arg Glu Gln Arg
1               5                   10                  15

Leu Arg Phe Ile Arg Thr His Leu Asp Ala Phe Asp Val Glu Pro Cys
            20                  25                  30

Phe Pro Leu Pro Leu Phe Glu Glu Ala Val Leu Glu Ile Glu Gly Tyr
        35                  40                  45

Cys Gly Ile Glu Pro Thr Cys His Val Glu Gly Asp Arg Leu Phe Ala
```

```
    50                  55                  60

Ser Asp Phe Gln Val Ala Thr Tyr Glu Glu Thr Trp Pro Arg Ser Leu
65                  70                  75                  80

Val Asp Ala Ser Lys Phe Leu Asp Lys Val Glu Ser Arg Val Gly Val
                85                  90                  95

Gln Ile Asn Arg Asn Leu Leu Asp Gln Phe Ser Ser Leu Tyr Ile Asn
            100                 105                 110

Ser Ser Gln Ile Glu Thr Asn Thr Ile Gly Ile Asp Leu Arg Pro Thr
        115                 120                 125

Leu Gln Asp Ser Leu Ile Lys Val Tyr Met His Leu His Pro Gly Glu
    130                 135                 140

Gly Asn Glu Asp Leu Val Met Thr Ala Leu Ala Leu Asp Gly Ala Asn
145                 150                 155                 160

Tyr Ser Ala Glu Val Thr Glu Val Leu Leu Lys Asp Gly Ser Leu Ile
                165                 170                 175

Gly Phe Asn Leu Phe Leu Asp Gly Arg Ser Asn Ile Glu Ile Trp Ala
            180                 185                 190

Ile Ser Pro Gly Gly Lys Tyr Gln Gln Arg Gly Asn Phe Gly Ser Tyr
        195                 200                 205

Leu Ala Ala Tyr Ile Arg Lys His Phe Ser Gln Lys Val Ile Ser Leu
    210                 215                 220

Phe Asp Val Ser Asp Gly Ile Ala Ala Ser Phe Ser Lys Gln Lys Thr
225                 230                 235                 240

Ser Pro Leu Leu Tyr Phe His Phe Phe Asp Ile Lys Glu Ile Pro Lys
                245                 250                 255

Tyr Phe Ala Phe Asn Ser Leu Gly Asp Lys Ile Tyr Asp Phe Tyr Gln
            260                 265                 270

Ser Leu Asp Cys Val Thr Tyr Ala Thr Val Tyr Ala Arg Glu Gln Asp
        275                 280                 285

Met Glu Ser Asn Arg Leu Asn Asn Tyr Gly Phe Leu Tyr Asn Arg Ser
    290                 295                 300

Asp Thr Cys Gln Val Asp Leu Asp Lys Leu Arg Phe Thr Gln Gln Val
305                 310                 315                 320

Gly Ile Ser Pro


<210> SEQ ID NO 52
<211> LENGTH: 324
<212> TYPE: PRT
<213> ORGANISM: Microcystis aeruginosa

<400> SEQUENCE: 52

Met Thr Ile Thr Pro Val Phe Ser His His Tyr Leu Arg Glu Gln Arg
1               5                   10                  15

Leu Arg Phe Ile Arg Thr His Leu Glu Ala Phe Asp Val Glu Pro Arg
            20                  25                  30

Phe Pro Leu Pro Leu Phe Glu Glu Ala Val Leu Glu Ile Glu Gly Tyr
        35                  40                  45

Cys Gly Ile Glu Pro Thr Cys His Val Gln Gly Asp Arg Ile Phe Ala
    50                  55                  60

Gly Asp Ile Gln Val Ala Thr Tyr Glu Lys Thr Trp Pro Lys Ser Leu
65                  70                  75                  80

Met Gly Ala Ser Lys Phe Leu Asp Lys Val Gly Ser Gln Val Gly Val
                85                  90                  95

Gln Ile Asn Arg Asn Leu Leu Asp Arg Phe Ser Ser Leu Tyr Ile His
```

100 105 110

Ser Ser Lys Ile Glu Thr Asn Thr Ile Gly Ile Asp Leu Arg Pro Thr
115 120 125

Ile Gln Asp Ser Leu Ile Lys Ile Tyr Met His Leu His Pro Gly Gly
130 135 140

Ser His Glu Asp Leu Val Met Thr Ala Leu Ala Leu Asp Gly Ala Asn
145 150 155 160

Tyr Ser Ala Glu Val Thr Glu Val Leu Leu Lys Asp Gly Ala Leu Ile
165 170 175

Gly Phe Asn Leu Phe Leu Asp Gly Arg Ser Asn Ile Glu Ile Trp Ala
180 185 190

Ile Ser Pro Gly Gly Lys Tyr Gln His Lys Gly Asn Phe Gly Arg Asp
195 200 205

Leu Ala Ala Tyr Ile Arg Lys Asn Phe Ser Gln Lys Val Asn Phe Leu
210 215 220

Phe Asp Val Ala Asp Gly Ile Ala Ala Ser Phe Ser Lys Gln Lys Ile
225 230 235 240

Asp Pro Ile Phe Tyr Phe His Phe Phe Asp Ile Lys Asp Ile Pro Lys
245 250 255

Tyr Phe Ala Phe Asn Ser Leu Gly Asp Arg Ile Tyr Asp Phe Tyr Gln
260 265 270

Ser Gln Asp Cys Val Thr Tyr Ala Ser Ile Ser Val Arg Glu Gln Asp
275 280 285

Leu Glu Ser Ser Arg Leu Asp Asn Tyr Gly Phe Leu Tyr Asn Lys Ser
290 295 300

Asp Val Cys Gln Leu Asn Leu Asp Lys Phe His Phe Ala Gln Gln Leu
305 310 315 320

Gly Ile Ser Pro

<210> SEQ ID NO 53
<211> LENGTH: 320
<212> TYPE: PRT
<213> ORGANISM: Oscillatoria nigro-viridis

<400> SEQUENCE: 53

Met Pro Ile Thr Ser Val Phe Ser His Asn Tyr Leu Arg Glu Gln Arg
1 5 10 15

Leu Arg Phe Ile Arg Thr His Arg Asp Ala Phe Asp Val Pro Tyr Ser
20 25 30

Phe Leu Leu Pro Leu Tyr Glu Glu Ala Val Phe Lys Ile Glu Gly Ser
35 40 45

Cys Gly Val Glu Pro Ser Cys Asn Val Glu Gly Asp Arg Leu Phe Ala
50 55 60

Gly Asp Phe Gln Val Ala Asn Tyr Gly His Thr Trp Pro Arg Ser Leu
65 70 75 80

Ile Asp Ala Ala Ser Phe Leu Asp Lys Ile Glu Arg Arg Ile Asp Val
85 90 95

Lys Ile Asn Arg Asn Leu Leu Glu Arg Phe Ser Ala Leu Tyr Ile Gly
100 105 110

Ser Ser Lys Ile Glu Asn Asn Thr Ile Gly Ile Asp Leu Arg Pro Thr
115 120 125

Leu Gln Asp Ser Val Ile Lys Ile Tyr Met His Ile His Pro Gly Gln
130 135 140

Ser Asn Glu Asp Leu Val Met Thr Ala Leu Ala Leu Asp Gly Ala Ile

-continued

```
145                 150                 155                 160

Tyr Ser Ala Glu Leu Thr Gln Val Leu Leu Arg Asp Val Val Val Ile
                165                 170                 175

Gly Phe Asn Leu Phe Leu Asp Gly Arg Ser Asn Ile Glu Ile Trp Ala
            180                 185                 190

Gly Ser Ala Gly Gln Lys His Asn His Gln Gly Asn Leu Gly Arg Asp
        195                 200                 205

Leu Thr Ala Tyr Ile Arg Lys Tyr Tyr Ser His Lys Val Asn Tyr Met
    210                 215                 220

Phe Asn Val Ser Asp Phe Ser Ala Val Ser Phe Ser Lys Gln Lys Ile
225                 230                 235                 240

Asp Pro Leu Phe His Phe His Phe Phe Asp Ile Lys Asp Ile Leu Lys
                245                 250                 255

Tyr Phe Ala Phe Asn Ser Leu Gly Asp Lys Ile Tyr Asp Phe Cys Gln
            260                 265                 270

Ser Gln Asp Cys Ile Thr Tyr Thr Gly Val Ser Ala Arg Ala Gln Glu
        275                 280                 285

Leu Glu Ser Asn Arg Leu Asn Asn Tyr Ser Phe Phe Tyr Asn Gln Ser
    290                 295                 300

Asp Thr Cys Gln Thr Asp Leu Asp Ile Leu Arg Leu Pro Met Met Phe
305                 310                 315                 320


<210> SEQ ID NO 54
<211> LENGTH: 306
<212> TYPE: PRT
<213> ORGANISM: Planktothrix paucivesiculata PCC 9631

<400> SEQUENCE: 54

Met Leu Gln Asn Ile Gln Asn Asn Arg Phe Lys Asp Arg Pro Ile Glu
1               5                   10                  15

Phe Ile Arg Ser His Gln Glu Ala Phe Asp Val Glu Pro Ile Phe Pro
            20                  25                  30

Ile Pro Leu Phe Glu Glu Val Ile Leu Glu Leu Glu Gly Val Phe Ser
        35                  40                  45

Val Lys Pro Ser Cys Lys Val Glu Gly Ser Arg Leu Leu Ala Gly Arg
    50                  55                  60

Tyr Glu Thr Gly Ile Leu Pro Met Arg Lys Thr Trp Pro Gln Leu Leu
65                  70                  75                  80

Thr His Thr Phe Lys Phe Leu Asn Lys Ile Glu Ser Arg Val Gly Val
                85                  90                  95

Cys Ile Asn Arg Glu Ser Phe Glu Gln Phe Ala Ala Val His Ile Gly
            100                 105                 110

Ser Asp Lys Ile Met Asp Ser Thr Ile Gly Val His Leu Gly Ser Lys
        115                 120                 125

Leu Glu Asp Ser Ser Val Met Met Tyr Ile His Phe Asp Thr Glu Gln
    130                 135                 140

Asp Cys Glu Glu Leu Ala Lys Thr Ala Ile Ala Leu Asp Gly Gly His
145                 150                 155                 160

Tyr Ser Asp Glu Leu Thr Gln Val Leu Ile Arg Asp Met Val Val Ile
                165                 170                 175

Gly Phe Glu Leu Phe Phe Asp Gly Arg Ser His Val Glu Leu Cys Pro
            180                 185                 190

Val Ala Pro Ala Gln Pro Gly Ala Leu Gly Ile Arg Gly Lys Tyr Leu
        195                 200                 205
```

```
Thr Pro Tyr Ile Gln Lys Tyr Phe Ser Gln Lys Val Asn Ser Ile Phe
    210                 215                 220

Arg Gly Ser His Leu Leu Lys Ile Cys Phe Ser Lys Ala Tyr Ala Thr
225                 230                 235                 240

Pro Val Leu Gly Phe Tyr Phe Lys Asn Leu Lys Asp Ile Pro Lys Tyr
                245                 250                 255

Phe Arg Phe Asn Ser Leu Gly Asp Arg Ile Tyr Asp Phe Cys Gln Ser
            260                 265                 270

Gln Ser Cys Ile Met Val Pro Ala Val Phe Ala Thr Glu Ala Glu Leu
        275                 280                 285

Glu Lys Ser Arg Leu Glu Lys Phe Asp Phe Tyr Tyr Ile Arg Trp Glu
    290                 295                 300

Glu Cys
305


<210> SEQ ID NO 55
<211> LENGTH: 300
<212> TYPE: PRT
<213> ORGANISM: Prochloron Didemni

<400> SEQUENCE: 55

Met Ile Val Asn Val Ile Gln Lys Asp Arg Leu Lys Glu Gln Lys Leu
1               5                   10                  15

Gln Phe Ile Arg Asn His Gln Gln Ala Phe Asp Val Glu Pro Ile Tyr
            20                  25                  30

Pro Leu Pro Leu Phe Glu Asp Phe Val Thr Ser Ile Glu Gly Asp Cys
        35                  40                  45

Ser Leu Glu Ala Ser Cys Lys Ile Glu Ser Asp Lys Leu Ile Ala Ser
    50                  55                  60

Arg Phe Leu Leu Phe Phe Glu Asp Lys Thr Gln Glu Trp Gln Lys Tyr
65                  70                  75                  80

Leu His Gln Ser Leu Thr Phe Phe Gly Leu Val Glu Asn Arg Val Gly
                85                  90                  95

Val Lys Ile Asn Tyr Ser Leu Leu Gln Gln Phe Leu Gly Ser Ser Phe
            100                 105                 110

Asp Phe Ser Lys Val Thr Val Leu Ser Ala Gly Ile Asp Leu Arg Asn
        115                 120                 125

Asn Leu Ala Glu Ser Ser Leu Lys Met His Ile Arg Ile Lys Asp Tyr
    130                 135                 140

Pro Glu Lys Leu Asp Lys Ala Phe Ala Leu Ser Asp Gly Ala Ala Asp
145                 150                 155                 160

Gly Asn Tyr Leu Lys Asp Phe Val Asn Leu Ile Gly Phe Asp Phe Tyr
                165                 170                 175

Phe Asn Gly Lys Ser Glu Ile Glu Ile Tyr Ala Glu Val Gln Glu Asp
            180                 185                 190

Asp Phe Phe Lys Pro Glu Ile Asn Asn Leu Val Trp Gln His Phe Pro
        195                 200                 205

Lys Thr Ala Leu Gln Pro Leu Lys Ala Ser Ser Leu Phe Phe Thr Gly
    210                 215                 220

Leu Ser Lys Ala Asn Asn Asn Pro Val Leu Tyr Tyr His Leu Lys Asn
225                 230                 235                 240

Arg Gln Asp Leu Thr Asn Tyr Phe Lys Leu Asn Asp Thr Ala Gln Arg
                245                 250                 255

Val His Ser Phe Tyr Gln His Gln Asp Ile Leu Pro Tyr Met Trp Val
            260                 265                 270
```

```
Gly Thr Ala Gln Lys Glu Leu Glu Lys Thr Arg Ile Glu Asn Ile Arg
        275                 280                 285

Leu Tyr Tyr Tyr Lys Ser Phe Lys Met Glu Ser Asn
    290                 295                 300


<210> SEQ ID NO 56
<211> LENGTH: 321
<212> TYPE: PRT
<213> ORGANISM: Prochloron Didemni
<220> FEATURE:
<221> NAME/KEY: misc_feature
<222> LOCATION: (135)..(135)
<223> OTHER INFORMATION: Xaa can be any naturally occurring amino acid
<220> FEATURE:
<221> NAME/KEY: misc_feature
<222> LOCATION: (174)..(174)
<223> OTHER INFORMATION: Xaa can be any naturally occurring amino acid
<220> FEATURE:
<221> NAME/KEY: misc_feature
<222> LOCATION: (203)..(203)
<223> OTHER INFORMATION: Xaa can be any naturally occurring amino acid

<400> SEQUENCE: 56

Asp Leu Ile Asp Arg Leu Gln Asn Asn Gln Arg Lys Asp Arg Arg Leu
1               5                   10                  15

Gln Phe Val Arg Thr His Gln Glu Ala Phe Asp Val Lys Pro Thr Phe
            20                  25                  30

Pro Leu Pro Leu Phe Glu Glu Ala Ile Leu Glu Ile Glu Gly Ser Cys
        35                  40                  45

Ser Val Glu Ser Ser Cys Gln Val Glu Gly Asp Arg Leu Gln Gly Gly
    50                  55                  60

Arg Tyr Glu Val Cys Asn Asn Gln Gly Thr Thr Trp Pro Glu Ser Leu
65                  70                  75                  80

Thr His Ala Phe Lys Leu Leu Asp Lys Ile Asp Ser Gln Leu Gly Val
                85                  90                  95

Arg Ile Asn Arg Asp Ser Phe Asp Arg Phe Ala Ala Ala His Val Asn
            100                 105                 110

Ser Arg Lys Ile Ile Asn Asn Thr Ile Gly Val His Leu Gly Ser Lys
        115                 120                 125

Leu Glu Asp Ser Ser Val Xaa Leu Tyr Ile His Ile Lys Pro Glu Glu
    130                 135                 140

Asp Thr Glu Glu Leu Ala Arg Thr Ala Leu Val Leu Asp Gly Gly Arg
145                 150                 155                 160

Tyr Ser Asp Glu Leu Thr Arg Val Leu Leu Arg Asp Thr Xaa Val Ile
                165                 170                 175

Gly Phe Glu Leu Phe Phe Asp Gly Arg Ser Arg Val Asp Leu Gly Pro
            180                 185                 190

Cys Ala Pro Gly Lys Ser Gly Thr Leu Lys Xaa Lys Gly Lys His Leu
        195                 200                 205

Glu Gln Tyr Thr Gln Lys Asn Leu Ser Arg Lys Val Asn Ser Ile Phe
    210                 215                 220

Arg Glu Gly Tyr Leu Phe Gly Ala Phe Phe Ser Lys Thr Arg Val Glu
225                 230                 235                 240

Pro Ile Leu Phe Phe Tyr His Ser Ile Ile Lys Asp Leu Pro Lys Tyr
                245                 250                 255

Phe Thr Phe Asn Ser Leu Gly Asp Lys Ile Tyr Asn Phe Cys Gln Ser
            260                 265                 270

Gln Gly Cys Ile Thr Asp Val Ala Ile Ala Val Thr Glu Thr Glu Leu
```

275 280 285

Glu Lys Ser Arg Leu Glu Asn Phe Cys Phe Tyr Tyr Asp Gln Trp Asp
290 295 300

Glu Cys Lys Pro Ser Ser Asp Tyr Asp Thr Glu Arg His Leu His Arg
305 310 315 320

Ser

<210> SEQ ID NO 57
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 57

Gly Val Trp Gly Gly
1 5

<210> SEQ ID NO 58
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 58

Gly Val Trp Trp Gly
1 5

<210> SEQ ID NO 59
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 59

Gly Val Trp Ser Gly
1 5

<210> SEQ ID NO 60
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 60

Glu Val Trp Asn Leu
1 5

<210> SEQ ID NO 61
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 61

Arg Val Trp Gly Pro
1 5

<210> SEQ ID NO 62
<211> LENGTH: 5
<212> TYPE: PRT

<213> ORGANISM: Artificial Sequence
<220> FEATURE:
<223> OTHER INFORMATION: motif for prenylation by KgpF

<400> SEQUENCE: 62

Arg Val Trp Gly Cys
1               5

<210> SEQ ID NO 63
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 63

Arg Val Trp Gly Tyr
1               5

<210> SEQ ID NO 64
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 64

His Val Trp Gly Asp
1               5

<210> SEQ ID NO 65
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 65

Asp Val Trp Gly Tyr
1               5

<210> SEQ ID NO 66
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 66

Asp Val Trp Ile Phe
1               5

<210> SEQ ID NO 67
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 67

Tyr Val Trp Gly Arg
1               5

<210> SEQ ID NO 68
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 68

Tyr Val Trp Gly His
1 5

<210> SEQ ID NO 69
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 69

His Val Trp Gly Thr
1 5

<210> SEQ ID NO 70
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 70

Thr Val Trp Gly Tyr
1 5

<210> SEQ ID NO 71
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 71

Tyr Val Trp Gly Pro
1 5

<210> SEQ ID NO 72
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 72

Pro Val Trp Gly Cys
1 5

<210> SEQ ID NO 73
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 73

His Val Trp Ser Leu
1 5

<210> SEQ ID NO 74
<211> LENGTH: 5
<212> TYPE: PRT
<213> ORGANISM: Artificial Sequence
<220> FEATURE:

-continued

<223> OTHER INFORMATION: motif for prenylation by KgpF

<400> SEQUENCE: 74

Ala Val Trp Asp His
1 5

<210> SEQ ID NO 75
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 75

Ser Val Trp Thr Cys
1 5

<210> SEQ ID NO 76
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 76

Ala Val Trp Arg Ser
1 5

<210> SEQ ID NO 77
<211> LENGTH: 5
<212> TYPE: PRT
<213> ORGANISM: Artificial Sequence
<220> FEATURE:
<223> OTHER INFORMATION: motif for prenylation by KgpF
<220> FEATURE:
<221> NAME/KEY: MOD_RES
<222> LOCATION: (1)..(1)
<223> OTHER INFORMATION: ClAc-D-Tyr

<400> SEQUENCE: 77

Tyr Val Trp Asn Val
1 5

<210> SEQ ID NO 78
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 78

Ala Val Trp Gln Thr
1 5

<210> SEQ ID NO 79
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 79

Arg Val Trp Lys Leu
1 5

<210> SEQ ID NO 80
<211> LENGTH: 5

<212> TYPE: PRT
<213> ORGANISM: Artificial Sequence
<220> FEATURE:
<223> OTHER INFORMATION: motif for prenylation by KgpF

<400> SEQUENCE: 80

Thr Val Trp Gln Gln
1 5

<210> SEQ ID NO 81
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 81

Ser Val Trp Ser Ile
1 5

<210> SEQ ID NO 82
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 82

Asp Val Trp Gln Thr
1 5

<210> SEQ ID NO 83
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 83

His Val Trp His Gln
1 5

<210> SEQ ID NO 84
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 84

Glu Val Trp Asn Leu
1 5

<210> SEQ ID NO 85
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 85

Gly Thr Trp Gly Gly
1 5

<210> SEQ ID NO 86
<211> LENGTH: 5
<212> TYPE: PRT

<213> ORGANISM: Artificial Sequence
<220> FEATURE:
<223> OTHER INFORMATION: motif for prenylation by KgpF

<400> SEQUENCE: 86

Gly Thr Trp Trp Gly
1 5

<210> SEQ ID NO 87
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 87

Gly Thr Trp Ser Gly
1 5

<210> SEQ ID NO 88
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 88

His Thr Trp Ser Thr
1 5

<210> SEQ ID NO 89
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 89

Ser Thr Trp Thr Ser
1 5

<210> SEQ ID NO 90
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 90

Asn Thr Trp Trp Gln
1 5

<210> SEQ ID NO 91
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 91

Ile Thr Trp Pro Leu
1 5

<210> SEQ ID NO 92
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 92

Gly Thr Trp Leu Tyr
1 5

<210> SEQ ID NO 93
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 93

Asn Thr Trp Lys Val
1 5

<210> SEQ ID NO 94
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 94

Phe Thr Trp Asp Asn
1 5

<210> SEQ ID NO 95
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 95

Thr Thr Trp Asp Glu
1 5

<210> SEQ ID NO 96
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 96

Glu Thr Trp Asn Ala
1 5

<210> SEQ ID NO 97
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 97

Thr Thr Trp Asn Ala
1 5

<210> SEQ ID NO 98
<211> LENGTH: 5
<212> TYPE: PRT
<213> ORGANISM: Artificial Sequence
<220> FEATURE:

<223> OTHER INFORMATION: motif for prenylation by KgpF

<400> SEQUENCE: 98

Val Thr Trp Asn Ser
1 5

<210> SEQ ID NO 99
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 99

Val Thr Trp Asn Ala
1 5

<210> SEQ ID NO 100
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 100

Asn Thr Trp Asn Ser
1 5

<210> SEQ ID NO 101
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 101

Glu Thr Trp His Asn
1 5

<210> SEQ ID NO 102
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 102

Ser Thr Trp Gly Ser
1 5

<210> SEQ ID NO 103
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 103

Leu Thr Trp Gly Ala
1 5

<210> SEQ ID NO 104
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 104

Ser Thr Trp Gly His
1 5

<210> SEQ ID NO 105
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 105

Val Thr Trp Lys Gly
1 5

<210> SEQ ID NO 106
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 106

Ala Thr Trp Asn Ala
1 5

<210> SEQ ID NO 107
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 107

Gly Ile Trp Gly Gly
1 5

<210> SEQ ID NO 108
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 108

Gly Ile Trp Trp Gly
1 5

<210> SEQ ID NO 109
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 109

Gly Ile Trp Ser Gly
1 5

<210> SEQ ID NO 110
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 110

Arg Ile Trp Arg Tyr
1 5

<210> SEQ ID NO 111
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 111

Ile Ile Trp Ile Ile
1 5

<210> SEQ ID NO 112
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 112

Gly Ile Trp Gly Ser
1 5

<210> SEQ ID NO 113
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 113

Gln Ile Trp Thr His
1 5

<210> SEQ ID NO 114
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 114

Arg Ile Trp Arg Lys
1 5

<210> SEQ ID NO 115
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 115

Lys Ile Trp Asn Ser
1 5

<210> SEQ ID NO 116
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 116

Thr Ile Trp Ile Ile
1 5

<210> SEQ ID NO 117
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 117

Arg Ile Trp Gln Val
1 5

<210> SEQ ID NO 118
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 118

Gly Ile Trp Glu Lys
1 5

<210> SEQ ID NO 119
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 119

Ser Ile Trp Ser Gln
1 5

<210> SEQ ID NO 120
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 120

His Ile Trp Thr Asp
1 5

<210> SEQ ID NO 121
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 121

Ile Ile Trp His Arg
1 5

<210> SEQ ID NO 122
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 122

Gln Ile Trp Pro Asn
1 5

<210> SEQ ID NO 123
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 123

Gly Ala Trp Gly Gly
1 5

<210> SEQ ID NO 124
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 124

Gly Ala Trp Trp Gly
1 5

<210> SEQ ID NO 125
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 125

Gly Ala Trp Ser Gly
1 5

<210> SEQ ID NO 126
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 126

Ser Ala Trp His Gly
1 5

<210> SEQ ID NO 127
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 127

Pro Ala Trp Val Arg
1 5

<210> SEQ ID NO 128
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 128

Tyr Ala Trp Asp Gln

-continued 1 5

<210> SEQ ID NO 129
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 129

Tyr Ala Trp Leu Arg
1 5

<210> SEQ ID NO 130
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 130

Gln Ala Trp Thr Lys
1 5

<210> SEQ ID NO 131
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 131

Asn Ala Trp Thr Gly
1 5

<210> SEQ ID NO 132
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 132

Tyr Ala Trp Arg Ser
1 5

<210> SEQ ID NO 133
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 133

Leu Ala Trp Gln Ile
1 5

<210> SEQ ID NO 134
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 134

Lys Ala Trp Ile Cys
1 5

<210> SEQ ID NO 135
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 135

Lys Ala Trp His Arg
1 5

<210> SEQ ID NO 136
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 136

Gly Pro Trp Gly Gly
1 5

<210> SEQ ID NO 137
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 137

Gly Pro Trp Trp Gly
1 5

<210> SEQ ID NO 138
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 138

Gly Pro Trp Ser Gly
1 5

<210> SEQ ID NO 139
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 139

Arg Pro Trp Val Pro
1 5

<210> SEQ ID NO 140
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 140

Gln Pro Trp Pro Glu
1 5

<210> SEQ ID NO 141
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 141

Thr Pro Trp Val Cys
1 5

<210> SEQ ID NO 142
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 142

Trp Pro Trp Arg Thr
1 5

<210> SEQ ID NO 143
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 143

Val Pro Trp Ala Glu
1 5

<210> SEQ ID NO 144
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 144

Lys Pro Trp Leu Lys
1 5

<210> SEQ ID NO 145
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 145

Lys Pro Trp Asn Tyr
1 5

<210> SEQ ID NO 146
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 146

Arg Pro Trp Tyr Cys
1 5

<210> SEQ ID NO 147
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 147

Ser Pro Trp Ile Asp
1 5

<210> SEQ ID NO 148
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 148

Asp Pro Trp Lys Ser
1 5

<210> SEQ ID NO 149
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 149

Asn Asn Trp Ser Pro
1 5

<210> SEQ ID NO 150
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 150

Asn Asn Trp Ser Thr
1 5

<210> SEQ ID NO 151
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 151

Gly Asn Trp Ser Tyr
1 5

<210> SEQ ID NO 152
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 152

Tyr Asn Trp Ser Gln
1 5

<210> SEQ ID NO 153

<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 153

Ile Asn Trp Ser Leu
1               5

<210> SEQ ID NO 154
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 154

Arg Asn Trp Ser Tyr
1               5

<210> SEQ ID NO 155
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 155

Arg Asn Trp Ser Arg
1               5

<210> SEQ ID NO 156
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 156

Phe Asn Trp Ser Phe
1               5

<210> SEQ ID NO 157
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 157

Gly Asn Trp Ser Gly
1               5

<210> SEQ ID NO 158
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 158

Asn Asn Trp Ser Thr
1               5

<210> SEQ ID NO 159
<211> LENGTH: 5

<212> TYPE: PRT
<213> ORGANISM: Artificial Sequence
<220> FEATURE:
<223> OTHER INFORMATION: motif for prenylation by KgpF

<400> SEQUENCE: 159

Gly Asn Trp Gly Gly
1               5

<210> SEQ ID NO 160
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 160

Gly Asn Trp Trp Gly
1               5

<210> SEQ ID NO 161
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 161

Gly Asn Trp Ala Gly
1               5

<210> SEQ ID NO 162
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 162

Gly Asn Trp Leu Gly
1               5

<210> SEQ ID NO 163
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 163

Gly Asn Trp Phe Gly
1               5

<210> SEQ ID NO 164
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 164

Gly Asn Trp Thr Gly
1               5

<210> SEQ ID NO 165
<211> LENGTH: 5
<212> TYPE: PRT

<213> ORGANISM: Artificial Sequence
<220> FEATURE:
<223> OTHER INFORMATION: motif for prenylation by KgpF

<400> SEQUENCE: 165

Gly Asn Trp Arg Gly
1 5

<210> SEQ ID NO 166
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 166

Gly Asn Trp Asn Gly
1 5

<210> SEQ ID NO 167
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 167

Gly Asn Trp Tyr Gly
1 5

<210> SEQ ID NO 168
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 168

Gly Asn Trp Ile Gly
1 5

<210> SEQ ID NO 169
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 169

Gly Asn Trp Val Gly
1 5

<210> SEQ ID NO 170
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 170

Gly Asn Trp His Gly
1 5

<210> SEQ ID NO 171
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 171

Gly Asn Trp Gln Gly
1 5

<210> SEQ ID NO 172
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 172

Gly Asn Trp Lys Gly
1 5

<210> SEQ ID NO 173
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 173

Gly Asn Trp Asp Gly
1 5

<210> SEQ ID NO 174
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 174

Gly Asn Trp Glu Gly
1 5

<210> SEQ ID NO 175
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 175

Asn Asn Trp Pro Thr
1 5

<210> SEQ ID NO 176
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 176

Pro Asn Trp Arg Phe
1 5

<210> SEQ ID NO 177
<211> LENGTH: 5
<212> TYPE: PRT
<213> ORGANISM: Artificial Sequence
<220> FEATURE:

<223> OTHER INFORMATION: motif for prenylation by KgpF

<400> SEQUENCE: 177

Phe Phe Trp Phe Phe
1 5

<210> SEQ ID NO 178
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 178

Gly Phe Trp Ser Gly
1 5

<210> SEQ ID NO 179
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 179

Gly Leu Trp Ser Gly
1 5

<210> SEQ ID NO 180
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 180

Tyr Leu Trp Ser Lys
1 5

<210> SEQ ID NO 181
<211> LENGTH: 5
<212> TYPE: PRT
<213> ORGANISM: Artificial Sequence
<220> FEATURE:
<223> OTHER INFORMATION: motif for prenylation by KgpF
<220> FEATURE:
<221> NAME/KEY: MOD_RES
<222> LOCATION: (1)..(1)
<223> OTHER INFORMATION: ClAc-D-Tyr

<400> SEQUENCE: 181

Tyr Leu Trp Val Leu
1 5

<210> SEQ ID NO 182
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 182

Asn Asp Trp Ser Thr
1 5

<210> SEQ ID NO 183
<211> LENGTH: 5

<212> TYPE: PRT
<213> ORGANISM: Artificial Sequence
<220> FEATURE:
<223> OTHER INFORMATION: motif for prenylation by KgpF

<400> SEQUENCE: 183

Tyr Asp Trp Phe Cys
1               5

<210> SEQ ID NO 184
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 184

Asn Glu Trp Ser Thr
1               5

<210> SEQ ID NO 185
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 185

His Glu Trp Pro Trp
1               5

<210> SEQ ID NO 186
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 186

Asn Lys Trp Ser Thr
1               5

<210> SEQ ID NO 187
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 187

Asn Tyr Trp Ser Thr
1               5

<210> SEQ ID NO 188
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 188

Gly Ser Trp Ser Gly
1               5

<210> SEQ ID NO 189
<211> LENGTH: 5
<212> TYPE: PRT

<213> ORGANISM: Artificial Sequence
<220> FEATURE:
<223> OTHER INFORMATION: motif for prenylation by KgpF
<220> FEATURE:
<221> NAME/KEY: MOD_RES
<222> LOCATION: (1)..(1)
<223> OTHER INFORMATION: ClAc-D-Tyr

<400> SEQUENCE: 189

Tyr Ser Trp Ser Pro
1               5

<210> SEQ ID NO 190
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 190

Ile Ser Trp Asn Glu
1               5

<210> SEQ ID NO 191
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 191

Gly Trp Trp Ser Gly
1               5

<210> SEQ ID NO 192
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 192

Thr Trp Trp Gln Arg
1               5

<210> SEQ ID NO 193
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 193

Gly Gly Trp Ser Gly
1               5

<210> SEQ ID NO 194
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 194

Thr Gly Trp Thr Arg
1               5

-continued

<210> SEQ ID NO 195
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 195

Gly His Trp Ser Gly
1               5

<210> SEQ ID NO 196
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 196

Phe His Trp Gly Leu
1               5

<210> SEQ ID NO 197
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 197

Ile His Trp Asp Cys
1               5

<210> SEQ ID NO 198
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 198

Gly Gln Trp Ser Gly
1               5

<210> SEQ ID NO 199
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 199

Tyr Gln Trp Ala Cys
1               5

<210> SEQ ID NO 200
<211> LENGTH: 5
<212> TYPE: PRT
<213> ORGANISM: Artificial Sequence
<220> FEATURE:
<223> OTHER INFORMATION: motif for prenylation by KgpF

<400> SEQUENCE: 200

Tyr Arg Trp Arg Val
1               5

<210> SEQ ID NO 201

<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 201

Asn Asn Trp Ser Pro
1 5

<210> SEQ ID NO 202
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 202

Asn Asn Trp Ser Thr
1 5

<210> SEQ ID NO 203
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 203

Arg Ile Trp Arg Tyr
1 5

<210> SEQ ID NO 204
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 204

Arg Pro Trp Val Pro
1 5

<210> SEQ ID NO 205
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 205

Asp Val Trp Ile Phe
1 5

<210> SEQ ID NO 206
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 206

Ile Ser Trp Asn Glu
1 5

<210> SEQ ID NO 207
<211> LENGTH: 5

<212> TYPE: PRT
<213> ORGANISM: Artificial Sequence
<220> FEATURE:
<223> OTHER INFORMATION: motif for prenylation by OltF

<400> SEQUENCE: 207

Pro Asn Trp Arg Phe
1 5

<210> SEQ ID NO 208
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 208

Tyr Ala Trp Asp Gln
1 5

<210> SEQ ID NO 209
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 209

Glu Val Trp Asn Leu
1 5

<210> SEQ ID NO 210
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 210

Gly Arg Trp Gly Tyr
1 5

<210> SEQ ID NO 211
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 211

Phe Phe Trp Phe Phe
1 5

<210> SEQ ID NO 212
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 212

Gly Gly Trp Gly Gly
1 5

<210> SEQ ID NO 213
<211> LENGTH: 5
<212> TYPE: PRT

<213> ORGANISM: Artificial Sequence
<220> FEATURE:
<223> OTHER INFORMATION: motif for prenylation by OltF

<400> SEQUENCE: 213

Tyr Tyr Trp Tyr Tyr
1 5

<210> SEQ ID NO 214
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 214

Asn Asn Trp Asn Asn
1 5

<210> SEQ ID NO 215
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 215

Val Val Trp Val Val
1 5

<210> SEQ ID NO 216
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 216

Tyr Phe Trp Leu Pro
1 5

<210> SEQ ID NO 217
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 217

Gly Leu Trp Val Pro
1 5

<210> SEQ ID NO 218
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 218

Ser Asp Trp Phe Trp
1 5

<210> SEQ ID NO 219
<211> LENGTH: 5
<212> TYPE: PRT
<213> ORGANISM: Artificial Sequence
<220> FEATURE:
<223> OTHER INFORMATION: motif for prenylation by OltF

<400> SEQUENCE: 219

Trp Phe Trp Leu Pro
1               5

<210> SEQ ID NO 220
<211> LENGTH: 12
<212> TYPE: PRT
<213> ORGANISM: Artificial Sequence
<220> FEATURE:
<223> OTHER INFORMATION: partial structure of cyclic peptide, YG280

<400> SEQUENCE: 220

Trp Leu Asn Gly Asp Asn Asn Trp Ser Thr Pro Cys
1               5                   10

<210> SEQ ID NO 221
<211> LENGTH: 11
<212> TYPE: PRT
<213> ORGANISM: Artificial Sequence
<220> FEATURE:
<223> OTHER INFORMATION: partial structure of cyclic peptide, YG281

<400> SEQUENCE: 221

Trp Leu Asn Gly Asp Asn Asn Trp Ser Pro Cys
1               5                   10

<210> SEQ ID NO 222
<211> LENGTH: 11
<212> TYPE: PRT
<213> ORGANISM: Artificial Sequence
<220> FEATURE:
<223> OTHER INFORMATION: partial structure of cyclic peptide, YG282

<400> SEQUENCE: 222

Trp Leu Asn Gly Asp Asn Asn Trp Ser Thr Cys
1               5                   10

<210> SEQ ID NO 223
<211> LENGTH: 12
<212> TYPE: PRT
<213> ORGANISM: Artificial Sequence
<220> FEATURE:
<223> OTHER INFORMATION: partial structure of cyclic peptide, ClAc-D-
      Trp-initiated YG298
<220> FEATURE:
<221> NAME/KEY: MOD_RES
<222> LOCATION: (1)..(1)
<223> OTHER INFORMATION: ClAc-D-Trp

<400> SEQUENCE: 223

Trp Leu Asn Gly Asp Asn Asn Tyr Ser Thr Pro Cys
1               5                   10

<210> SEQ ID NO 224
<211> LENGTH: 12
<212> TYPE: PRT
<213> ORGANISM: Artificial Sequence
<220> FEATURE:
<223> OTHER INFORMATION: partial structure of cyclic peptide, ClAc-D-
      Trp-initiated YG280
<220> FEATURE:
<221> NAME/KEY: MOD_RES
<222> LOCATION: (1)..(1)
<223> OTHER INFORMATION: ClAc-D-Tyr

<400> SEQUENCE: 224

```
Tyr Leu Asn Gly Asp Asn Asn Trp Ser Thr Pro Cys
1               5                   10


<210> SEQ ID NO 225
<211> LENGTH: 13
<212> TYPE: PRT
<213> ORGANISM: Artificial Sequence
<220> FEATURE:
<223> OTHER INFORMATION: partial structure of cyclic peptide, YG290-CM11
<220> FEATURE:
<221> NAME/KEY: MOD_RES
<222> LOCATION: (1)..(1)
<223> OTHER INFORMATION: ClAc-D-Trp

<400> SEQUENCE: 225

Trp Cys Asp Val Ser Gly Arg Phe Gly Tyr Phe Pro Cys
1               5                   10


<210> SEQ ID NO 226
<211> LENGTH: 8
<212> TYPE: PRT
<213> ORGANISM: Artificial Sequence
<220> FEATURE:
<223> OTHER INFORMATION: partial structure of cyclic peptide, YG310
<220> FEATURE:
<221> NAME/KEY: MOD_RES
<222> LOCATION: (1)..(1)
<223> OTHER INFORMATION: ClAc-D-Tyr

<400> SEQUENCE: 226

Tyr Asp Asn Asn Trp Ser Thr Cys
1               5


<210> SEQ ID NO 227
<211> LENGTH: 10
<212> TYPE: PRT
<213> ORGANISM: Artificial Sequence
<220> FEATURE:
<223> OTHER INFORMATION: partial structure of cyclic peptide, YG311
<220> FEATURE:
<221> NAME/KEY: MOD_RES
<222> LOCATION: (1)..(1)
<223> OTHER INFORMATION: ClAc-D-Tyr

<400> SEQUENCE: 227

Tyr Gly Asp Asn Asn Trp Ser Thr Pro Cys
1               5                   10


<210> SEQ ID NO 228
<211> LENGTH: 12
<212> TYPE: PRT
<213> ORGANISM: Artificial Sequence
<220> FEATURE:
<223> OTHER INFORMATION: partial structure of cyclic peptide, YG280-1
<220> FEATURE:
<221> NAME/KEY: MOD_RES
<222> LOCATION: (1)..(1)
<223> OTHER INFORMATION: ClAc-D-Tyr

<400> SEQUENCE: 228

Tyr Leu Asn Gly Asp Asn Asn Trp Ser Thr Pro Cys
1               5                   10


<210> SEQ ID NO 229
<211> LENGTH: 14
<212> TYPE: PRT
<213> ORGANISM: Artificial Sequence
<220> FEATURE:
<223> OTHER INFORMATION: partial structure of cyclic peptide, YG312
```

<220> FEATURE:
<221> NAME/KEY: MOD_RES
<222> LOCATION: (1)..(1)
<223> OTHER INFORMATION: ClAc-D-Tyr

<400> SEQUENCE: 229

Tyr Leu Asn Gly Asp Asn Asn Trp Ser Thr Gln Asn Pro Cys
1 5 10

<210> SEQ ID NO 230
<211> LENGTH: 16
<212> TYPE: PRT
<213> ORGANISM: Artificial Sequence
<220> FEATURE:
<223> OTHER INFORMATION: partial structure of cyclic peptide, YG313
<220> FEATURE:
<221> NAME/KEY: MOD_RES
<222> LOCATION: (1)..(1)
<223> OTHER INFORMATION: ClAc-D-Tyr

<400> SEQUENCE: 230

Tyr Leu Asn Asn Gly Asp Asn Asn Trp Ser Thr Gln Asn Gln Pro Cys
1 5 10 15

<210> SEQ ID NO 231
<211> LENGTH: 18
<212> TYPE: PRT
<213> ORGANISM: Artificial Sequence
<220> FEATURE:
<223> OTHER INFORMATION: partial structure of cyclic peptide, YG314
<220> FEATURE:
<221> NAME/KEY: MOD_RES
<222> LOCATION: (1)..(1)
<223> OTHER INFORMATION: ClAc-D-Tyr

<400> SEQUENCE: 231

Tyr Leu Asn Gln Asn Gly Asp Asn Asn Trp Ser Thr Gln Asn Gln Gln
1 5 10 15

Pro Cys

<210> SEQ ID NO 232
<211> LENGTH: 13
<212> TYPE: PRT
<213> ORGANISM: Artificial Sequence
<220> FEATURE:
<223> OTHER INFORMATION: partial structure of cyclic peptide, YG300
<220> FEATURE:
<221> NAME/KEY: MOD_RES
<222> LOCATION: (1)..(1)
<223> OTHER INFORMATION: ClAc-D-Tyr

<400> SEQUENCE: 232

Tyr Cys Asp Val Ser Gly Asn Trp Ser Tyr Phe Pro Cys
1 5 10

<210> SEQ ID NO 233
<211> LENGTH: 11
<212> TYPE: PRT
<213> ORGANISM: Artificial Sequence
<220> FEATURE:
<223> OTHER INFORMATION: partial structure of cyclic peptide, YG304
<220> FEATURE:
<221> NAME/KEY: MOD_RES
<222> LOCATION: (1)..(1)
<223> OTHER INFORMATION: ClAc-D-Tyr

<400> SEQUENCE: 233

Tyr Leu Asn Gly Asp Phe Phe Trp Phe Phe Cys
1 5 10

<210> SEQ ID NO 234
<211> LENGTH: 11
<212> TYPE: PRT
<213> ORGANISM: Artificial Sequence
<220> FEATURE:
<223> OTHER INFORMATION: partial structure of cyclic peptide, YG305
<220> FEATURE:
<221> NAME/KEY: MOD_RES
<222> LOCATION: (1)..(1)
<223> OTHER INFORMATION: ClAc-D-Tyr

<400> SEQUENCE: 234

Tyr Leu Asn Gly Asp Ile Ile Trp Ile Ile Cys
1 5 10

<210> SEQ ID NO 235
<211> LENGTH: 14
<212> TYPE: PRT
<213> ORGANISM: Artificial Sequence
<220> FEATURE:
<223> OTHER INFORMATION: partial structure of cyclic peptide, YG288-S2iL8

<400> SEQUENCE: 235

Trp Ser Asn Phe Arg Ile Trp Arg Tyr Ser Asn Ser Ser Cys
1 5 10

<210> SEQ ID NO 236
<211> LENGTH: 14
<212> TYPE: PRT
<213> ORGANISM: Artificial Sequence
<220> FEATURE:
<223> OTHER INFORMATION: partial structure of cyclic peptide, YG289-S2iD7

<400> SEQUENCE: 236

Trp His Asp Tyr Arg Ile Trp Arg Tyr His Thr Tyr Pro Cys
1 5 10

<210> SEQ ID NO 237
<211> LENGTH: 14
<212> TYPE: PRT
<213> ORGANISM: Artificial Sequence
<220> FEATURE:
<223> OTHER INFORMATION: partial structure of cyclic peptide, YG292-PaktiL5

<400> SEQUENCE: 237

Trp Ile Arg Arg Pro Trp Val Pro Ile Ile Tyr Leu Gly Cys
1 5 10

<210> SEQ ID NO 238
<211> LENGTH: 16
<212> TYPE: PRT
<213> ORGANISM: Artificial Sequence
<220> FEATURE:
<223> OTHER INFORMATION: partial structure of cyclic peptide, YG297-aMD4

<400> SEQUENCE: 238

Trp Arg Gln Phe Asn Arg Arg Thr His Glu Val Trp Asn Leu Asp Cys
1 5 10 15

<210> SEQ ID NO 239
<211> LENGTH: 13
<212> TYPE: PRT
<213> ORGANISM: Artificial Sequence
<220> FEATURE:

<223> OTHER INFORMATION: partial structure of cyclic peptide, YG310-CM11
<220> FEATURE:
<221> NAME/KEY: MOD_RES
<222> LOCATION: (1)..(1)
<223> OTHER INFORMATION: ClAc-D-Tyr

<400> SEQUENCE: 239

Tyr Cys Asp Val Ser Gly Asn Trp Ser Tyr Phe Pro Cys
1 5 10

<210> SEQ ID NO 240
<211> LENGTH: 15
<212> TYPE: PRT
<213> ORGANISM: Artificial Sequence
<220> FEATURE:
<223> OTHER INFORMATION: partial structure of cyclic peptide, YG317-aMD5-NWS
<220> FEATURE:
<221> NAME/KEY: MOD_RES
<222> LOCATION: (1)..(1)
<223> OTHER INFORMATION: ClAc-D-Tyr

<400> SEQUENCE: 240

Tyr Trp Tyr Tyr Asn Trp Ser Gln Thr Tyr Lys Ala Phe Pro Cys
1 5 10 15

<210> SEQ ID NO 241
<211> LENGTH: 15
<212> TYPE: PRT
<213> ORGANISM: Artificial Sequence
<220> FEATURE:
<223> OTHER INFORMATION: partial structure of cyclic peptide, YG318-aMD5-NNWST
<220> FEATURE:
<221> NAME/KEY: MOD_RES
<222> LOCATION: (1)..(1)
<223> OTHER INFORMATION: ClAc-D-Tyr

<400> SEQUENCE: 241

Tyr Trp Tyr Asn Asn Trp Ser Thr Thr Tyr Lys Ala Phe Pro Cys
1 5 10 15

<210> SEQ ID NO 242
<211> LENGTH: 14
<212> TYPE: PRT
<213> ORGANISM: Artificial Sequence
<220> FEATURE:
<223> OTHER INFORMATION: partial structure of cyclic peptide, YG319-PaktiL2-NWS
<220> FEATURE:
<221> NAME/KEY: MOD_RES
<222> LOCATION: (1)..(1)
<223> OTHER INFORMATION: ClAc-D-Tyr

<400> SEQUENCE: 242

Tyr Trp Ile Leu Ile Asn Trp Ser Leu Val Arg Arg Lys Cys
1 5 10

<210> SEQ ID NO 243
<211> LENGTH: 14
<212> TYPE: PRT
<213> ORGANISM: Artificial Sequence
<220> FEATURE:
<223> OTHER INFORMATION: partial structure of cyclic peptide, YG321-301-NWS
<220> FEATURE:
<221> NAME/KEY: MOD_RES
<222> LOCATION: (1)..(1)
<223> OTHER INFORMATION: ClAc-D-Tyr

<400> SEQUENCE: 243

Tyr Arg Arg Asn Trp Ser Tyr Lys Asp Asp Asp Asp Lys Cys
1 5 10

<210> SEQ ID NO 244
<211> LENGTH: 14
<212> TYPE: PRT
<213> ORGANISM: Artificial Sequence
<220> FEATURE:
<223> OTHER INFORMATION: partial structure of cyclic peptide, YG322-301-NNWST
<220> FEATURE:
<221> NAME/KEY: MOD_RES
<222> LOCATION: (1)..(1)
<223> OTHER INFORMATION: ClAc-D-Tyr

<400> SEQUENCE: 244

Tyr Arg Asn Asn Trp Ser Thr Lys Asp Asp Asp Asp Lys Cys
1 5 10

<210> SEQ ID NO 245
<211> LENGTH: 12
<212> TYPE: PRT
<213> ORGANISM: Artificial Sequence
<220> FEATURE:
<223> OTHER INFORMATION: partial structure of cyclic peptide, YG323-302-NWS
<220> FEATURE:
<221> NAME/KEY: MOD_RES
<222> LOCATION: (1)..(1)
<223> OTHER INFORMATION: ClAc-D-Tyr

<400> SEQUENCE: 245

Tyr Leu Asn Gly Asp Arg Asn Trp Ser Arg Pro Cys
1 5 10

<210> SEQ ID NO 246
<211> LENGTH: 12
<212> TYPE: PRT
<213> ORGANISM: Artificial Sequence
<220> FEATURE:
<223> OTHER INFORMATION: partial structure of cyclic peptide, YG304-YG280(FFWFF)
<220> FEATURE:
<221> NAME/KEY: MOD_RES
<222> LOCATION: (1)..(1)
<223> OTHER INFORMATION: ClAc-D-Tyr

<400> SEQUENCE: 246

Tyr Leu Asn Gly Asp Phe Phe Trp Phe Phe Pro Cys
1 5 10

<210> SEQ ID NO 247
<211> LENGTH: 12
<212> TYPE: PRT
<213> ORGANISM: Artificial Sequence
<220> FEATURE:
<223> OTHER INFORMATION: partial structure of cyclic peptide, YG325-304-NWS
<220> FEATURE:
<221> NAME/KEY: MOD_RES
<222> LOCATION: (1)..(1)
<223> OTHER INFORMATION: ClAc-D-Tyr

<400> SEQUENCE: 247

Tyr Leu Asn Gly Asp Phe Asn Trp Ser Phe Pro Cys
1 5 10

<210> SEQ ID NO 248
<211> LENGTH: 12

<212> TYPE: PRT
<213> ORGANISM: Artificial Sequence
<220> FEATURE:
<223> OTHER INFORMATION: partial structure of cyclic peptide, YG326-306-NWS
<220> FEATURE:
<221> NAME/KEY: MOD_RES
<222> LOCATION: (1)..(1)
<223> OTHER INFORMATION: ClAc-D-Tyr

<400> SEQUENCE: 248

Tyr Leu Asn Gly Asp Gly Asn Trp Ser Gly Pro Cys
1 5 10

<210> SEQ ID NO 249
<211> LENGTH: 12
<212> TYPE: PRT
<213> ORGANISM: Artificial Sequence
<220> FEATURE:
<223> OTHER INFORMATION: partial structure of cyclic peptide, YG326 mutant I
<220> FEATURE:
<221> NAME/KEY: MOD_RES
<222> LOCATION: (1)..(1)
<223> OTHER INFORMATION: ClAc-D-Tyr
<220> FEATURE:
<221> NAME/KEY: misc_feature
<222> LOCATION: (7)..(7)
<223> OTHER INFORMATION: Xaa can be any naturally occurring amino acid

<400> SEQUENCE: 249

Tyr Leu Asn Gly Asp Gly Xaa Trp Ser Gly Pro Cys
1 5 10

<210> SEQ ID NO 250
<211> LENGTH: 12
<212> TYPE: PRT
<213> ORGANISM: Artificial Sequence
<220> FEATURE:
<223> OTHER INFORMATION: partial structure of cyclic peptide, YG326 mutant II
<220> FEATURE:
<221> NAME/KEY: MOD_RES
<222> LOCATION: (1)..(1)
<223> OTHER INFORMATION: ClAc-D-Tyr
<220> FEATURE:
<221> NAME/KEY: misc_feature
<222> LOCATION: (9)..(9)
<223> OTHER INFORMATION: Xaa can be any naturally occurring amino acid

<400> SEQUENCE: 250

Tyr Leu Asn Gly Asp Gly Asn Trp Xaa Gly Pro Cys
1 5 10

<210> SEQ ID NO 251
<211> LENGTH: 11
<212> TYPE: PRT
<213> ORGANISM: Artificial Sequence
<220> FEATURE:
<223> OTHER INFORMATION: partial structure of cyclic peptide, YG280-DWS
<220> FEATURE:
<221> NAME/KEY: MOD_RES
<222> LOCATION: (1)..(1)
<223> OTHER INFORMATION: ClAc-D-Tyr

<400> SEQUENCE: 251

Tyr Leu Asn Gly Phe Asn Asp Trp Ser Thr Cys
1 5 10

<210> SEQ ID NO 252
<211> LENGTH: 11

<212> TYPE: PRT
<213> ORGANISM: Artificial Sequence
<220> FEATURE:
<223> OTHER INFORMATION: partial structure of cyclic peptide, YG280-EWS
<220> FEATURE:
<221> NAME/KEY: MOD_RES
<222> LOCATION: (1)..(1)
<223> OTHER INFORMATION: ClAc-D-Tyr

<400> SEQUENCE: 252

Tyr Leu Asn Gly Phe Asn Glu Trp Ser Thr Cys
1 5 10

<210> SEQ ID NO 253
<211> LENGTH: 11
<212> TYPE: PRT
<213> ORGANISM: Artificial Sequence
<220> FEATURE:
<223> OTHER INFORMATION: partial structure of cyclic peptide, YG280-KWS
<220> FEATURE:
<221> NAME/KEY: MOD_RES
<222> LOCATION: (1)..(1)
<223> OTHER INFORMATION: ClAc-D-Tyr

<400> SEQUENCE: 253

Tyr Leu Asn Gly Phe Asn Lys Trp Ser Thr Cys
1 5 10

<210> SEQ ID NO 254
<211> LENGTH: 11
<212> TYPE: PRT
<213> ORGANISM: Artificial Sequence
<220> FEATURE:
<223> OTHER INFORMATION: partial structure of cyclic peptide, YG280-YWS
<220> FEATURE:
<221> NAME/KEY: MOD_RES
<222> LOCATION: (1)..(1)
<223> OTHER INFORMATION: ClAc-D-Tyr

<400> SEQUENCE: 254

Tyr Leu Asn Gly Phe Asn Tyr Trp Ser Thr Cys
1 5 10

<210> SEQ ID NO 255
<211> LENGTH: 11
<212> TYPE: PRT
<213> ORGANISM: Artificial Sequence
<220> FEATURE:
<223> OTHER INFORMATION: partial structure of cyclic peptide, YG280-NWP
<220> FEATURE:
<221> NAME/KEY: MOD_RES
<222> LOCATION: (1)..(1)
<223> OTHER INFORMATION: ClAc-D-Tyr

<400> SEQUENCE: 255

Tyr Leu Asn Gly Phe Asn Asn Trp Pro Thr Cys
1 5 10

<210> SEQ ID NO 256
<211> LENGTH: 14
<212> TYPE: PRT
<213> ORGANISM: Artificial Sequence
<220> FEATURE:
<223> OTHER INFORMATION: partial structure of cyclic peptide, Clone-M1
<220> FEATURE:
<221> NAME/KEY: MOD_RES
<222> LOCATION: (1)..(1)
<223> OTHER INFORMATION: ClAc-D-Tyr

<400> SEQUENCE: 256

Tyr Leu Arg Leu Asn His Thr Trp Ser Thr Trp Thr Ser Cys
1 5 10

<210> SEQ ID NO 257
<211> LENGTH: 14
<212> TYPE: PRT
<213> ORGANISM: Artificial Sequence
<220> FEATURE:
<223> OTHER INFORMATION: partial structure of cyclic peptide, Clone-M2
<220> FEATURE:
<221> NAME/KEY: MOD_RES
<222> LOCATION: (1)..(1)
<223> OTHER INFORMATION: ClAc-D-Tyr

<400> SEQUENCE: 257

Tyr Ser Ala Trp His Gly Lys Asp Asn Tyr Asp Trp Phe Cys
1 5 10

<210> SEQ ID NO 258
<211> LENGTH: 14
<212> TYPE: PRT
<213> ORGANISM: Artificial Sequence
<220> FEATURE:
<223> OTHER INFORMATION: partial structure of cyclic peptide, Clone-M3
<220> FEATURE:
<221> NAME/KEY: MOD_RES
<222> LOCATION: (1)..(1)
<223> OTHER INFORMATION: ClAc-D-Tyr

<400> SEQUENCE: 258

Tyr Ser Trp Ser Pro Ala Trp Val Arg Gln Ala Asp Ile Cys
1 5 10

<210> SEQ ID NO 259
<211> LENGTH: 14
<212> TYPE: PRT
<213> ORGANISM: Artificial Sequence
<220> FEATURE:
<223> OTHER INFORMATION: partial structure of cyclic peptide, Clone-M4
<220> FEATURE:
<221> NAME/KEY: MOD_RES
<222> LOCATION: (1)..(1)
<223> OTHER INFORMATION: ClAc-D-Tyr

<400> SEQUENCE: 259

Tyr Arg Val Ser Asn Thr Trp Trp Gln Arg His Arg Trp Cys
1 5 10

<210> SEQ ID NO 260
<211> LENGTH: 14
<212> TYPE: PRT
<213> ORGANISM: Artificial Sequence
<220> FEATURE:
<223> OTHER INFORMATION: partial structure of cyclic peptide, Clone-M5
<220> FEATURE:
<221> NAME/KEY: MOD_RES
<222> LOCATION: (1)..(1)
<223> OTHER INFORMATION: ClAc-D-Tyr

<400> SEQUENCE: 260

Tyr Leu Trp Ser Lys Asn Ser Gln Pro Trp Pro Glu Ser Cys
1 5 10

<210> SEQ ID NO 261
<211> LENGTH: 14
<212> TYPE: PRT
<213> ORGANISM: Artificial Sequence
<220> FEATURE:
<223> OTHER INFORMATION: partial structure of cyclic peptide, Clone-M6
<220> FEATURE:

<221> NAME/KEY: MOD_RES
<222> LOCATION: (1)..(1)
<223> OTHER INFORMATION: ClAc-D-Tyr

<400> SEQUENCE: 261

Tyr Ile Leu Ser Gln Glu Asn His Val Trp Ser Leu Trp Cys
1 5 10

<210> SEQ ID NO 262
<211> LENGTH: 14
<212> TYPE: PRT
<213> ORGANISM: Artificial Sequence
<220> FEATURE:
<223> OTHER INFORMATION: partial structure of cyclic peptide, Clone-M7
<220> FEATURE:
<221> NAME/KEY: MOD_RES
<222> LOCATION: (1)..(1)
<223> OTHER INFORMATION: ClAc-D-Tyr

<400> SEQUENCE: 262

Tyr Leu Trp Val Leu Arg Ser Asp Asn Thr Pro Trp Val Cys
1 5 10

<210> SEQ ID NO 263
<211> LENGTH: 14
<212> TYPE: PRT
<213> ORGANISM: Artificial Sequence
<220> FEATURE:
<223> OTHER INFORMATION: partial structure of cyclic peptide, Clone-M8
<220> FEATURE:
<221> NAME/KEY: MOD_RES
<222> LOCATION: (1)..(1)
<223> OTHER INFORMATION: ClAc-D-Tyr

<400> SEQUENCE: 263

Tyr Thr His Glu Trp Pro Trp Arg Thr Gly Trp Thr Arg Cys
1 5 10

<210> SEQ ID NO 264
<211> LENGTH: 14
<212> TYPE: PRT
<213> ORGANISM: Artificial Sequence
<220> FEATURE:
<223> OTHER INFORMATION: partial structure of cyclic peptide, Clone-M9
<220> FEATURE:
<221> NAME/KEY: MOD_RES
<222> LOCATION: (1)..(1)
<223> OTHER INFORMATION: ClAc-D-Tyr

<400> SEQUENCE: 264

Tyr Ser Phe His Trp Gly Leu Ala Val Trp Asp His Asn Cys
1 5 10

<210> SEQ ID NO 265
<211> LENGTH: 12
<212> TYPE: PRT
<213> ORGANISM: Artificial Sequence
<220> FEATURE:
<223> OTHER INFORMATION: partial structure of cyclic peptide, YG281 in table 7
<220> FEATURE:
<221> NAME/KEY: MOD_RES
<222> LOCATION: (1)..(1)
<223> OTHER INFORMATION: ClAc-D-Tyr

<400> SEQUENCE: 265

Tyr Leu Asn Gly Asp Asn Asn Trp Ser Thr Pro Cys
1 5 10

-continued

<210> SEQ ID NO 266
<211> LENGTH: 11
<212> TYPE: PRT
<213> ORGANISM: Artificial Sequence
<220> FEATURE:
<223> OTHER INFORMATION: partial structure of cyclic peptide, YG282 in table 7
<220> FEATURE:
<221> NAME/KEY: MOD_RES
<222> LOCATION: (1)..(1)
<223> OTHER INFORMATION: ClAc-D-Tyr

<400> SEQUENCE: 266

Tyr Leu Asn Gly Asp Asn Asn Trp Ser Pro Cys
1               5                   10

<210> SEQ ID NO 267
<211> LENGTH: 14
<212> TYPE: PRT
<213> ORGANISM: Artificial Sequence
<220> FEATURE:
<223> OTHER INFORMATION: partial structure of cyclic peptide, YG288-S2iL8 in table 7
<220> FEATURE:
<221> NAME/KEY: MOD_RES
<222> LOCATION: (1)..(1)
<223> OTHER INFORMATION: ClAc-D-Tyr

<400> SEQUENCE: 267

Tyr Ser Asn Phe Arg Ile Trp Arg Tyr Ser Asn Ser Ser Cys
1               5                   10

<210> SEQ ID NO 268
<211> LENGTH: 14
<212> TYPE: PRT
<213> ORGANISM: Artificial Sequence
<220> FEATURE:
<223> OTHER INFORMATION: partial structure of cyclic peptide, YG289-S2iD7 in table 7
<220> FEATURE:
<221> NAME/KEY: MOD_RES
<222> LOCATION: (1)..(1)
<223> OTHER INFORMATION: ClAc-D-Tyr

<400> SEQUENCE: 268

Tyr His Asp Tyr Arg Ile Trp Arg Tyr His Thr Tyr Pro Cys
1               5                   10

<210> SEQ ID NO 269
<211> LENGTH: 14
<212> TYPE: PRT
<213> ORGANISM: Artificial Sequence
<220> FEATURE:
<223> OTHER INFORMATION: partial structure of cyclic peptide, YG291-PaktiL2 in table 7
<220> FEATURE:
<221> NAME/KEY: MOD_RES
<222> LOCATION: (1)..(1)
<223> OTHER INFORMATION: ClAc-D-Tyr

<400> SEQUENCE: 269

Tyr Trp Ile Leu Ile Thr Trp Pro Leu Val Arg Arg Lys Cys
1               5                   10

<210> SEQ ID NO 270
<211> LENGTH: 14
<212> TYPE: PRT
<213> ORGANISM: Artificial Sequence
<220> FEATURE:
<223> OTHER INFORMATION: partial structure of cyclic peptide, YG292-PaktiL5 in table 7

<220> FEATURE:
<221> NAME/KEY: MOD_RES
<222> LOCATION: (1)..(1)
<223> OTHER INFORMATION: ClAc-D-Tyr

<400> SEQUENCE: 270

Tyr Ile Arg Arg Pro Trp Val Pro Ile Ile Tyr Leu Gly Cys
1 5 10

<210> SEQ ID NO 271
<211> LENGTH: 17
<212> TYPE: PRT
<213> ORGANISM: Artificial Sequence
<220> FEATURE:
<223> OTHER INFORMATION: partial structure of cyclic peptide, YG293-MaL4 in table 7
<220> FEATURE:
<221> NAME/KEY: MOD_RES
<222> LOCATION: (1)..(1)
<223> OTHER INFORMATION: ClAc-D-Tyr

<400> SEQUENCE: 271

Tyr Thr Phe Arg Asp Val Trp Ile Phe Tyr Gly Ser Leu Leu Ser Arg
1 5 10 15

Cys

<210> SEQ ID NO 272
<211> LENGTH: 17
<212> TYPE: PRT
<213> ORGANISM: Artificial Sequence
<220> FEATURE:
<223> OTHER INFORMATION: partial structure of cyclic peptide, YG295-aML5 in table 7
<220> FEATURE:
<221> NAME/KEY: MOD_RES
<222> LOCATION: (1)..(1)
<223> OTHER INFORMATION: ClAc-D-Tyr

<400> SEQUENCE: 272

Tyr Ile Ser Trp Asn Glu Phe Asn Ser Pro Asn Trp Arg Phe Ile Thr
1 5 10 15

Cys

<210> SEQ ID NO 273
<211> LENGTH: 15
<212> TYPE: PRT
<213> ORGANISM: Artificial Sequence
<220> FEATURE:
<223> OTHER INFORMATION: partial structure of cyclic peptide, YG296-aMD5 in table 7
<220> FEATURE:
<221> NAME/KEY: MOD_RES
<222> LOCATION: (1)..(1)
<223> OTHER INFORMATION: ClAc-D-Tyr

<400> SEQUENCE: 273

Tyr Trp Tyr Tyr Ala Trp Asp Gln Thr Tyr Lys Ala Phe Pro Cys
1 5 10 15

<210> SEQ ID NO 274
<211> LENGTH: 16
<212> TYPE: PRT
<213> ORGANISM: Artificial Sequence
<220> FEATURE:
<223> OTHER INFORMATION: partial structure of cyclic peptide, YG297-aMD4 in table 7
<220> FEATURE:
<221> NAME/KEY: MOD_RES
<222> LOCATION: (1)..(1)

<223> OTHER INFORMATION: ClAc-D-Tyr

<400> SEQUENCE: 274

Tyr Arg Gln Phe Asn Arg Arg Thr His Glu Val Trp Asn Leu Asp Cys
1 5 10 15

<210> SEQ ID NO 275
<211> LENGTH: 8
<212> TYPE: PRT
<213> ORGANISM: Artificial Sequence
<220> FEATURE:
<223> OTHER INFORMATION: partial structure of cyclic peptide, YG386
<220> FEATURE:
<221> NAME/KEY: MOD_RES
<222> LOCATION: (1)..(1)
<223> OTHER INFORMATION: ClAc-D-Tyr

<400> SEQUENCE: 275

Tyr Val Trp Cys Tyr Pro Arg Gly
1 5

<210> SEQ ID NO 276
<211> LENGTH: 8
<212> TYPE: PRT
<213> ORGANISM: Artificial Sequence
<220> FEATURE:
<223> OTHER INFORMATION: partial structure of cyclic peptide, YG387
<220> FEATURE:
<221> NAME/KEY: MOD_RES
<222> LOCATION: (1)..(1)
<223> OTHER INFORMATION: ClAc-D-Tyr

<400> SEQUENCE: 276

Tyr Val Trp Gly Cys Tyr Pro Arg
1 5

<210> SEQ ID NO 277
<211> LENGTH: 8
<212> TYPE: PRT
<213> ORGANISM: Artificial Sequence
<220> FEATURE:
<223> OTHER INFORMATION: partial structure of cyclic peptide, YG388
<220> FEATURE:
<221> NAME/KEY: MOD_RES
<222> LOCATION: (1)..(1)
<223> OTHER INFORMATION: ClAc-D-Tyr

<400> SEQUENCE: 277

Tyr Arg Val Trp Gly Cys Tyr Pro
1 5

<210> SEQ ID NO 278
<211> LENGTH: 8
<212> TYPE: PRT
<213> ORGANISM: Artificial Sequence
<220> FEATURE:
<223> OTHER INFORMATION: partial structure of cyclic peptide, YG389
<220> FEATURE:
<221> NAME/KEY: MOD_RES
<222> LOCATION: (1)..(1)
<223> OTHER INFORMATION: ClAc-D-Tyr

<400> SEQUENCE: 278

Tyr Arg Val Trp Gly Pro Cys Tyr
1 5

<210> SEQ ID NO 279
<211> LENGTH: 8
<212> TYPE: PRT

```
<213> ORGANISM: Artificial Sequence
<220> FEATURE:
<223> OTHER INFORMATION: partial structure of cyclic peptide, YG390
<220> FEATURE:
<221> NAME/KEY: MOD_RES
<222> LOCATION: (1)..(1)
<223> OTHER INFORMATION: ClAc-D-Tyr

<400> SEQUENCE: 279

Tyr Arg Val Trp Gly Tyr Pro Cys
1               5


<210> SEQ ID NO 280
<211> LENGTH: 9
<212> TYPE: PRT
<213> ORGANISM: Artificial Sequence
<220> FEATURE:
<223> OTHER INFORMATION: partial structure of cyclic peptide, YG391
<220> FEATURE:
<221> NAME/KEY: MOD_RES
<222> LOCATION: (1)..(1)
<223> OTHER INFORMATION: ClAc-D-Tyr

<400> SEQUENCE: 280

Tyr Tyr Arg Val Trp Gly Tyr Pro Cys
1               5


<210> SEQ ID NO 281
<211> LENGTH: 10
<212> TYPE: PRT
<213> ORGANISM: Artificial Sequence
<220> FEATURE:
<223> OTHER INFORMATION: partial structure of cyclic peptide, YG392
<220> FEATURE:
<221> NAME/KEY: MOD_RES
<222> LOCATION: (1)..(1)
<223> OTHER INFORMATION: ClAc-D-Tyr

<400> SEQUENCE: 281

Tyr Tyr Arg Val Trp Gly Tyr His Pro Cys
1               5                   10


<210> SEQ ID NO 282
<211> LENGTH: 11
<212> TYPE: PRT
<213> ORGANISM: Artificial Sequence
<220> FEATURE:
<223> OTHER INFORMATION: partial structure of cyclic peptide, YG393
<220> FEATURE:
<221> NAME/KEY: MOD_RES
<222> LOCATION: (1)..(1)
<223> OTHER INFORMATION: ClAc-D-Tyr

<400> SEQUENCE: 282

Tyr Asp Tyr Arg Val Trp Gly Tyr His Pro Cys
1               5                   10


<210> SEQ ID NO 283
<211> LENGTH: 12
<212> TYPE: PRT
<213> ORGANISM: Artificial Sequence
<220> FEATURE:
<223> OTHER INFORMATION: partial structure of cyclic peptide, YG394
<220> FEATURE:
<221> NAME/KEY: MOD_RES
<222> LOCATION: (1)..(1)
<223> OTHER INFORMATION: ClAc-D-Tyr

<400> SEQUENCE: 283

Tyr Asp Tyr Arg Val Trp Gly Tyr His Thr Pro Cys
```

1 5 10

<210> SEQ ID NO 284
<211> LENGTH: 13
<212> TYPE: PRT
<213> ORGANISM: Artificial Sequence
<220> FEATURE:
<223> OTHER INFORMATION: partial structure of cyclic peptide, YG395
<220> FEATURE:
<221> NAME/KEY: MOD_RES
<222> LOCATION: (1)..(1)
<223> OTHER INFORMATION: ClAc-D-Tyr

<400> SEQUENCE: 284

Tyr His Asp Tyr Arg Val Trp Gly Tyr His Thr Pro Cys
1 5 10

<210> SEQ ID NO 285
<211> LENGTH: 14
<212> TYPE: PRT
<213> ORGANISM: Artificial Sequence
<220> FEATURE:
<223> OTHER INFORMATION: partial structure of cyclic peptide, YG396
<220> FEATURE:
<221> NAME/KEY: MOD_RES
<222> LOCATION: (1)..(1)
<223> OTHER INFORMATION: ClAc-D-Tyr

<400> SEQUENCE: 285

Tyr His Asp Tyr Arg Val Trp Gly Tyr His Thr Tyr Pro Cys
1 5 10

<210> SEQ ID NO 286
<211> LENGTH: 15
<212> TYPE: PRT
<213> ORGANISM: Artificial Sequence
<220> FEATURE:
<223> OTHER INFORMATION: partial structure of cyclic peptide, YG397
<220> FEATURE:
<221> NAME/KEY: MOD_RES
<222> LOCATION: (1)..(1)
<223> OTHER INFORMATION: ClAc-D-Tyr

<400> SEQUENCE: 286

Tyr His Asn Asp Tyr Arg Val Trp Gly Tyr His Thr Tyr Pro Cys
1 5 10 15

<210> SEQ ID NO 287
<211> LENGTH: 16
<212> TYPE: PRT
<213> ORGANISM: Artificial Sequence
<220> FEATURE:
<223> OTHER INFORMATION: partial structure of cyclic peptide, YG398
<220> FEATURE:
<221> NAME/KEY: MOD_RES
<222> LOCATION: (1)..(1)
<223> OTHER INFORMATION: ClAc-D-Tyr

<400> SEQUENCE: 287

Tyr His Asn Asp Tyr Arg Val Trp Gly Tyr His Thr Tyr Gln Pro Cys
1 5 10 15

<210> SEQ ID NO 288
<211> LENGTH: 17
<212> TYPE: PRT
<213> ORGANISM: Artificial Sequence
<220> FEATURE:
<223> OTHER INFORMATION: partial structure of cyclic peptide, YG399
<220> FEATURE:
<221> NAME/KEY: MOD_RES
<222> LOCATION: (1)..(1)
<223> OTHER INFORMATION: ClAc-D-Tyr

<400> SEQUENCE: 288

Tyr His Asn Gln Asp Tyr Arg Val Trp Gly Tyr His Thr Tyr Gln Pro
1 5 10 15

Cys

<210> SEQ ID NO 289
<211> LENGTH: 18
<212> TYPE: PRT
<213> ORGANISM: Artificial Sequence
<220> FEATURE:
<223> OTHER INFORMATION: partial structure of cyclic peptide, YG400
<220> FEATURE:
<221> NAME/KEY: MOD_RES
<222> LOCATION: (1)..(1)
<223> OTHER INFORMATION: ClAc-D-Tyr

<400> SEQUENCE: 289

Tyr His Asn Gln Asp Tyr Arg Val Trp Gly Tyr His Thr Tyr Gln Asn
1 5 10 15

Pro Cys

<210> SEQ ID NO 290
<211> LENGTH: 19
<212> TYPE: PRT
<213> ORGANISM: Artificial Sequence
<220> FEATURE:
<223> OTHER INFORMATION: partial structure of cyclic peptide, YG401
<220> FEATURE:
<221> NAME/KEY: MOD_RES
<222> LOCATION: (1)..(1)
<223> OTHER INFORMATION: ClAc-D-Tyr

<400> SEQUENCE: 290

Tyr His Asn Gln Asn Asp Tyr Arg Val Trp Gly Tyr His Thr Tyr Gln
1 5 10 15

Asn Pro Cys

<210> SEQ ID NO 291
<211> LENGTH: 14
<212> TYPE: PRT
<213> ORGANISM: Artificial Sequence
<220> FEATURE:
<223> OTHER INFORMATION: partial structure of cyclic peptide, YG402
<220> FEATURE:
<221> NAME/KEY: MOD_RES
<222> LOCATION: (1)..(1)
<223> OTHER INFORMATION: ClAc-D-Tyr

<400> SEQUENCE: 291

Tyr Trp Gly His Asp Tyr Arg Val Tyr His Thr Tyr Pro Cys
1 5 10

<210> SEQ ID NO 292
<211> LENGTH: 14
<212> TYPE: PRT
<213> ORGANISM: Artificial Sequence
<220> FEATURE:
<223> OTHER INFORMATION: partial structure of cyclic peptide, YG403
<220> FEATURE:
<221> NAME/KEY: MOD_RES
<222> LOCATION: (1)..(1)
<223> OTHER INFORMATION: ClAc-D-Tyr

<400> SEQUENCE: 292

Tyr Val Trp Gly His Asp Tyr Arg Tyr His Thr Tyr Pro Cys
1 5 10

<210> SEQ ID NO 293
<211> LENGTH: 14
<212> TYPE: PRT
<213> ORGANISM: Artificial Sequence
<220> FEATURE:
<223> OTHER INFORMATION: partial structure of cyclic peptide, YG404
<220> FEATURE:
<221> NAME/KEY: MOD_RES
<222> LOCATION: (1)..(1)
<223> OTHER INFORMATION: ClAc-D-Tyr

<400> SEQUENCE: 293

Tyr His Val Trp Gly Asp Tyr Arg Tyr His Thr Tyr Pro Cys
1 5 10

<210> SEQ ID NO 294
<211> LENGTH: 14
<212> TYPE: PRT
<213> ORGANISM: Artificial Sequence
<220> FEATURE:
<223> OTHER INFORMATION: partial structure of cyclic peptide, YG405
<220> FEATURE:
<221> NAME/KEY: MOD_RES
<222> LOCATION: (1)..(1)
<223> OTHER INFORMATION: ClAc-D-Tyr

<400> SEQUENCE: 294

Tyr His Asp Val Trp Gly Tyr Arg Tyr His Thr Tyr Pro Cys
1 5 10

<210> SEQ ID NO 295
<211> LENGTH: 14
<212> TYPE: PRT
<213> ORGANISM: Artificial Sequence
<220> FEATURE:
<223> OTHER INFORMATION: partial structure of cyclic peptide, YG406
<220> FEATURE:
<221> NAME/KEY: MOD_RES
<222> LOCATION: (1)..(1)
<223> OTHER INFORMATION: ClAc-D-Tyr

<400> SEQUENCE: 295

Tyr His Asp Tyr Val Trp Gly Arg Tyr His Thr Tyr Pro Cys
1 5 10

<210> SEQ ID NO 296
<211> LENGTH: 14
<212> TYPE: PRT
<213> ORGANISM: Artificial Sequence
<220> FEATURE:
<223> OTHER INFORMATION: partial structure of cyclic peptide, YG407
<220> FEATURE:
<221> NAME/KEY: MOD_RES
<222> LOCATION: (1)..(1)
<223> OTHER INFORMATION: ClAc-D-Tyr

<400> SEQUENCE: 296

Tyr His Asp Tyr Arg Tyr Val Trp Gly His Thr Tyr Pro Cys
1 5 10

<210> SEQ ID NO 297
<211> LENGTH: 14
<212> TYPE: PRT
<213> ORGANISM: Artificial Sequence
<220> FEATURE:
<223> OTHER INFORMATION: partial structure of cyclic peptide, YG408
<220> FEATURE:

```
<221> NAME/KEY: MOD_RES
<222> LOCATION: (1)..(1)
<223> OTHER INFORMATION: ClAc-D-Tyr

<400> SEQUENCE: 297

Tyr His Asp Tyr Arg Tyr His Val Trp Gly Thr Tyr Pro Cys
1               5                   10


<210> SEQ ID NO 298
<211> LENGTH: 14
<212> TYPE: PRT
<213> ORGANISM: Artificial Sequence
<220> FEATURE:
<223> OTHER INFORMATION: partial structure of cyclic peptide, YG409
<220> FEATURE:
<221> NAME/KEY: MOD_RES
<222> LOCATION: (1)..(1)
<223> OTHER INFORMATION: ClAc-D-Tyr

<400> SEQUENCE: 298

Tyr His Asp Tyr Arg Tyr His Thr Val Trp Gly Tyr Pro Cys
1               5                   10


<210> SEQ ID NO 299
<211> LENGTH: 14
<212> TYPE: PRT
<213> ORGANISM: Artificial Sequence
<220> FEATURE:
<223> OTHER INFORMATION: partial structure of cyclic peptide, YG410
<220> FEATURE:
<221> NAME/KEY: MOD_RES
<222> LOCATION: (1)..(1)
<223> OTHER INFORMATION: ClAc-D-Tyr

<400> SEQUENCE: 299

Tyr His Asp Tyr Arg Tyr His Thr Tyr Val Trp Gly Pro Cys
1               5                   10


<210> SEQ ID NO 300
<211> LENGTH: 14
<212> TYPE: PRT
<213> ORGANISM: Artificial Sequence
<220> FEATURE:
<223> OTHER INFORMATION: partial structure of cyclic peptide, YG411
<220> FEATURE:
<221> NAME/KEY: MOD_RES
<222> LOCATION: (1)..(1)
<223> OTHER INFORMATION: ClAc-D-Tyr

<400> SEQUENCE: 300

Tyr His Asp Tyr Arg Tyr His Thr Tyr Pro Val Trp Gly Cys
1               5                   10


<210> SEQ ID NO 301
<211> LENGTH: 14
<212> TYPE: PRT
<213> ORGANISM: Artificial Sequence
<220> FEATURE:
<223> OTHER INFORMATION: partial structure of cyclic peptide, YG412
<220> FEATURE:
<221> NAME/KEY: MOD_RES
<222> LOCATION: (1)..(1)
<223> OTHER INFORMATION: ClAc-D-Tyr

<400> SEQUENCE: 301

Tyr His Asp Tyr Arg Gly Tyr His Thr Tyr Pro Val Trp Cys
1               5                   10


<210> SEQ ID NO 302
```

<211> LENGTH: 14
<212> TYPE: PRT
<213> ORGANISM: Artificial Sequence
<220> FEATURE:
<223> OTHER INFORMATION: partial structure of cyclic peptide, Clone-V1
<220> FEATURE:
<221> NAME/KEY: MOD_RES
<222> LOCATION: (1)..(1)
<223> OTHER INFORMATION: ClAc-D-Tyr

<400> SEQUENCE: 302

Tyr Ser Lys Pro Val Ile His Ser Asn Ser Val Trp Thr Cys
1 5 10

<210> SEQ ID NO 303
<211> LENGTH: 14
<212> TYPE: PRT
<213> ORGANISM: Artificial Sequence
<220> FEATURE:
<223> OTHER INFORMATION: partial structure of cyclic peptide, Clone-V2
<220> FEATURE:
<221> NAME/KEY: MOD_RES
<222> LOCATION: (1)..(1)
<223> OTHER INFORMATION: ClAc-D-Tyr

<400> SEQUENCE: 303

Tyr Phe His Ala Gln Ser Asp His Ala Val Trp Arg Ser Cys
1 5 10

<210> SEQ ID NO 304
<211> LENGTH: 14
<212> TYPE: PRT
<213> ORGANISM: Artificial Sequence
<220> FEATURE:
<223> OTHER INFORMATION: partial structure of cyclic peptide, Clone-V3
<220> FEATURE:
<221> NAME/KEY: MOD_RES
<222> LOCATION: (1)..(1)
<223> OTHER INFORMATION: ClAc-D-Tyr

<400> SEQUENCE: 304

Tyr Val Trp Asn Val Lys Ile Lys Pro Lys Thr Thr Lys Cys
1 5 10

<210> SEQ ID NO 305
<211> LENGTH: 14
<212> TYPE: PRT
<213> ORGANISM: Artificial Sequence
<220> FEATURE:
<223> OTHER INFORMATION: partial structure of cyclic peptide, Clone-V4
<220> FEATURE:
<221> NAME/KEY: MOD_RES
<222> LOCATION: (1)..(1)
<223> OTHER INFORMATION: ClAc-D-Tyr

<400> SEQUENCE: 305

Tyr Arg Ala Asp Leu Asn His Pro Ala Val Trp Gln Thr Cys
1 5 10

<210> SEQ ID NO 306
<211> LENGTH: 14
<212> TYPE: PRT
<213> ORGANISM: Artificial Sequence
<220> FEATURE:
<223> OTHER INFORMATION: partial structure of cyclic peptide, Clone-V5
<220> FEATURE:
<221> NAME/KEY: MOD_RES
<222> LOCATION: (1)..(1)
<223> OTHER INFORMATION: ClAc-D-Tyr

<400> SEQUENCE: 306

Tyr Val Leu Thr Lys Arg Val Trp Lys Leu Val Thr Asn Cys
1 5 10

<210> SEQ ID NO 307
<211> LENGTH: 14
<212> TYPE: PRT
<213> ORGANISM: Artificial Sequence
<220> FEATURE:
<223> OTHER INFORMATION: partial structure of cyclic peptide, Clone-T1
<220> FEATURE:
<221> NAME/KEY: MOD_RES
<222> LOCATION: (1)..(1)
<223> OTHER INFORMATION: ClAc-D-Tyr

<400> SEQUENCE: 307

Tyr Gly Thr Trp Leu Tyr Leu Thr Ser Gln Arg Val Asn Cys
1 5 10

<210> SEQ ID NO 308
<211> LENGTH: 14
<212> TYPE: PRT
<213> ORGANISM: Artificial Sequence
<220> FEATURE:
<223> OTHER INFORMATION: partial structure of cyclic peptide, Clone-T2
<220> FEATURE:
<221> NAME/KEY: MOD_RES
<222> LOCATION: (1)..(1)
<223> OTHER INFORMATION: ClAc-D-Tyr

<400> SEQUENCE: 308

Tyr Leu Val Arg Glu Arg Glu Asn Thr Trp Lys Val Thr Cys
1 5 10

<210> SEQ ID NO 309
<211> LENGTH: 14
<212> TYPE: PRT
<213> ORGANISM: Artificial Sequence
<220> FEATURE:
<223> OTHER INFORMATION: partial structure of cyclic peptide, Clone-T3
<220> FEATURE:
<221> NAME/KEY: MOD_RES
<222> LOCATION: (1)..(1)
<223> OTHER INFORMATION: ClAc-D-Tyr

<400> SEQUENCE: 309

Tyr Leu Phe Thr Trp Asp Asn Gly Val Tyr Ser Val Leu Cys
1 5 10

<210> SEQ ID NO 310
<211> LENGTH: 14
<212> TYPE: PRT
<213> ORGANISM: Artificial Sequence
<220> FEATURE:
<223> OTHER INFORMATION: partial structure of cyclic peptide, Clone-T4
<220> FEATURE:
<221> NAME/KEY: MOD_RES
<222> LOCATION: (1)..(1)
<223> OTHER INFORMATION: ClAc-D-Tyr

<400> SEQUENCE: 310

Tyr Arg Ala Leu Ser Cys Gly Pro Thr Thr Trp Asp Glu Cys
1 5 10

<210> SEQ ID NO 311
<211> LENGTH: 14
<212> TYPE: PRT
<213> ORGANISM: Artificial Sequence
<220> FEATURE:
<223> OTHER INFORMATION: partial structure of cyclic peptide, Clone-I1

<220> FEATURE:
<221> NAME/KEY: MOD_RES
<222> LOCATION: (1)..(1)
<223> OTHER INFORMATION: ClAc-D-Tyr

<400> SEQUENCE: 311

Tyr Pro Thr His Gly Ile Trp Gly Ser Ser Phe Gly Glu Cys
1 5 10

<210> SEQ ID NO 312
<211> LENGTH: 14
<212> TYPE: PRT
<213> ORGANISM: Artificial Sequence
<220> FEATURE:
<223> OTHER INFORMATION: partial structure of cyclic peptide, Clone-I2
<220> FEATURE:
<221> NAME/KEY: MOD_RES
<222> LOCATION: (1)..(1)
<223> OTHER INFORMATION: ClAc-D-Tyr

<400> SEQUENCE: 312

Tyr Pro Lys Asp Arg Cys Gln Ile Trp Thr His Thr Tyr Cys
1 5 10

<210> SEQ ID NO 313
<211> LENGTH: 14
<212> TYPE: PRT
<213> ORGANISM: Artificial Sequence
<220> FEATURE:
<223> OTHER INFORMATION: partial structure of cyclic peptide, Clone-I3
<220> FEATURE:
<221> NAME/KEY: MOD_RES
<222> LOCATION: (1)..(1)
<223> OTHER INFORMATION: ClAc-D-Tyr

<400> SEQUENCE: 313

Tyr Phe Gly Arg Arg Ala Ala Val Arg Ile Trp Arg Lys Cys
1 5 10

<210> SEQ ID NO 314
<211> LENGTH: 14
<212> TYPE: PRT
<213> ORGANISM: Artificial Sequence
<220> FEATURE:
<223> OTHER INFORMATION: partial structure of cyclic peptide, Clone-I4
<220> FEATURE:
<221> NAME/KEY: MOD_RES
<222> LOCATION: (1)..(1)
<223> OTHER INFORMATION: ClAc-D-Tyr

<400> SEQUENCE: 314

Tyr Leu Val Ser Val Ala Glu Lys Ile Trp Asn Ser Glu Cys
1 5 10

<210> SEQ ID NO 315
<211> LENGTH: 14
<212> TYPE: PRT
<213> ORGANISM: Artificial Sequence
<220> FEATURE:
<223> OTHER INFORMATION: partial structure of cyclic peptide, Clone-I5
<220> FEATURE:
<221> NAME/KEY: MOD_RES
<222> LOCATION: (1)..(1)
<223> OTHER INFORMATION: ClAc-D-Tyr

<400> SEQUENCE: 315

Tyr Leu Thr Ile Trp Ile Ile Asn Ser Ser Gly Phe Ala Cys
1 5 10

<210> SEQ ID NO 316
<211> LENGTH: 14
<212> TYPE: PRT
<213> ORGANISM: Artificial Sequence
<220> FEATURE:
<223> OTHER INFORMATION: partial structure of cyclic peptide, Clone-I6
<220> FEATURE:
<221> NAME/KEY: MOD_RES
<222> LOCATION: (1)..(1)
<223> OTHER INFORMATION: ClAc-D-Tyr

<400> SEQUENCE: 316

Tyr Arg Ile Trp Gln Val Arg Glu Gln Lys Thr Ser Arg Cys
1               5                   10

<210> SEQ ID NO 317
<211> LENGTH: 14
<212> TYPE: PRT
<213> ORGANISM: Artificial Sequence
<220> FEATURE:
<223> OTHER INFORMATION: partial structure of cyclic peptide, Clone-I7
<220> FEATURE:
<221> NAME/KEY: MOD_RES
<222> LOCATION: (1)..(1)
<223> OTHER INFORMATION: ClAc-D-Tyr

<400> SEQUENCE: 317

Tyr His Ile Arg Ile Phe Ala Arg Gly Ile Trp Glu Lys Cys
1               5                   10

<210> SEQ ID NO 318
<211> LENGTH: 14
<212> TYPE: PRT
<213> ORGANISM: Artificial Sequence
<220> FEATURE:
<223> OTHER INFORMATION: partial structure of cyclic peptide, Clone-A1
<220> FEATURE:
<221> NAME/KEY: MOD_RES
<222> LOCATION: (1)..(1)
<223> OTHER INFORMATION: ClAc-D-Tyr

<400> SEQUENCE: 318

Tyr Gly Lys Tyr Ala Trp Leu Arg Lys Ser Gln Lys Asp Cys
1               5                   10

<210> SEQ ID NO 319
<211> LENGTH: 14
<212> TYPE: PRT
<213> ORGANISM: Artificial Sequence
<220> FEATURE:
<223> OTHER INFORMATION: partial structure of cyclic peptide, Clone-A2
<220> FEATURE:
<221> NAME/KEY: MOD_RES
<222> LOCATION: (1)..(1)
<223> OTHER INFORMATION: ClAc-D-Tyr

<400> SEQUENCE: 319

Tyr Ile Phe Gln Ala Trp Thr Lys Glu Asn Thr Ala Ser Cys
1               5                   10

<210> SEQ ID NO 320
<211> LENGTH: 14
<212> TYPE: PRT
<213> ORGANISM: Artificial Sequence
<220> FEATURE:
<223> OTHER INFORMATION: partial structure of cyclic peptide, Clone-A3
<220> FEATURE:
<221> NAME/KEY: MOD_RES
<222> LOCATION: (1)..(1)
<223> OTHER INFORMATION: ClAc-D-Tyr

<400> SEQUENCE: 320

Tyr Leu Asn Ala Trp Thr Gly Pro Asn His Lys Glu Leu Cys
1 5 10

<210> SEQ ID NO 321
<211> LENGTH: 14
<212> TYPE: PRT
<213> ORGANISM: Artificial Sequence
<220> FEATURE:
<223> OTHER INFORMATION: partial structure of cyclic peptide, Clone-A4
<220> FEATURE:
<221> NAME/KEY: MOD_RES
<222> LOCATION: (1)..(1)
<223> OTHER INFORMATION: ClAc-D-Tyr

<400> SEQUENCE: 321

Tyr Tyr Ala Trp Arg Ser Ile Thr Pro Phe Gly Glu Lys Cys
1 5 10

<210> SEQ ID NO 322
<211> LENGTH: 14
<212> TYPE: PRT
<213> ORGANISM: Artificial Sequence
<220> FEATURE:
<223> OTHER INFORMATION: partial structure of cyclic peptide, Clone-A5
<220> FEATURE:
<221> NAME/KEY: MOD_RES
<222> LOCATION: (1)..(1)
<223> OTHER INFORMATION: ClAc-D-Tyr

<400> SEQUENCE: 322

Tyr Arg Leu Ala Trp Gln Ile Pro Thr Ile Val Ser Leu Cys
1 5 10

<210> SEQ ID NO 323
<211> LENGTH: 14
<212> TYPE: PRT
<213> ORGANISM: Artificial Sequence
<220> FEATURE:
<223> OTHER INFORMATION: partial structure of cyclic peptide, Clone-P1
<220> FEATURE:
<221> NAME/KEY: MOD_RES
<222> LOCATION: (1)..(1)
<223> OTHER INFORMATION: ClAc-D-Tyr

<400> SEQUENCE: 323

Tyr Ser Ile Asn Ser His Val Pro Trp Ala Glu Val Tyr Cys
1 5 10

<210> SEQ ID NO 324
<211> LENGTH: 14
<212> TYPE: PRT
<213> ORGANISM: Artificial Sequence
<220> FEATURE:
<223> OTHER INFORMATION: partial structure of cyclic peptide, Clone-P2
<220> FEATURE:
<221> NAME/KEY: MOD_RES
<222> LOCATION: (1)..(1)
<223> OTHER INFORMATION: ClAc-D-Tyr

<400> SEQUENCE: 324

Tyr Thr Ser Arg Ile Thr Asn Leu Lys Pro Trp Leu Lys Cys
1 5 10

<210> SEQ ID NO 325
<211> LENGTH: 14
<212> TYPE: PRT
<213> ORGANISM: Artificial Sequence
<220> FEATURE:

<223> OTHER INFORMATION: partial structure of cyclic peptide, Clone-P3
<220> FEATURE:
<221> NAME/KEY: MOD_RES
<222> LOCATION: (1)..(1)
<223> OTHER INFORMATION: ClAc-D-Tyr

<400> SEQUENCE: 325

Tyr Pro Lys Pro Trp Asn Tyr His Thr Gly Asp Asn Thr Cys
1 5 10

<210> SEQ ID NO 326
<211> LENGTH: 14
<212> TYPE: PRT
<213> ORGANISM: Artificial Sequence
<220> FEATURE:
<223> OTHER INFORMATION: partial structure of cyclic peptide, Clone-P4
<220> FEATURE:
<221> NAME/KEY: MOD_RES
<222> LOCATION: (1)..(1)
<223> OTHER INFORMATION: ClAc-D-Tyr

<400> SEQUENCE: 326

Tyr Asn Gly His Asp Asp Phe Arg Thr Arg Pro Trp Tyr Cys
1 5 10

<210> SEQ ID NO 327
<211> LENGTH: 14
<212> TYPE: PRT
<213> ORGANISM: Artificial Sequence
<220> FEATURE:
<223> OTHER INFORMATION: partial structure of cyclic peptide, Clone-P5
<220> FEATURE:
<221> NAME/KEY: MOD_RES
<222> LOCATION: (1)..(1)
<223> OTHER INFORMATION: ClAc-D-Tyr

<400> SEQUENCE: 327

Tyr Val Ile Ser Pro Trp Ile Asp Arg Leu Val Glu Arg Cys
1 5 10

<210> SEQ ID NO 328
<211> LENGTH: 14
<212> TYPE: PRT
<213> ORGANISM: Artificial Sequence
<220> FEATURE:
<223> OTHER INFORMATION: partial structure of cyclic peptide, Clone-P6
<220> FEATURE:
<221> NAME/KEY: MOD_RES
<222> LOCATION: (1)..(1)
<223> OTHER INFORMATION: ClAc-D-Tyr

<400> SEQUENCE: 328

Tyr Arg Leu Ala Asp Pro Trp Lys Ser Arg Asn Ser Gly Cys
1 5 10

<210> SEQ ID NO 329
<211> LENGTH: 14
<212> TYPE: PRT
<213> ORGANISM: Artificial Sequence
<220> FEATURE:
<223> OTHER INFORMATION: partial structure of cyclic peptide, Clone-Q1
<220> FEATURE:
<221> NAME/KEY: MOD_RES
<222> LOCATION: (1)..(1)
<223> OTHER INFORMATION: ClAc-D-Tyr

<400> SEQUENCE: 329

Tyr Tyr Val Thr Asp Arg Ile Cys Arg Tyr Gln Trp Ala Cys
1 5 10

<210> SEQ ID NO 330
<211> LENGTH: 11
<212> TYPE: PRT
<213> ORGANISM: Artificial Sequence
<220> FEATURE:
<223> OTHER INFORMATION: partial structure of cyclic peptide, YG413
<220> FEATURE:
<221> NAME/KEY: MOD_RES
<222> LOCATION: (1)..(1)
<223> OTHER INFORMATION: ClAc-D-Tyr

<400> SEQUENCE: 330

Tyr Glu Arg Gly Tyr Gly Leu Trp Val Pro Cys
1 5 10

<210> SEQ ID NO 331
<211> LENGTH: 12
<212> TYPE: PRT
<213> ORGANISM: Artificial Sequence
<220> FEATURE:
<223> OTHER INFORMATION: partial structure of cyclic peptide, YG414
<220> FEATURE:
<221> NAME/KEY: MOD_RES
<222> LOCATION: (1)..(1)
<223> OTHER INFORMATION: ClAc-D-Tyr

<400> SEQUENCE: 331

Tyr Asn Glu Arg Gly Tyr Gly Leu Trp Val Pro Cys
1 5 10

<210> SEQ ID NO 332
<211> LENGTH: 11
<212> TYPE: PRT
<213> ORGANISM: Artificial Sequence
<220> FEATURE:
<223> OTHER INFORMATION: partial structure of cyclic peptide, YG415
<220> FEATURE:
<221> NAME/KEY: MOD_RES
<222> LOCATION: (1)..(1)
<223> OTHER INFORMATION: ClAc-D-Tyr

<400> SEQUENCE: 332

Tyr Gly Leu Trp Val Pro Asn Glu Arg Gly Cys
1 5 10

<210> SEQ ID NO 333
<211> LENGTH: 16
<212> TYPE: PRT
<213> ORGANISM: Artificial Sequence
<220> FEATURE:
<223> OTHER INFORMATION: partial structure of cyclic peptide, YG416
<220> FEATURE:
<221> NAME/KEY: MOD_RES
<222> LOCATION: (1)..(1)
<223> OTHER INFORMATION: ClAc-D-Tyr

<400> SEQUENCE: 333

Tyr Asn Asn Arg Glu Arg Gly Ser Asp Trp Phe Trp Leu Pro Pro Cys
1 5 10 15

<210> SEQ ID NO 334
<211> LENGTH: 17
<212> TYPE: PRT
<213> ORGANISM: Artificial Sequence
<220> FEATURE:
<223> OTHER INFORMATION: partial structure of cyclic peptide, YG417
<220> FEATURE:
<221> NAME/KEY: MOD_RES
<222> LOCATION: (1)..(1)
<223> OTHER INFORMATION: ClAc-D-Tyr

<400> SEQUENCE: 334

Tyr Gln Asn Asn Arg Glu Arg Gly Ser Asp Trp Phe Trp Leu Pro Pro
1               5                   10                  15

Cys

<210> SEQ ID NO 335
<211> LENGTH: 16
<212> TYPE: PRT
<213> ORGANISM: Artificial Sequence
<220> FEATURE:
<223> OTHER INFORMATION: partial structure of cyclic peptide, YG419
<220> FEATURE:
<221> NAME/KEY: MOD_RES
<222> LOCATION: (1)..(1)
<223> OTHER INFORMATION: ClAc-D-Tyr

<400> SEQUENCE: 335

Tyr Arg Gly Ser Asp Trp Phe Trp Leu Pro Pro Gln Asn Asn Arg Cys
1               5                   10                  15

<210> SEQ ID NO 336
<211> LENGTH: 11
<212> TYPE: PRT
<213> ORGANISM: Artificial Sequence
<220> FEATURE:
<223> OTHER INFORMATION: partial structure of cyclic peptide, YG281 in table 11
<220> FEATURE:
<221> NAME/KEY: MOD_RES
<222> LOCATION: (1)..(1)
<223> OTHER INFORMATION: ClAc-D-Tyr

<400> SEQUENCE: 336

Tyr Leu Asn Gly Asp Asn Asn Trp Ser Pro Cys
1               5                   10

<210> SEQ ID NO 337
<211> LENGTH: 11
<212> TYPE: PRT
<213> ORGANISM: Artificial Sequence
<220> FEATURE:
<223> OTHER INFORMATION: partial structure of cyclic peptide, YG282 in table 11
<220> FEATURE:
<221> NAME/KEY: MOD_RES
<222> LOCATION: (1)..(1)
<223> OTHER INFORMATION: ClAc-D-Tyr

<400> SEQUENCE: 337

Tyr Leu Asn Gly Asp Asn Asn Trp Ser Thr Cys
1               5                   10

<210> SEQ ID NO 338
<211> LENGTH: 14
<212> TYPE: PRT
<213> ORGANISM: Artificial Sequence
<220> FEATURE:
<223> OTHER INFORMATION: partial structure of cyclic peptide, YG288 in table 11
<220> FEATURE:
<221> NAME/KEY: MOD_RES
<222> LOCATION: (1)..(1)
<223> OTHER INFORMATION: ClAc-D-Tyr

<400> SEQUENCE: 338

Tyr Ser Asn Phe Arg Ile Trp Arg Tyr Ser Asn Ser Ser Cys
1               5                   10

<210> SEQ ID NO 339
<211> LENGTH: 14
<212> TYPE: PRT
<213> ORGANISM: Artificial Sequence
<220> FEATURE:
<223> OTHER INFORMATION: partial structure of cyclic peptide, YG289 in table 11
<220> FEATURE:
<221> NAME/KEY: MOD_RES
<222> LOCATION: (1)..(1)
<223> OTHER INFORMATION: ClAc-D-Tyr

<400> SEQUENCE: 339

Tyr His Asp Tyr Arg Ile Trp Arg Tyr His Thr Tyr Pro Cys
1               5                   10

<210> SEQ ID NO 340
<211> LENGTH: 14
<212> TYPE: PRT
<213> ORGANISM: Artificial Sequence
<220> FEATURE:
<223> OTHER INFORMATION: partial structure of cyclic peptide, YG292 in table 11
<220> FEATURE:
<221> NAME/KEY: MOD_RES
<222> LOCATION: (1)..(1)
<223> OTHER INFORMATION: ClAc-D-Tyr

<400> SEQUENCE: 340

Tyr Ile Arg Arg Pro Trp Val Pro Ile Ile Tyr Leu Gly Cys
1               5                   10

<210> SEQ ID NO 341
<211> LENGTH: 17
<212> TYPE: PRT
<213> ORGANISM: Artificial Sequence
<220> FEATURE:
<223> OTHER INFORMATION: partial structure of cyclic peptide, YG293 in table 11
<220> FEATURE:
<221> NAME/KEY: MOD_RES
<222> LOCATION: (1)..(1)
<223> OTHER INFORMATION: ClAc-D-Tyr

<400> SEQUENCE: 341

Tyr Thr Phe Arg Asp Val Trp Ile Phe Tyr Gly Ser Leu Leu Ser Arg
1               5                   10                  15

Cys

<210> SEQ ID NO 342
<211> LENGTH: 17
<212> TYPE: PRT
<213> ORGANISM: Artificial Sequence
<220> FEATURE:
<223> OTHER INFORMATION: partial structure of cyclic peptide, YG295 in table 11
<220> FEATURE:
<221> NAME/KEY: MOD_RES
<222> LOCATION: (1)..(1)
<223> OTHER INFORMATION: ClAc-D-Tyr

<400> SEQUENCE: 342

Tyr Ile Ser Trp Asn Glu Phe Asn Ser Pro Asn Trp Arg Phe Ile Thr
1               5                   10                  15

Cys

<210> SEQ ID NO 343
<211> LENGTH: 15

<212> TYPE: PRT
<213> ORGANISM: Artificial Sequence
<220> FEATURE:
<223> OTHER INFORMATION: partial structure of cyclic peptide, YG296 in table 11
<220> FEATURE:
<221> NAME/KEY: MOD_RES
<222> LOCATION: (1)..(1)
<223> OTHER INFORMATION: ClAc-D-Tyr

<400> SEQUENCE: 343

Tyr Trp Tyr Tyr Ala Trp Asp Gln Thr Tyr Lys Ala Phe Pro Cys
1 5 10 15

<210> SEQ ID NO 344
<211> LENGTH: 16
<212> TYPE: PRT
<213> ORGANISM: Artificial Sequence
<220> FEATURE:
<223> OTHER INFORMATION: partial structure of cyclic peptide, YG297 in table 11
<220> FEATURE:
<221> NAME/KEY: MOD_RES
<222> LOCATION: (1)..(1)
<223> OTHER INFORMATION: ClAc-D-Tyr

<400> SEQUENCE: 344

Tyr Arg Gln Phe Asn Arg Arg Thr His Glu Val Trp Asn Leu Asp Cys
1 5 10 15

<210> SEQ ID NO 345
<211> LENGTH: 13
<212> TYPE: PRT
<213> ORGANISM: Artificial Sequence
<220> FEATURE:
<223> OTHER INFORMATION: partial structure of cyclic peptide, YG299 in table 11
<220> FEATURE:
<221> NAME/KEY: MOD_RES
<222> LOCATION: (1)..(1)
<223> OTHER INFORMATION: ClAc-D-Tyr

<400> SEQUENCE: 345

Tyr Cys Asp Val Ser Gly Arg Trp Gly Tyr Phe Pro Cys
1 5 10

<210> SEQ ID NO 346
<211> LENGTH: 16
<212> TYPE: PRT
<213> ORGANISM: Artificial Sequence
<220> FEATURE:
<223> OTHER INFORMATION: partial structure of cyclic peptide, DNT061
<220> FEATURE:
<221> NAME/KEY: MOD_RES
<222> LOCATION: (1)..(1)
<223> OTHER INFORMATION: ClAc-D-Tyr

<400> SEQUENCE: 346

Tyr Asn Asn Arg Glu Arg Gly Ser Asp Phe Phe Trp Phe Phe Pro Cys
1 5 10 15

<210> SEQ ID NO 347
<211> LENGTH: 16
<212> TYPE: PRT
<213> ORGANISM: Artificial Sequence
<220> FEATURE:
<223> OTHER INFORMATION: partial structure of cyclic peptide, DNT062
<220> FEATURE:
<221> NAME/KEY: MOD_RES
<222> LOCATION: (1)..(1)
<223> OTHER INFORMATION: ClAc-D-Tyr

<400> SEQUENCE: 347

Tyr Asn Asn Arg Glu Arg Gly Ser Asp Gly Gly Trp Gly Gly Pro Cys
1               5                   10                  15

<210> SEQ ID NO 348
<211> LENGTH: 16
<212> TYPE: PRT
<213> ORGANISM: Artificial Sequence
<220> FEATURE:
<223> OTHER INFORMATION: partial structure of cyclic peptide, DNT063
<220> FEATURE:
<221> NAME/KEY: MOD_RES
<222> LOCATION: (1)..(1)
<223> OTHER INFORMATION: ClAc-D-Tyr

<400> SEQUENCE: 348

Tyr Asn Asn Arg Glu Arg Gly Ser Asp Tyr Tyr Trp Tyr Tyr Pro Cys
1               5                   10                  15

<210> SEQ ID NO 349
<211> LENGTH: 16
<212> TYPE: PRT
<213> ORGANISM: Artificial Sequence
<220> FEATURE:
<223> OTHER INFORMATION: partial structure of cyclic peptide, DNT065
<220> FEATURE:
<221> NAME/KEY: MOD_RES
<222> LOCATION: (1)..(1)
<223> OTHER INFORMATION: ClAc-D-Tyr

<400> SEQUENCE: 349

Tyr Asn Asn Arg Glu Arg Gly Ser Asp Asn Asn Trp Asn Asn Pro Cys
1               5                   10                  15

<210> SEQ ID NO 350
<211> LENGTH: 16
<212> TYPE: PRT
<213> ORGANISM: Artificial Sequence
<220> FEATURE:
<223> OTHER INFORMATION: partial structure of cyclic peptide, DNT066
<220> FEATURE:
<221> NAME/KEY: MOD_RES
<222> LOCATION: (1)..(1)
<223> OTHER INFORMATION: ClAc-D-Tyr

<400> SEQUENCE: 350

Tyr Asn Asn Arg Glu Arg Gly Ser Asp Val Val Trp Val Val Pro Cys
1               5                   10                  15

<210> SEQ ID NO 351
<211> LENGTH: 17
<212> TYPE: PRT
<213> ORGANISM: Artificial Sequence
<220> FEATURE:
<223> OTHER INFORMATION: partial structure of cyclic peptide, DNT070
<220> FEATURE:
<221> NAME/KEY: MOD_RES
<222> LOCATION: (1)..(1)
<223> OTHER INFORMATION: ClAc-D-Tyr

<400> SEQUENCE: 351

Tyr Ile Ser Trp Asn Glu Phe Asn Ser Tyr Phe Trp Leu Pro Ile Thr
1               5                   10                  15

Cys

<210> SEQ ID NO 352
<211> LENGTH: 16

<212> TYPE: PRT
<213> ORGANISM: Artificial Sequence
<220> FEATURE:
<223> OTHER INFORMATION: partial structure of cyclic peptide, DNT034
<220> FEATURE:
<221> NAME/KEY: MOD_RES
<222> LOCATION: (1)..(1)
<223> OTHER INFORMATION: ClAc-D-Tyr

<400> SEQUENCE: 352

Tyr Asn Asn Arg Glu Arg Gly Ser Asp Tyr Phe Trp Leu Pro Pro Cys
1 5 10 15

<210> SEQ ID NO 353
<211> LENGTH: 16
<212> TYPE: PRT
<213> ORGANISM: Artificial Sequence
<220> FEATURE:
<223> OTHER INFORMATION: partial structure of cyclic peptide, DNT057
<220> FEATURE:
<221> NAME/KEY: MOD_RES
<222> LOCATION: (1)..(1)
<223> OTHER INFORMATION: ClAc-D-Tyr

<400> SEQUENCE: 353

Tyr Arg Gln Phe Asn Arg Arg Thr His Tyr Phe Trp Leu Pro Asp Cys
1 5 10 15

<210> SEQ ID NO 354
<211> LENGTH: 20
<212> TYPE: PRT
<213> ORGANISM: Artificial Sequence
<220> FEATURE:
<223> OTHER INFORMATION: partial structure of cyclic peptide, Met3
<220> FEATURE:
<221> NAME/KEY: MOD_RES
<222> LOCATION: (1)..(1)
<223> OTHER INFORMATION: ClAc-D-Tyr

<400> SEQUENCE: 354

Tyr Lys Arg Lys Ala Trp Ile Cys Gln Thr Ala Val Tyr Cys Asn Ser
1 5 10 15

Gly Gly Val Ser
20

<210> SEQ ID NO 355
<211> LENGTH: 20
<212> TYPE: PRT
<213> ORGANISM: Artificial Sequence
<220> FEATURE:
<223> OTHER INFORMATION: partial structure of cyclic peptide, Met9
<220> FEATURE:
<221> NAME/KEY: MOD_RES
<222> LOCATION: (1)..(1)
<223> OTHER INFORMATION: ClAc-D-Tyr

<400> SEQUENCE: 355

Tyr Lys Arg Lys Asn Cys Leu Val His Val Trp His Gln Cys Asn Ser
1 5 10 15

Gly Gly Val Ser
20

<210> SEQ ID NO 356
<211> LENGTH: 20
<212> TYPE: PRT
<213> ORGANISM: Artificial Sequence
<220> FEATURE:
<223> OTHER INFORMATION: partial structure of cyclic peptide, Met11
<220> FEATURE:

<221> NAME/KEY: MOD_RES
<222> LOCATION: (1)..(1)
<223> OTHER INFORMATION: ClAc-D-Tyr

<400> SEQUENCE: 356

Tyr His Thr Asp Pro Phe Lys Ala Trp His Arg Arg Ser Cys Asn Ser
1               5                   10                  15

Gly Gly Val Ser
            20

<210> SEQ ID NO 357
<211> LENGTH: 20
<212> TYPE: PRT
<213> ORGANISM: Artificial Sequence
<220> FEATURE:
<223> OTHER INFORMATION: partial structure of cyclic peptide, Met12
<220> FEATURE:
<221> NAME/KEY: MOD_RES
<222> LOCATION: (1)..(1)
<223> OTHER INFORMATION: ClAc-D-Tyr

<400> SEQUENCE: 357

Tyr Tyr Ile Ile Trp His Arg His Arg Ile Met Thr Val Cys Asn Ser
1               5                   10                  15

Gly Gly Val Ser
            20

<210> SEQ ID NO 358
<211> LENGTH: 19
<212> TYPE: PRT
<213> ORGANISM: Artificial Sequence
<220> FEATURE:
<223> OTHER INFORMATION: partial structure of cyclic peptide, Met13
<220> FEATURE:
<221> NAME/KEY: MOD_RES
<222> LOCATION: (1)..(1)
<223> OTHER INFORMATION: ClAc-D-Tyr

<400> SEQUENCE: 358

Tyr Val Thr Trp Lys Gly Pro Tyr Arg Trp Arg Val Cys Asn Ser Gly
1               5                   10                  15

Gly Val Ser

<210> SEQ ID NO 359
<211> LENGTH: 20
<212> TYPE: PRT
<213> ORGANISM: Artificial Sequence
<220> FEATURE:
<223> OTHER INFORMATION: partial structure of cyclic peptide, Met14 by
      chemical synthesis

<400> SEQUENCE: 359

Tyr Leu Leu Ile Trp Lys Arg His Arg Ile Arg Val Thr Cys Asn Ser
1               5                   10                  15

Gly Gly Val Ser
            20

<210> SEQ ID NO 360
<211> LENGTH: 17
<212> TYPE: PRT
<213> ORGANISM: Artificial Sequence
<220> FEATURE:
<223> OTHER INFORMATION: partial structure of cyclic peptide, Met3-1 by
      chemical synthesis

<400> SEQUENCE: 360

Tyr Lys Arg Lys Ala Trp Ile Cys Gln Thr Ala Val Tyr Cys Asn Ser
1 5 10 15

Gly

<210> SEQ ID NO 361
<211> LENGTH: 12
<212> TYPE: PRT
<213> ORGANISM: Artificial Sequence
<220> FEATURE:
<223> OTHER INFORMATION: partial structure of cyclic peptide, Met2 by chemical synthesis

<400> SEQUENCE: 361

Tyr Lys Arg Arg His Cys Leu Pro Pro Ala Trp Gly
1 5 10

<210> SEQ ID NO 362
<211> LENGTH: 8
<212> TYPE: PRT
<213> ORGANISM: Artificial Sequence
<220> FEATURE:
<223> OTHER INFORMATION: partial structure of cyclic peptide, Met3a-L by chemical synthesis

<400> SEQUENCE: 362

Tyr Lys Arg Lys Ala Trp Leu Cys
1 5

<210> SEQ ID NO 363
<211> LENGTH: 17
<212> TYPE: PRT
<213> ORGANISM: Artificial Sequence
<220> FEATURE:
<223> OTHER INFORMATION: partial structure of cyclic peptide, Met11 by chemical synthesis

<400> SEQUENCE: 363

Tyr His Thr Asp Pro Phe Lys Ala Trp His Arg Arg Ser Cys Asn Ser
1 5 10 15

Gly

<210> SEQ ID NO 364
<211> LENGTH: 16
<212> TYPE: PRT
<213> ORGANISM: Artificial Sequence
<220> FEATURE:
<223> OTHER INFORMATION: partial structure of cyclic peptide, Met13 by chemical synthesis

<400> SEQUENCE: 364

Tyr Val Thr Trp Lys Gly Pro Tyr Arg Trp Arg Val Cys Asn Ser Gly
1 5 10 15

<210> SEQ ID NO 365
<211> LENGTH: 17
<212> TYPE: PRT
<213> ORGANISM: Artificial Sequence
<220> FEATURE:
<223> OTHER INFORMATION: partial structure of cyclic peptide, Kgp1-1

<400> SEQUENCE: 365

Tyr Cys Ile Trp Leu Ser His His Cys Arg Leu Phe Thr Cys Asn Ser
1 5 10 15

Gly

<210> SEQ ID NO 366
<211> LENGTH: 8
<212> TYPE: PRT
<213> ORGANISM: Artificial Sequence
<220> FEATURE:
<223> OTHER INFORMATION: partial structure of cyclic peptide including D-Ile

<400> SEQUENCE: 366

Tyr Lys Arg Lys Ala Trp Ile Cys
1 5

<210> SEQ ID NO 367
<211> LENGTH: 8
<212> TYPE: PRT
<213> ORGANISM: Artificial Sequence
<220> FEATURE:
<223> OTHER INFORMATION: partial structure of cyclic peptide including D-Phe

<400> SEQUENCE: 367

Tyr Lys Arg Lys Ala Trp Phe Cys
1 5

<210> SEQ ID NO 368
<211> LENGTH: 8
<212> TYPE: PRT
<213> ORGANISM: Artificial Sequence
<220> FEATURE:
<223> OTHER INFORMATION: partial structure of cyclic peptide including D-Trp

<400> SEQUENCE: 368

Tyr Lys Arg Lys Ala Trp Trp Cys
1 5

<210> SEQ ID NO 369
<211> LENGTH: 8
<212> TYPE: PRT
<213> ORGANISM: Artificial Sequence
<220> FEATURE:
<223> OTHER INFORMATION: partial structure of cyclic peptide including D-Tyr

<400> SEQUENCE: 369

Tyr Lys Arg Lys Ala Trp Tyr Cys
1 5

<210> SEQ ID NO 370
<211> LENGTH: 8
<212> TYPE: PRT
<213> ORGANISM: Artificial Sequence
<220> FEATURE:
<223> OTHER INFORMATION: partial structure of cyclic peptide including D-Trp

<400> SEQUENCE: 370

Tyr Lys Arg Lys Ala Trp Leu Cys
1 5

<210> SEQ ID NO 371
<211> LENGTH: 14
<212> TYPE: PRT
<213> ORGANISM: Artificial Sequence
<220> FEATURE:
<223> OTHER INFORMATION: partial structure of cyclic peptide including D-Trp and L-Trp

<400> SEQUENCE: 371

Trp Ser Asn Phe Arg Ile Trp Arg Tyr Ser Asn Ser Ser Cys
1 5 10

<210> SEQ ID NO 372
<211> LENGTH: 14
<212> TYPE: PRT
<213> ORGANISM: Artificial Sequence
<220> FEATURE:
<223> OTHER INFORMATION: partial structure of cyclic peptide, AY015

<400> SEQUENCE: 372

Trp Ser Asn Phe Arg Ile Ala Arg Tyr Ser Asn Ser Ser Cys
1 5 10

<210> SEQ ID NO 373
<211> LENGTH: 14
<212> TYPE: PRT
<213> ORGANISM: Artificial Sequence
<220> FEATURE:
<223> OTHER INFORMATION: partial structure of cyclic peptide, AY016

<400> SEQUENCE: 373

Trp His Asp Tyr Arg Ile Ala Arg Tyr His Thr Tyr Pro Cys
1 5 10

<210> SEQ ID NO 374
<211> LENGTH: 13
<212> TYPE: PRT
<213> ORGANISM: Artificial Sequence
<220> FEATURE:
<223> OTHER INFORMATION: partial structure of cyclic peptide, AY017

<400> SEQUENCE: 374

Trp Cys Asp Val Ser Gly Arg Ala Gly Tyr Phe Pro Cys
1 5 10

<210> SEQ ID NO 375
<211> LENGTH: 16
<212> TYPE: PRT
<213> ORGANISM: Artificial Sequence
<220> FEATURE:
<223> OTHER INFORMATION: partial structure of cyclic peptide, AY018

<400> SEQUENCE: 375

Trp Asn Asn Arg Glu Arg Gly Ser Asp Asp Asp Ala Gly Gly Pro Cys
1 5 10 15

<210> SEQ ID NO 376
<211> LENGTH: 13
<212> TYPE: PRT
<213> ORGANISM: Artificial Sequence
<220> FEATURE:
<223> OTHER INFORMATION: partial structure of cyclic peptide, AY019

<400> SEQUENCE: 376

Trp Ser Asn Val Ser Gly Arg Ala Gly Tyr Phe Pro Cys
1 5 10

<210> SEQ ID NO 377
<211> LENGTH: 16
<212> TYPE: PRT
<213> ORGANISM: Artificial Sequence
<220> FEATURE:
<223> OTHER INFORMATION: partial structure of cyclic peptide, AY020

<400> SEQUENCE: 377

Trp Ser Asn Arg Glu Arg Gly Ser Asp Asp Asp Ala Gly Gly Pro Cys
1 5 10 15

<210> SEQ ID NO 378
<211> LENGTH: 46
<212> TYPE: DNA
<213> ORGANISM: Artificial Sequence
<220> FEATURE:
<223> OTHER INFORMATION: T7YGM.F46 v1tr.F46

<400> SEQUENCE: 378
taatacgact cactataggg ttaactttaa gaaggagata taaata 46

<210> SEQ ID NO 379
<211> LENGTH: 39
<212> TYPE: DNA
<213> ORGANISM: Artificial Sequence
<220> FEATURE:
<223> OTHER INFORMATION: rCNSGGVSan13.R39

<400> SEQUENCE: 379
tttccgcccc ccgtcctagc ttaccccacc actgttaca 39

<210> SEQ ID NO 380
<211> LENGTH: 8
<212> TYPE: PRT
<213> ORGANISM: Artificial Sequence
<220> FEATURE:
<223> OTHER INFORMATION: partial structure of cyclic peptide including D-amino acid
<220> FEATURE:
<221> NAME/KEY: MOD_RES
<222> LOCATION: (6)..(6)
<223> OTHER INFORMATION: Xaa is D- amino acid

<400> SEQUENCE: 380

Tyr Lys Arg Lys Ala Xaa Leu Cys
1 5

<210> SEQ ID NO 381
<211> LENGTH: 17
<212> TYPE: PRT
<213> ORGANISM: Artificial Sequence
<220> FEATURE:
<223> OTHER INFORMATION: partial structure of cyclic peptide, Met14 in paragraph 0254

<400> SEQUENCE: 381

Tyr Leu Leu Ile Trp Lys Arg His Arg Ile Arg Val Thr Cys Asn Ser
1 5 10 15

Gly

<210> SEQ ID NO 382
<211> LENGTH: 10
<212> TYPE: PRT
<213> ORGANISM: Artificial Sequence
<220> FEATURE:
<223> OTHER INFORMATION: example of partial structure of cyclic peptide which can be prenylated

<400> SEQUENCE: 382

Thr Ser Gln Ile Trp Gly Ser Pro Val Pro
1 5 10

<210> SEQ ID NO 383
<211> LENGTH: 10
<212> TYPE: PRT

```
<213> ORGANISM: Artificial Sequence
<220> FEATURE:
<223> OTHER INFORMATION: example of partial structure of cyclic peptide
      which can be prenylated

<400> SEQUENCE: 383

Ser Ala Gln Trp Gln Asn Phe Gly Val Pro
1               5                   10


<210> SEQ ID NO 384
<211> LENGTH: 11
<212> TYPE: PRT
<213> ORGANISM: Artificial Sequence
<220> FEATURE:
<223> OTHER INFORMATION: example of partial structure of cyclic peptide
      which can be prenylated

<400> SEQUENCE: 384

Trp Leu Asn Gly Asp Asn Asn Trp Ser Thr Pro
1               5                   10


<210> SEQ ID NO 385
<211> LENGTH: 15
<212> TYPE: PRT
<213> ORGANISM: Artificial Sequence
<220> FEATURE:
<223> OTHER INFORMATION: example of partial structure of cyclic peptide
      which can be prenylated

<400> SEQUENCE: 385

Trp Leu Asn Gly Asp Asn Asn Trp Ser Thr Pro Ala Tyr Asp Gly
1               5                   10                  15


<210> SEQ ID NO 386
<211> LENGTH: 11
<212> TYPE: PRT
<213> ORGANISM: Artificial Sequence
<220> FEATURE:
<223> OTHER INFORMATION: example of partial structure of cyclic peptide
      which can be prenylated

<400> SEQUENCE: 386

Trp Leu Asn Gly Asp Asn Asn Trp Ser Thr Pro
1               5                   10


<210> SEQ ID NO 387
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 387

Tyr Lys Arg Arg His Cys Met Thr Trp Cys Ala Asp His Cys
1               5                   10


<210> SEQ ID NO 388
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 388

Tyr Lys Arg Arg His Cys Ile Thr Trp Cys Ala Asp His Cys
1               5                   10
```

<210> SEQ ID NO 389
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 389

Tyr Lys Arg Arg His Cys Leu Thr Trp Cys Ala Asp His Cys
1 5 10

<210> SEQ ID NO 390
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 390

Tyr Lys Arg Arg His Cys Met Thr Trp Cys Ala Asp Arg Cys
1 5 10

<210> SEQ ID NO 391
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 391

Tyr Lys Arg Arg His Cys Thr Thr Trp Cys Ala Asp His Cys
1 5 10

<210> SEQ ID NO 392
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 392

Tyr Lys Arg Arg His Cys Val Thr Trp Cys Ala Asp His Cys
1 5 10

<210> SEQ ID NO 393
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 393

Tyr Lys Arg Arg His Cys Met Thr Trp Cys Thr Asp His Cys
1 5 10

<210> SEQ ID NO 394
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 394

Thr Lys Arg Arg His Cys Met Thr Trp Cys Ala Asp His Cys
1 5 10

<210> SEQ ID NO 395

<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 395

Tyr Lys Arg Arg His Cys Leu Thr Trp Gln Ser Pro His Cys
1 5 10

<210> SEQ ID NO 396
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 396

Tyr Lys Arg Arg His Cys Leu Thr Trp Val Leu Glu Ser Cys
1 5 10

<210> SEQ ID NO 397
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 397

Tyr Lys Arg Arg His Cys Leu Thr Trp Ser Cys Pro Pro Cys
1 5 10

<210> SEQ ID NO 398
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 398

Tyr Lys Arg Arg His Cys Gln Arg Ile Thr Trp Thr Lys Cys
1 5 10

<210> SEQ ID NO 399
<211> LENGTH: 13
<212> TYPE: PRT
<213> ORGANISM: Artificial Sequence
<220> FEATURE:
<223> OTHER INFORMATION: partial structure of cyclic peptide in fig 10

<400> SEQUENCE: 399

Tyr Lys Arg Arg His Cys Thr Leu Arg Ala Trp Ala Cys
1 5 10

<210> SEQ ID NO 400
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 400

Tyr Lys Arg Arg His Cys Thr Leu Lys Arg Ala Trp Asp Cys
1 5 10

<210> SEQ ID NO 401
<211> LENGTH: 16

<212> TYPE: PRT
<213> ORGANISM: Artificial Sequence
<220> FEATURE:
<223> OTHER INFORMATION: partial structure of cyclic peptide in fig 10

<400> SEQUENCE: 401

Tyr Lys Arg Arg His Cys His Cys Leu Ser Arg Ala Trp Pro Thr Cys
1 5 10 15

<210> SEQ ID NO 402
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 402

Tyr Lys Arg Arg His Cys Met Val Ser Ser Thr Trp Ala Cys
1 5 10

<210> SEQ ID NO 403
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 403

Tyr Lys Arg Arg His Cys Arg Ala Ser Ile Trp Leu Thr Cys
1 5 10

<210> SEQ ID NO 404
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 404

Tyr Lys Arg Arg His Cys Glu Gly Thr Ser Ile Trp Ser Cys
1 5 10

<210> SEQ ID NO 405
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 405

Tyr Lys Arg Arg His Cys Thr Trp Tyr Lys Val Tyr Asp Cys
1 5 10

<210> SEQ ID NO 406
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 406

Tyr Lys Arg Arg His Cys Arg Ser Thr Trp Tyr Ser Asp Cys
1 5 10

<210> SEQ ID NO 407
<211> LENGTH: 14
<212> TYPE: PRT

<213> ORGANISM: Artificial Sequence
<220> FEATURE:
<223> OTHER INFORMATION: partial structure of cyclic peptide in fig 10

<400> SEQUENCE: 407

Tyr Lys Arg Arg His Cys Arg Ser Leu Asp Trp Leu Ala Cys
1 5 10

<210> SEQ ID NO 408
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 408

Tyr Lys Arg Arg His Cys Thr Trp Asn Asn Leu Ser Gly Cys
1 5 10

<210> SEQ ID NO 409
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 409

Tyr Lys Arg Arg His Cys Gly Tyr Thr Trp Asp Ser Lys Cys
1 5 10

<210> SEQ ID NO 410
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 410

Tyr Lys Arg Arg His Cys Leu Pro Pro Ala Trp Thr Trp Cys
1 5 10

<210> SEQ ID NO 411
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 411

Tyr Lys Arg Arg His Cys Leu Pro Pro Ala Trp Thr Cys Cys
1 5 10

<210> SEQ ID NO 412
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 412

Tyr Lys Arg Arg His Cys Leu Pro Pro Ala Arg Thr Cys Trp
1 5 10

<210> SEQ ID NO 413
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 413

Tyr Lys Arg Arg His Cys Phe Thr Trp Pro Lys Ser Glu Cys
1 5 10

<210> SEQ ID NO 414
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 414

Tyr Lys Arg Arg His Cys Thr Trp Phe Pro Gly Asp Glu Cys
1 5 10

<210> SEQ ID NO 415
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 415

Tyr Lys Arg Arg His Cys Thr Trp Thr Ala Thr Arg Lys Cys
1 5 10

<210> SEQ ID NO 416
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 416

Tyr Lys Arg Arg His Cys Thr Trp Thr Tyr Phe Thr Pro Cys
1 5 10

<210> SEQ ID NO 417
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 417

Tyr Lys Arg Arg His Cys Ile Pro Val Ala Trp His Pro Cys
1 5 10

<210> SEQ ID NO 418
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 418

Tyr Lys Arg Arg His Cys Ile Trp Leu Arg Pro Val Asn Cys
1 5 10

<210> SEQ ID NO 419
<211> LENGTH: 14
<212> TYPE: PRT
<213> ORGANISM: Artificial Sequence
<220> FEATURE:

<223> OTHER INFORMATION: partial structure of cyclic peptide in fig 10

<400> SEQUENCE: 419

Tyr Lys Arg Arg His Cys Asp Glu Phe Gln Ile Trp Lys Cys
1 5 10

<210> SEQ ID NO 420
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 420

Tyr Lys Arg Arg His Cys Ser Met Pro Thr Trp Phe Thr Cys
1 5 10

<210> SEQ ID NO 421
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 421

Tyr Lys Arg Arg His Cys Val Tyr Glu Ile Ala Trp Leu Cys
1 5 10

<210> SEQ ID NO 422
<211> LENGTH: 13
<212> TYPE: PRT
<213> ORGANISM: Artificial Sequence
<220> FEATURE:
<223> OTHER INFORMATION: partial structure of cyclic peptide in fig 10

<400> SEQUENCE: 422

Tyr Lys Arg Arg His Cys Thr Ser Leu Ala Trp Leu Cys
1 5 10

<210> SEQ ID NO 423
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 423

Tyr Lys Arg Arg His Cys Ser Ser Arg Asn Val Trp Ile Cys
1 5 10

<210> SEQ ID NO 424
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 424

Tyr Lys Arg Arg His Cys Thr Trp Leu Phe Lys Ala Glu Cys
1 5 10

<210> SEQ ID NO 425
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 425

Tyr Lys Arg Arg His Cys Trp Gln Pro Ala Thr Trp Glu Cys
1 5 10

<210> SEQ ID NO 426
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 426

Tyr Lys Arg Lys Ala Trp Ile Cys Gln Thr Ala Val Tyr Cys
1 5 10

<210> SEQ ID NO 427
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 427

Thr Lys Arg Lys Ala Trp Ile Cys Gln Thr Ala Val Tyr Cys
1 5 10

<210> SEQ ID NO 428
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 428

Tyr Lys Arg Lys Ala Trp Ile Cys Arg Thr Ala Val Tyr Cys
1 5 10

<210> SEQ ID NO 429
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 429

Tyr Lys Arg Lys Ala Trp Ile Cys Gln Thr Ala Ala Tyr Cys
1 5 10

<210> SEQ ID NO 430
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 430

Tyr Lys Arg Lys Ala Trp Ile Cys Gln Thr Ala Ile Tyr Cys
1 5 10

<210> SEQ ID NO 431
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 431

Tyr Lys Arg Lys Ala Trp Phe Cys Glu Pro Arg Ser Val Cys
1 5 10

<210> SEQ ID NO 432
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 432

Tyr Lys Arg Lys Ala Trp Phe Cys Glu Lys Arg Tyr Gly Cys
1 5 10

<210> SEQ ID NO 433
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 433

Tyr Lys Arg Lys Ala Trp Tyr Cys Lys Lys Glu Lys His Cys
1 5 10

<210> SEQ ID NO 434
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 434

Tyr Lys Arg Lys Ala Trp Tyr Cys Lys Pro Thr Met His Cys
1 5 10

<210> SEQ ID NO 435
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 435

Tyr Lys Arg Lys Ala Trp Leu Cys Thr Ser Val His Asp Cys
1 5 10

<210> SEQ ID NO 436
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 436

Tyr Lys Arg Lys Ala Trp Phe Cys Thr Ser Asn Lys Asn Cys
1 5 10

<210> SEQ ID NO 437
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 437

Tyr Lys Arg Lys Ala Trp Ser Cys Arg Ala Gln Pro Gln Cys
1 5 10

<210> SEQ ID NO 438
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 438

Tyr Lys Arg Lys Ala Trp Ser Cys Arg Ala Gln Pro His Cys
1 5 10

<210> SEQ ID NO 439
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 439

Tyr Lys Arg Lys Ala Trp Ser Cys Arg Val Gln Pro Gln Cys
1 5 10

<210> SEQ ID NO 440
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 440

Tyr Lys Arg Lys Ala Trp Val Cys Arg Ser Pro Glu Ala Cys
1 5 10

<210> SEQ ID NO 441
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 441

Tyr Lys Arg Lys Ala Trp Val Cys Arg Asn Pro Glu Ala Cys
1 5 10

<210> SEQ ID NO 442
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 442

Tyr Lys Arg Lys Ala Trp Leu Cys Leu Val Lys Asn Lys Cys
1 5 10

<210> SEQ ID NO 443
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 443

```
Tyr Lys Arg Lys Ala Trp Val Cys Cys Ser Gln Tyr Arg Cys
1               5                   10


<210> SEQ ID NO 444
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 444

Tyr Lys Arg Lys Ala Trp Thr Cys Arg Lys Gln Gly His Cys
1               5                   10


<210> SEQ ID NO 445
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 445

Tyr Lys Arg Lys Ala Trp His Cys Ile Lys Ser Tyr Leu Cys
1               5                   10


<210> SEQ ID NO 446
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 446

Tyr Lys Arg Lys Ala Trp His Cys Phe Lys Ser Lys Cys Cys
1               5                   10


<210> SEQ ID NO 447
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 447

Tyr Lys Arg Arg Ala Trp Tyr Cys Lys Ser Arg Lys Ala Cys
1               5                   10


<210> SEQ ID NO 448
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 448

Tyr Lys Arg Arg Ala Trp Tyr Cys Leu Ser Arg Lys Val Cys
1               5                   10


<210> SEQ ID NO 449
<211> LENGTH: 13
<212> TYPE: PRT
<213> ORGANISM: Artificial Sequence
<220> FEATURE:
<223> OTHER INFORMATION: partial structure of cyclic peptide in fig 10

<400> SEQUENCE: 449

Tyr Lys Arg Arg Ala Trp Phe Cys Leu Pro Pro Thr Cys
```

-continued 1 5 10

<210> SEQ ID NO 450
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 450

Tyr Lys Arg Arg Ala Trp His Cys Ile Thr Asn Ser Val Cys
1 5 10

<210> SEQ ID NO 451
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 451

Tyr Lys Arg Arg Ala Trp His Cys Leu Lys Val Leu Asn Cys
1 5 10

<210> SEQ ID NO 452
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 452

Tyr Lys Arg Arg Ala Trp Phe Cys Cys Asn Phe Pro Leu Cys
1 5 10

<210> SEQ ID NO 453
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 453

Tyr Lys Arg Lys Ser Ala Tyr Cys Ile Trp Ser Met Glu Cys
1 5 10

<210> SEQ ID NO 454
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 454

Tyr Lys Arg Lys Ser Ala Tyr Cys Ile Trp Ser Met Asp Cys
1 5 10

<210> SEQ ID NO 455
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 455

Tyr Lys Arg Lys His Cys Ile Asp Thr Pro Ile Trp Ser Cys
1 5 10

<210> SEQ ID NO 456
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 456

Tyr Lys Arg Lys His Cys Leu Pro Pro Ile Trp Leu Gln Cys
1 5 10

<210> SEQ ID NO 457
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 457

Tyr Lys Arg Lys Thr Ala His Cys Ile Trp Trp Arg Tyr Cys
1 5 10

<210> SEQ ID NO 458
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 458

Tyr Lys Arg Lys Thr Ala His Cys Ile Trp Trp His Tyr Cys
1 5 10

<210> SEQ ID NO 459
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 459

Tyr Lys Arg Lys Asn Cys Leu Val His Val Trp His Gln Cys
1 5 10

<210> SEQ ID NO 460
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 460

Tyr Lys Arg Lys Asn Cys Leu Val His Val Trp His His Cys
1 5 10

<210> SEQ ID NO 461
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 461

Tyr Lys Arg Lys Asn Cys Leu Val His Val Arg His Gln Cys
1 5 10

<210> SEQ ID NO 462
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 462

Tyr Lys Arg Lys His Cys Leu Pro Thr Trp Arg Gln Arg Cys
1 5 10

<210> SEQ ID NO 463
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 463

Tyr Lys Arg Arg Asn Cys Thr Trp Arg Arg Ile Trp Gln Cys
1 5 10

<210> SEQ ID NO 464
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 464

Tyr Lys Arg Arg Asn Cys Thr Trp Arg Arg Ile Trp His Cys
1 5 10

<210> SEQ ID NO 465
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 465

Tyr Lys Arg Arg Asn Cys Thr Trp Arg His Val Thr Tyr Cys
1 5 10

<210> SEQ ID NO 466
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 466

Tyr Lys Arg Arg Asn Cys Thr Trp Asn Lys Trp Phe Arg Cys
1 5 10

<210> SEQ ID NO 467
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 467

Tyr Lys Arg Arg Ser Cys Thr Trp Leu His Thr Asp Trp Cys
1 5 10

<210> SEQ ID NO 468
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 468

Tyr Lys Arg Lys His Cys Leu Thr Trp Glu Ile Gln Pro Cys
1 5 10

<210> SEQ ID NO 469
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 469

Tyr Lys Arg Lys His Cys Ala Trp Val Met Pro Val Cys Cys
1 5 10

<210> SEQ ID NO 470
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 470

Tyr Lys Arg Lys Asn Ala Phe Cys Ala Trp His Arg Ile Cys
1 5 10

<210> SEQ ID NO 471
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 471

Tyr Lys Arg Lys Pro Cys Trp Ile Thr Trp Lys His Pro Cys
1 5 10

<210> SEQ ID NO 472
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 472

Tyr Lys Arg Lys Trp Cys Thr Ile Ala Trp Ile His Pro Cys
1 5 10

<210> SEQ ID NO 473
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 473

Tyr Lys Arg Arg His Cys Ser Ile Trp Cys Tyr Gly Asn Cys
1 5 10

<210> SEQ ID NO 474

<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 474

Tyr Lys Arg Lys Ala Ala Ile Cys Cys Asn Val Trp Leu Cys
1 5 10

<210> SEQ ID NO 475
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 475

Tyr His Thr Asp Pro Phe Lys Ala Trp His Arg Arg Ser Cys
1 5 10

<210> SEQ ID NO 476
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 476

Tyr His Thr Asp Pro Phe Arg Ala Trp His Arg Arg Ser Cys
1 5 10

<210> SEQ ID NO 477
<211> LENGTH: 13
<212> TYPE: PRT
<213> ORGANISM: Artificial Sequence
<220> FEATURE:
<223> OTHER INFORMATION: partial structure of cyclic peptide in fig 10

<400> SEQUENCE: 477

Tyr Arg Asn Asp Pro Phe Arg Ala Trp His Arg Ala Cys
1 5 10

<210> SEQ ID NO 478
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 478

Tyr Leu Arg Asp Pro Phe Arg Ala Trp Trp Arg Lys Thr Cys
1 5 10

<210> SEQ ID NO 479
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 479

Tyr Tyr Val Asp Ala Phe Arg Ala Trp Gly Arg Ala Ser Cys
1 5 10

<210> SEQ ID NO 480
<211> LENGTH: 14

<212> TYPE: PRT
<213> ORGANISM: Artificial Sequence
<220> FEATURE:
<223> OTHER INFORMATION: partial structure of cyclic peptide in fig 10

<400> SEQUENCE: 480

Tyr Lys Arg Arg Ser Thr Tyr Cys Cys Gly Thr Trp Trp Cys
1 5 10

<210> SEQ ID NO 481
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 481

Tyr Lys Arg Asn Ala Trp Met Cys Arg Glu Ala Asn His Cys
1 5 10

<210> SEQ ID NO 482
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 482

Tyr Lys Ala Lys Trp Cys Asn Asn Arg Arg Ile Trp Ser Cys
1 5 10

<210> SEQ ID NO 483
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 483

Tyr Tyr Ile Ile Trp His Arg His Arg Ile Met Thr Val Cys
1 5 10

<210> SEQ ID NO 484
<211> LENGTH: 14
<212> TYPE: PRT
<213> ORGANISM: Artificial Sequence
<220> FEATURE:
<223> OTHER INFORMATION: partial structure of cyclic peptide in fig 10

<400> SEQUENCE: 484

Tyr Tyr Ile Ile Arg His Arg His Arg Ile Met Thr Val Cys
1 5 10

<210> SEQ ID NO 485
<211> LENGTH: 13
<212> TYPE: PRT
<213> ORGANISM: Artificial Sequence
<220> FEATURE:
<223> OTHER INFORMATION: partial structure of cyclic peptide in fig 10

<400> SEQUENCE: 485

Tyr Val Thr Trp Lys Gly Pro Tyr Arg Trp Arg Val Cys
1 5 10

<210> SEQ ID NO 486
<211> LENGTH: 14
<212> TYPE: PRT

<213> ORGANISM: Artificial Sequence
<220> FEATURE:
<223> OTHER INFORMATION: partial structure of cyclic peptide in fig 10

<400> SEQUENCE: 486

Tyr Leu Leu Ile Trp Lys Arg His Arg Ile Arg Val Thr Cys
1 5 10

<210> SEQ ID NO 487
<211> LENGTH: 10
<212> TYPE: PRT
<213> ORGANISM: Artificial Sequence
<220> FEATURE:
<223> OTHER INFORMATION: Oscillatorin

<400> SEQUENCE: 487

Asn Glu Arg Gly Tyr Gly Leu Trp Val Pro
1 5 10

<210> SEQ ID NO 488
<211> LENGTH: 10
<212> TYPE: PRT
<213> ORGANISM: Artificial Sequence
<220> FEATURE:
<223> OTHER INFORMATION: Oscillatorin

<400> SEQUENCE: 488

Tyr Gly Leu Trp Val Pro Asn Glu Arg Gly
1 5 10

<210> SEQ ID NO 489
<211> LENGTH: 15
<212> TYPE: PRT
<213> ORGANISM: Artificial Sequence
<220> FEATURE:
<223> OTHER INFORMATION: OscE2

<400> SEQUENCE: 489

Gln Asn Asn Arg Glu Arg Gly Ser Asp Trp Phe Trp Met Pro Pro
1 5 10 15

<210> SEQ ID NO 490
<211> LENGTH: 15
<212> TYPE: PRT
<213> ORGANISM: Artificial Sequence
<220> FEATURE:
<223> OTHER INFORMATION: OscE2

<400> SEQUENCE: 490

Glu Arg Gly Ser Asp Trp Phe Trp Met Pro Pro Gln Asn Asn Arg
1 5 10 15

<210> SEQ ID NO 491
<211> LENGTH: 9
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u

<400> SEQUENCE: 491 augnngugu 9

<210> SEQ ID NO 492

<211> LENGTH: 9
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u

<400> SEQUENCE: 492 augnnkugu 9

<210> SEQ ID NO 493
<211> LENGTH: 9
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u

<400> SEQUENCE: 493 augnnsugu 9

<210> SEQ ID NO 494
<211> LENGTH: 9
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u

<400> SEQUENCE: 494 augnnmugu 9

<210> SEQ ID NO 495
<211> LENGTH: 9
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u

<400> SEQUENCE: 495 augnnwugu 9

<210> SEQ ID NO 496
<211> LENGTH: 9
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u

<400> SEQUENCE: 496 augnnaugu 9

<210> SEQ ID NO 497
<211> LENGTH: 9
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u

<400> SEQUENCE: 497 augnnuugu 9

<210> SEQ ID NO 498
<211> LENGTH: 9
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u

<400> SEQUENCE: 498 augnncugu 9

<210> SEQ ID NO 499
<211> LENGTH: 18
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(9)
<223> OTHER INFORMATION: n is a, c, g, or u
<220> FEATURE:
<221> NAME/KEY: misc_feature
<222> LOCATION: (13)..(15)
<223> OTHER INFORMATION: n is a, c, g, or u

<400> SEQUENCE: 499
augnnnnnnu ggnnnugu 18

<210> SEQ ID NO 500
<211> LENGTH: 18
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(6)
<223> OTHER INFORMATION: n is a, c, g, or u
<220> FEATURE:
<221> NAME/KEY: misc_feature
<222> LOCATION: (10)..(15)
<223> OTHER INFORMATION: n is a, c, g, or u

<400> SEQUENCE: 500
augnnnuggn nnnnnugu 18

<210> SEQ ID NO 501
<211> LENGTH: 21
<212> TYPE: RNA
<213> ORGANISM: Artificial Sequence
<220> FEATURE:
<223> OTHER INFORMATION: mRNA
<220> FEATURE:

<221> NAME/KEY: misc_feature
<222> LOCATION: (4)..(9)
<223> OTHER INFORMATION: n is a, c, g, or u
<220> FEATURE:
<221> NAME/KEY: misc_feature
<222> LOCATION: (13)..(18)
<223> OTHER INFORMATION: n is a, c, g, or u

<400> SEQUENCE: 501
augnnnnnnu ggnnnnnnug u 21

<210> SEQ ID NO 502
<211> LENGTH: 18
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u
<220> FEATURE:
<221> NAME/KEY: misc_feature
<222> LOCATION: (7)..(9)
<223> OTHER INFORMATION: n is a, c, g, or u
<220> FEATURE:
<221> NAME/KEY: misc_feature
<222> LOCATION: (13)..(14)
<223> OTHER INFORMATION: n is a, c, g, or u

<400> SEQUENCE: 502
augnnknnnu ggnnkugu 18

<210> SEQ ID NO 503
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(6)
<223> OTHER INFORMATION: n is a, c, g, or u
<220> FEATURE:
<221> NAME/KEY: misc_feature
<222> LOCATION: (10)..(11)
<223> OTHER INFORMATION: n is a, c, g, or u
<220> FEATURE:
<221> NAME/KEY: misc_feature
<222> LOCATION: (13)..(14)
<223> OTHER INFORMATION: n is a, c, g, or u
<220> FEATURE:
<221> NAME/KEY: misc_feature
<222> LOCATION: (16)..(17)
<223> OTHER INFORMATION: n is a, c, g, or u
<220> FEATURE:
<221> NAME/KEY: misc_feature
<222> LOCATION: (19)..(20)
<223> OTHER INFORMATION: n is a, c, g, or u
<220> FEATURE:
<221> NAME/KEY: misc_feature
<222> LOCATION: (22)..(23)
<223> OTHER INFORMATION: n is a, c, g, or u
<220> FEATURE:
<221> NAME/KEY: misc_feature
<222> LOCATION: (25)..(26)
<223> OTHER INFORMATION: n is a, c, g, or u
<220> FEATURE:
<221> NAME/KEY: misc_feature
<222> LOCATION: (28)..(29)
<223> OTHER INFORMATION: n is a, c, g, or u
<220> FEATURE:
<221> NAME/KEY: misc_feature
<222> LOCATION: (31)..(32)
<223> OTHER INFORMATION: n is a, c, g, or u
<220> FEATURE:
<221> NAME/KEY: misc_feature
<222> LOCATION: (34)..(35)
<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 503
augnnnuggn nknnknnknn knnknnknnk nnknnknnku gu 42

<210> SEQ ID NO 504
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u
<220> FEATURE:
<221> NAME/KEY: misc_feature
<222> LOCATION: (7)..(9)
<223> OTHER INFORMATION: n is a, c, g, or u
<220> FEATURE:
<221> NAME/KEY: misc_feature
<222> LOCATION: (13)..(14)
<223> OTHER INFORMATION: n is a, c, g, or u
<220> FEATURE:
<221> NAME/KEY: misc_feature
<222> LOCATION: (16)..(17)
<223> OTHER INFORMATION: n is a, c, g, or u
<220> FEATURE:
<221> NAME/KEY: misc_feature
<222> LOCATION: (19)..(20)
<223> OTHER INFORMATION: n is a, c, g, or u
<220> FEATURE:
<221> NAME/KEY: misc_feature
<222> LOCATION: (22)..(23)
<223> OTHER INFORMATION: n is a, c, g, or u
<220> FEATURE:
<221> NAME/KEY: misc_feature
<222> LOCATION: (25)..(26)
<223> OTHER INFORMATION: n is a, c, g, or u
<220> FEATURE:
<221> NAME/KEY: misc_feature
<222> LOCATION: (28)..(29)
<223> OTHER INFORMATION: n is a, c, g, or u
<220> FEATURE:
<221> NAME/KEY: misc_feature
<222> LOCATION: (31)..(32)
<223> OTHER INFORMATION: n is a, c, g, or u
<220> FEATURE:
<221> NAME/KEY: misc_feature
<222> LOCATION: (34)..(35)
<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 504
augnnknnnu ggnnknnknn knnknnknnk nnknnknnku gu 42

<210> SEQ ID NO 505
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)

<223> OTHER INFORMATION: n is a, c, g, or u
<220> FEATURE:
<221> NAME/KEY: misc_feature
<222> LOCATION: (7)..(8)
<223> OTHER INFORMATION: n is a, c, g, or u
<220> FEATURE:
<221> NAME/KEY: misc_feature
<222> LOCATION: (10)..(12)
<223> OTHER INFORMATION: n is a, c, g, or u
<220> FEATURE:
<221> NAME/KEY: misc_feature
<222> LOCATION: (16)..(17)
<223> OTHER INFORMATION: n is a, c, g, or u
<220> FEATURE:
<221> NAME/KEY: misc_feature
<222> LOCATION: (19)..(20)
<223> OTHER INFORMATION: n is a, c, g, or u
<220> FEATURE:
<221> NAME/KEY: misc_feature
<222> LOCATION: (22)..(23)
<223> OTHER INFORMATION: n is a, c, g, or u
<220> FEATURE:
<221> NAME/KEY: misc_feature
<222> LOCATION: (25)..(26)
<223> OTHER INFORMATION: n is a, c, g, or u
<220> FEATURE:
<221> NAME/KEY: misc_feature
<222> LOCATION: (28)..(29)
<223> OTHER INFORMATION: n is a, c, g, or u
<220> FEATURE:
<221> NAME/KEY: misc_feature
<222> LOCATION: (31)..(32)
<223> OTHER INFORMATION: n is a, c, g, or u
<220> FEATURE:
<221> NAME/KEY: misc_feature
<222> LOCATION: (34)..(35)
<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 505
augnnknnkn nnuggnnknn knnknnknnk nnknnknnku gu 42

<210> SEQ ID NO 506
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u
<220> FEATURE:
<221> NAME/KEY: misc_feature
<222> LOCATION: (7)..(8)
<223> OTHER INFORMATION: n is a, c, g, or u
<220> FEATURE:
<221> NAME/KEY: misc_feature
<222> LOCATION: (10)..(11)
<223> OTHER INFORMATION: n is a, c, g, or u
<220> FEATURE:
<221> NAME/KEY: misc_feature
<222> LOCATION: (13)..(15)
<223> OTHER INFORMATION: n is a, c, g, or u
<220> FEATURE:
<221> NAME/KEY: misc_feature
<222> LOCATION: (19)..(20)
<223> OTHER INFORMATION: n is a, c, g, or u
<220> FEATURE:
<221> NAME/KEY: misc_feature
<222> LOCATION: (22)..(23)
<223> OTHER INFORMATION: n is a, c, g, or u
<220> FEATURE:
<221> NAME/KEY: misc_feature
<222> LOCATION: (25)..(26)
<223> OTHER INFORMATION: n is a, c, g, or u
<220> FEATURE:
<221> NAME/KEY: misc_feature
<222> LOCATION: (28)..(29)
<223> OTHER INFORMATION: n is a, c, g, or u
<220> FEATURE:
<221> NAME/KEY: misc_feature
<222> LOCATION: (31)..(32)
<223> OTHER INFORMATION: n is a, c, g, or u
<220> FEATURE:
<221> NAME/KEY: misc_feature
<222> LOCATION: (34)..(35)
<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 506
augnnknnkn nknnnuggnn knnknnknnk nnknnknnku gu 42

<210> SEQ ID NO 507
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u
<220> FEATURE:
<221> NAME/KEY: misc_feature
<222> LOCATION: (7)..(8)
<223> OTHER INFORMATION: n is a, c, g, or u
<220> FEATURE:
<221> NAME/KEY: misc_feature
<222> LOCATION: (10)..(11)
<223> OTHER INFORMATION: n is a, c, g, or u
<220> FEATURE:
<221> NAME/KEY: misc_feature
<222> LOCATION: (13)..(14)
<223> OTHER INFORMATION: n is a, c, g, or u
<220> FEATURE:
<221> NAME/KEY: misc_feature
<222> LOCATION: (16)..(18)
<223> OTHER INFORMATION: n is a, c, g, or u
<220> FEATURE:
<221> NAME/KEY: misc_feature
<222> LOCATION: (22)..(23)
<223> OTHER INFORMATION: n is a, c, g, or u
<220> FEATURE:
<221> NAME/KEY: misc_feature
<222> LOCATION: (25)..(26)
<223> OTHER INFORMATION: n is a, c, g, or u
<220> FEATURE:
<221> NAME/KEY: misc_feature
<222> LOCATION: (28)..(29)
<223> OTHER INFORMATION: n is a, c, g, or u
<220> FEATURE:
<221> NAME/KEY: misc_feature
<222> LOCATION: (31)..(32)
<223> OTHER INFORMATION: n is a, c, g, or u
<220> FEATURE:
<221> NAME/KEY: misc_feature
<222> LOCATION: (34)..(35)
<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 507
augnnknnkn nknnknnnug gnnknnknnk nnknnknnku gu 42

<210> SEQ ID NO 508
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u
<220> FEATURE:
<221> NAME/KEY: misc_feature
<222> LOCATION: (7)..(8)
<223> OTHER INFORMATION: n is a, c, g, or u
<220> FEATURE:
<221> NAME/KEY: misc_feature
<222> LOCATION: (10)..(11)
<223> OTHER INFORMATION: n is a, c, g, or u
<220> FEATURE:
<221> NAME/KEY: misc_feature
<222> LOCATION: (13)..(14)
<223> OTHER INFORMATION: n is a, c, g, or u
<220> FEATURE:
<221> NAME/KEY: misc_feature
<222> LOCATION: (16)..(17)
<223> OTHER INFORMATION: n is a, c, g, or u
<220> FEATURE:
<221> NAME/KEY: misc_feature
<222> LOCATION: (19)..(21)
<223> OTHER INFORMATION: n is a, c, g, or u
<220> FEATURE:
<221> NAME/KEY: misc_feature
<222> LOCATION: (25)..(26)
<223> OTHER INFORMATION: n is a, c, g, or u
<220> FEATURE:
<221> NAME/KEY: misc_feature
<222> LOCATION: (28)..(29)
<223> OTHER INFORMATION: n is a, c, g, or u
<220> FEATURE:
<221> NAME/KEY: misc_feature
<222> LOCATION: (31)..(32)
<223> OTHER INFORMATION: n is a, c, g, or u
<220> FEATURE:
<221> NAME/KEY: misc_feature
<222> LOCATION: (34)..(35)
<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 508
augnnknnkn nknnknnknn nuggnnknnk nnknnknnku gu 42

<210> SEQ ID NO 509
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u
<220> FEATURE:
<221> NAME/KEY: misc_feature
<222> LOCATION: (7)..(8)
<223> OTHER INFORMATION: n is a, c, g, or u
<220> FEATURE:
<221> NAME/KEY: misc_feature
<222> LOCATION: (10)..(11)
<223> OTHER INFORMATION: n is a, c, g, or u
<220> FEATURE:
<221> NAME/KEY: misc_feature
<222> LOCATION: (13)..(14)
<223> OTHER INFORMATION: n is a, c, g, or u
<220> FEATURE:
<221> NAME/KEY: misc_feature
<222> LOCATION: (16)..(17)
<223> OTHER INFORMATION: n is a, c, g, or u
<220> FEATURE:
<221> NAME/KEY: misc_feature
<222> LOCATION: (19)..(20)
<223> OTHER INFORMATION: n is a, c, g, or u
<220> FEATURE:
<221> NAME/KEY: misc_feature
<222> LOCATION: (22)..(24)
<223> OTHER INFORMATION: n is a, c, g, or u
<220> FEATURE:
<221> NAME/KEY: misc_feature
<222> LOCATION: (28)..(29)
<223> OTHER INFORMATION: n is a, c, g, or u
<220> FEATURE:
<221> NAME/KEY: misc_feature
<222> LOCATION: (31)..(32)
<223> OTHER INFORMATION: n is a, c, g, or u
<220> FEATURE:
<221> NAME/KEY: misc_feature
<222> LOCATION: (34)..(35)
<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 509
augnnknnkn nknnknnknn knnnuggnnk nnknnknnku gu 42

<210> SEQ ID NO 510
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u
<220> FEATURE:
<221> NAME/KEY: misc_feature
<222> LOCATION: (7)..(8)
<223> OTHER INFORMATION: n is a, c, g, or u
<220> FEATURE:
<221> NAME/KEY: misc_feature
<222> LOCATION: (10)..(11)
<223> OTHER INFORMATION: n is a, c, g, or u
<220> FEATURE:
<221> NAME/KEY: misc_feature
<222> LOCATION: (13)..(14)
<223> OTHER INFORMATION: n is a, c, g, or u
<220> FEATURE:
<221> NAME/KEY: misc_feature
<222> LOCATION: (16)..(17)
<223> OTHER INFORMATION: n is a, c, g, or u
<220> FEATURE:
<221> NAME/KEY: misc_feature
<222> LOCATION: (19)..(20)
<223> OTHER INFORMATION: n is a, c, g, or u
<220> FEATURE:
<221> NAME/KEY: misc_feature
<222> LOCATION: (22)..(23)
<223> OTHER INFORMATION: n is a, c, g, or u
<220> FEATURE:
<221> NAME/KEY: misc_feature
<222> LOCATION: (25)..(27)
<223> OTHER INFORMATION: n is a, c, g, or u
<220> FEATURE:
<221> NAME/KEY: misc_feature
<222> LOCATION: (31)..(32)
<223> OTHER INFORMATION: n is a, c, g, or u
<220> FEATURE:
<221> NAME/KEY: misc_feature
<222> LOCATION: (34)..(35)

<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 510
augnnknnkn nknnknnknn knnknnnugg nnknnknnku gu 42

<210> SEQ ID NO 511
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u
<220> FEATURE:
<221> NAME/KEY: misc_feature
<222> LOCATION: (7)..(8)
<223> OTHER INFORMATION: n is a, c, g, or u
<220> FEATURE:
<221> NAME/KEY: misc_feature
<222> LOCATION: (10)..(11)
<223> OTHER INFORMATION: n is a, c, g, or u
<220> FEATURE:
<221> NAME/KEY: misc_feature
<222> LOCATION: (13)..(14)
<223> OTHER INFORMATION: n is a, c, g, or u
<220> FEATURE:
<221> NAME/KEY: misc_feature
<222> LOCATION: (16)..(17)
<223> OTHER INFORMATION: n is a, c, g, or u
<220> FEATURE:
<221> NAME/KEY: misc_feature
<222> LOCATION: (19)..(20)
<223> OTHER INFORMATION: n is a, c, g, or u
<220> FEATURE:
<221> NAME/KEY: misc_feature
<222> LOCATION: (22)..(23)
<223> OTHER INFORMATION: n is a, c, g, or u
<220> FEATURE:
<221> NAME/KEY: misc_feature
<222> LOCATION: (25)..(26)
<223> OTHER INFORMATION: n is a, c, g, or u
<220> FEATURE:
<221> NAME/KEY: misc_feature
<222> LOCATION: (28)..(30)
<223> OTHER INFORMATION: n is a, c, g, or u
<220> FEATURE:
<221> NAME/KEY: misc_feature
<222> LOCATION: (34)..(35)
<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 511
augnnknnkn nknnknnknn knnknnknnn uggnnknnku gu 42

<210> SEQ ID NO 512
<211> LENGTH: 42
<212> TYPE: RNA
<213> ORGANISM: Artificial Sequence
<220> FEATURE:
<223> OTHER INFORMATION: mRNA
<220> FEATURE:
<221> NAME/KEY: misc_feature
<222> LOCATION: (4)..(5)
<223> OTHER INFORMATION: n is a, c, g, or u
<220> FEATURE:
<221> NAME/KEY: misc_feature -continued
<222> LOCATION: (7)..(8)
<223> OTHER INFORMATION: n is a, c, g, or u
<220> FEATURE:
<221> NAME/KEY: misc_feature
<222> LOCATION: (10)..(11)
<223> OTHER INFORMATION: n is a, c, g, or u
<220> FEATURE:
<221> NAME/KEY: misc_feature
<222> LOCATION: (13)..(14)
<223> OTHER INFORMATION: n is a, c, g, or u
<220> FEATURE:
<221> NAME/KEY: misc_feature
<222> LOCATION: (16)..(17)
<223> OTHER INFORMATION: n is a, c, g, or u
<220> FEATURE:
<221> NAME/KEY: misc_feature
<222> LOCATION: (19)..(20)
<223> OTHER INFORMATION: n is a, c, g, or u
<220> FEATURE:
<221> NAME/KEY: misc_feature
<222> LOCATION: (22)..(23)
<223> OTHER INFORMATION: n is a, c, g, or u
<220> FEATURE:
<221> NAME/KEY: misc_feature
<222> LOCATION: (25)..(26)
<223> OTHER INFORMATION: n is a, c, g, or u
<220> FEATURE:
<221> NAME/KEY: misc_feature
<222> LOCATION: (28)..(29)
<223> OTHER INFORMATION: n is a, c, g, or u
<220> FEATURE:
<221> NAME/KEY: misc_feature
<222> LOCATION: (31)..(33)
<223> OTHER INFORMATION: n is a, c, g, or u
<220> FEATURE:
<221> NAME/KEY: misc_feature
<222> LOCATION: (37)..(38)
<223> OTHER INFORMATION: n is a, c, g, or u

<400> SEQUENCE: 512
augnnknnkn nknnknnknn knnknnknnk nnnuggnnku gu 42